US012760046B2

(12) United States Patent
Schmidt et al.

(10) Patent No.: US 12,760,046 B2
(45) Date of Patent: Oct. 13, 2026

(54) PHOSPHOROUS (V)-BASED REAGENTS, PROCESSES FOR THE PREPARATION THEREOF, AND THEIR USE IN MAKING STEREO-DEFINED ORGANOPHOSHOROUS (V) COMPOUNDS

(71) Applicants: Bristol-Myers Squibb Company, Princeton, NJ (US); The Scripps Research Institute, La Jolla, CA (US)

(72) Inventors: Michael Anthony Schmidt, Cranbury, NJ (US); Michal Ociepa, San Diego, CA (US); Martin D. Eastgate, Titusville, NJ (US); Bin Zheng, Kendall Park, NJ (US); Phil Baran, San Diego, CA (US); Hai-Jun Zhang, San Diego, CA (US); Molham Naser, Solana Beach, CA (US)

(73) Assignees: BRISTOL-MYERS SQUIBB COMPANY, Princeton, NJ (US); THE SCRIPPS RESEARCH INSTITUTE, La Jolla, CA (US)

( * ) Notice: Subject to any disclaimer, the term of this patent is extended or adjusted under 35 U.S.C. 154(b) by 413 days.

(21) Appl. No.: 18/469,393

(22) Filed: Sep. 18, 2023

(65) Prior Publication Data

US 2024/0166675 A1 May 23, 2024

Related U.S. Application Data

(60) Provisional application No. 63/376,249, filed on Sep. 19, 2022.

(51) Int. Cl.
*C07F 9/6568* (2006.01)
*C07F 9/6578* (2006.01)

(52) U.S. Cl.
CPC ........ *C07F 9/6578* (2013.01); *C07B 2200/07* (2013.01)

(58) Field of Classification Search
CPC .................................................. C07D 213/61
See application file for complete search history.

(56) References Cited

U.S. PATENT DOCUMENTS

| | | | | |
|---|---|---|---|---|
| 11,613,554 | B2 * | 3/2023 | Schmidt | C07H 19/10 536/25.33 |
| 12,269,840 | B2 * | 4/2025 | Schmidt | C07H 21/00 |
| 2023/0212204 | A1 | 7/2023 | Xu et al. | |
| 2023/0242569 | A1 * | 8/2023 | Schmidt | C07H 1/02 536/25.33 |

FOREIGN PATENT DOCUMENTS

| | | |
|---|---|---|
| WO | WO-2016079181 A1 | 5/2016 |
| WO | WO-2024064638 A1 | 3/2024 |

OTHER PUBLICATIONS

M. Nassir et al., 145 Journal of the American Chemical Society, 15088-15093 (2023) (Year: 2023).*

H. Zhang et al., 16 Nature Chemistry, 249-258 (2023) (Year: 2023).*

K. Knouse et al., 361 Science, 1234-1238 (2018) (Year: 2018).*

International Search Report and Written Opinion for International Application No. PCT/US2023/074505, European Patent Office, Netherlands, mailed on Jan. 30, 2024, 10 pages.

Nassir, M., et al., "Stereocontrolled Radical Thiophosphorylation," J Am Chem Soc 145(28):15088-15093, American Chemical Society, United States (Jul. 2023).

Nassir, M., et al., "Stereocontrolled Radical Thiophosphorylation—Supporting Information," J Am Chem Soc 145(28):S1-S227, American Chemical Society, United States (Jul. 2023).

Davisson, V., et al., "Synthesis of nucleotide 5'-diphosphates from 5'-O-tosyl nucleosides," J Org Chem 52(9):1794-1801, American Chemical Society, United States (May 1987).

Debarge, S., et al., "Design and synthesis of a-carboxy phosphononucleosides," J Org Chem 76(1):105-126, American Chemical Society, United States (Jan. 2011).

(Continued)

*Primary Examiner* — Alexander R Pagano
(74) *Attorney, Agent, or Firm* — STERNE, KESSLER, GOLDSTEIN & FOX P.L.L.C.

(57) ABSTRACT

The present invention relates to novel phosphorous (V) (P(V)) reagents

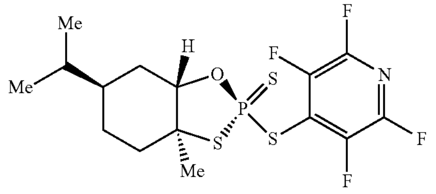

and

Enantiomer (-)

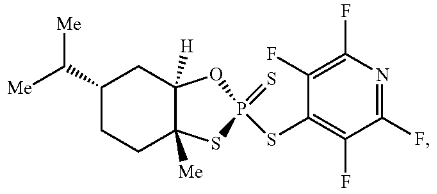

Enantiomer (+)

methods for preparing thereof, and methods for preparing nucleoside phosphorothioate compounds by using the novel reagents.

21 Claims, 2 Drawing Sheets

(56) References Cited

OTHER PUBLICATIONS

Dilman, A., et al., "Using the Thiyl Radical for Aliphatic Hydrogen-Atom Transfer: Thiolation of Unactivated C—H Bonds," Angew Chem Int Ed Engl 60(6):2849-2854, Wiley, United Kingdom (Feb. 2021).
Huang, Y., et al., "A P(V) platform for oligonucleotide synthesis," Science 373(6560):1265-1270, American Association for the Advancement of Science, United States (Sep. 2021).
Lambrecht, M., et al., "Synthesis of dimeric ADP-ribose and its structure with human poly(ADP-ribose) glycohydrolase," J Am Chem Soc 137(10):3558-3564, American Chemical Society, United States (Feb. 2015).
Lu, S., et al., "Fluorescent Sensing of Guanine and Guanosine Monophosphate with Conjugated Receptors Incorporating Aniline and Naphthyridine Moieties," Org Lett 18(8):1724-1727, American Chemical Society, United States (Mar. 2016).
Saudi, M., et al., "In search of Flavivirus inhibitors part 2: tritylated, diphenylmethylated and other alkylated nucleoside analogues," Eur J Med Chem 76:98-109, Elsevier, Netherlands (Apr. 2014).
Steiner, D., et al., "A facile and efficient method for the kinetic separation of commercially available cis- and trans-limonene epoxide," Tetrahedron Asymmetry 13(21):2359-2363, Elsevier, Netherlands (Oct. 2002).
Yang, M., et al., "Palladium Catalysis Enables Benzylation of α,α-Difluoroketone Enolates," Angew Chem Int Ed Engl 55(31):9080-9083, Wiley, United Kingdom (Jul. 2016).
Zhu, X., and Scott, A., "Novel Synthetic Approach to Multibenzoylated Nucleosides," Synthetic Communications 38(9):1346-1354, Taylor & Francis Ltd., United Kingdom (Apr. 2008).
Antonov, K.V., et al., "Chemical and Chemoenzymatic Synthesis of Nucleoside 5'-a- Thiotriphosphates," Russian Journal of Bioorganic Chemistry 29(6):560-565, Springer Nature, Germany (Nov. 2003).
Bryant, FR., and Benkovic, S.J., et al., "Stereochemical Course of the Reaction Catalyzed by 5'-Nucleotide Phosphodiesterase From Snake Venom," Biochemistry 18(13):2825-2828, American Chemical Society, United States (Jun. 1979).
Ludwig, J., and Eckstein, F, "Rapid and Efficient Synthesis of Nucleoside 5'-O-(1-Thiotriphosphates), 5'-Triphosphates and 2',3'-Cyclophosphorothioates Using 2-Chloro-4H- 1,3,2-benzodioxaphosphorin-4-one" The Journal of Organic Chemistry 54(3):631-635, American Chemical Society, United States (Feb. 1989).
Misiura, K., et al., "Synthesis of Nucleoside a-Thiotriphosphates via an Oxathiaphospholane Approach," Organic Letters 7(11):2217-2220, American Chemical Society, United States (May 2005).
Moran, J.R., and Whitesides, G.M., "A Practical Enzymatic Synthesis of (Sp)-Adenosine 5'-O-(1-Thiotriphosphate)((Sp)-ATP-a-S)1" The Journal of Organic Chemistry 49(4):704-706, American Chemical Society, United States (Feb. 1984).
Nadel, Y., et al., "Highly Potent and Selective Ectonucleotide Pyrophosphatase/phosphodiesterase I Inhibitors Based on an Adenosine 5'-(a or y)-Thio-(a,ß- or ß,y)-methylenetriphosphate Scaffold," Journal of Medicinal Chemistry 57(11):4677-4691, American Chemical Society, United States (Jun. 2014).
Nassir, M., et al., "Adenine-(methoxy)-ethoxy-Pa,a-dithio-triphosphate Inhibits Pathologic Calcium Pyrophosphate Deposition in Osteoarthritic Human Chondrocytes," Organic & Biomolecular Chemistry 17(46):9913-9923, Royal Society of Chemistry, United Kingdom (Nov. 2019).
Nassir, M., et al., "Structure-activity Relationship Study of NPP1 Inhibitors Based on uracil- N1-(methoxy)ethyl-ß-phosphate Scaffold," European Journal of Medicinal Chemistry 184:111754, pp. 1-13, Editions Scientifiques Elsevier, France (Dec 2019).
Strenkowska, M., et al., "Preparation of Synthetically Challenging Nucleotides Using Cyanoethyl P-Imidazolides and Microwaves," Organic Letters 14(18):4782-4785, American Chemical Society, United States (Sep. 2012).
Zelikman, V., et al., "Highly Selective and Potent Ectonucleotide Pyrophosphatase-1 (NPP1) Inhibitors Based on Uridine 5'-Pa,a-Dithiophosphate Analogues," Journal of Medicinal Chemistry 61(9):3939-3951, American Chemical Society, United States (May 2018).

* cited by examiner

PHOSPHOROUS (V)-BASED REAGENTS, PROCESSES FOR THE PREPARATION THEREOF, AND THEIR USE IN MAKING STEREO-DEFINED ORGANOPHOSHOROUS (V) COMPOUNDS

CROSS-REFERENCE TO A RELATED APPLICATION

This application claims priority to U.S. Provisional Application No. 63/376,249, filed on Sep. 19, 2022, the disclosure of which is incorporated by reference in its entirety.

BACKGROUND

Field

The present invention relates to novel phosphorous (V) (P(V)) reagents

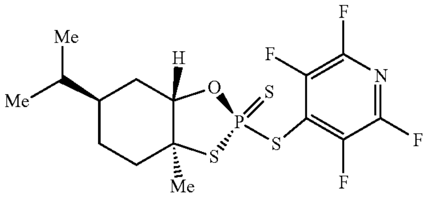
and

Enantiomer (-)

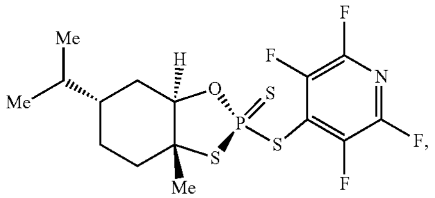

Enantiomer (+)

and methods for preparing enantiomerically enriched (e.g., homochiral, optically pure, or single-isomer) p-chiral nucleoside phosphorothioate compounds by using the novel (P(V)) reagents.

Background

Organophosphorous compounds have wide-ranging applications as therapeutic and diagnostic agents, pest and insects control agents, along with many other applications. Organophosphorous compounds are generally classified based on the oxidation state of the phosphorous atom: +5 (phosphorous (V)) or +3 (phosphorous (III)). Organothiophosphates (phosphorous (V) compounds containing sulfur attached to phosphorous) are a subclass of organophosphate compounds where at least one of the oxygen atoms in the phosphate is replaced by sulfur. In some situations, an asymmetry induced at phosphorous results in chiral organothiophosphate compounds, which makes this class of compounds particularly suitable in therapeutic, diagnostic, research, and other applications.

A well-known and well-utilized example of organothiophosphates are nucleic acids containing a thiophosphate, e.g., phosphorothioate, backbone. The use of poly(nucleic acids), for example dinucleotides, containing a natural phosphodiester backbone of DNA or RNA is limited by their instability to nucleases. Nucleoside phosphorothioates have one of the non-crosslinked oxygen atoms in the phosphodiester bond replaced with a sulfur atom. Therefore, nucleoside phosphorothioates containing a phosphorothioate backbone have higher nuclease resistance and cell membrane permeability compared with dinucleotides having a phosphodiester backbone.

Because of the chiral nature of a phosphorus atom in some organothiophosphates, two kinds of stereoisomers ($R_P$- and $S_P$-isomers) can exist. Therefore, in a P-chiral nucleoside phosphorothioate, diastereoisomers exist, resulting in significant issues for development of such agents. It is known that properties of oligonucleotides, including binding affinity, sequence specific binding to complementary RNA, and stability to nucleases, are affected by the configurations at the phosphorous atoms. Further, it has been suggested that homochiral isomers may have differential properties (solubility, stability, activity, pharmacokinetics, etc.). Therefore, it is highly desirable to prepare nucleoside phosphorothioates with specific stereochemical configurations.

BRIEF SUMMARY

A Compound of the Disclosure is represented by the structure:

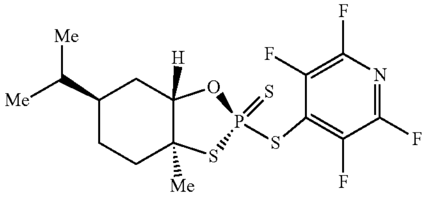
or

Enantiomer (-)

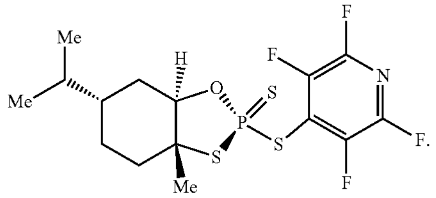

Enantiomer (+)

One embodiment of the present disclosure is directed to methods of making a Compound of the Disclosure comprising reacting compound 1:

(compound 1)

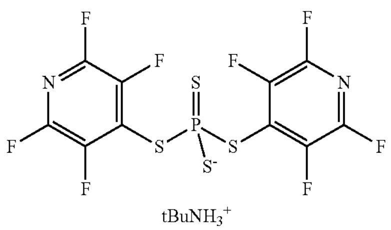

with compound 2 or compound 3:

(compound 2)

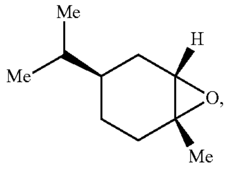

(compound 3)

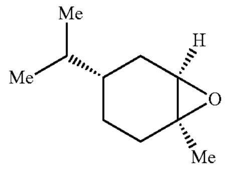

in the presence of an acid.

In another embodiment, the present disclosure provides methods of making compound 1, comprising reacting compound 4:

(compound 4)

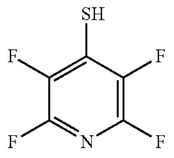

with $P_2S_5$ in the presence of a base.

In another embodiment, the present disclosure provides methods of making compound 2 or compound 3, comprising reacting compound 5 or compound 6:

(compound 5)

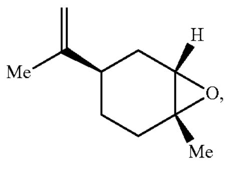

(compound 6)

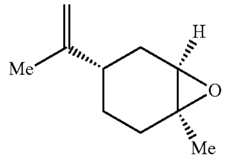

with hydrogen in the presence of a catalyst respectively.

In some embodiments, the present disclosure provides methods of making a nucleoside diphosphorothioate or a salt thereof, comprising:

(a) reacting one of compounds 7, 8, or 9:

(compound 7)

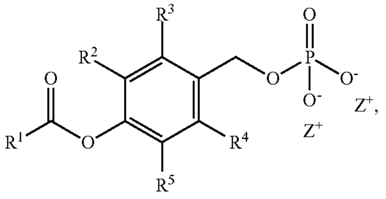

(compound 8)

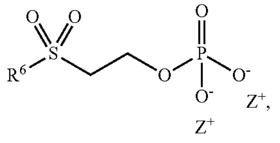

(compound 9)

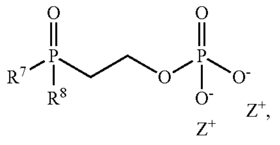

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; each of $R^6$, $R^7$, and $R^8$ is independently $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with a Compound of the Disclosure in the presence of a first base to form a chiral thiodiphosphate transfer reagent;

(b) reacting the chiral thiodiphosphate transfer reagent with a nucleoside in the presence of a second base to form a protected nucleoside diphosphorothioate; and (c) deprotecting the protected nucleoside diphosphorothioate to form a nucleoside diphosphorothioate.

In some embodiments, the nucleoside is a protected nucleoside.

In some embodiments, the nucleoside is an unprotected nucleoside.

In some embodiments, the present disclosure provides methods of making a nucleoside triphosphorothioate or a salt thereof, comprising:

(a) reacting compound 20 or compound 21:

(compound 20)

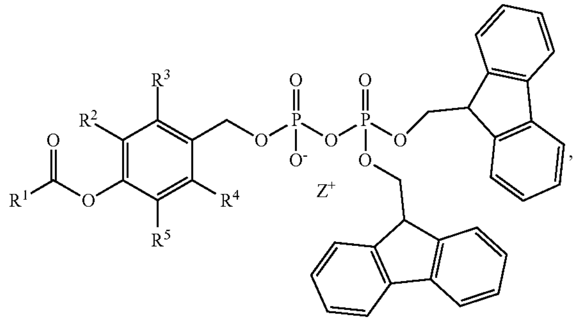

-continued (compound 21)

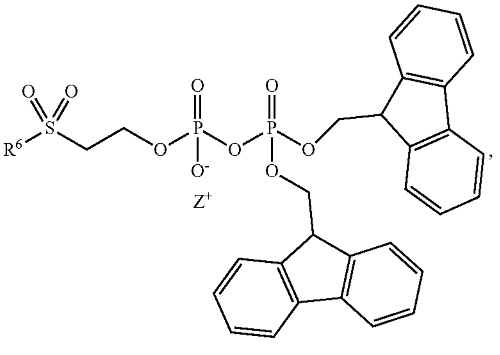

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; $R^6$ is $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with a Compound of the Disclosure in the presence of a first base to form a chiral thiotriphosphate transfer reagent;

(b) reacting the chiral thiotriphosphate transfer reagent with a nucleoside in the presence of a second base to form a protected nucleoside triphosphorothioate; and (c) deprotecting the protected nucleoside triphosphorothioate to form a nucleoside triphosphorothioate.

In some embodiments, the nucleoside is a protected nucleoside.

In some embodiments, the nucleoside is an unprotected nucleoside.

In some embodiments, the present disclosure provides a nucleoside selected from the group consisting of compound 10, compound 11, compound 12, compound 13, compound 14, compound 15, compound 16, compound 17, compound 18, and compound 19:

(compound 10)

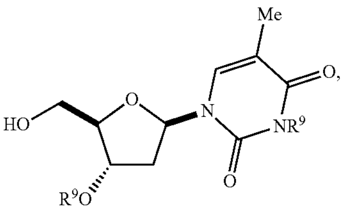

(compound 11)

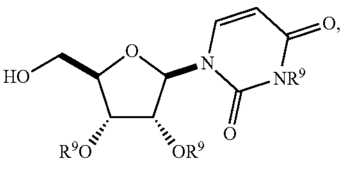

(compound 12)

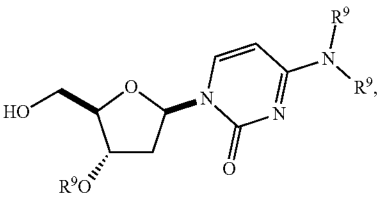

-continued (compound 13)

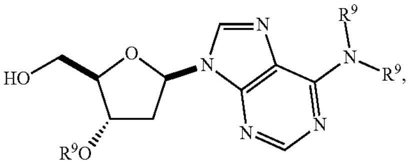

(compound 14)

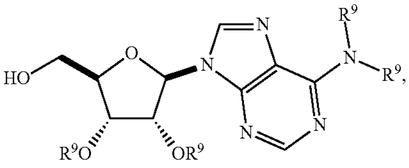

(compound 15)

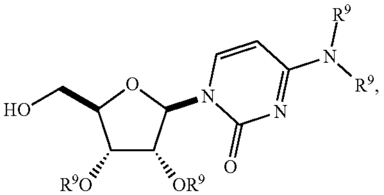

(compound 16)

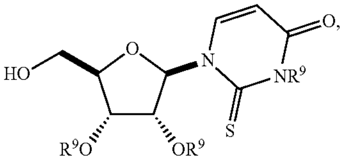

(compound 17)

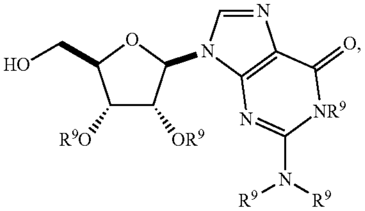

(compound 18)

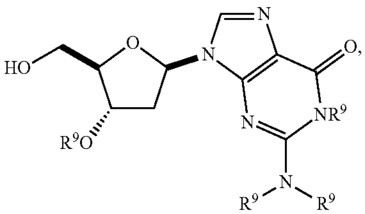

(compound 19)

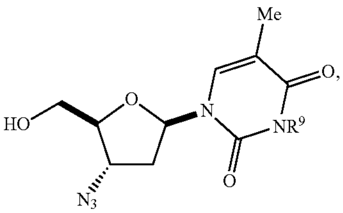

wherein each of $R^9$ is independently hydrogen, acetyl, branched or linear $C_2$-$C_{20}$ alkanoyl, benzoyl, aryloyl, acryloyl, or heteroaryloyl.

In some embodiments, the present disclosure provides a nucleoside diphosphorothioate selected from the group consisting of:

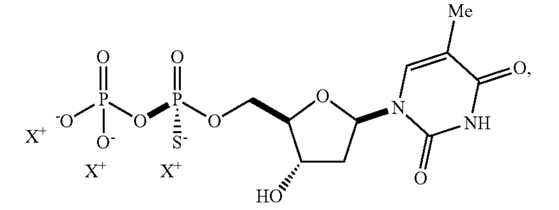
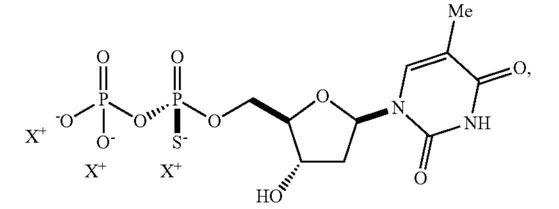
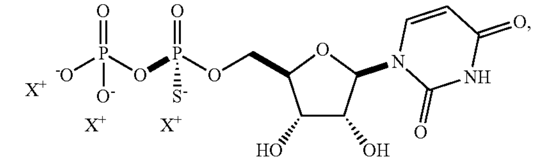
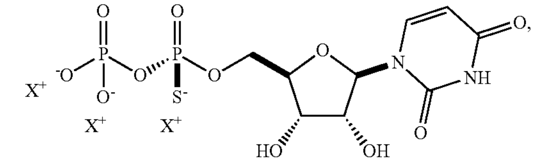
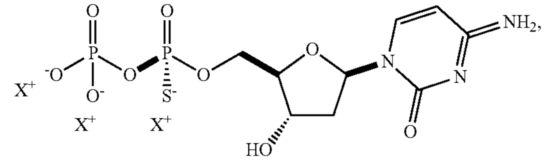
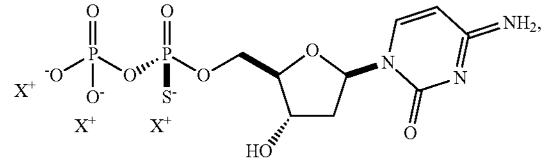
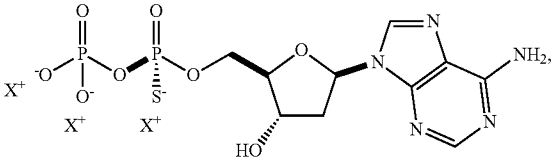
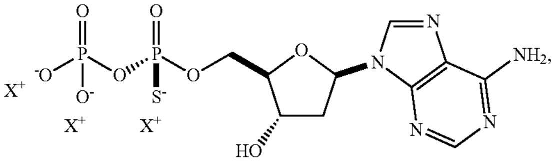
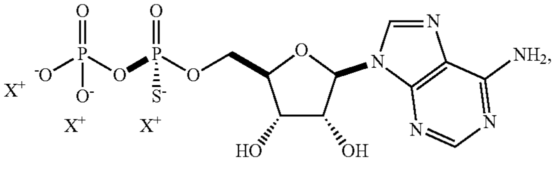
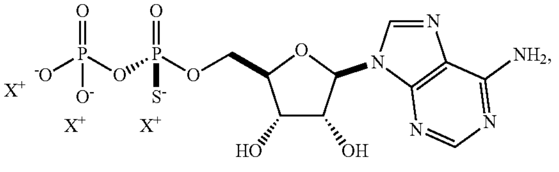
-continued
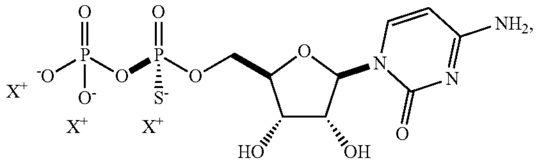
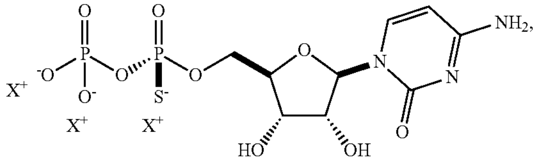
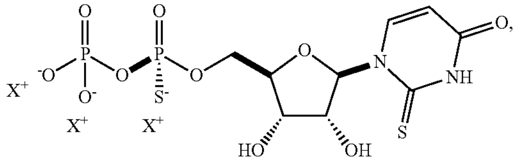
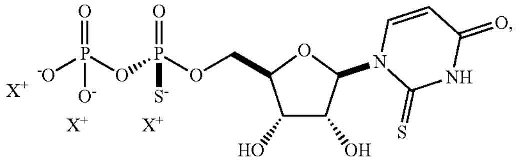
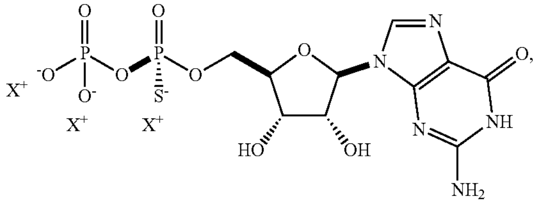
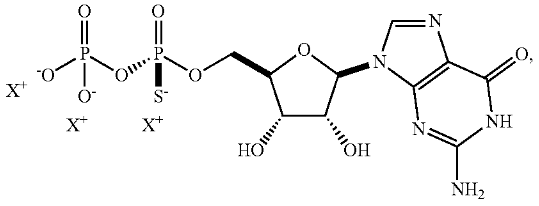
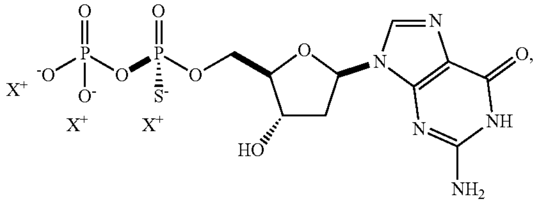
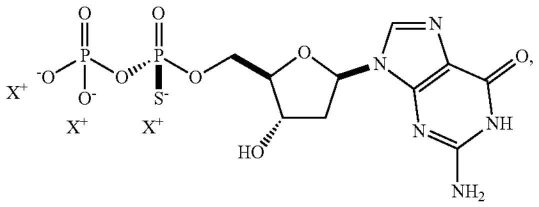
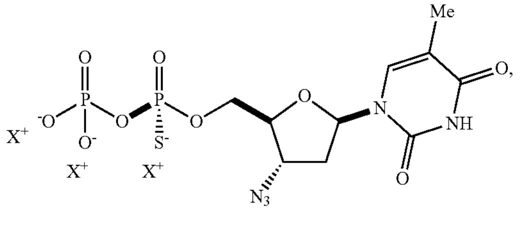

-continued
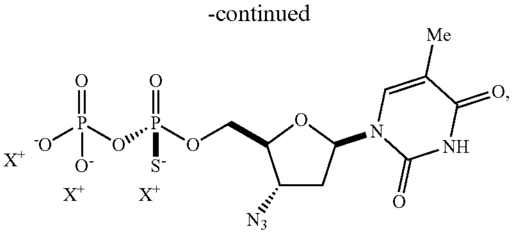
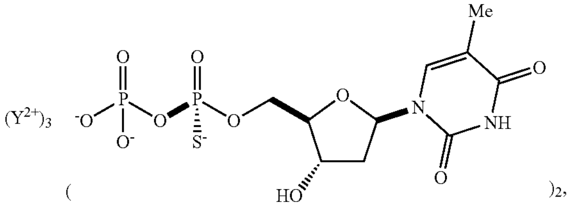
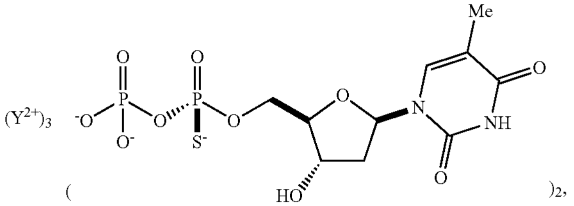
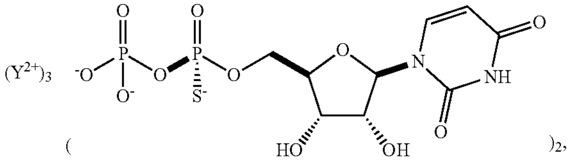
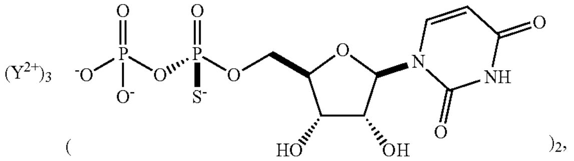
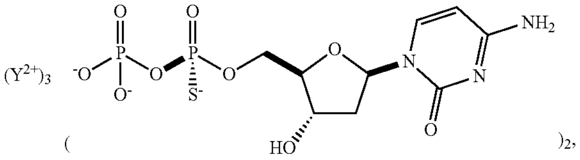
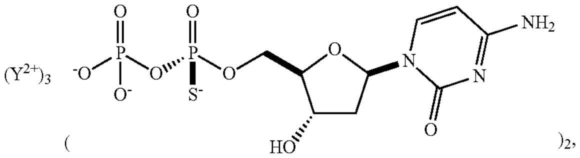
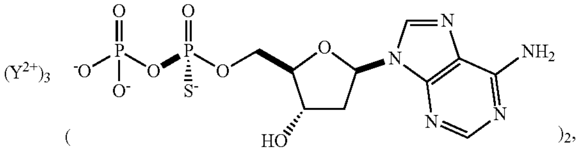
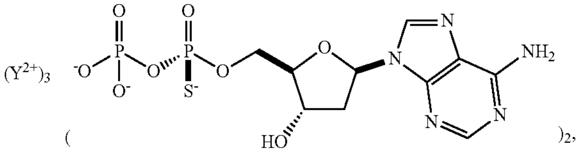
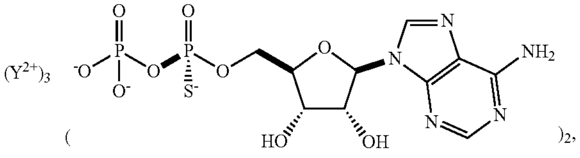
-continued
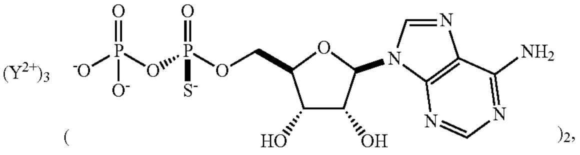
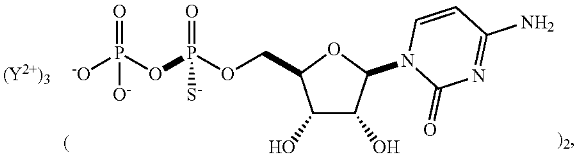
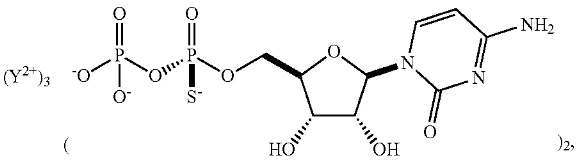
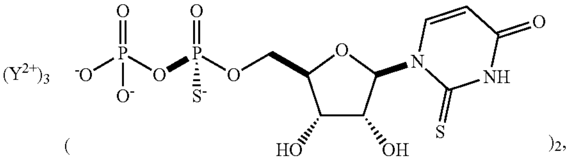
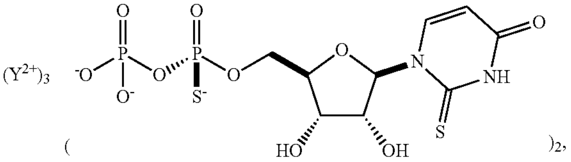
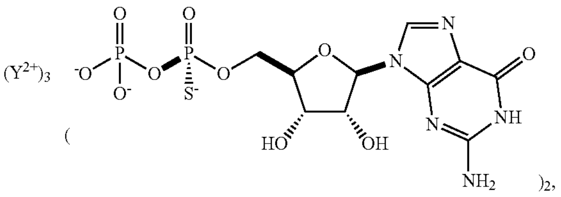
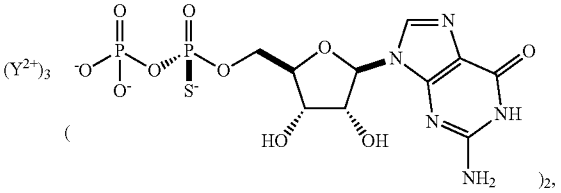
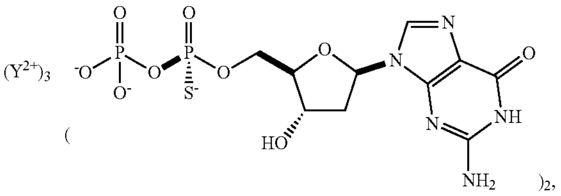
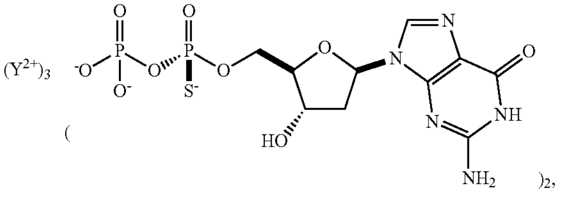

-continued
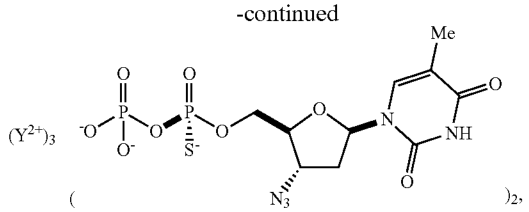
and
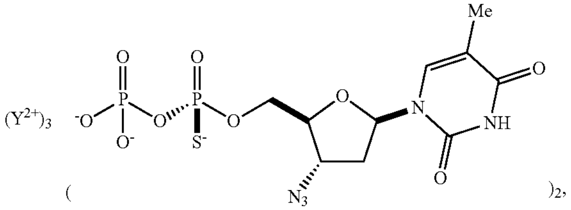
wherein X is ammonium, trialkylammonium, lithium, sodium, or potassium; and Y is calcium or magnesium.
In some embodiments, the present disclosure provides a nucleoside triphosphorothioate selected from the group consisting of:
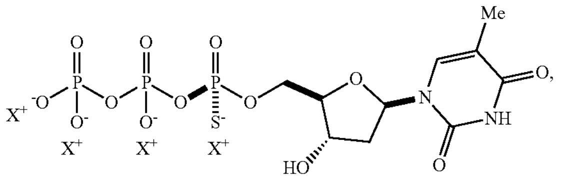
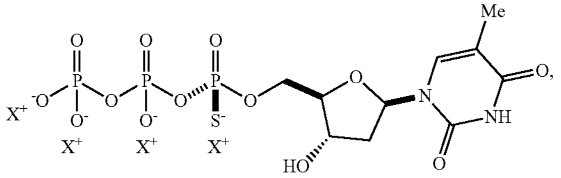
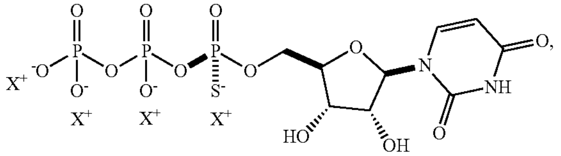
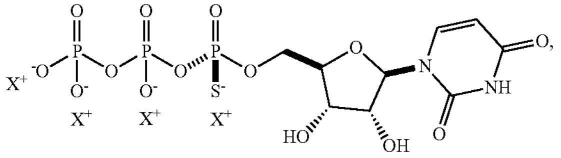
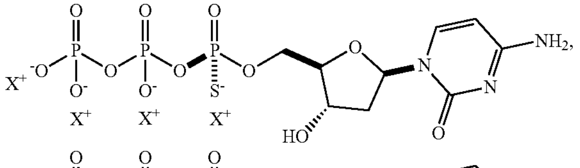
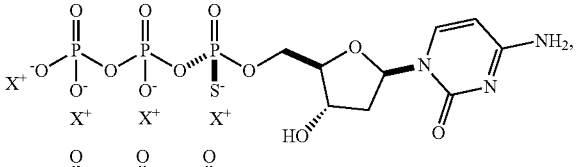
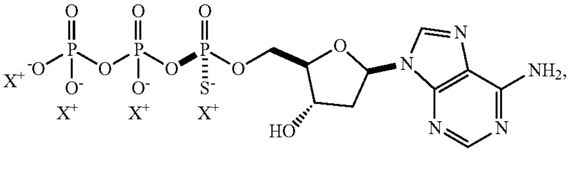
-continued
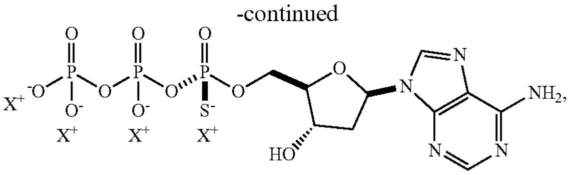
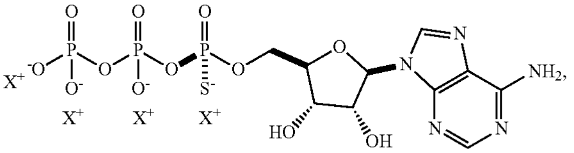
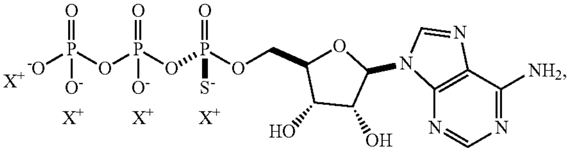
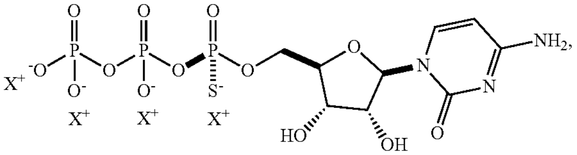
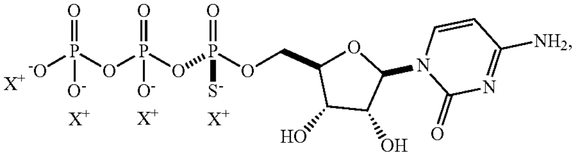
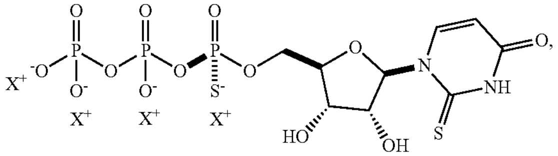
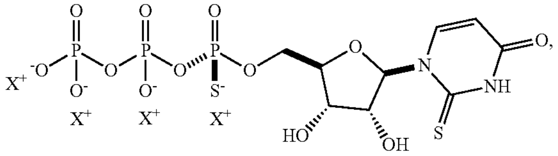
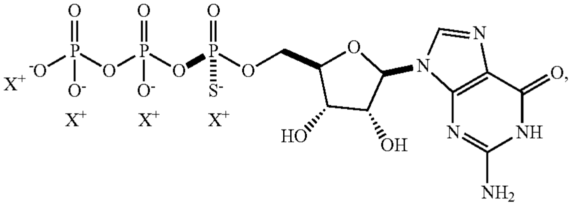
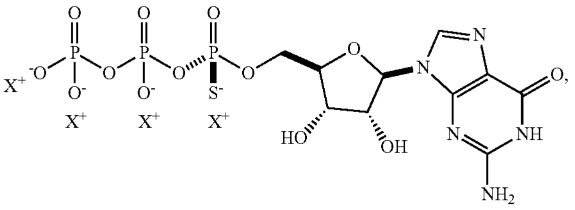
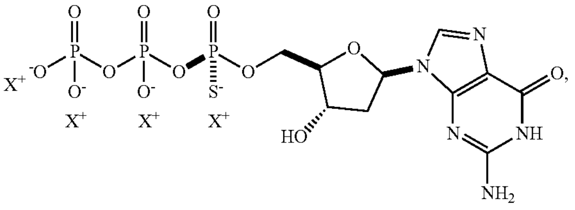

-continued
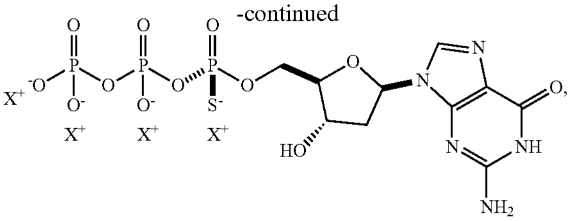
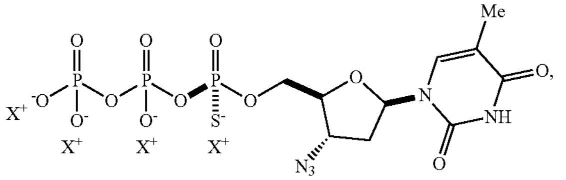
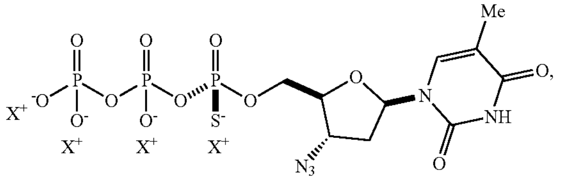
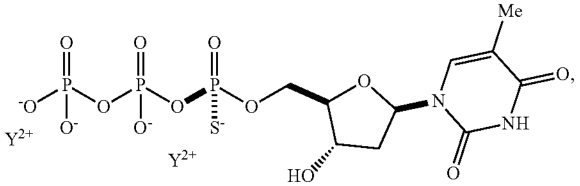
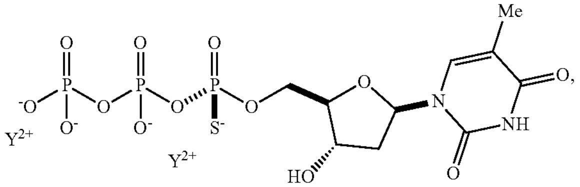
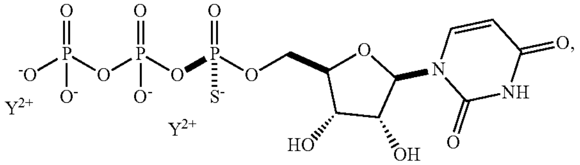
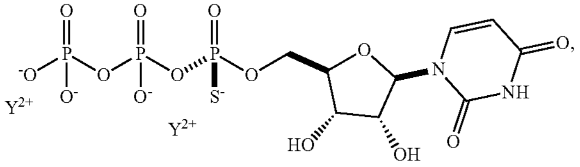
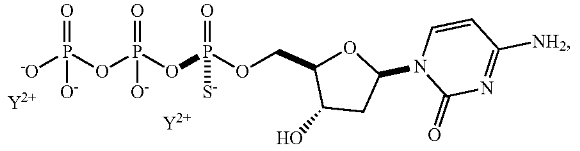
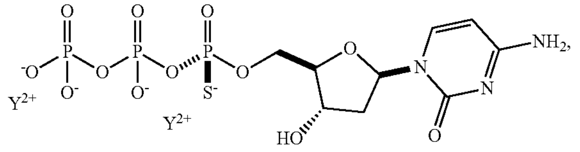
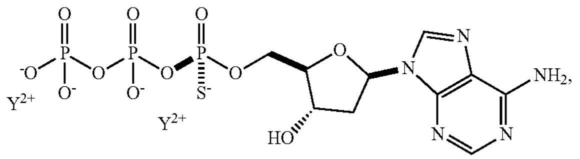
-continued
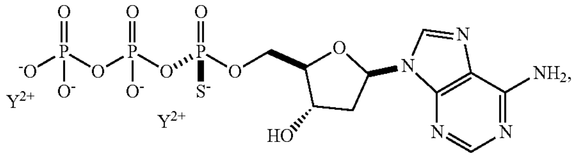
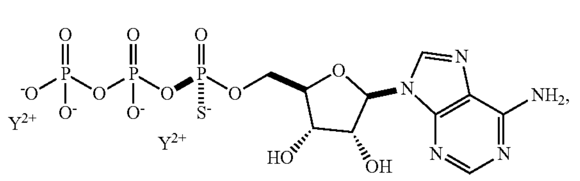
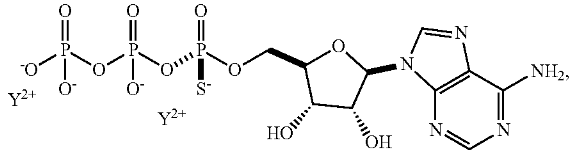
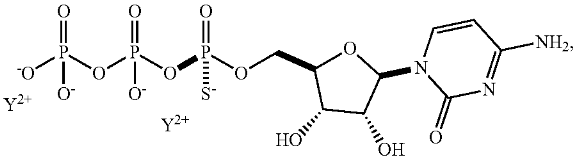
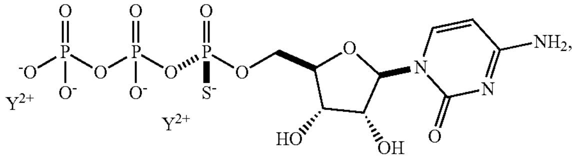
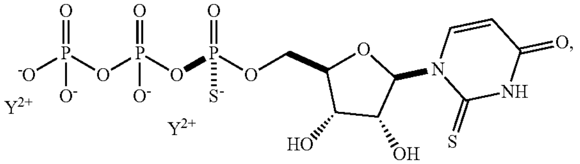
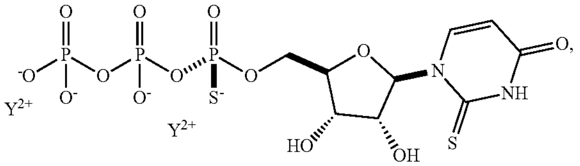
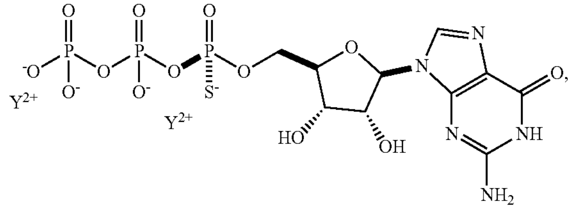
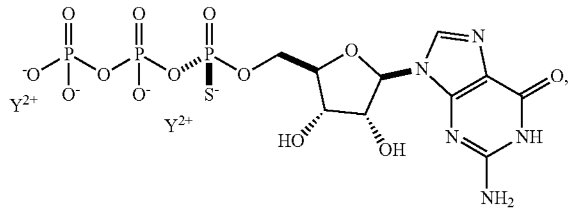

-continued

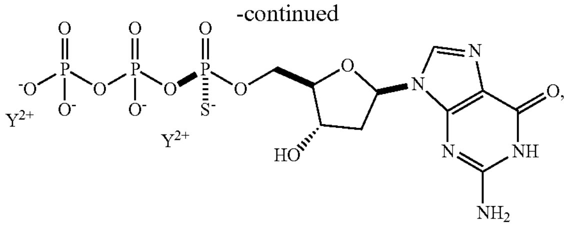

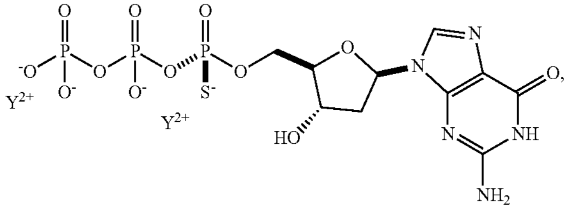

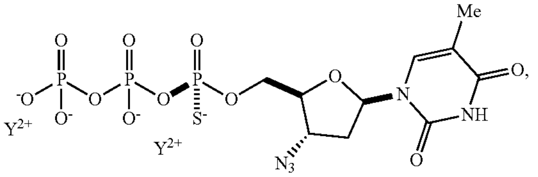

and

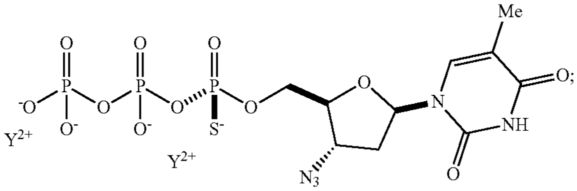

wherein X is ammonium, trialkylammonium, lithium, sodium, or potassium; and Y is calcium or magnesium.

Additional embodiments and advantages of the disclosure will be set forth, in part, in the description that follows, and will flow from the description, or can be learned by practice of the disclosure. The embodiments and advantages of the disclosure will be realized and attained by means of the elements and combinations particularly pointed out in the appended claims.

It is to be understood that both the foregoing summary and the following detailed description are exemplary and explanatory only, and are not restrictive of the invention as claimed.

BRIEF DESCRIPTION OF THE DRAWINGS/FIGURES

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. The figures are intended to be illustrative, not limiting.

DETAILED DESCRIPTION

Definitions

Figure 1:
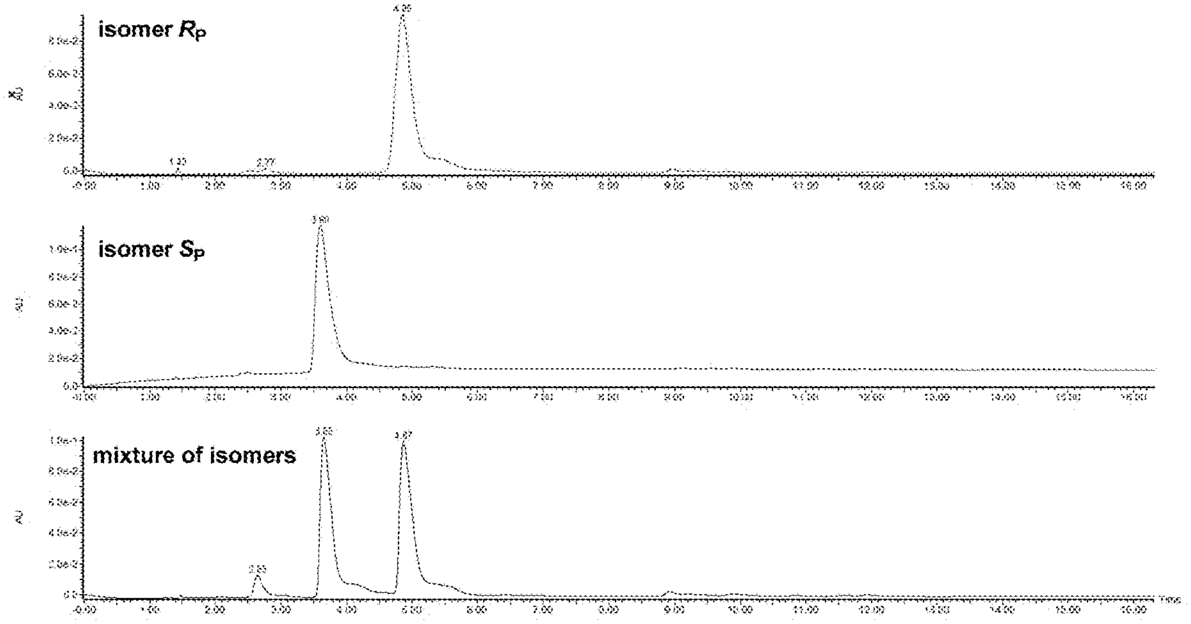
FIG. 1 depicts a representative LC trace for compound 50 as an illustration of an LC trace demonstrating diastereoisomeric purity for a diphosphorothioate of the disclosure.

Unless otherwise stated, the following terms used in this application, including the specification and claims, have the definitions given below. It must be noted that, as used in the specification and the appended claims, the singular forms "a" "an" and "the" include plural referents unless the context clearly dictates otherwise. Unless otherwise indicated, conventional methods of mass spectroscopy, NMR, HPLC, protein chemistry, biochemistry, recombinant DNA techniques and pharmacology are employed. In this application, the use of "or" or "and" means "and/or" unless stated otherwise. Furthermore, use of the term "including" as well as other forms, such as "include", "includes" and "included" is not limiting.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary of Biochemistry And Molecular Biology, Revised, 2000, Oxford University Press, provide one of skill with a general dictionary of many of the terms used in this disclosure.

Wherever embodiments are described herein with the language "comprising," otherwise analogous embodiments described in terms of "consisting of" and/or "consisting essentially of" are also provided.

Units, prefixes, and symbols are denoted in their Système International de Unites (SI) accepted form. Numeric ranges are inclusive of the numbers defining the range. Where a range of values is recited, it is to be understood that each intervening integer value, and each fraction thereof, between the recited upper and lower limits of that range is also specifically disclosed, along with each subrange between such values. The upper and lower limits of any range can independently be included in or excluded from the range, and each range where either, neither or both limits are included is also encompassed within the invention. Where a value is explicitly recited, it is to be understood that values which are about the same quantity or amount as the recited value are also within the scope of the invention. Where a combination is disclosed, each subcombination of the elements of that combination is also specifically disclosed and is within the scope of the invention. Conversely, where different elements or groups of elements are individually disclosed, combinations thereof are also disclosed. Where any element of an invention is disclosed as having a plurality of alternatives, examples of that invention in which each alternative is excluded singly or in any combination with the other alternatives are also hereby disclosed; more than one element of an invention can have such exclusions, and all combinations of elements having such exclusions are hereby disclosed.

The present disclosure is intended to include all isotopes of atoms occurring in the present compounds. Isotopes include those atoms having the same atomic number but different mass numbers. By way of general example and without limitation, isotopes of hydrogen include deuterium and tritium. The isotopes of hydrogen can be denoted as $^{1}H$ (hydrogen), $^{2}H$ (deuterium) and $^{3}H$ (tritium). They are also commonly denoted as D for deuterium and T for tritium. In the application, $CD_3$ denotes a methyl group wherein all of the hydrogen atoms are deuterium. Isotopes of carbon include $^{13}C$ and $^{14}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

In the present disclosure, the term "compound" is meant to include all stereoisomers and isotopes of the structure depicted. As used herein, the term "stereoisomer" means any geometric isomer (e.g., cis- and trans-isomer), enantiomer, or diastereomer of a compound. The present disclosure encompasses any and all stereoisomers of the compounds described herein, including stereomerically pure forms (e.g., geometrically pure, enantiomerically pure, or diastereomerically pure) and enantiomeric and stereoisomeric mixtures, e.g., racemates. Enantiomeric and stereomeric mixtures of compounds and means of resolving them into their component enantiomers or stereoisomers are well-known. "Isotopes" refers to atoms having the same atomic number but different mass numbers resulting from a different number of neutrons in the nuclei. For example, isotopes of hydrogen include tritium and deuterium. Further, a compound, salt, or complex of the present disclosure can be prepared in combination with solvent or water molecules to form solvates and hydrates by routine methods.

In the present disclosure, the term "isomer" means any tautomer, stereoisomer, enantiomer, or diastereomer of any compound of the invention. It is recognized that the compounds of the invention can have one or more chiral centers and/or double bonds and, therefore, exist as stereoisomers, such as double-bond isomers (i.e., geometric E/Z isomers) or diastereomers (e.g., enantiomers (i.e., (+) or (−)) or cis/trans isomers). According to the invention, the chemical structures depicted herein, and therefore the compounds of the invention, encompass all of the corresponding stereoisomers, that is, both the stereomerically pure form (e.g., geometrically pure, enantiomerically pure, or diastereomerically pure) and enantiomeric and stereoisomeric mixtures, e.g., racemates. Enantiomeric and stereoisomeric mixtures of compounds of the invention can typically be resolved into their component enantiomers or stereoisomers by well-known methods, such as chiral-phase gas chromatography, chiral-phase high performance liquid chromatography, crystallizing the compound as a chiral salt complex, or crystallizing the compound in a chiral solvent. Enantiomers and stereoisomers can also be obtained from stereomerically or enantiomerically pure intermediates, reagents, and catalysts by well-known asymmetric synthetic methods.

In the present disclosure, the term "stereoisomer" refers to all possible different isomeric as well as conformational forms that a compound may possess (e.g., a compound of any formula described herein), in particular all possible stereochemically and conformationally isomeric forms, all diastereomers, enantiomers and/or conformers of the basic molecular structure. Some compounds of the present disclosure may exist in different tautomeric forms, all of the latter being included within the scope of the present disclosure.

In the present disclosure, the term "enantiomer" means each individual optically active form of a compound of the invention, having an optical purity or enantiomeric excess (as determined by methods standard in the art) of at least 80% (i.e., at least 90% of one enantiomer and at most 10% of the other enantiomer), at least 90%, or at least 98%.

In the present disclosure, the term "diastereomer," means stereoisomers that are not mirror images of one another and are non-superimposable on one another.

In the present disclosure, the term "nucleic acid" encompasses poly- or oligo-ribonucleotides (RNA) and poly- or oligo-deoxyribonucleotides (DNA); RNA or DNA derived from N-glycosides or C-glycosides of nucleobases; nucleic acids derived from sugars and/or modified sugars; and nucleic acids derived from phosphate bridges and/or modified phosphorous-atom bridges. The term encompasses nucleic acids containing any combinations of nucleobases, sugars, modified sugars, phosphate bridges or modified phosphorous atom bridges. Examples include, and are not limited to, nucleic acids containing ribose moieties, nucleic acids containing deoxyribose moieties, nucleic acids containing both ribose and deoxyribose moieties, nucleic acids containing ribose and modified ribose moieties. The prefix "poly-" refers to a nucleic acid containing about 1 to about 10,000 nucleotide monomer units, and the prefix "oligo-" refers to a nucleic acid containing about 1 to about 200 nucleotide monomer units. The term "nucleic acid" can also encompass cyclic dinucleotides (CDNs).

In the present disclosure, the terms "nucleobase" and "nucleosidic base moiety," used interchangeably, refer to the parts of nucleic acids that are involved in the hydrogen-bonding that binds one nucleic acid strand to the complementary strand in a sequence-specific manner. The most common naturally-occurring nucleobases are adenine (A), guanine (G), uracil (U), cytosine (C), and thymine (T).

In the present disclosure, the term "nucleobases" include modified nucleobases. The examples of nucleobases include, but not limited to, adenine, guanine, uracil, cytosine, and thymine. The examples of nucleobases also include modified nucleobases, such as heterocyclic compounds that can serve as nucleobases, including certain 'universal bases' that are not nucleobases in the most classical sense but serve as nucleobases.

In the present disclosure, the term "nucleoside" refers to a compound, glycosylamine, wherein a nucleobase (a nitrogenous base, such as adenine, guanine, thymine, uracil, 5-methyluracil, etc.) is covalently bound to a five-carbon sugar (ribose or deoxyribose) or a modified sugar.

In the present disclosure, the term "sugar" refers to a monosaccharide in closed and/or open form. Sugars include, but are not limited to, ribose, deoxyribose, pentofuranose, pentopyranose, morpholinos, carbocyclic analogs, hexopyranose moieties and bicyclic sugars such as those found in locked nucleic acids. Examples of locked nucleic acids include, without limitation, those disclosed in WO2016/079181.

In the present disclosure, the term "modified sugar" refers to a moiety that can replace a sugar. The modified sugar mimics the spatial arrangement, electronic properties, or some other physicochemical property of a sugar.

In the present disclosure, the term "nucleotide" refers to a moiety wherein a nucleobase is covalently linked to a sugar or modified sugar, and the sugar or modified sugar is covalently linked to a phosphate group or a modified phosphorous-atom moiety, such a thiophosphate group.

In the present disclosure, the term "purified," when used in relation to nucleic acids, refers to one that is separated from at least one contaminant. As used herein, a "contaminant" is any substance that makes another unfit, impure or inferior. Thus, a purified oligonucleotide is present in a form or setting different from that which existed prior to subjecting it to a purification method.

In the present disclosure, the term "about" encompasses the range of experimental error that occurs in any measurement.

In the present disclosure, the term, "hydrocarbon" as used herein refers to any chemical structure containing hydrogen atoms and carbon atoms.

In the present disclosure, the term "alkyl" as used by itself or as part of another group refers to unsubstituted straight- or branched-chain aliphatic hydrocarbons. In one embodiment, the alkyl group is a $C_{1-20}$ alkyl. In one embodiment, the alkyl group is a $C_{1-10}$ alkyl. In another embodiment, the alkyl group is a $C_{1-6}$ alkyl. In another embodiment, the alkyl group is a $C_{1-4}$ alkyl. Non-limiting exemplary $C_{1-20}$ alkyl groups include methyl, ethyl, propyl, isopropyl, butyl, sec-butyl, tert-butyl, iso-butyl, 3-pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl. Non-limiting exemplary $C_{1-10}$ alkyl groups include methyl, ethyl, propyl, isopropyl, butyl, sec-butyl, tert-butyl, iso-butyl, 3-pentyl, hexyl, heptyl, octyl, nonyl, and decyl. Non-limiting exemplary $C_{1-6}$ alkyl groups include methyl, ethyl, propyl, isopropyl, butyl, sec-butyl, tert-butyl, iso-butyl, pentyl, and hexyl. Non-limiting exemplary $C_{1-4}$ alkyl groups include methyl, ethyl, propyl, isopropyl, butyl, sec-butyl, tert-butyl, and iso-butyl.

In the present disclosure, the term "alkanoyl" as used by itself or as part of another group refers to an optionally substituted alkyl attached to a terminal ketone group. A non-limiting exemplary alkanoyl group is

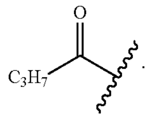

In the present disclosure, the term "cycloalkyl" as used by itself or as part of another group refers to unsubstituted saturated and partially unsaturated, e.g., containing one or two double bonds, cyclic aliphatic hydrocarbons containing one to three rings having from three to twelve carbon atoms, i.e., $C_{3-12}$ cycloalkyl, or the number of carbons designated. In one embodiment, the cycloalkyl group has two rings. In one embodiment, the cycloalkyl group has one ring. In another embodiment, the cycloalkyl is saturated. In another embodiment, the cycloalkyl is unsaturated. In another embodiment, the cycloalkyl group is a $C_{3-8}$ cycloalkyl group. In another embodiment, the cycloalkyl group is a $C_{3-7}$ cycloalkyl group. In another embodiment, the cycloalkyl group is a $C_{5-7}$ cycloalkyl group. In another embodiment, the cycloalkyl group is a $C_{3-6}$ cycloalkyl group. The term "cycloalkyl" includes groups wherein a ring —$CH_2$— is replaced with a —C(═O)—. Non-limiting exemplary cycloalkyl groups include cyclopropyl, cyclobutyl, cyclopentyl, cyclohexyl, cycloheptyl, cyclooctyl, norbornyl, decalin, adamantyl, cyclohexenyl, cyclopentenyl, cyclohexenyl, and cyclopentanone.

In the present disclosure, the term "alkenyl" as used by itself or as part of another group refers to an alkyl containing one, two or three carbon-to-carbon double bonds. In one embodiment, the alkenyl group is a $C_{2-12}$ alkenyl group. In one embodiment, the alkenyl group is a $C_{2-6}$ alkenyl group. In another embodiment, the alkenyl group is a $C_{24}$ alkenyl group. Non-limiting exemplary alkenyl groups include ethenyl, propenyl, isopropenyl, butenyl, sec-butenyl, pentenyl, and hexenyl.

In the present disclosure, the term "alkynyl" as used by itself or as part of another group refers to an alkyl containing one to three carbon-to-carbon triple bonds. In one embodiment, the alkynyl has one carbon-to-carbon triple bond. In one embodiment, the alkynyl group is a $C_{2-12}$ alkynyl group. In one embodiment, the alkynyl group is a $C_{2-6}$ alkynyl group. In another embodiment, the alkynyl group is a $C_{24}$ alkynyl group. Non-limiting exemplary alkynyl groups include ethynyl, propynyl, butynyl, 2-butynyl, pentynyl, and hexynyl groups.

In the present disclosure, the term "aryl" as used by itself or as part of another group refers to unsubstituted monocyclic or bicyclic aromatic ring systems. In one embodiment, the aryl group is a $C_{6-14}$ aryl group. In one embodiment, the aryl group is a $C_{6-20}$ aryl group. Non-limiting exemplary aryl groups include phenyl (abbreviated as "Ph"), naphthyl, phenanthryl, anthracyl, indenyl, azulenyl, biphenyl, biphenylenyl, and fluorenyl groups. In one embodiment, the aryl group is a phenyl or naphthyl.

In the present disclosure, the term "aryloxy" as used by itself or as part of another group refers to an optionally substituted aryl attached to a terminal oxygen atom. A non-limiting exemplary aryloxy group is PhO—.

In the present disclosure, the term "aryloyl" as used by itself or as part of another group refers to an optionally substituted aryl attached to a terminal ketone group. A non-limiting exemplary aryloyl group is

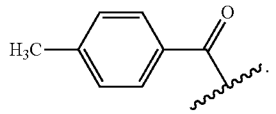

In the present disclosure, the term "heterocycle," "heterocyclyl," or "heterocyclic group" is intended to mean a stable 3-, 4-, 5-, 6-, or 7-membered monocyclic or bicyclic or 7-, 8-, 9-, 10-, 11-, 12-, 13-, or 14-membered polycyclic heterocyclic ring that is saturated, partially unsaturated, or fully unsaturated, and that contains carbon atoms and 1, 2, 3 or 4 heteroatoms independently selected from the group consisting of N, O and S; and including any polycyclic group in which any of the above-defined heterocyclic rings is fused to a benzene ring. The nitrogen and sulfur heteroatoms may optionally be oxidized (i.e., N→O and $S(O)_p$, wherein p is 0, 1 or 2). The nitrogen atom may be substituted or unsubstituted (i.e., N or NR wherein R is H or another substituent, if defined). The heterocyclic ring may be attached to its pendant group at any heteroatom or carbon atom that results in a stable structure. The heterocyclic rings described herein may be substituted on carbon or on a nitrogen atom if the resulting compound is stable. A nitrogen in the heterocycle may optionally be quaternized. It is preferred that when the total number of S and O atoms in the heterocycle exceeds 1, then these heteroatoms are not adjacent to one another. It is preferred that the total number of S and O atoms in the heterocycle is not more than 1. When the term "heterocycle" is used, it is intended to include heteroaryl.

Examples of heterocycles include, but are not limited to, acridinyl, azetidinyl, azocinyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, imidazolopyridinyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isothiazolopyridinyl, isoxazolyl, isoxazolopyridinyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolopyridinyl, oxazolidinylperimidinyl, oxindolyl, pyrimidinyl, phenanthridinyl, phenanthrolinyl, phenazinyl, phenothiazinyl, phenoxathiinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolopyridinyl, pyrazolyl, pyridazinyl, pyridooxazolyl, pyridoimidazolyl, pyridothiazolyl, pyridinyl, pyrimidinyl, pyrrolidinyl, pyrrolinyl, 2-pyrrolidonyl, 2H-pyrrolyl, pyrrolyl, quinazolinyl, quinolinyl, 4H-quinolizinyl, quinoxalinyl, quinuclidinyl, tetrazolyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thiazolopyridinyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl. Also included are fused ring and spiro compounds containing, for example, the above heterocycles.

As used herein, the term "aromatic heterocyclic group" or "heteroaryl" is intended to mean stable monocyclic and polycyclic aromatic hydrocarbons that include at least one heteroatom ring member such as sulfur, oxygen, or nitrogen. Heteroaryl groups include, without limitation, pyridyl, pyrimidinyl, pyrazinyl, pyridazinyl, triazinyl, furyl, quinolyl, isoquinolyl, thienyl, imidazolyl, thiazolyl, indolyl, pyrroyl, oxazolyl, benzofuryl, benzothienyl, benzthiazolyl, isoxazolyl, pyrazolyl, triazolyl, tetrazolyl, indazolyl, 1,2,4-thiadiazolyl, isothiazolyl, purinyl, carbazolyl, benzimidazolyl, indolinyl, benzodioxolanyl and benzodioxane. Heteroaryl groups are substituted or unsubstituted. The nitrogen atom is substituted or unsubstituted (i.e., N or NR wherein R is H or another substituent, if defined). The nitrogen and sulfur heteroatoms may optionally be oxidized (i.e., N→*O and $S(O)_p$, wherein p is 0, 1 or 2).

Bridged rings are also included in the definition of heterocycle. A bridged ring occurs when one or more, preferably one to three, atoms (i.e., C, O, N, or S) link two non-adjacent carbon or nitrogen atoms. Examples of bridged rings include, but are not limited to, one carbon atom, two carbon atoms, one nitrogen atom, two nitrogen atoms, and a carbon-nitrogen group. It is noted that a bridge always converts a monocyclic ring into a tricyclic ring. When a ring is bridged, the substituents recited for the ring may also be present on the bridge.

In the present disclosure, the term "heteroaryl" or "heteroaromatic" refers to unsubstituted monocyclic and bicyclic aromatic ring systems, wherein at least one carbon atom of one of the rings is replaced with a heteroatom independently selected from the group consisting of oxygen, nitrogen and sulfur. In one embodiment, the heteroaryl contains 1, 2, 3, or 4 heteroatoms independently selected from the group consisting of oxygen, nitrogen and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 14-membered heteroaryl. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

In one embodiment, the heteroaryl is a 5- or 6-membered heteroaryl. In one embodiment, the heteroaryl is a 5-membered heteroaryl, i.e., the heteroaryl is a monocyclic aromatic ring system having 5 ring atoms wherein at least one carbon atom of the ring is replaced with a heteroatom independently selected from nitrogen, oxygen, and sulfur. Non-limiting exemplary 5-membered heteroaryl groups include thienyl, furyl, pyrrolyl, oxazolyl, pyrazolyl, imidazolyl, thiazolyl, isothiazolyl, and isoxazolyl.

In another embodiment, the heteroaryl is a 6-membered heteroaryl, e.g., the heteroaryl is a monocyclic aromatic ring system having 6 ring atoms wherein at least one carbon atom of the ring is replaced with a nitrogen atom. Non-limiting exemplary 6-membered heteroaryl groups include pyridyl, pyrazinyl, pyrimidinyl, and pyridazinyl.

In the present disclosure, the term "heteroaryloyl" as used by itself or as part of another group refers to an optionally substituted heteroaryl attached to a terminal ketone group. A non-limiting exemplary heteroaryloyl group

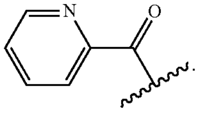 [SMILES: *C(=O)c1ccccn1]

In the present disclosure, the term "halogen" is intended to include fluorine, chlorine, bromine and iodine.

In the present disclosure, the term "internucleoside linkage" refers to a naturally-occurring or modified linkage between two adjacent nucleosides in an oligonucleotide or a CDN. Naturally occurring RNA and DNA contain phosphodiester internucleoside linkages. An example of a modified internucleoside linkage is a phosphorothioate linkage.

In the present disclosure, the term "protecting group" refers to a group that protects a functional group, such as alcohol, amine, carbonyl, carboxylic acid, phosphate, terminal alkyne, etc., from an unwanted chemical reaction. In some embodiments, the functional group is a nucleophile. Examples of alcohol protecting groups include, but are not limited to, acetyl (Ac), acryloyl, benzoyl (Bz), benzyl (Bn), 9-fluorenylmethyl (Fm), β-methoxyethoxymethyl ether (MEM), dimethoxytrityl (DMT), methoxymethyl ether (MOM), methoxytrityl (MMT), p-methoxybenzyl ether (PMB), trimethylsislyl (TMS), tert-butyldimethylsilyl (TBS), tert-butyldiphenylsilyl ether (TBDPS), tri-iso-propylsilyloxymethyl (TOM), trityl (Triphenyl methyl, Tr), pivaloyl (Piv), and the like. In one embodiment, the protecting group is the protecting group is 4,4'-dimethoxytrityl. Examples of amine protecting groups include, but are not limited to, carbobenzyloxy (Cbz), isobutyryl (iBu), p-methoxybenzyl carbonyl (MOZ), tert-butylcarbonyl (Boc), acetyl (Ac), benzoyl (Bz), benzyl (Bn), p-methoxybenzyl (PMB), p-methoxyphenyl (PMP), tosyl (Ts), and the like. Examples of carbonyl protecting groups include, but are not limited to, acetals and ketals, acylals, dithianes, and the like. Examples of carboxylic acid protecting groups include, but are not limited to, methyl esters, bezyl esters, tert-butyl esters, silyl esters, orthoesters, oxazoline, and the like. Examples of phosphate protecting groups include, but are not limited to, 2-cyanoethyl, methyl and the like. Examples of terminal alkyne protecting groups include, but are not limited to, propargyl and silyl groups. In one embodiment, a protecting group is used to protect a 5'-hydroxy group of a nucleoside used in the methods of the present disclosure. In one embodiment, the protecting group is DMT. In another embodiment, a protecting group is used to protect a nucleobase of a nucleoside used in the methods of the present disclosure. In some embodiments, the protecting group is an amine protecting group. In one embodiment, the protecting group is Ac. In another embodiment, the protecting group is Bz. In yet another embodiment, the protecting group is iBu.

I. Compounds of the Disclosure

A Compound of the Disclosure is represented by the structure:

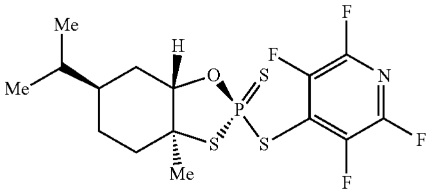

Enantiomer (-)

or

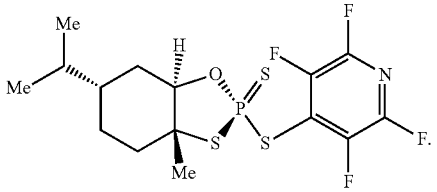

Enantiomer (+)

In one embodiment, methods of making a Compound of the Disclosure comprise reacting compound 1:

(compound 1)

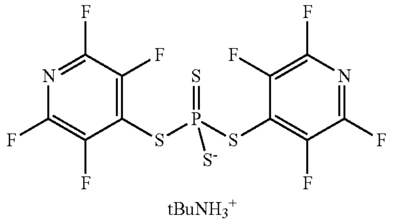

with compound 2:

(compound 2)

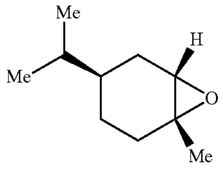

in the presence of an acid.

In one embodiment, methods of making a Compound of the Disclosure comprise reacting compound 1:

(compound 1)

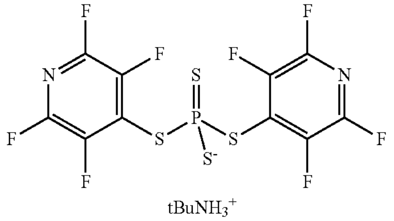

with compound 3:

(compound 3)

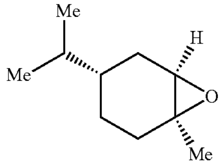

in the presence of an acid.

In some embodiments, the acid is selected from the group consisting of trifluoroacetic acid, dichloroacetic acid, acetic acid, and formic acid.

In some embodiments, the acid is trifluoroacetic acid.

In some embodiments, compound 1 is formed by reacting compound 4:

(compound 4)

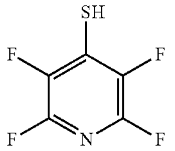

with $P_2S_5$ in the presence of a base.

In some embodiments, the base is selected from the group consisting of tert-butylamine, triethylamine, pyridine, tri-n-propylamine, trimethylamine, 1,2-bicyclo[2.2.2]octane, and 1,8-diazabicyclo[5.4.0]undec-7-ene.

In some embodiments, the base is tert-butylamine.

In some embodiments, compound 2 is formed by reacting compound 5:

(compound 5)

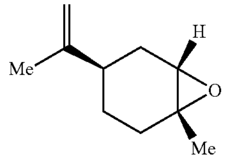

with hydrogen in the presence of a catalyst.

In some embodiments, compound 3 is formed by reacting compound 6:

(compound 5)

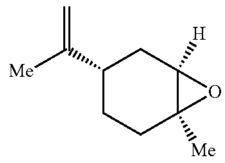

with hydrogen in the presence of a catalyst.

In some embodiments, the catalyst is selected from the group consisting of platinum dioxide, palladium on carbon, platinum on carbon, Lindlar's catalyst, Raney nickel, nickel, rhodium on aluminum oxide, palladium, and platinum.

In some embodiments, the catalyst is platinum dioxide.

II. Methods of Making Nucleoside Diphosphorothioates or Nucleobase Diphosphorothioates In one embodiment, the present disclosure provides methods of making a nucleoside diphosphorothioate or a salt thereof, comprising:

(a) reacting one of compounds 7, 8, or 9:

(compound 7)

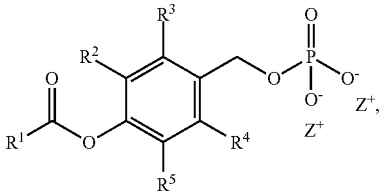

-continued (compound 8)

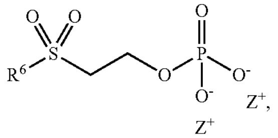

(compound 9)

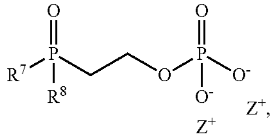

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; each of $R^6$, $R^7$, and $R^8$ is independently $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with a Compound of the Disclosure in the presence of a first base to form a chiral thiodiphosphate transfer reagent;

(b) reacting the chiral thiodiphosphate transfer reagent with a nucleoside in the presence of a second base to form a protected nucleoside diphosphorothioate; and (c) deprotecting the protected nucleoside diphosphorothioate to form a nucleoside diphosphorothioate.

In some embodiments, the chiral thiodiphosphate transfer reagent in step (b) reacts with a nucleobase in the presence of a second base to form a protected nucleobase diphosphorothioate, then the protected nucleobase diphosphorothioate was deprotected to form a nucleobase diphosphorothioate.

In some embodiments, the protected nucleoside diphosphorothioate or protected nucleobase diphosphorothioate is deprotected in an ammonia solution.

In some embodiments, the protected nucleoside diphosphorothioate or protected nucleobase diphosphorothioate is deprotected in a tetra-n-butylammonium fluoride solution buffered with acetic acid.

In some embodiments, the protected nucleoside diphosphorothioate or protected nucleobase diphosphorothioate is deprotected in an acetic acid solution.

In some embodiments, the nucleoside diphosphorothioate or nucleobase diphosphorothioate is purified by an ion exchange chromatography.

In some embodiments, the nucleoside diphosphorothioate or nucleobase diphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, triethylamine, pyridine, 2,6-lutidine, and imidazole.

In some embodiments, the first base is 1,8-diazabicyclo[5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, the term "nucleoside" refers to a compound, glycosylamine, wherein a nucleobase (a nitrogenous base, such as adenine, guanine, thymine, uracil, 5-methyluracil, etc.) is covalently bound to a five-carbon sugar (ribose or deoxyribose) or a modified sugar.

In some embodiments, the term "sugar" refers to a monosaccharide in closed and/or open form. Sugars include, but are not limited to, ribose, deoxyribose, pentofuranose, pentopyranose, morpholinos, carbocyclic analogs, hexopyranose moieties and bicyclic sugars.

In some embodiments, the term "modified sugar" refers to a moiety that can replace a sugar. The modified sugar mimics the spatial arrangement, electronic properties, or some other physicochemical property of a sugar.

In the present disclosure, the term "nucleobases" include modified nucleobases. The examples of nucleobases include, but not limited to, adenine, guanine, uracil, cytosine, and thymine. The examples of nucleobases also include modified nucleobases, such as heterocyclic compounds that can serve as nucleobases, including certain 'universal bases' that are not nucleobases in the most classical sense but serve as nucleobases.

In some embodiments, the nucleoside in step (b) is a protected nucleoside.

In some embodiments, the nucleoside in step (b) is an unprotected nucleoside.

In some embodiments, the nucleoside is selected from the group consisting of compound 10, compound 11, compound 12, compound 13, compound 14, compound 15, compound 16, compound 17, compound 18, and compound 19:

(compound 10)

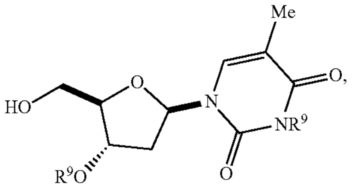

(compound 11)

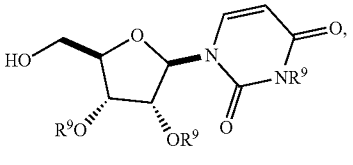

(compound 12)

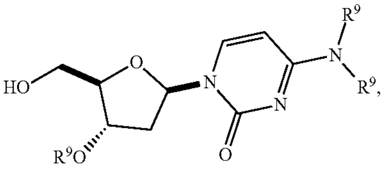

(compound 13)

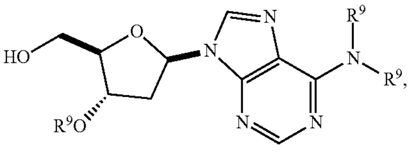

-continued (compound 14)

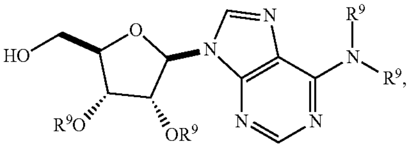

(compound 15)

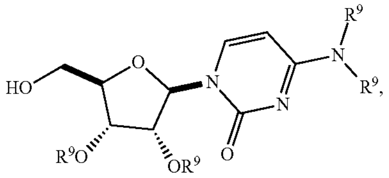

(compound 16)

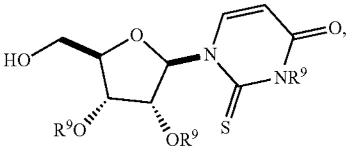

(compound 17)

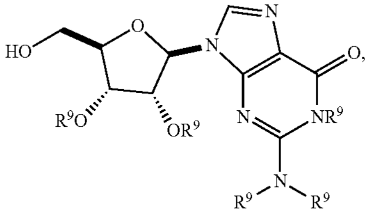

(compound 18)

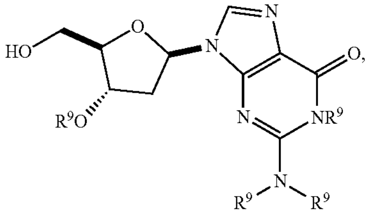

(compound 19)

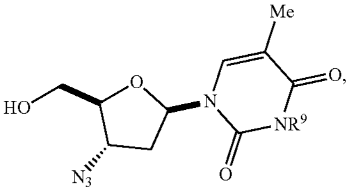

wherein each of $R^9$ is independently hydrogen, acetyl, branched or linear $C_2$-$C_{20}$ alkanoyl, benzoyl, aryloyl, acryloyl, or heteroaryloyl.

In some embodiments, the nucleoside is selected from the group consisting of compound 76, compound 77, compound 78, compound 79, compound 80, compound 81, compound 82, compound 83, compound 84, and compound 85:

(compound 76)

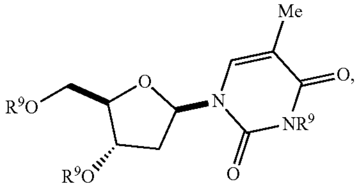

-continued (compound 77)

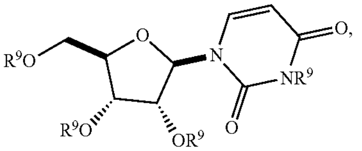

(compound 78)

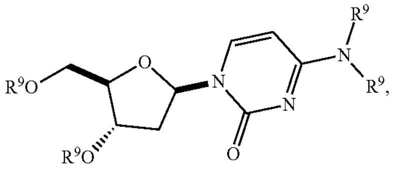

(compound 79)

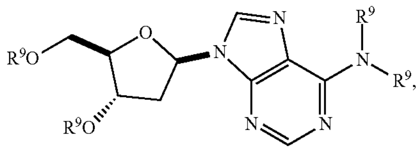

(compound 80)

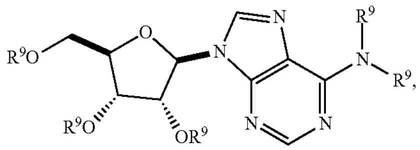

(compound 81)

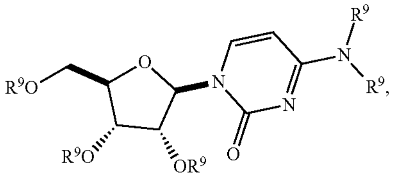

(compound 82)

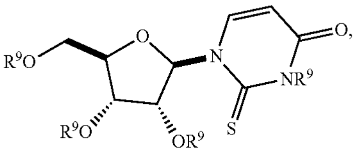

(compound 83)

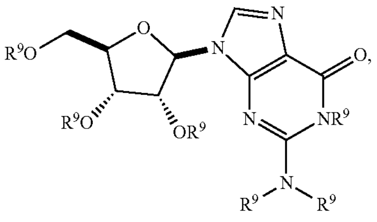

(compound 84)

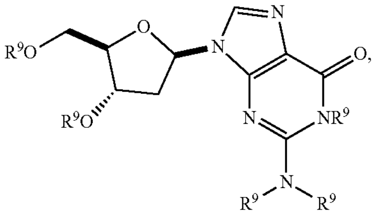

-continued (compound 85)

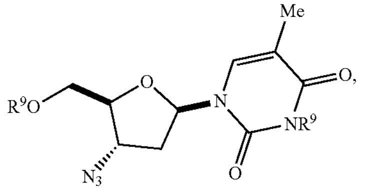

wherein each of $R^9$ is independently hydrogen, acetyl, branched or linear $C_2$-$C_{20}$ alkanoyl, benzoyl, aryloyl, acryloyl, or heteroaryloyl.

In some embodiments, the nucleoside is selected from the group consisting of compound 86, compound 87, compound 88, compound 89, and compound 90:

(compound 86)

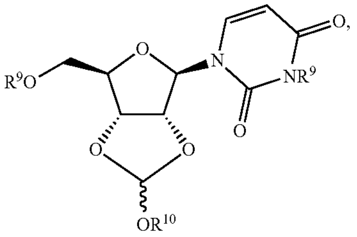

(compound 87)

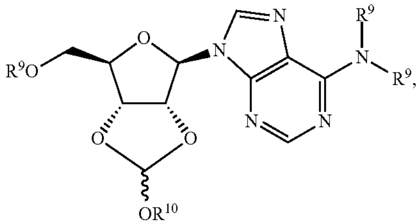

(compound 88)

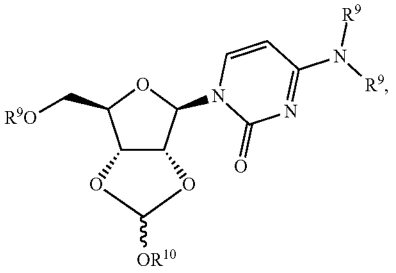

(compound 89)

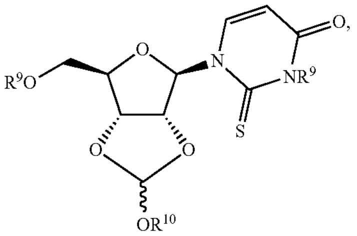

-continued (compound 90)

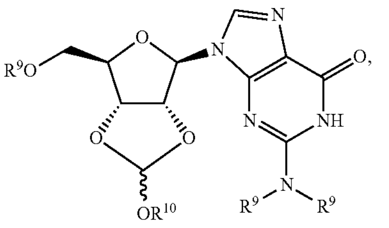

wherein each of $R^9$ is independently hydrogen, acetyl, branched or linear $C_2$-$C_{20}$ alkanoyl, benzoyl, aryloyl, acryloyl, or heteroaryloyl; and $R^{10}$ is linear or branched $C_1$-$C_{20}$ alkyl, linear or branched $C_2$-$C_{12}$ alkenyl, or linear or branched $C_2$-$C_{12}$ alkynyl.

In some embodiments, the nucleoside diphosphorothioate is selected from the group consisting of:

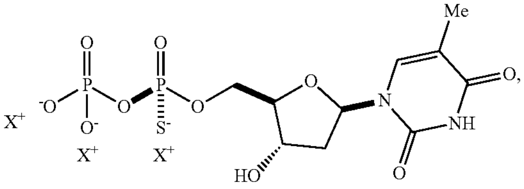

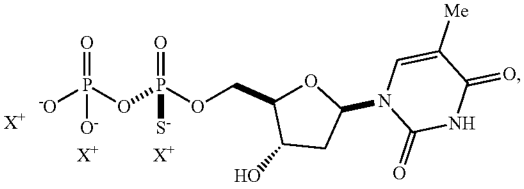

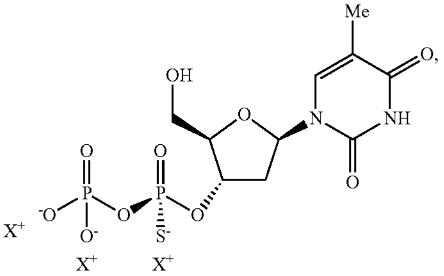

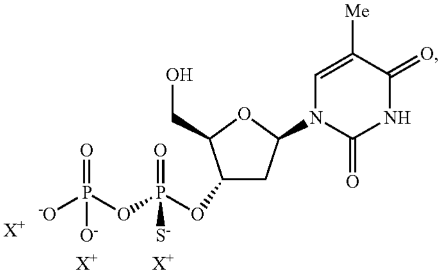

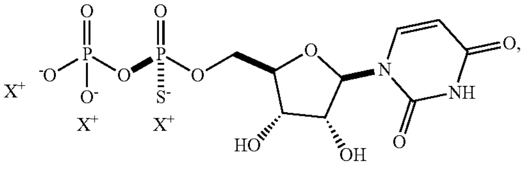

-continued

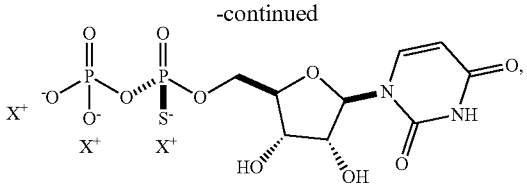

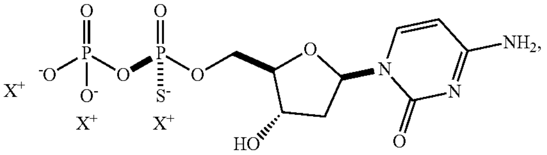

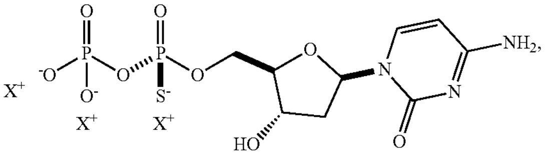

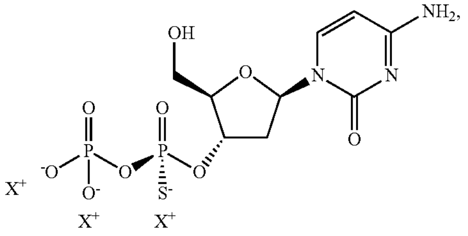

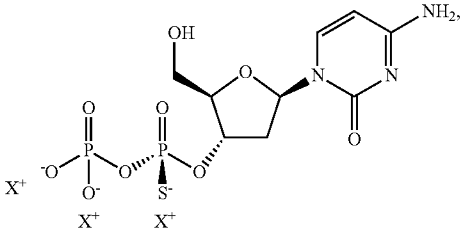

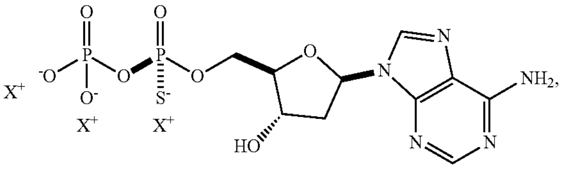

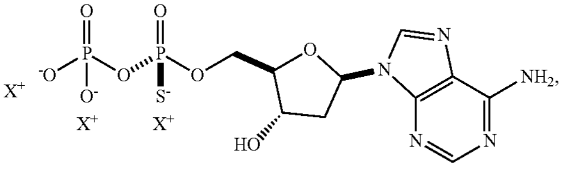

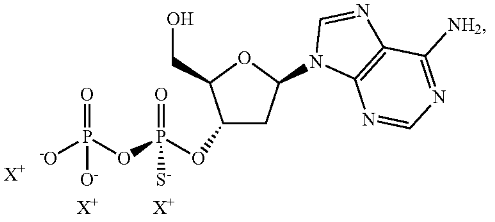

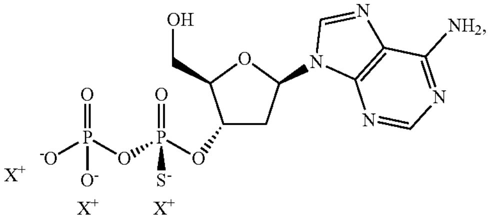

-continued
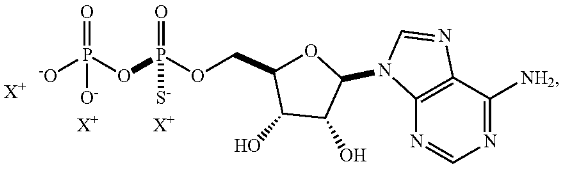
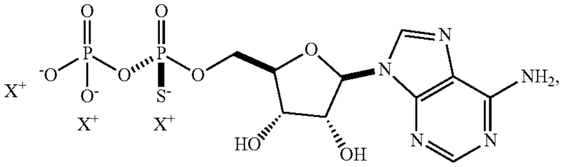
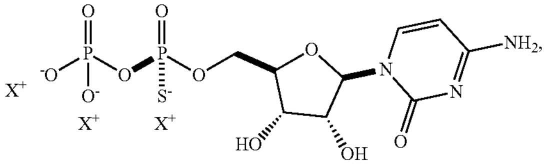
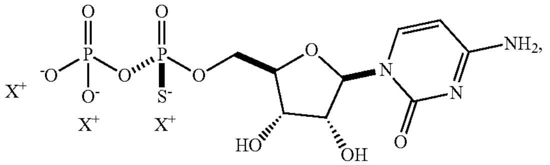
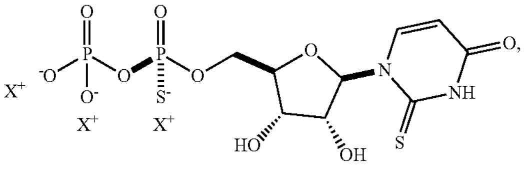
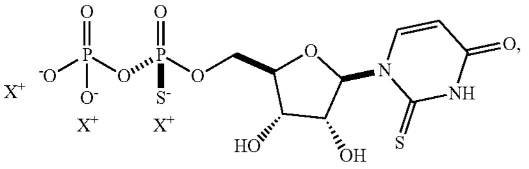
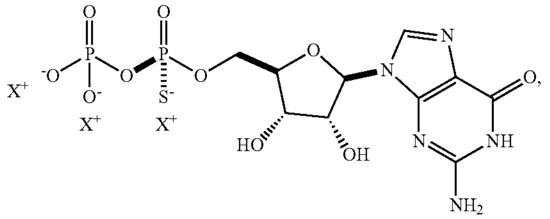
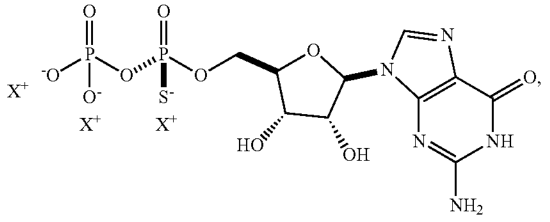
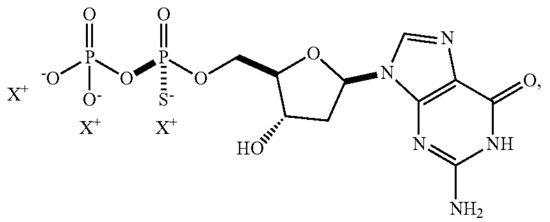
-continued
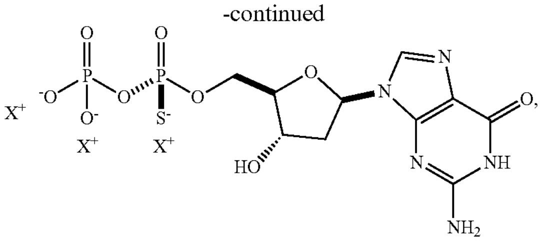
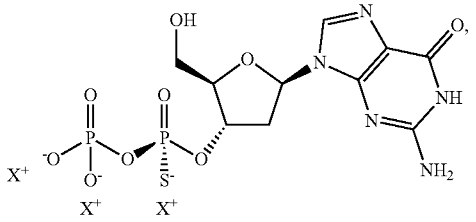
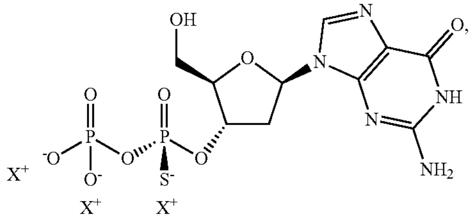
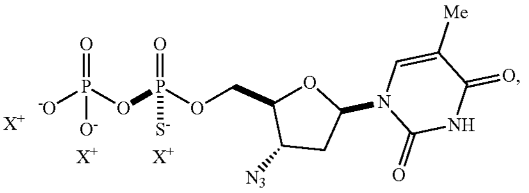
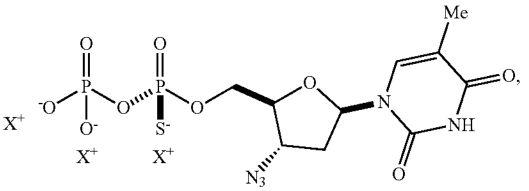
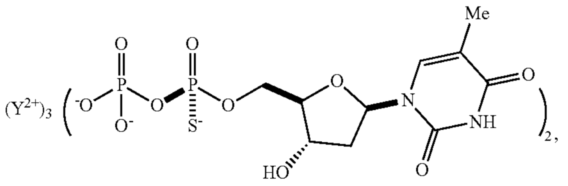
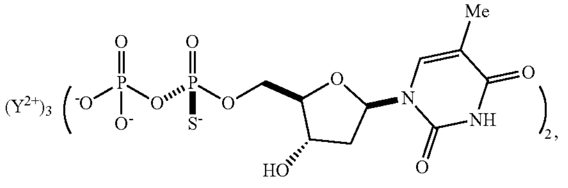
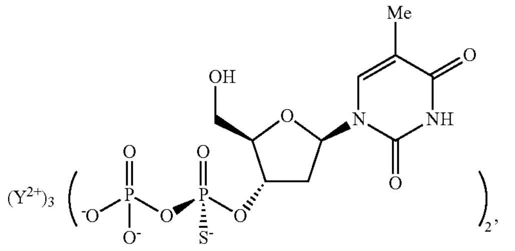

-continued
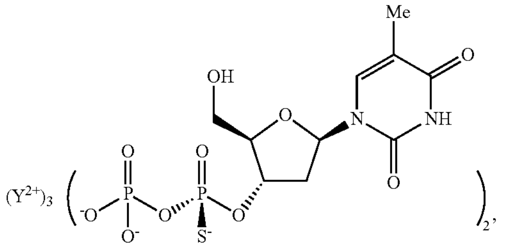
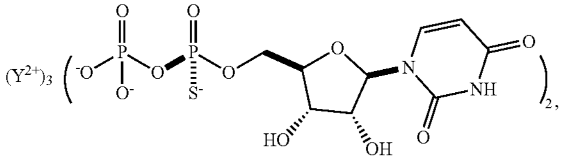
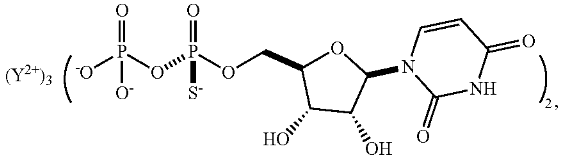
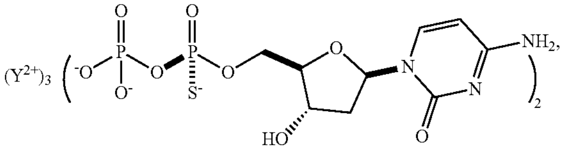
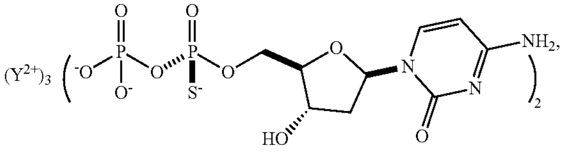
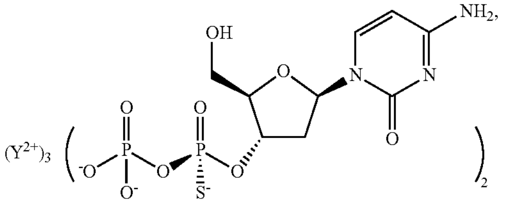
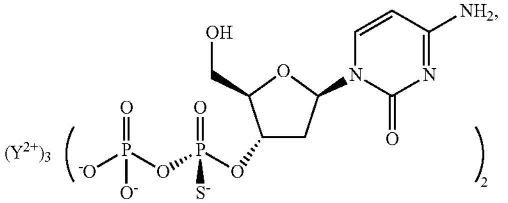
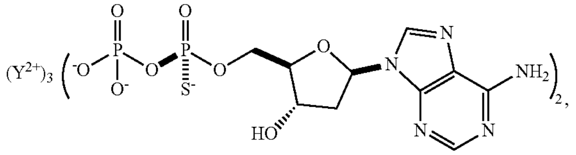
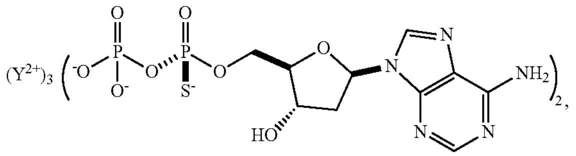
-continued
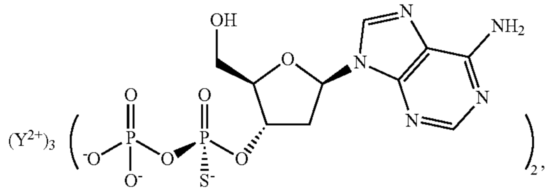
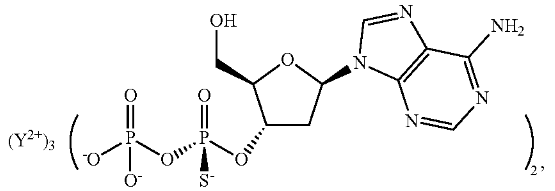
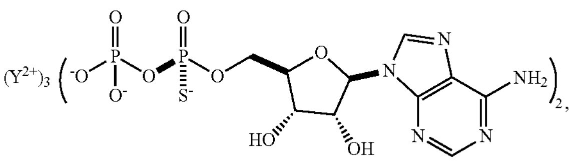
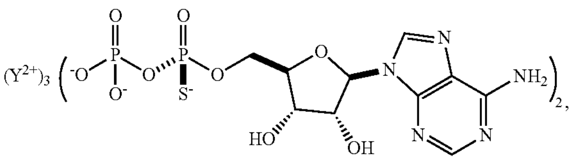
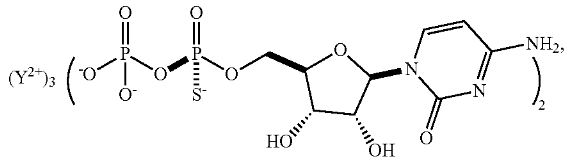
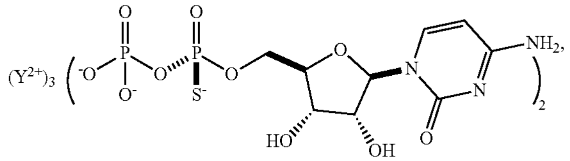
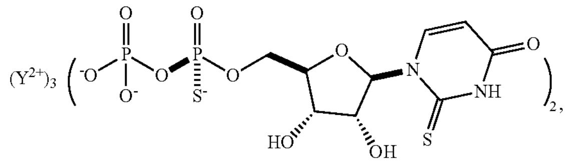
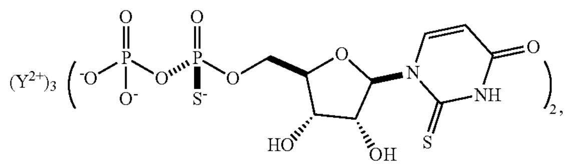
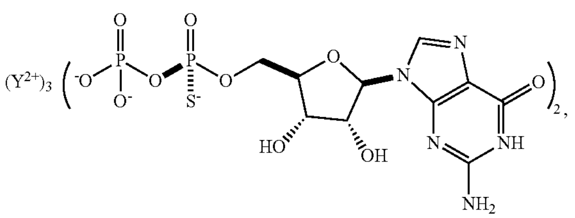

-continued

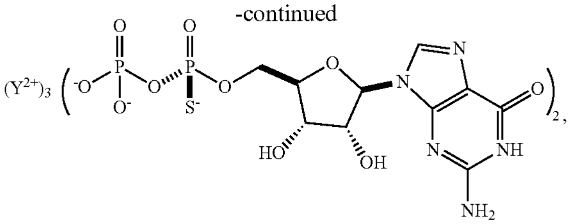

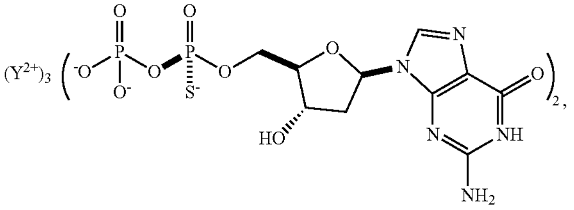

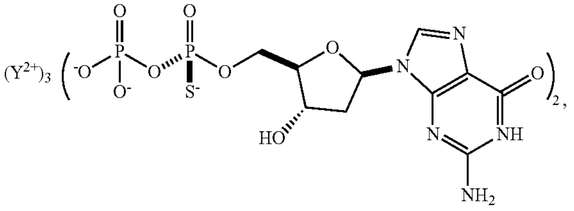

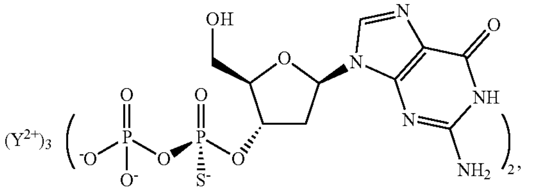

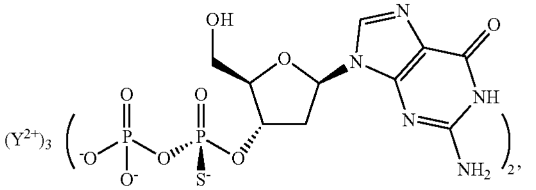

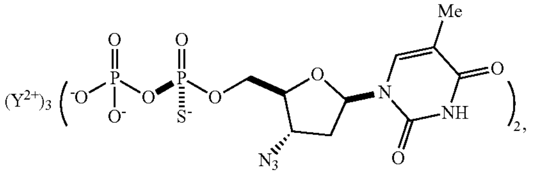

and

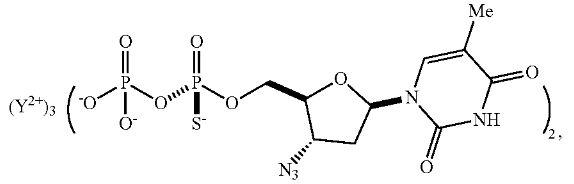

wherein X is ammonium, trialkylammonium, lithium, sodium, or potassium; and Y is calcium or magnesium.

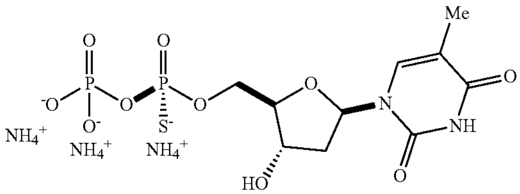

or

-continued

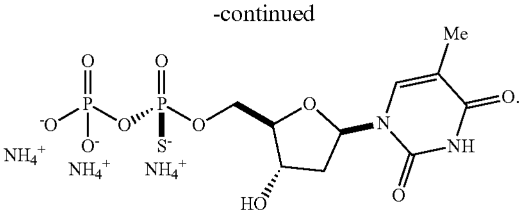

In some embodiments, the nucleoside diphosphorothioate is

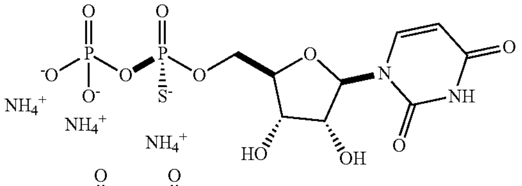

or

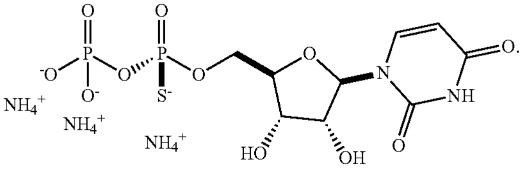

In some embodiments, the nucleoside diphosphorothioate is

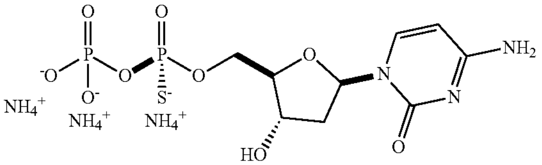

or

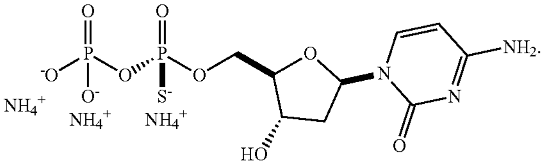

In some embodiments, the nucleoside diphosphorothioate is

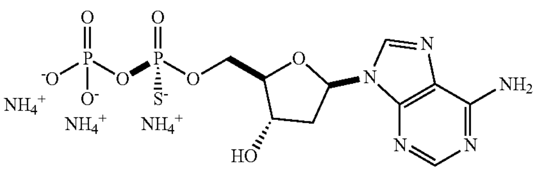

or

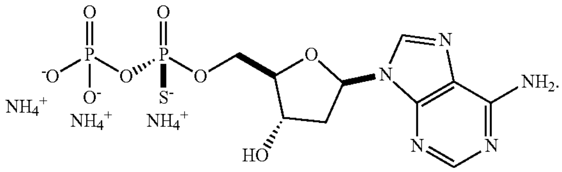

In some embodiments, the nucleoside diphosphorothioate is

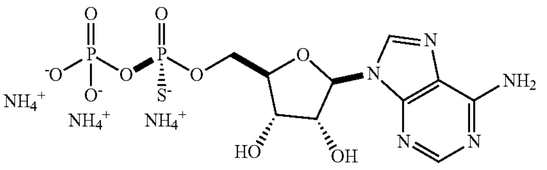
or
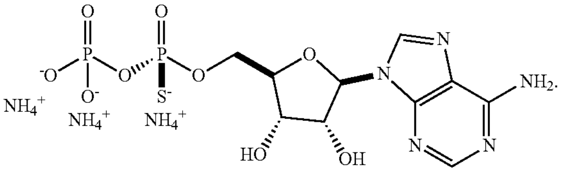
In some embodiments, the nucleoside diphosphorothioate is
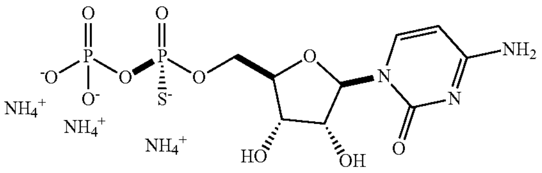
or
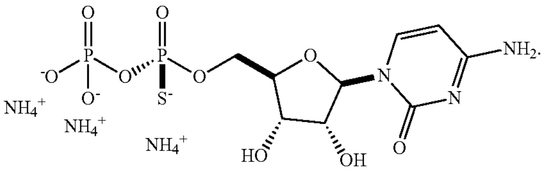
In some embodiments, the nucleoside diphosphorothioate is
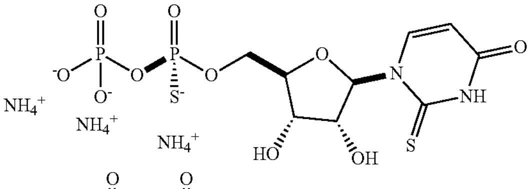
or
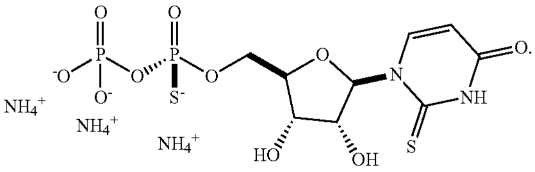
In some embodiments, the nucleoside diphosphorothioate is
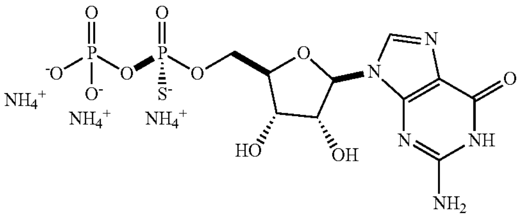
or
-continued
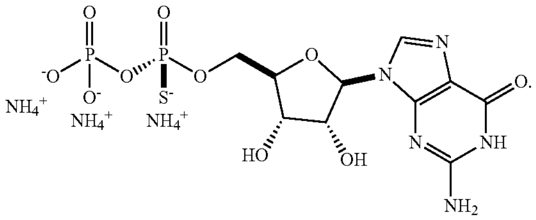
In some embodiments, the nucleoside diphosphorothioate is
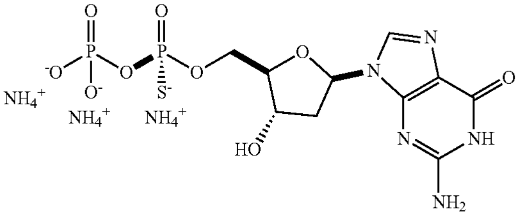
or
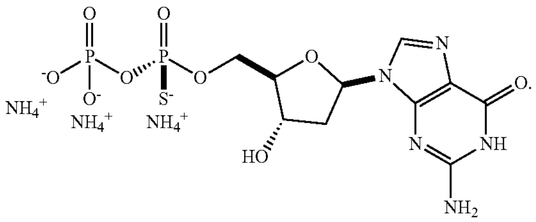
In some embodiments, the nucleoside diphosphorothioate is
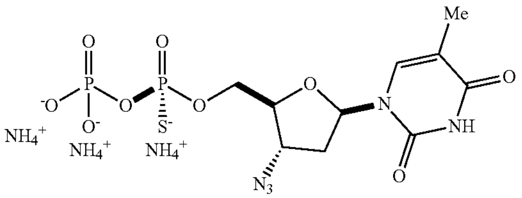
or
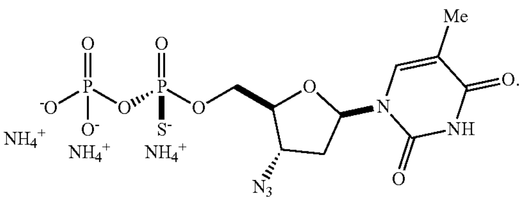

In some embodiments, the nucleoside diphosphorothioate is

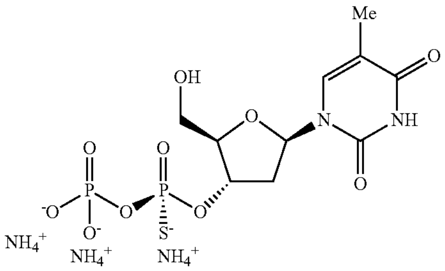

or

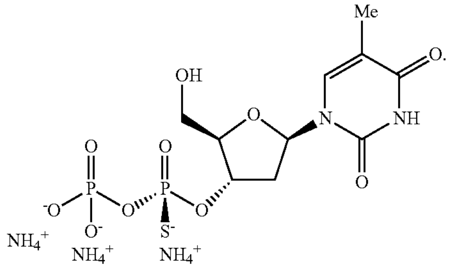

In some embodiments, the nucleobase is acyclovir:

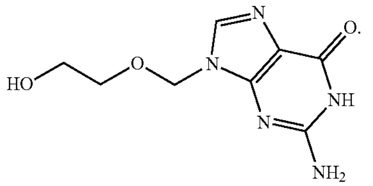 [SMILES: Nc1nc2c(ncn2COCCO)c(=O)[nH]1]

In some embodiments, the nucleobase diphosphorothioate is selected from the group consisting of:

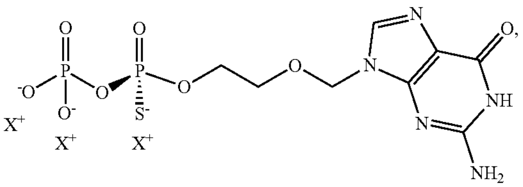

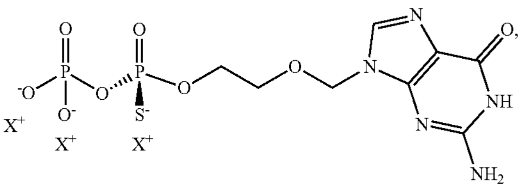

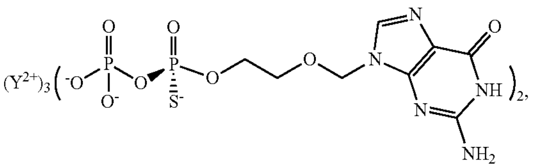

and

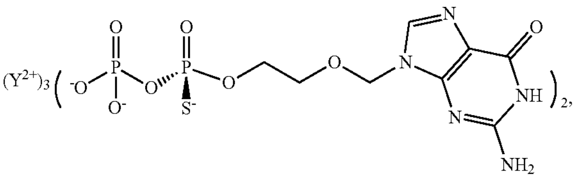

wherein X is ammonium, trialkylammonium, lithium, sodium, or potassium; and Y is calcium or magnesium.

In some embodiments, the nucleobase diphosphorothioate is

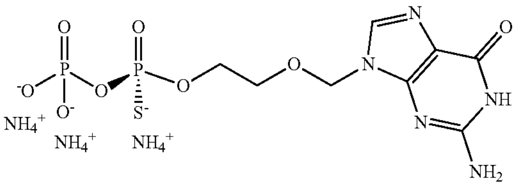

or

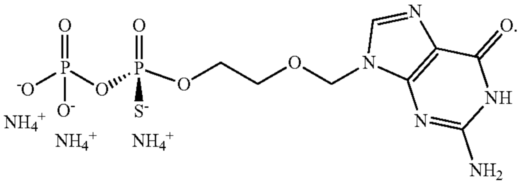

In some embodiments, the present disclosure provides methods of making a nucleoside diphosphorothioate or a salt thereof, comprising:

(a) reacting compound 92:

(compound 92)

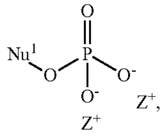

wherein $Nu^1$ is a nucleoside; and Z is hydrogen, alkylammonium, dialkylammonium, trialkylammonium, or tetralkylammonium;

with a Compound of the Disclosure in the presence of a first base to form a chiral thiodiphosphate transfer reagent; and (b) reacting the chiral thiodiphosphate transfer reagent with compound 97 in the presence of a second base to form a protected nucleoside diphosphorothioate;

(compound 97)

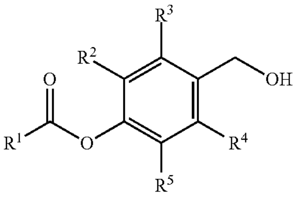

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and (c) deprotecting the protected nucleoside diphosphorothioate to form a nucleoside diphosphorothioate.

In some embodiments, $Nu^1$ is a nucleobase, then a protected nucleobase diphosphorothioate is generated in step (b) described above, a nucleobase diphosphorothioate is generated in step (c) described above.

In some embodiments, the protected nucleoside diphosphorothioate or protected nucleobase diphosphorothioate is deprotected in an ammonia solution.

In some embodiments, the protected nucleoside diphosphorothioate or protected nucleobase diphosphorothioate is deprotected in a tetra-n-butylammonium fluoride solution buffered with acetic acid.

In some embodiments, the protected nucleoside diphosphorothioate or protected nucleobase diphosphorothioate is deprotected in an acetic acid solution.

In some embodiments, the nucleoside diphosphorothioate or nucleobase diphosphorothioate is purified by an ion exchange chromatography.

In some embodiments, the nucleoside diphosphorothioate or nucleobase diphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, triethylamine, pyridine, 2,6-lutidine, and imidazole.

In some embodiments, the first base is 1,8-diazabicyclo[5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, compound 92 is:

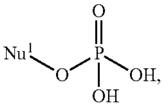

wherein $Nu^1$ is a nucleoside or nucleobase.

In some embodiments, compound 92 is prepared by:

(a) reacting a nucleoside or nucleobase with $iPr_2NP(OBn)_2$ to form compound 91:

(compound 91)

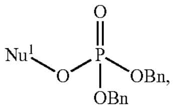

wherein $Nu^1$ is a nucleoside or nucleobase; and (b) reacting compound 91 with hydrogen in the presence of a catalyst.

In some embodiments, step (a) described above is conducted in the presence of 1-H-tetrazole. In some embodiments, step (a) described above is conducted in the presence of imidazole. In some embodiments, step (a) described above is conducted in the presence of 5-phenyl-1-H-tetrazole. In some embodiments, step (a) described above is conducted in the presence of hydrogen peroxide. In some embodiments, step (a) described above is conducted in the presence of tert-butyl hydroperoxide (TBHP). In some embodiments, step (a) described above is conducted in the presence of a compound selected from the group consisting of 1-H-tetrazole, imidazole and 5-phenyl-1-H-tetrazole, and a compound selected from the group consisting of hydrogen peroxide and tert-butyl hydroperoxide (TBHP). In some embodiments, step (a) described above is conducted in the presence of 1-H-tetrazole and hydrogen peroxide.

In some embodiments, the catalyst is selected from the group consisting of platinum dioxide, palladium on carbon, platinum on carbon, Lindlar's catalyst, Raney nickel, nickel, rhodium on aluminum oxide, palladium, and platinum.

In some embodiments, the catalyst is palladium on carbon.

In some embodiments, the nucleoside diphosphorothioate is

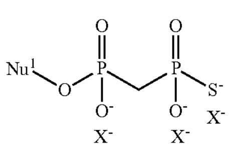

or

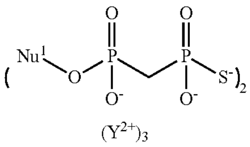

, wherein $Nu^1$ is a nucleoside; X is ammonium, trialkylammonium, lithium, sodium, or potassium; and Y is calcium or magnesium.

In some embodiments, $Nu^1$ is a protected nucleoside.

In some embodiments, $Nu^1$ is an unprotected nucleoside.

In some embodiments, the nucleoside is described above.

In some embodiments, the nucleoside diphosphorothioate is

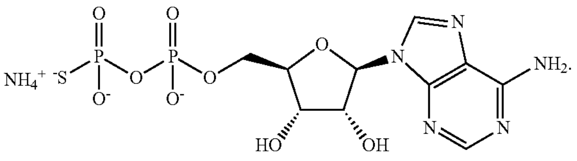

III. Methods of Making Nucleoside Triphosphorothioates or Nucleobase Triphosphorothioates In one embodiment, the present disclosure provides methods of making a nucleoside triphosphorothioate or a salt thereof, comprising:

(a) reacting compound 20 or compound 21:

(compound 20)

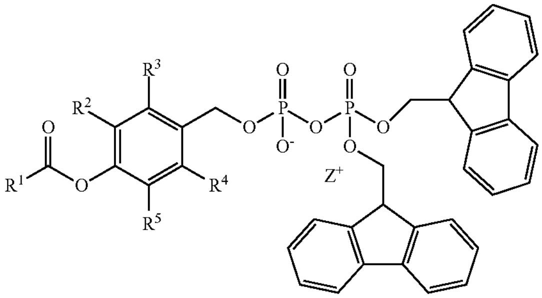

,

-continued (compound 21)

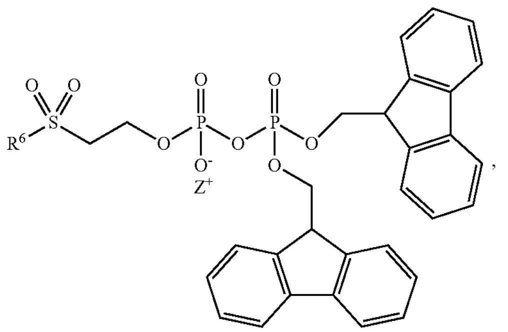

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; $R^6$ is $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with a Compound of the Disclosure in the presence of a first base to form a chiral thiotriphosphate transfer reagent;

(b) reacting the chiral thiotriphosphate transfer reagent with a nucleoside in the presence of a second base to form a protected nucleoside triphosphorothioate; and (c) deprotecting the protected nucleoside triphosphorothioate to form a nucleoside triphosphorothioate.

In some embodiments, the chiral thiotriphosphate transfer reagent in step (b) reacts with a nucleobase in the presence of a second base to form a protected nucleobase triphosphorothioate, then the protected nucleobase triphosphorothioate was deprotected to form a nucleobase triphosphorothioate.

In some embodiments, the protected nucleoside triphosphorothioate or protected nucleobase triphosphorothioate is deprotected in an ammonia solution.

In some embodiments, the protected nucleoside triphosphorothioate or protected nucleobase triphosphorothioate is deprotected in a tetra-n-butylammonium fluoride solution buffered with acetic acid.

In some embodiments, the protected nucleoside triphosphorothioate or protected nucleobase triphosphorothioate is deprotected in an acetic acid solution.

In some embodiments, the nucleoside triphosphorothioate or nucleobase triphosphorothioate is purified by an ion exchange chromatography.

In some embodiments, the nucleoside triphosphorothioate or nucleobase triphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, and triethylamine.

In some embodiments, the first base is 1,8-diazabicyclo [5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, compound 20 is prepared by reacting compound 7 with $iPr_2NP(OFm)_2$.

In some embodiments, the reaction described above is conducted in the presence of 1-H-tetrazole. In some embodiments, the reaction described above is conducted in the presence of imidazole. In some embodiments, the reaction described above is conducted in the presence of 5-phenyl-1-H-tetrazole. In some embodiments, the reaction described above is conducted in the presence of hydrogen peroxide. In some embodiments, the reaction described above is conducted in the presence of tert-butyl hydroperoxide (TBHP). In some embodiments, the reaction described above is conducted in the presence of a compound selected from the group consisting of 1-H-tetrazole, imidazole and 5-phenyl-1-H-tetrazole, and a compound selected from the group consisting of hydrogen peroxide and tert-butyl hydroperoxide (TBHP). In some embodiments, the reaction described above is conducted in the presence of 1-H-tetrazole and hydrogen peroxide. In some embodiments, the reaction described above is conducted in the presence of 5-phenyl-1H-tetrazole and tert-butyl hydroperoxide.

In some embodiments, compound 7 is,

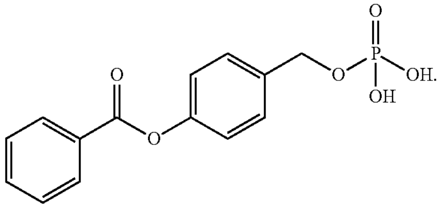 [SMILES: O=C(Oc1ccc(COP(=O)(O)O)cc1)c1ccccc1]

In some embodiments, compound 20 is:

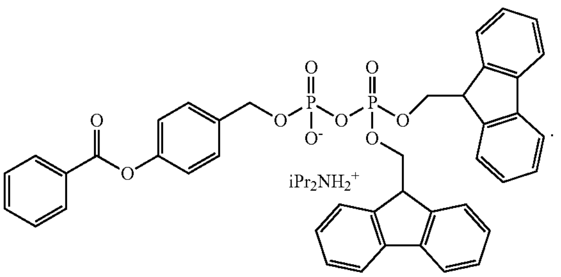 [SMILES: "iPr2NH2+" ; O=C(Oc1ccc(COP(=O)([O-])OP(=O)(OCC2c3ccccc3-c3ccccc32)OCC2c3ccccc3-c3ccccc32)cc1)c1ccccc1]

In some embodiments, the nucleoside in step (b) is a protected nucleoside.

In some embodiments, the nucleoside in step (b) is an unprotected nucleoside.

In some embodiments, the nucleoside is described above.

In some embodiments, the nucleoside triphosphorothioate is selected from the group consisting of:

-continued
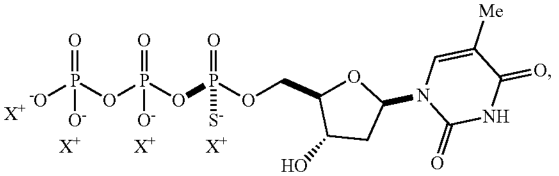
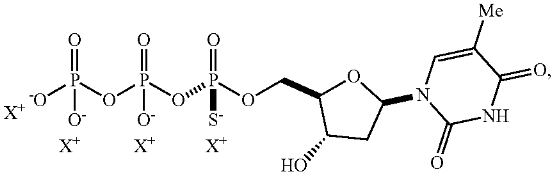
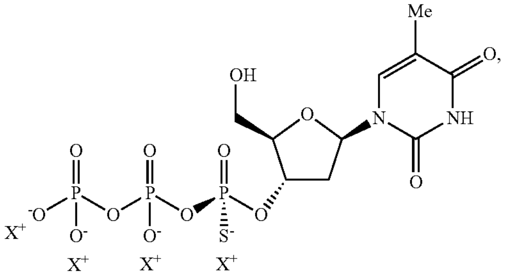
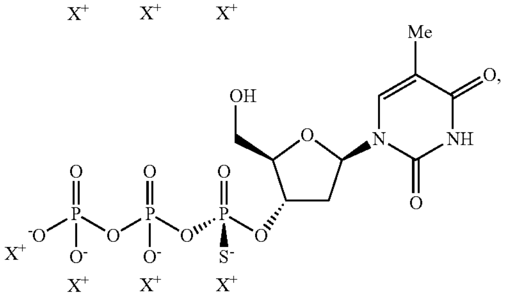
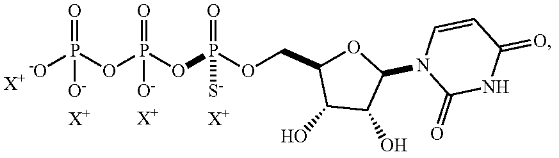
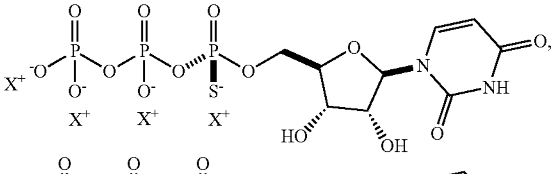
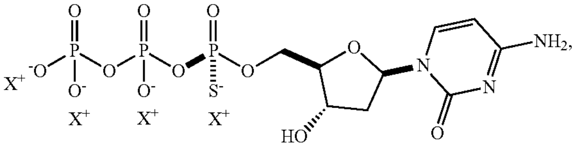
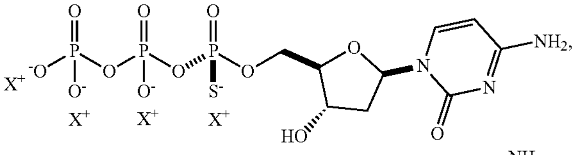
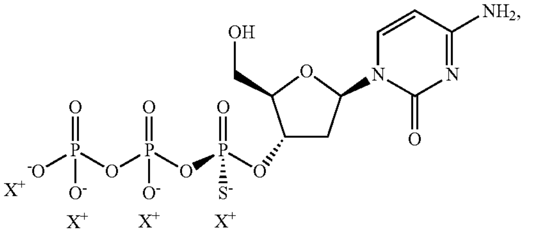
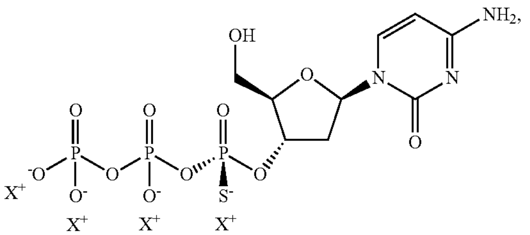
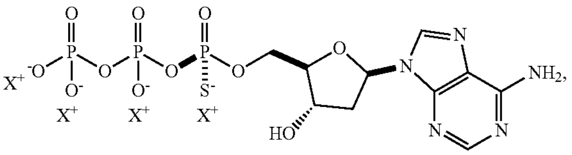
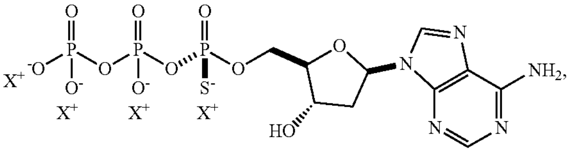
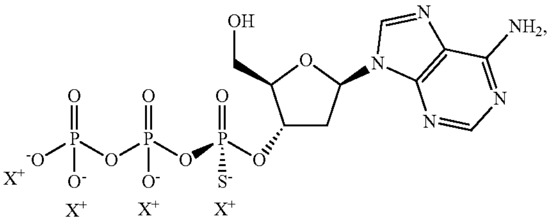
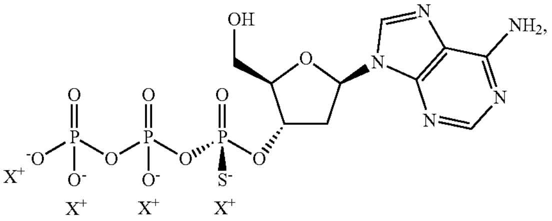
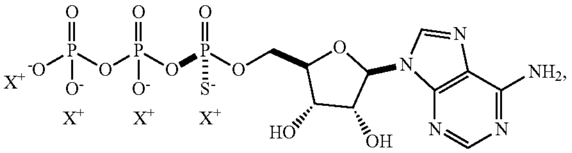
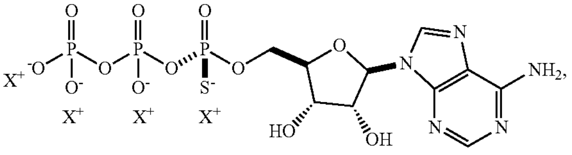
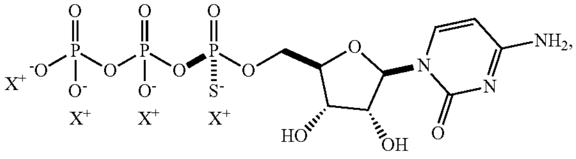
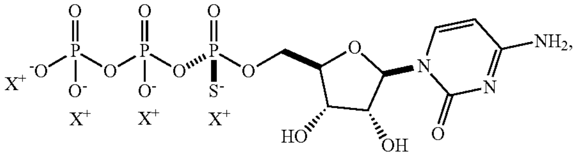

-continued
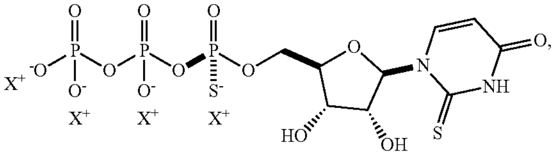
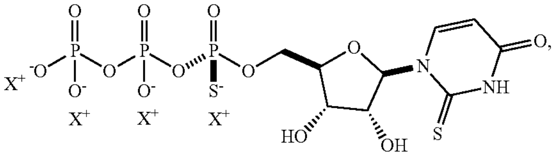
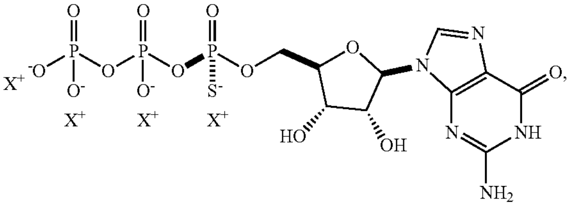
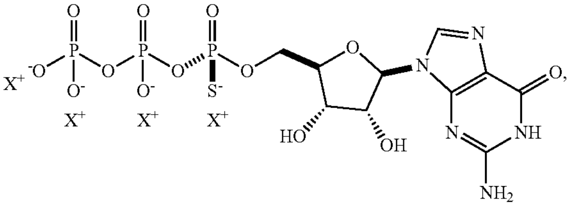
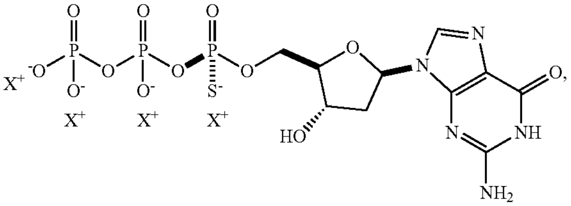
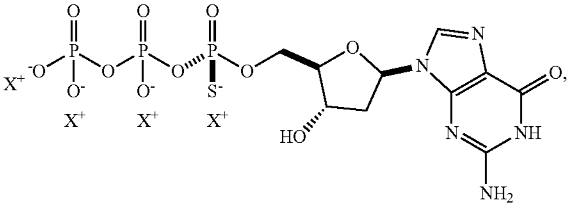
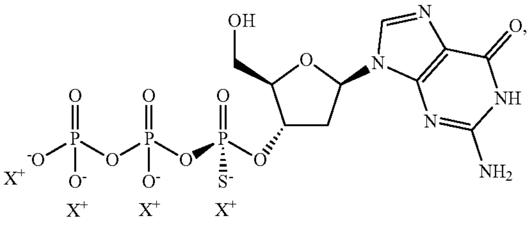
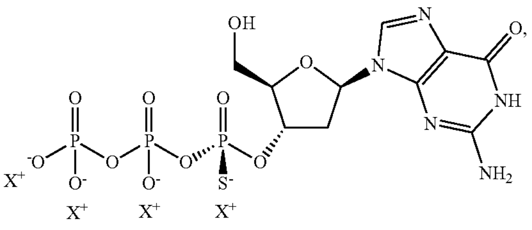
-continued
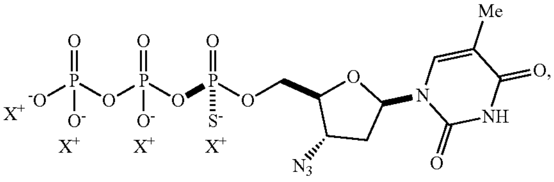
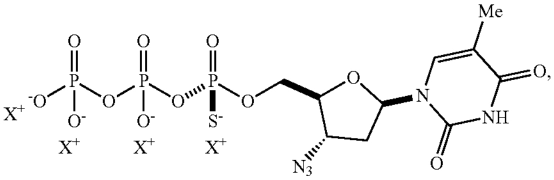
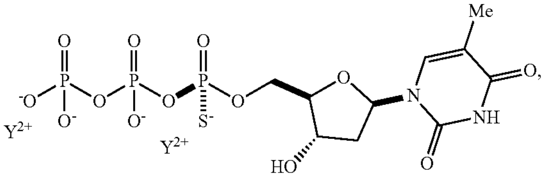
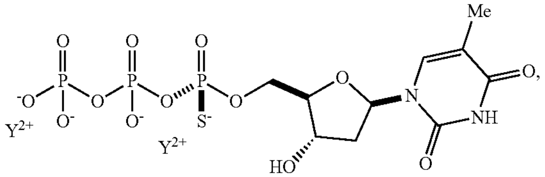
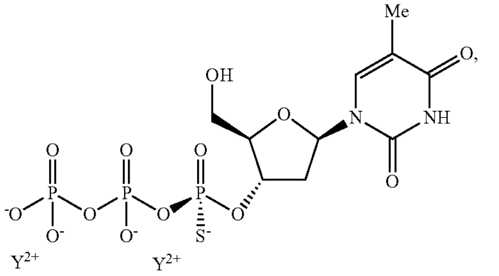
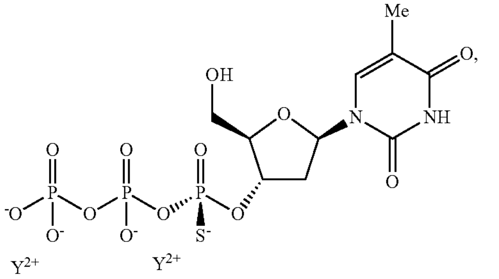
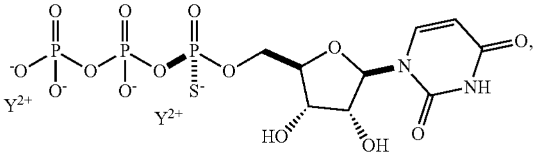
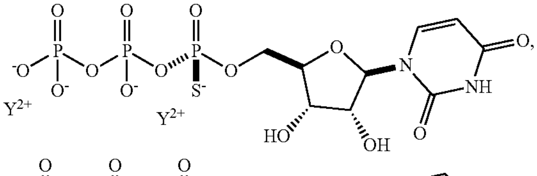
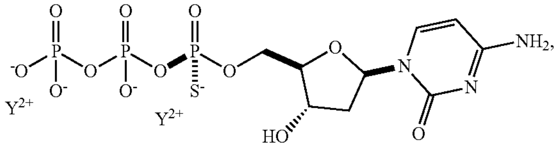

-continued
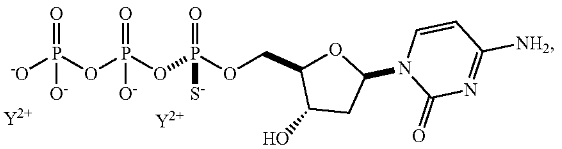
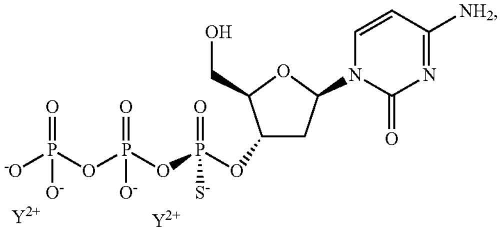
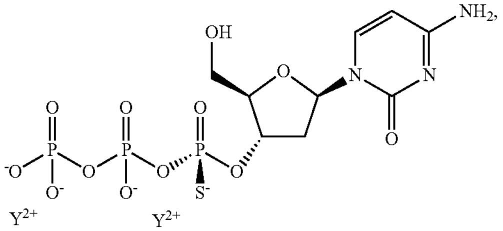
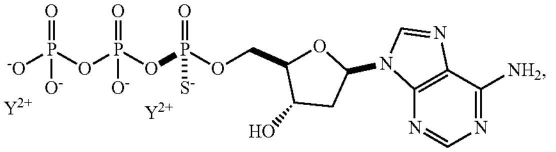
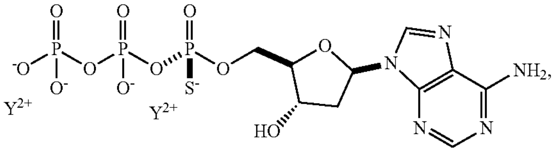
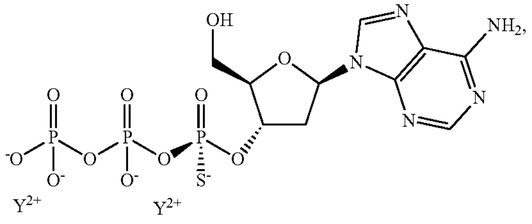
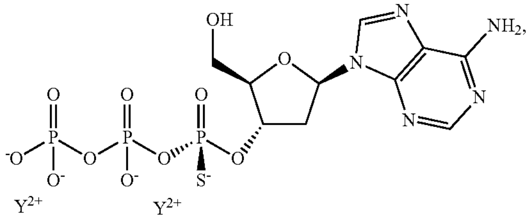
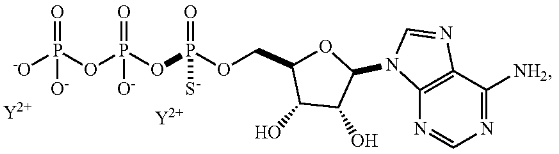
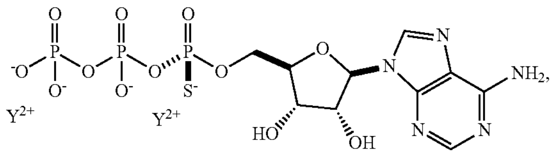
-continued
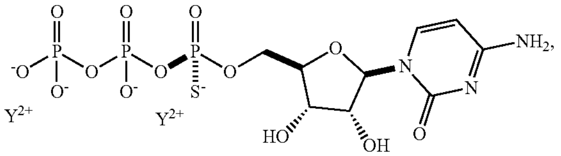
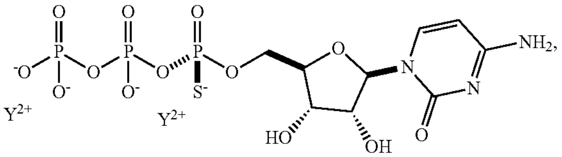
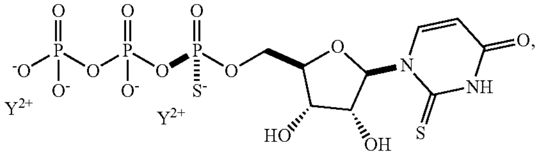
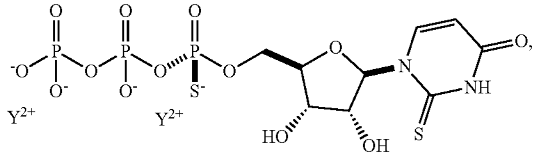
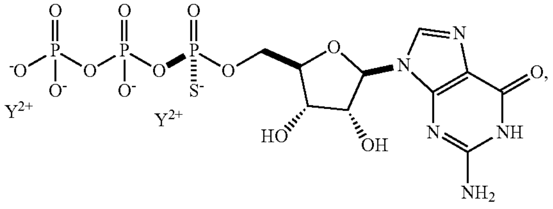
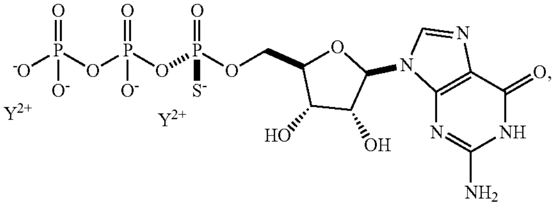
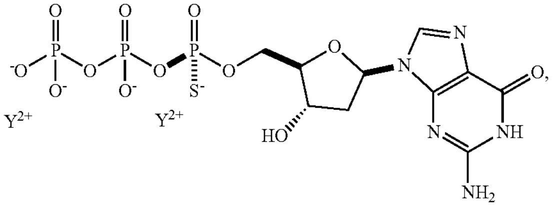
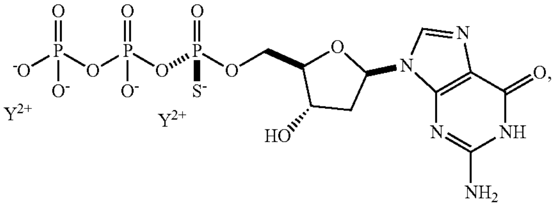
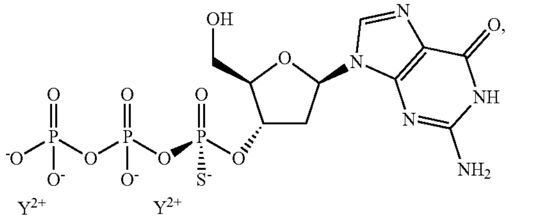

-continued

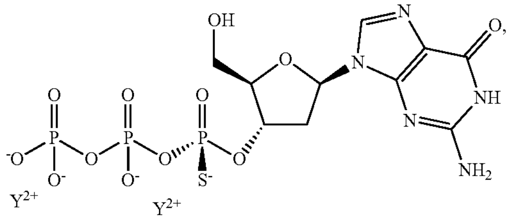

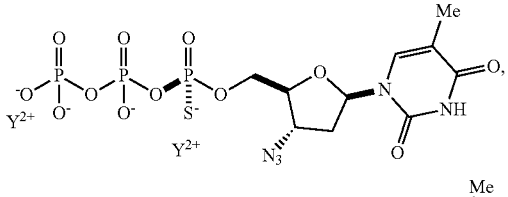

and

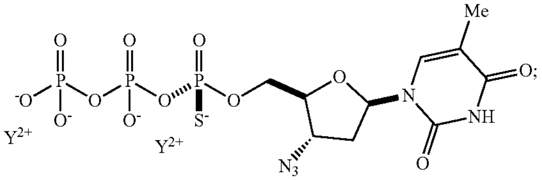

wherein X is ammonium, trialkylammonium, lithium, sodium, or potassium; and Y is calcium or magnesium.

In some embodiments, the nucleoside triphosphorothioate is

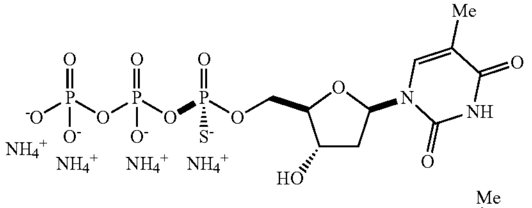

or

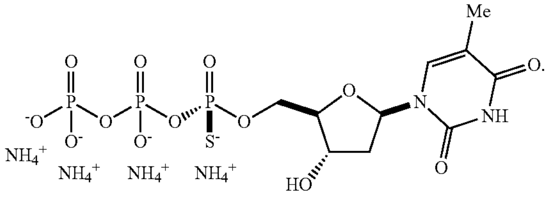

In some embodiments, the nucleoside triphosphorothioate is

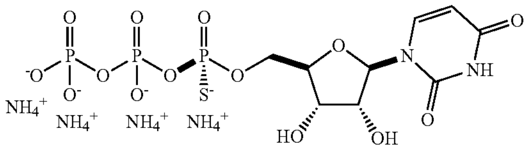

or

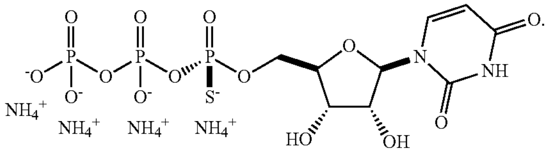

In some embodiments, the nucleoside triphosphorothioate is

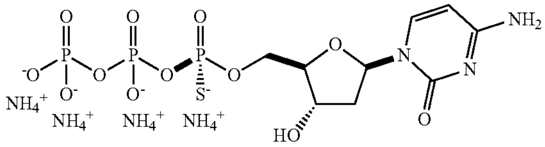

or

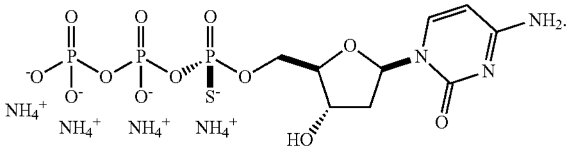

In some embodiments, the nucleoside triphosphorothioate is

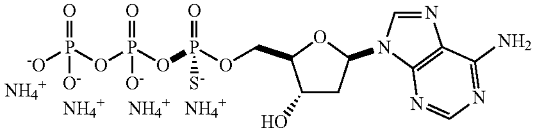

or

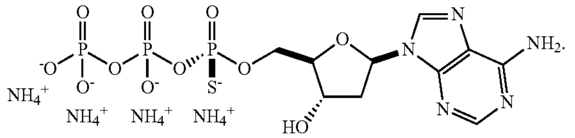

In some embodiments, the nucleoside triphosphorothioate is

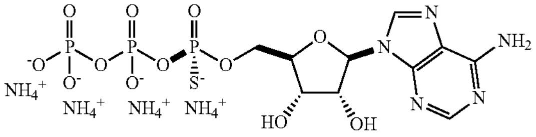

or

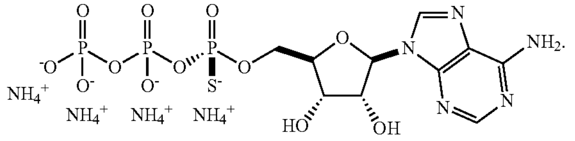

In some embodiments, the nucleoside triphosphorothioate is

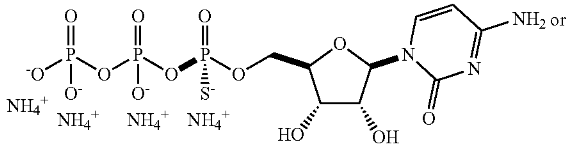

or

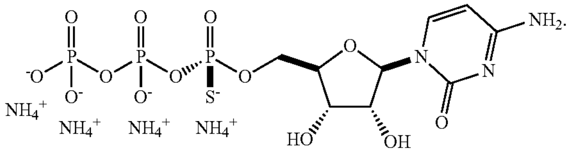

In some embodiments, the nucleoside triphosphorothioate is

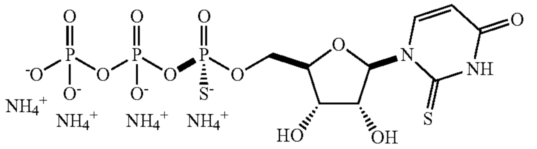

or

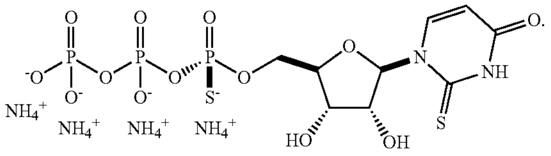

In some embodiments, the nucleoside triphosphorothioate is

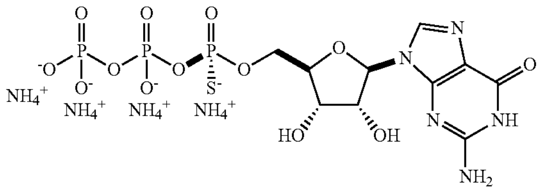

or

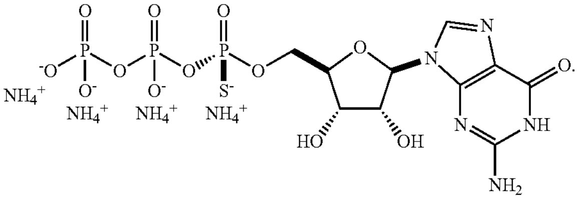

In some embodiments, the nucleoside triphosphorothioate is

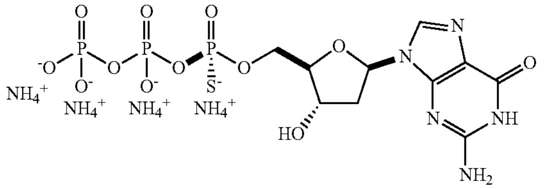

or

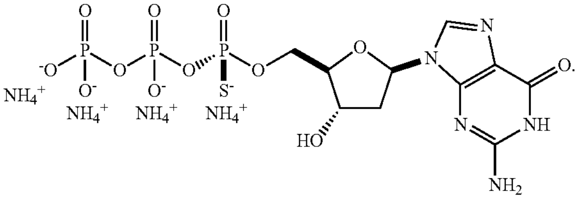

In some embodiments, the nucleoside triphosphorothioate is

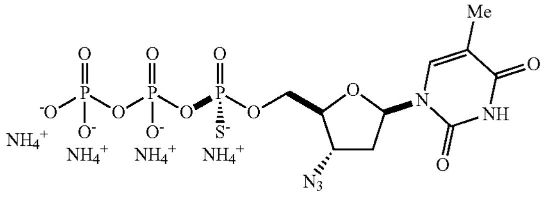

or

-continued

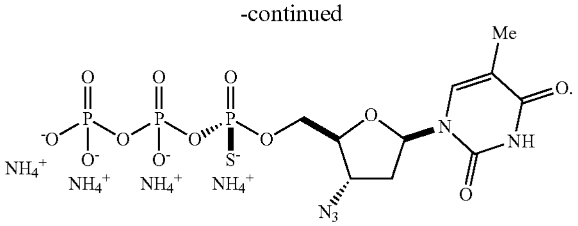

In some embodiments, the nucleoside triphosphorothioate is

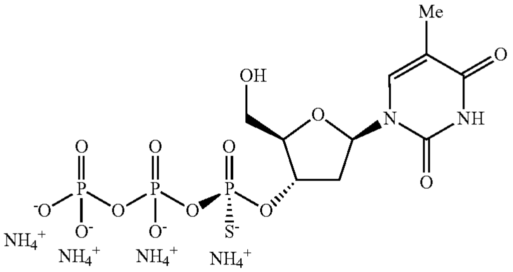

or

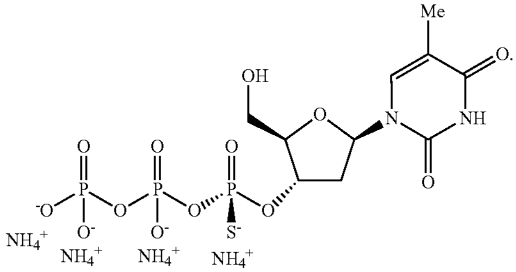

In some embodiments, the present disclosure provides methods of making a nucleoside triphosphorothioate or a salt thereof, comprising:

(a) reacting compound 93:

(compound 93)

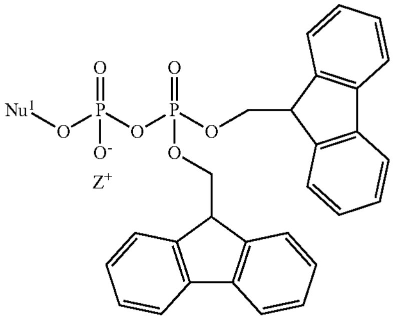

, wherein $Nu^1$ is a nucleoside; and Z is hydrogen, alkylammonium, dialkylammonium, trialkylammonium, or tetralkylammonium;

with a Compound of the Disclosure in the presence of a first base to form a chiral thiotriphosphate transfer reagent;

(b) reacting the chiral thiotriphosphate transfer reagent with compound 97 in the presence of a second base to form a protected nucleoside triphosphorothioate;

(compound 97)

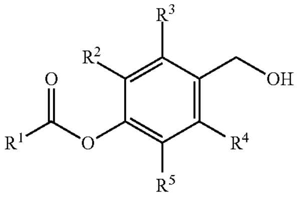

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl;

(c) deprotecting the protected nucleoside triphopsphorothioate to form a nucleoside triphosphorothioate.

In some embodiments, $Nu^1$ is a nucleobase, then a protected nucleobase triphosphorothioate is generated in step (b) described above, a nucleobase triphosphorothioate is generated in step (c) described above.

In some embodiments, the protected nucleoside triphosphorothioate or protected nucleobase triphosphorothioate reagent is deprotected in an ammonia solution.

In some embodiments, the protected nucleoside triphosphorothioate or protected nucleobase triphosphorothioate is deprotected in a tetra-n-butylammonium fluoride solution buffered with acetic acid.

In some embodiments, the protected nucleoside triphosphorothioate or protected nucleobase triphosphorothioate is deprotected in an acetic acid solution.

In some embodiments, the nucleoside triphosphorothioate or nucleobase triphosphorothioate is purified by an ion exchange chromatography.

In some embodiments, the nucleoside triphosphorothioate or nucleobase triphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, and triethylamine.

In some embodiments, the first base is 1,8-diazabicyclo[5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, compound 93 is prepared by reacting compound 92:

(compound 92)

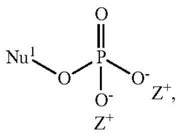

with $iPr_2NP(OFm)_2$, wherein $Nu^1$ is a nucleoside or nucleobase; and Z is hydrogen, alkylammonium, dialkylammonium, trialkylammonium, or tetralkylammonium.

In some embodiments, the reaction described above is conducted in the presence of 1-H-tetrazole. In some embodiments, the reaction described above is conducted in the presence of imidazole. In some embodiments, the reaction described above is conducted in the presence of 5-phenyl-1-H-tetrazole. In some embodiments, the reaction described above is conducted in the presence of hydrogen peroxide. In some embodiments, the reaction described above is conducted in the presence of tert-butyl hydroperoxide (TBHP). In some embodiments, the reaction described above is conducted in the presence of a compound selected from the group consisting of 1-H-tetrazole, imidazole and 5-phenyl-1-H-tetrazole, and a compound selected from the group consisting of hydrogen peroxide and tert-butyl hydroperoxide (TBHP). In some embodiments, the reaction described above is conducted in the presence of 1-H-tetrazole and hydrogen peroxide. In some embodiments, the reaction described above is conducted in the presence of 5-phenyl-1H-tetrazole and tert-butyl hydroperoxide.

In some embodiments, the nucleoside triphosphorothioate is

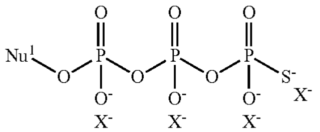

or

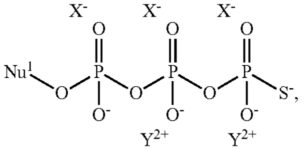

wherein $Nu^1$ is a nucleoside; X is ammonium, trialkylammonium, lithium, sodium, or potassium; and Y is calcium or magnesium.

In some embodiments, $Nu^1$ is a protected nucleoside.

In some embodiments, $Nu^1$ is an unprotected nucleoside.

In some embodiments, the nucleoside is described above.

IV. Methods of Making Dinucleoside Diphosphorothioates, Dinucleobase Diphosphorothioates, or Nucleoside Nucleobase Diphosphorothioate In one embodiment, the present disclosure provides methods of making a dinucleoside diphosphorothioate or a salt thereof, comprising:

(a) reacting compound 92:

(compound 92)

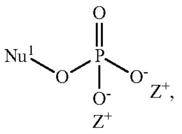

wherein $Nu^1$ is a nucleoside; and Z is hydrogen, alkylammonium, dialkylammonium, trialkylammonium, or tetralkylammonium;

with a Compound of the Disclosure in the presence of a first base to form a chiral thiodiphosphate transfer reagent;

(b) reacting the chiral thiodiphosphate transfer reagent with a nucleoside in the presence of a second base to form a protected dinucleoside diphosphorothioate; and (c) deprotecting the protected dinucleoside diphosphorothioate to form a dinucleoside diphosphorothioate.

In some embodiments, a dinucleobase diphosphorothioate or a salt thereof is prepared from the reaction described above, when $Nu^1$ is a nucleobase and the chiral thiodiphosphate transfer reagent reacts with a nucleobase in step (b).

In some embodiments, a nucleoside nucleobase diphosphorothioate or a salt thereof is prepared from the reaction described above, when $Nu^1$ is a nucleoside and the chiral thiodiphosphate transfer reagent reacts with a nucleobase in step (b).

In some embodiments, a nucleoside nucleobase diphosphorothioate or a salt thereof is prepared from the reaction described above, when $Nu^1$ is a nucleobase and the chiral thiodiphosphate transfer reagent reacts with a nucleoside in step (b).

In some embodiments, the protected dinucleoside diphosphorothioate, protected dinucleobase diphosphorothioate, or protected nucleoside nucleobase diphosphorothioate is deprotected in an ammonia solution.

In some embodiments, the protected dinucleoside diphosphorothioate, protected dinucleobase diphosphorothioate, or protected nucleoside nucleobase diphosphorothioate is deprotected in a tetra-n-butylammonium fluoride solution buffered with acetic acid.

In some embodiments, the protected dinucleoside diphosphorothioate, protected dinucleobase diphosphorothioate, or protected nucleoside nucleobase diphosphorothioate is deprotected in an acetic acid solution.

In some embodiments, the dinucleoside diphosphorothioate, dinucleobase diphosphorothioate, or nucleoside nucleobase diphosphorothioate is purified by an ion exchange chromatogtaphy.

In some embodiments, the dinucleoside diphosphorothioate, dinucleobase diphosphorothioate, or nucleoside nucleobase diphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, triethylamine, pyridine, 2,6-lutidine, and imidazole.

In some embodiments, the first base is 1,8-diazabicyclo [5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, $Nu^1$ is a protected nucleoside. In some embodiments, $Nu^1$ is an unprotected nucleoside.

In some embodiments, $Nu^1$ is a protected nucleobase. In some embodiments, $Nu^1$ is an unprotected nucleobase.

In some embodiments, the nucleoside in step (b) is a protected nucleoside. In some embodiments, the nucleoside in step (b) is an unprotected nucleoside.

In some embodiments, the nucleobase in step (b) is a protected nucleoside. In some embodiments, the nucleobase in step (b) is an unprotected nucleoside.

In some embodiments, the nucleoside in step (a) is same as the nucleoside in step (b). In some embodiments, the nucleoside in step (a) is different from the nucleoside in step (b).

In some embodiments, the nucleobase in step (a) is same as the nucleobase in step (b). In some embodiments, the nucleobase in step (a) is different from the nucleobase in step (b).

In some embodiments, the dinucleoside diphosphorothioate is selected from the group consisting of:

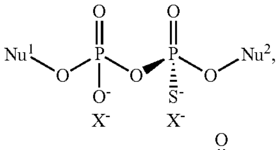

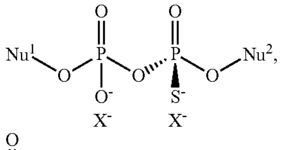

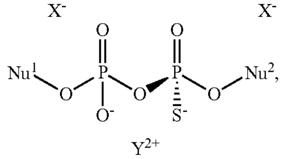

and

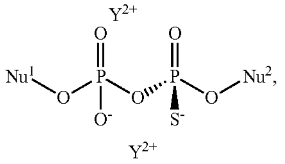

wherein $Nu^1$ and $Nu^2$ are nucleosides; X is ammonium, trialkylammonium, lithium, sodium, or potassium; and Y is calcium or magnesium.

In some embodiments, $Nu^2$ is a protected nucleoside.

In some embodiments, $Nu^2$ is an unprotected nucleoside.

In some embodiments, $Nu^1$ and $Nu^2$ are same nucleoside.

In some embodiments, $Nu^1$ and $Nu^2$ are different nucleosides.

In some embodiments, the nucleoside is described above.

In some embodiments, the dinucleoside diphosphorothioate is

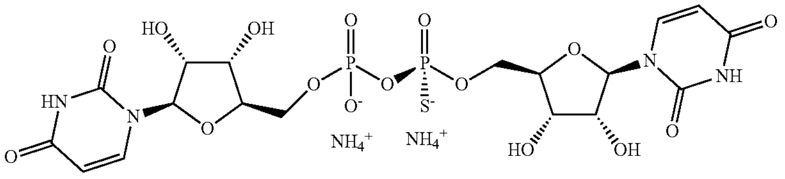

or

-continued
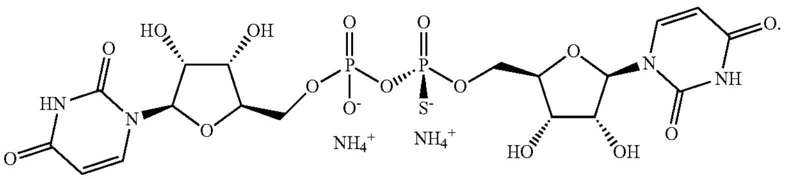
In some embodiments, the dinucleoside diphosphorothioate is
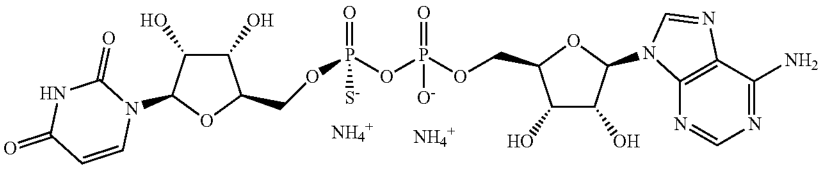
or
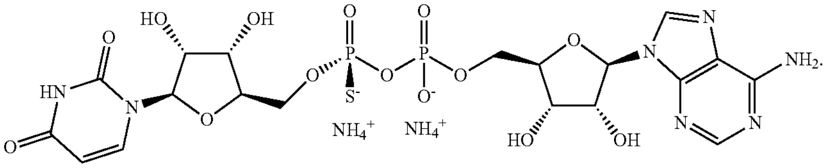
In some embodiments, the dinucleoside diphosphorothioate is
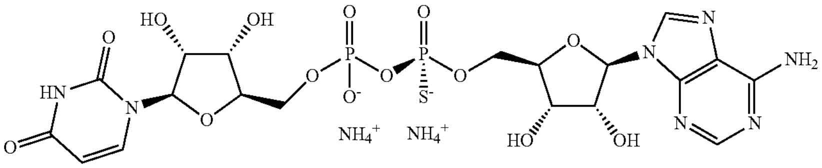
or
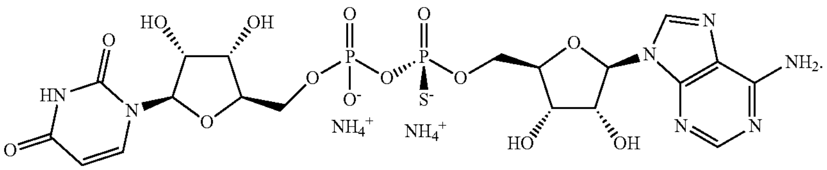

V. Methods of Making Dinucleoside Triphosphorothioates, Dinucleobase Triphosphorothioates, Nucleoside Nucleobase Triphosphorothioates In one embodiment, the present disclosure provides methods of making a dinucleoside triphosphorothioate or a salt thereof, comprising:

(a) reacting compound 93:

(compound 93)

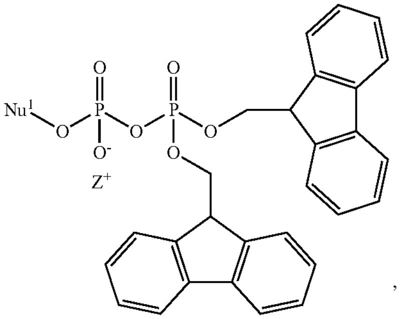

, wherein $Nu^1$ is a nucleoside; and Z is hydrogen, alkylammonium, dialkylammonium, trialkylammonium, or tetralkylammonium;

with a Compound of the Disclosure in the presence of a first base to form a chiral thiotriphosphate transfer reagent;

(b) reacting the chiral thiotriphosphate transfer reagent with a nucleoside in the presence of a second base to form a protected dinucleoside triphosphorothioate; and (c) deprotecting the protected dinucleoside triphosphorothioate to form a dinucleoside triphosphorothioate.

In some embodiments, a dinucleobase triphosphorothioate or a salt thereof is prepared from the reaction described above, when $Nu^1$ is a nucleobase and the chiral thiotriphosphate transfer reagent reacts with a nucleobase in step (b).

In some embodiments, a nucleoside nucleobase triphosphorothioate or a salt thereof is prepared from the reaction described above, when $Nu^1$ is a nucleoside and the chiral thiotriphosphate transfer reagent reacts with a nucleobase in step (b).

In some embodiments, a nucleoside nucleobase triphosphorothioate or a salt thereof is prepared from the reaction described above, when $Nu^1$ is a nucleobase and the chiral thiotriphosphate transfer reagent reacts with a nucleoside in step (b).

In some embodiments, the protected dinucleoside triphosphorothioate, protected dinucleobase triphosphorothioate, or protected nucleoside nucleobase triphosphorothioate is deprotected in an ammonia solution.

In some embodiments, the protected dinucleoside triphosphorothioate, protected dinucleobase triphosphorothioate, or protected nucleoside nucleobase triphosphorothioate is deprotected in a tetra-n-butylammonium fluoride solution buffered with acetic acid.

In some embodiments, the protected dinucleoside triphosphorothioate, protected dinucleobase triphosphorothioate, or protected nucleoside nucleobase triphosphorothioate is deprotected in an acetic acid solution.

In some embodiments, the dinucleoside triphosphorothioate, dinucleobase triphosphorothioate, or nucleoside nucleobase triphosphorothioate is purified by an ion exchange chromatography.

In some embodiments, the dinucleoside triphosphorothioate, dinucleobase triphosphorothioate, or nucleoside nucleobase triphosphorothioate is purified by precipitation from a solution containing one of the cations of lithium, sodium, potassium, calcium, and magnesium.

In some embodiments, the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, and triethylamine.

In some embodiments, the first base is 1,8-diazabicyclo [5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, $Nu^1$ is a protected nucleoside. In some embodiments, $Nu^1$ is an unprotected nucleoside.

In some embodiments, $Nu^1$ is a protected nucleobase. In some embodiments, $Nu^1$ is an unprotected nucleobase.

In some embodiments, the nucleoside in step (b) is a protected nucleoside. In some embodiments, the nucleoside in step (b) is an unprotected nucleoside.

In some embodiments, the nucleobase in step (b) is a protected nucleobase. In some embodiments, the nucleobase in step (b) is an unprotected nucleobase.

In some embodiments, the nucleoside in step (a) is same as the nucleoside in step (b). In some embodiments, the nucleoside in step (a) is different from the nucleoside in step (b).

In some embodiments, the nucleobase in step (a) is same as the nucleobase in step (b). In some embodiments, the nucleobase in step (a) is different from the nucleobase in step (b).

In some embodiments, the dinucleoside triphosphorothioate is selected from the group consisting of:

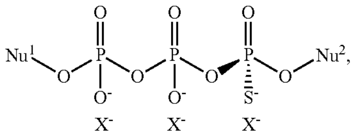

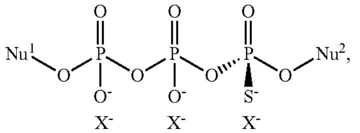

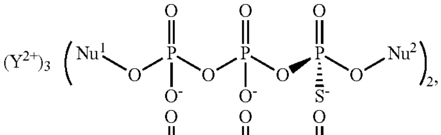

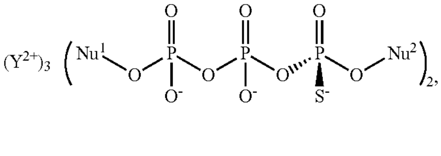

-continued

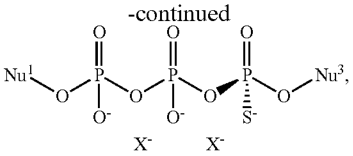

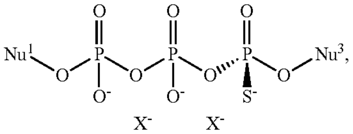

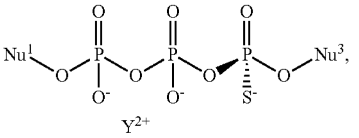

and

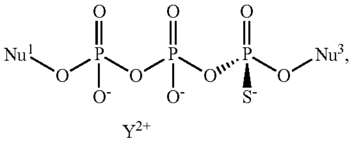

wherein $Nu^1$ and $Nu^2$ are nucleosides; $Nu^3$ is a cationic nucleoside; X is ammonium, trialkylammonium, lithium, sodium, or potassium; and Y is calcium or magnesium.

In some embodiments, $Nu^2$ is a protected nucleoside.

In some embodiments, $Nu^2$ is an unprotected nucleoside.

In some embodiments, $Nu^3$ is a protected nucleoside.

In some embodiments, $Nu^3$ is an unprotected nucleoside.

In some embodiments, $Nu^1$ and $Nu^2$ are same nucleoside.

In some embodiments, $Nu^1$ and $Nu^2$ are different nucleosides.

In some embodiments, $Nu^1$ and $Nu^3$ are same nucleoside.

In some embodiments, $Nu^1$ and $Nu^3$ are different nucleosides.

In some embodiments, the nucleoside is described above.

In some embodiments, the dinucleoside triphosphorothioate is

VI. Methods of Making Capped Dinucleoside Triphosphorothioates

In one embodiment, the present disclosure provides methods of making a capped dinucleoside triphosphorothioate or a salt thereof, comprising:

(a) reacting a first nucleoside with a $\Psi^O$ reagent in the presence of a first base to form a loaded nucleoside;

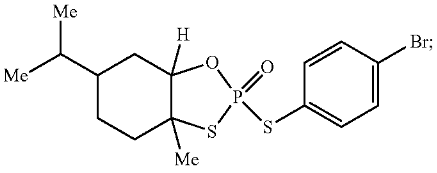

($\Psi^O$ reagent)

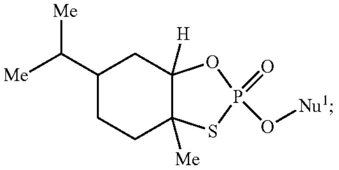

(a loaded nucleoside)

(b) reacting the loaded nucleoside with a second nucleoside in the presence of a second base to form a dinucleoside phosphate compound 94:

(compound 94)

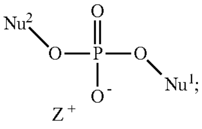

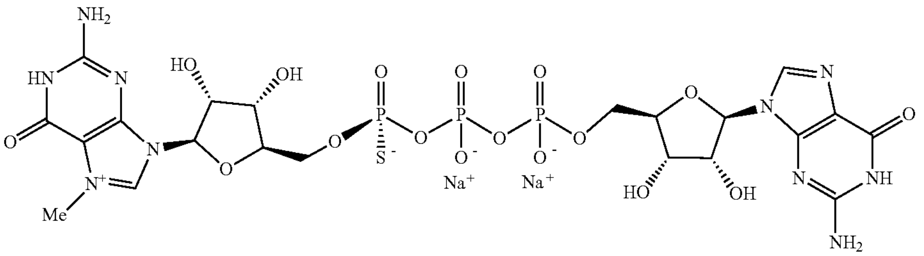

or

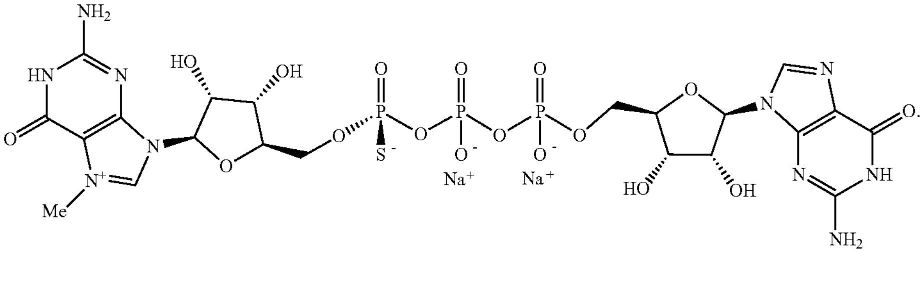

(c) reacting compound 94 with a $\Psi^P$ reagent in the presence of a third base to form a loaded dinucleoside:

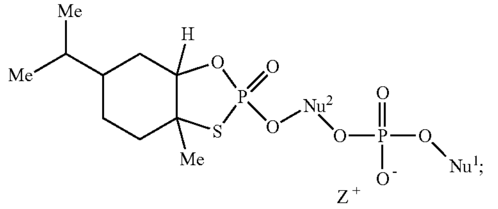

(a loaded dinucleoside)

(d) reacting the loaded dinucleoside with water in the presence of a fourth base to form compound 95:

(compound 95)

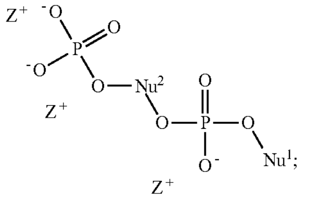

(e) reacting compound 95 with $iPr_2NP(OFm)_2$ to form compound 96:

(compound 96)

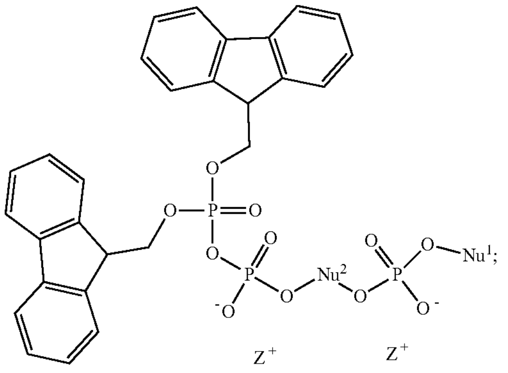

(f) reacting compound 96 with a Compound of the Disclosure in the presence of a fifth base to form a chiral triphosphorothioate transfer reagent;

(g) reacting the chiral triphosphorothioate transfer reagent with a third nucleoside in the presence of a six base to form a protected capped dinucleoside triphosphorothioate; and (h) deprotecting the protected capped dinucleoside triphosphorothioate to form a capped dinucleoside triphosphorothioate;

wherein $Nu^1$ and $Nu^2$ are nucleosides; and Z is hydrogen, alkylammonium, dialkylammonium, trialkylammonium, or tetralkylammonium.

In some embodiments, the $\Psi^O$ reagent is

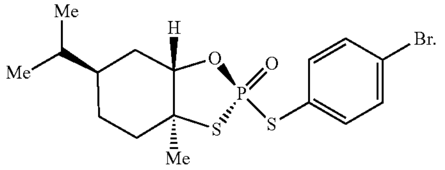 [SMILES: CC(C)[C@@H]1CC[C@]2(C)S[P@](=O)(Sc3ccc(Br)cc3)O[C@H]2C1]

In some embodiments, the $\Psi^O$ reagent is Me

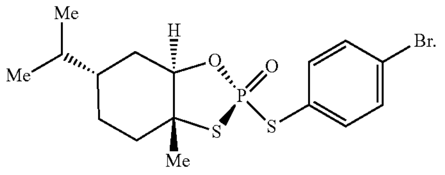 [SMILES: CC(C)[C@H]1CC[C@@]2(C)S[P@@](=O)(Sc3ccc(Br)cc3)O[C@@H]2C1]

In some embodiments, the loaded nucleoside in step (a) is isolated before the next step.

In some embodiments, compound 94 in step (b) is isolated before the next step.

In some embodiments, the loaded dinucleoside in step (c) is not isolated before the next step.

In some embodiments, compound 95 in step (d) is isolated before the next step.

In some embodiments, compound 96 in step (e) is isolated before the next step.

In some embodiments, the chiral triphosphorothioate transfer reagent in step (f) is not isolated before the next step.

In some embodiments, the protected capped dinucleoside triphosphorothioate in step (g) is isolated by ion exchange chromatography before the next step.

In some embodiments, the first base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the first base is 1,8-diazabicyclo[5.4.0]undec-7-ene.

In some embodiments, the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the second base is 1,8-diazabicyclo[5.4.0]undec-7-ene.

In some embodiments, the third base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the third base is 1,8-diazabicyclo[5.4.0]undec-7-ene.

In some embodiments, the fourth base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the fourth base is 1,8-diazabicyclo[5.4.0]undec-7-ene.

In some embodiments, the fifth base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the fifth base is 1,8-diazabicyclo[5.4.0]undec-7-ene.

In some embodiments, the sixth base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

In some embodiments, the sixth base is 1,8-diazabicyclo[5.4.0]undec-7-ene.

In some embodiments, compound 95 reacts with $iPr_2NP(OFm)_2$ in the presence of 1-H-tetrazole. In some embodiments, compound 95 reacts with $iPr_2NP(OFm)_2$ in the presence of imidazole. In some embodiments, compound 95 reacts with $iPr_2NP(OFm)_2$ in the presence of 5-phenyl-1-H-tetrazole. In some embodiments, compound 95 reacts with $iPr_2NP(OFm)_2$ in the presence of hydrogen peroxide. In some embodiments, compound 95 reacts with $iPr_2NP(OFm)_2$ in the presence of tert-butyl hydroperoxide (TBHP). In some embodiments, compound 95 reacts with $iPr_2NP(OFm)_2$ in the presence of a compound selected from the group consisting of 1-H-tetrazole, imidazole and 5-phenyl-1-H-tetrazole, and a compound selected from the group consisting of hydrogen peroxide and tert-butyl hydroperoxide (TBHP). In some embodiments, compound 95 reacts with $iPr_2NP(OFm)_2$ in the presence of 1-H-tetrazole and hydrogen peroxide. In some embodiments, compound 95 reacts with $iPr_2NP(OFm)_2$ in the presence of 5-phenyl-1H-tetrazole and tert-butyl hydroperoxide.

In some embodiments, the protected capped dinucleoside triphosphorothioate is deprotected in an ammonia solution.

In some embodiments, the protected capped dinucleoside triphosphorothioate is deprotected in a tetra-n-butylammonium fluoride solution buffered with acetic acid.

In some embodiments, the protected capped dinucleoside triphosphorothioate is deprotected in an acetic acid solution.

In some embodiments, the capped dinucleoside triphosphorothioate is purified by a reverse phase chromatography.

In some embodiments, the capped dinucleoside triphosphorothioate is purified by precipitation from a solution containing one of the cations of lithium, sodium, potassium, calcium, and magnesium.

In some embodiments, $Nu^1$ is a protected nucleoside.

In some embodiments, $Nu^1$ is an unprotected nucleoside.

In some embodiments, $Nu^2$ is a protected nucleoside.

In some embodiments, $Nu^2$ is an unprotected nucleoside.

In some embodiments, the third nucleoside in step (g) is a protected nucleoside.

In some embodiments, the third nucleoside in step (g) is an unprotected nucleoside.

In some embodiments, the capped dinucleoside triphosphorothioate is selected from the group consisting of:

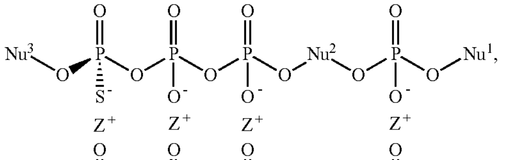

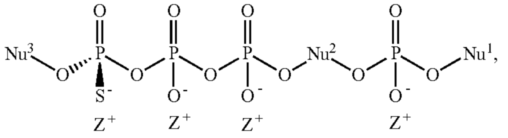

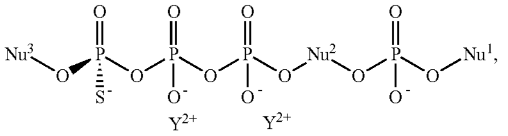

-continued

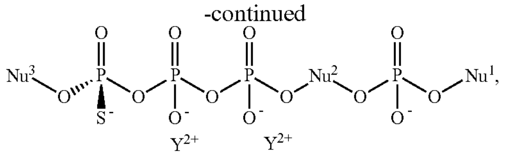

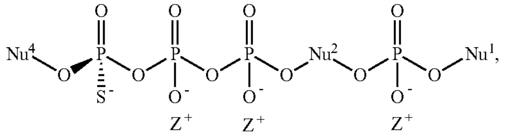

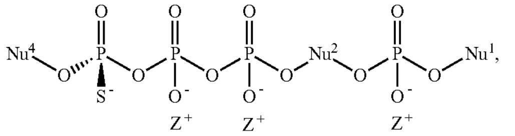

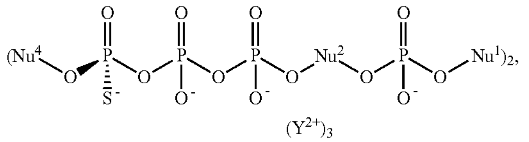
and

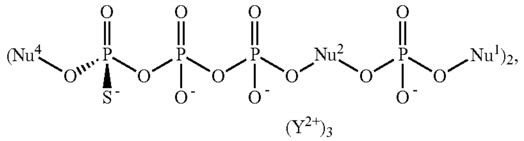

wherein $Nu^1$, $Nu^2$ and $Nu^3$ are nucleosides; $Nu^4$ is a cationic nucleoside; X is ammonium, trialkylammonium, lithium, sodium, or potassium; and Y is calcium or magnesium.

In some embodiments, $Nu^3$ is a protected nucleoside.

In some embodiments, $Nu^3$ is an unprotected nucleoside.

In some embodiments, $Nu^4$ is a protected nucleoside.

In some embodiments, $Nu^4$ is an unprotected nucleoside.

In some embodiments, $Nu^1$, $Nu^2$ and $Nu^3$ are same nucleoside.

In some embodiments, $Nu^1$, $Nu^2$ and $Nu^3$ are different nucleosides.

In some embodiments, $Nu^1$ and $Nu^2$ are same nucleoside, and $Nu^3$ is a different nucleoside from $Nu^1$ and $Nu^2$.

In some embodiments, $Nu^1$ and $Nu^3$ are same nucleoside, and $Nu^2$ is a different nucleoside from $Nu^1$ and $Nu^3$.

In some embodiments, $Nu^2$ and $Nu^3$ are same nucleoside, and $Nu^1$ is a different nucleoside from $Nu^2$ and $Nu^3$.

In some embodiments, $Nu^1$, $Nu^2$ and $Nu^4$ are different nucleosides.

In some embodiments, $Nu^1$ and $Nu^2$ are same nucleoside, and $Nu^4$ is a different nucleoside from $Nu^1$ and $Nu^2$.

In some embodiments, the nucleoside is described above.

In some embodiments, the capped dinucleoside triphosphorothioate is

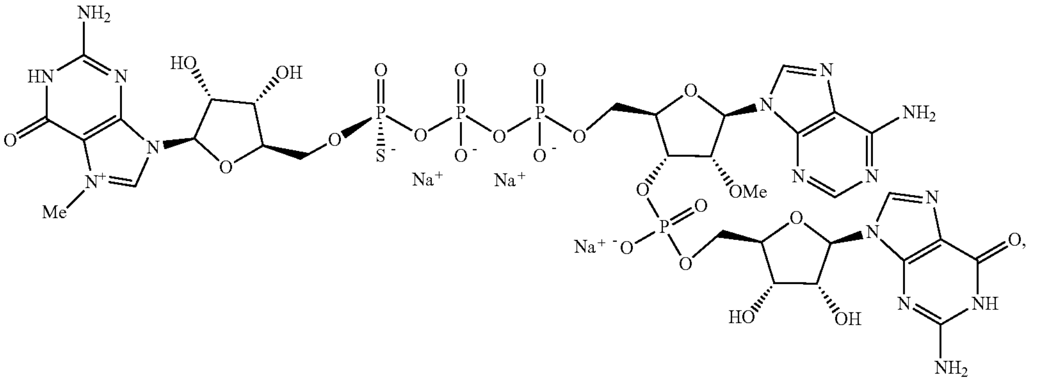

or

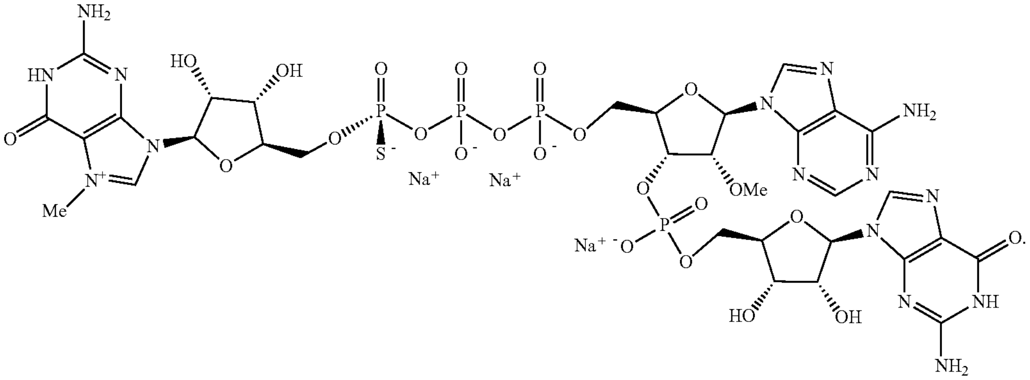

EXAMPLES

The invention is further defined in the following Examples. It should be understood that the Examples are given by way of illustration only. From the above discussion and the Examples, one skilled in the art can ascertain the essential characteristics of the invention, and without departing from the spirit and scope thereof, can make various changes and modifications to adapt the invention to various uses and conditions. As a result, the invention is not limited by the illustrative examples set forth hereinbelow, but rather is defined by the claims appended hereto.

Example 1

Preparation of tetrafluoropyridine-4-thiol (Compound 4)

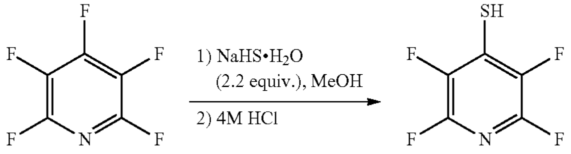

compound 4

Tetrafluoropyridine-4-thiol was prepared according to the procedure disclosed by Dilman et al., Angew. Chem. Int. Ed. 2021, 60, 2849-2854. All steps should be performed under well ventilated fume hood due to large amount of $H_2S$ liberated during the reaction.

A 250 mL round bottom flask equipped with a stir bar was charged with sodium hydrosulfide hydrate (48.2 g, 660 mmol, 2.2 equiv.), followed by addition of MeOH (100 mL) and the resulting suspension was stirred at room temperature until most of the solid dissolved. The flask was immersed into ice/water bath and pentafluoropyridine (33.0 mL, 300 mmol, 1.0 equiv.) was added slowly, maintaining internal reaction temperature below 30° C. The resulting viscous solution was stirred for 5 min, after which the volatile components were evaporated under reduced pressure. The residue was carefully treated with 4M HCl solution (180 mL), and the product was extracted with hexanes (100 mL, then 2×50 mL). The combined organic phases were dried using $MgSO_4$, filtered and the solvent was evaporated under reduced pressure (>100 mbar, temp. 30° C.) to afford tetrafluoropyridine-4-thiol (compound 4; 52.2 g) as a colorless liquid, which solidifies upon storage at 0° C. (Yield=95%). The product was characterized by $^{19}F$ NMR (376 MHz, $CDCl_3$): δ −93.4-−93.7 (m, 2F), −142.4-−142.6 (m, 2F).

Example 2

Preparation of Compound 1

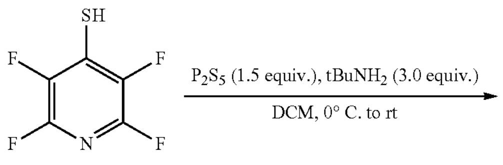

compound 4

-continued

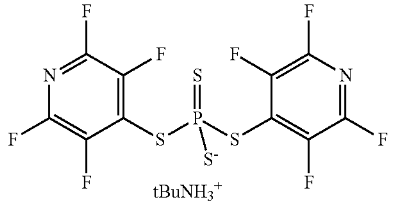

compound 1

A flame dried 1 L round bottom flask, equipped with a stir bar, was charged with phosphorus pentasulfide (17.0 g, 75 mmol, 1.5 equiv.), followed by addition of anhydrous DCM (135 mL). The batch was made inert by flushing with argon for 2 min. Subsequently, tetrafluoropyridine-4-thiol (compound 4; 21.0 g, 115 mmol, 2.0 equiv.) was added and the reaction flask was immersed in ice/water bath. Tert-butylamine (18.4 mL, 150 mmol, 3.0 equiv.) was added to the reaction mixture (caution: reaction very exothermic). The resulting suspension was warmed to room temperature and stirred for 16 h under argon atmosphere. The reaction was carefully quenched with water (135 mL) (caution: $H_2S$ is evolved during this step), followed by the addition of hexanes (135 mL). The resulting slurry was stirred for 30 min, after which precipitate was filtered off and washed consecutively with water (60 mL), DCM/hexanes (1:1; 3×60 mL) and hexanes (60 mL). The filter cake was dried in vacuo for 16 h to provide 18.4 g of compound 1 as a white crystalline solid (Yield=60%). The product was characterized by $^1H$ NMR (600 MHz, $(CD_3)_2CO$): δ 7.93-7.65 (m, 3H), 1.55 (s, 9H); $^{13}C$ NMR (150 MHz, $(CD_3)_2CO$): δ 145.2-144.9 (m), 144.7-144.4 (m), 143.6-143.3 (m), 143.0-142.6 (m), 131.4-131.0 (m), 54.7, 27.7; $^{19}F$ NMR (376 MHz, $CD_3CN$): 6-96.5--96.7 (m, 4F), −135.9--136.0 (m, 4F); $^{31}P$ NMR (162 MHz, $CD_3CN$): δ 92.5; HRMS (ESI-TOF) m/z: calculated for $C_{10}F_8N_2PS_4$ $[M-H]^-$: 458.8559, found: 458.8562; m.p. 152-153° C.

Example 3

Preparation of Compound 3

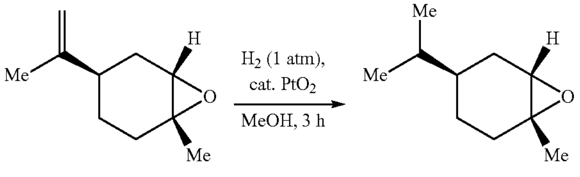

compound 5 compound 2

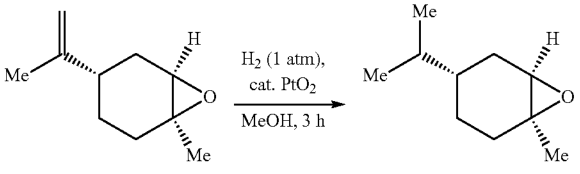

compound 6 compound 3

250 mL round bottom flask equipped with a stir bar was charged with (−)-cis-limonene oxide (compound 6; 12.2 mL, 75 mmol, 1.0 equiv.), and the atmosphere was exchanged to argon. MeOH (50 mL) was added, followed by $PtO_2$ (surface area≥60 $m^2/g$; 84 mg, 0.37 mmol, 0.5 mol %). The atmosphere in the flask was exchanged for $H_2$ and the reaction vessel was equipped with a $H_2$ balloon. The reaction mixture was stirred at room temperature for 3 h, after which TLC indicated full conversion of the starting material. The crude reaction mixture was filtered through a pad of CELITE (diamataceous earth), followed by few volumes of DCM. The resulting solution was concentrated in vacuo to ~12 mL (>100 mbar, temp. 35° C.) and used in the next step without any further purification. Compound 3 was produced.

Second enantiomer of compound 2 was obtained via analogous procedure starting from (+)-cis-limonene oxide (compound 5). The synthesis of compounds 5 and 6 are disclosed in Steiner et al., Tetrahedron Asymmetry 2002, 13, 2359-2363.

Example 4

Preparation of (+)-Ψ* Reagent

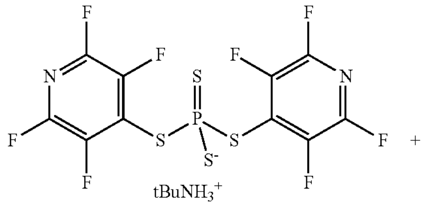

compound 1

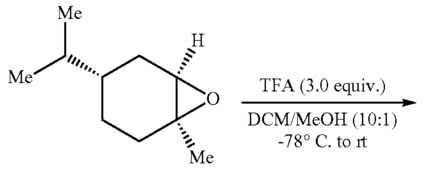

compound 3

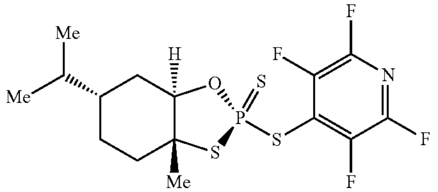

(+)-Ψ* reagent

Round bottom flask, equipped with a stir bar was charged with compound 1 (20.0 g, 37.5 mmol, 1.0 equiv.), followed by anhydrous DCM (75 mL). The reaction batch was made inert by flushing with argon for 2 min, and the resulting suspension was cooled to −78° C. Subsequently, MeOH (7.5 mL), crude epoxide compound 3 (12 mL; 2.0 equiv.) and TFA (12 mL; 3.0 equiv.) were added consecutively and the resulting clear solution for 10 min. The cooling bath was removed and the reaction mixture was stirred for 1 h. After that time $^{31}P$ NMR indicated full conversion of the staring material compound 1 (see below). The reaction mixture was diluted with hexanes (150 mL) and washed consecutively with water (75 mL), 10% aq. $K_2HPO_4$ (75 mL), and 10% aq. $KH_2PO_4$ (75 mL). The organic layer was dried over MgSO4, filtered and concentrated in vacuo. The resulting crude solid was redissolved in the minimal amount of DCM and the resulting solution was diluted with MeOH (100 mL). Crystals appeared after addition of MeOH and the solution was left for 1 h at room temperature to complete crystallization.

The resulting slurry was filtered and the filter cake was washed with cold MeOH. After being dried under vacuum, compound (+)-Ψ* reagent was obtained as a white crystalline solid (8.9 g, d.r.>99:1, ee>99:1, Yield=55%). Compound (+)-Ψ* reagent was characterized by $^{1}H$ NMR (600 MHz, $CDCl_3$): δ 4.51 (ddd, J=12.8, 6.1, 3.7 Hz, 1H), 2.28-2.23 (m, 1H), 2.02 (td, J=13.0, 4.2 Hz, 1H), 1.97-1.93 (m, 1H), 1.84-1.76 (m, 3H), 1.67 (s, 3H), 1.67-1.58 (m, 2H), 1.03 (d, J=6.6 Hz, 3H), 0.97 (d, J=6.6 Hz, 3H); $^{13}C$ NMR (150 MHz, $CDCl_3$): δ 144.7-144.5 (m), 143.9-143.5 (m), 143.1-142.8 (m), 142.1-141.8 (m), 86.6 (d, J=3.3 Hz), 66.2, 40.9, 33.2 (d, J=8.8 Hz), 27.9 (d, J=14.9 Hz), 27.0, 23.4, 22.4, 22.0, 21.1; $^{19}F$ NMR (376 MHz, $CDCl_3$): δ −91.1--91.3 (m, 2F), −135.1--135.3 (m, 2F); $^{31}P$ NMR (162 MHz, $CDCl_3$): δ 96.4; HRMS (ESI-TOF) m/z: calculated for $C_{15}H_{19}F_4NOPS_3$ $[M+H]^+$: 432.0303, found: 432.0290; $[\alpha]_D^{20}$=+315.3 (c 1.01, $CHCl_3$); m.p. 131° C.

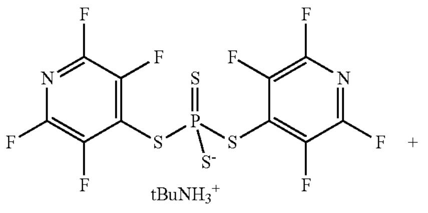

compound 1

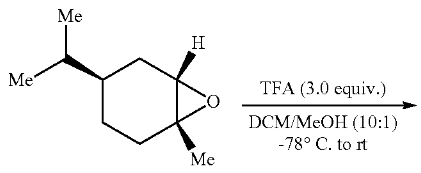

compound 2

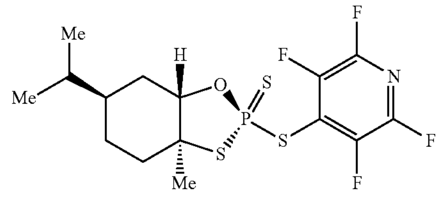

(+)-Ψ* reagent

Compound (−)-Ψ* reagent was obtained via analogous procedure starting from (+)-cis-limonene oxide (compound 2). All characterization data were identical, except of the optical rotation. Compound (−)-Ψ* reagent was characterized by $[\alpha]_D^{20}$=−314.7 (c 1.01, $CHCl_3$).

Example 5

Preparation of Compound 7-1

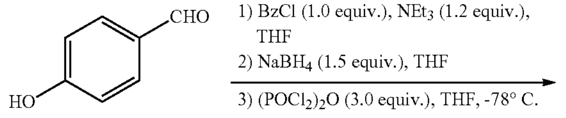

-continued

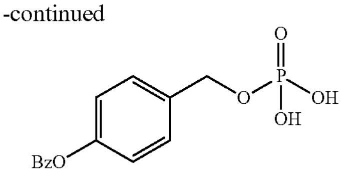

compound 7-1

Step 1. Benzoylation

Flame dried round bottom flask, equipped with a stir bar was charged with 4-hydroxybenzaldehyde (24.4 g, 200 mmol, 1.0 equiv.). The solid substrate was dissolved in anhydrous THF (200 mL), followed by the addition of $NEt_3$ (33.5 mL, 240 mmol, 1.2 equiv.). The reaction flask was immersed in ice/water bath and benzoyl chloride (23.2 mL, 200 mmol, 1.0 equiv.) was added over 3 min. The reaction mixture was allowed to warm to room temperature overnight. Subsequently, the mixture was diluted with EtOAc and filtered via a pad of celite. The filtrate was washed with saturated aq. $NH_4Cl$, and the organic layer was dried over $Na_2SO_4$, filtered and the volatiles were removed in vacuo to provide crude 4-formylphenyl benzoate (46 g), which was used in the next step without any additional purification.

Step 2. Reduction

Crude 4-formylphenyl benzoate (46 g) was dissolved in THF (200 mL), and the reaction mixture was cooled to 0° C. $NaBH_4$ (11.3 g, 300 mmol, 3.0 equiv.) was added in 3 portions and the mixture was allowed to warm to room temperature over 2 h. Subsequently, the reaction was carefully quenched with saturated aq. $NH_4Cl$ and diluted with EtOAc. Organic phase was separated and the water fraction was extracted with EtOAc. Combined organic layers were dried over $Na_2SO_4$, filtered and concentrated in vacuo to provide crude 4-(hydroxymethyl)phenyl benzoate (48 g), which was used in the next step without any additional purification.

Step 3. Phosphorylation

Crude 4-(hydroxymethyl)phenyl benzoate (24 g) was dissolved in anhydrous THF (200 mL) and cooled to −78° C. Pyrophosphoryl chloride (13.8 mL, 300 mmol, 3.0 equiv.) was added dropwise over 10 min. The reaction mixture was stirred at −78° C. for 4 h, after which the reaction was quenched with water. The pH of the resulting solution was carefully adjusted to 8 with saturated aq. $NaHCO_3$. Concentrated aq. HCl was added dropwise to the resulting suspension until the solution became clear. The reaction mixture was extracted with EtOAc, and the combined organic fractions were washed with water. Organic layers were combined, dried over $Na_2SO_4$, filtered and concentrated in vacuo to provide crude solid of compound 7-1. The solid was suspended in DCM, filtered, and the filter cake was washed with DCM. After being dried under reduced pressure, phosphate compound 7-1 was obtained as a white crystalline solid (17.0 g, 55 mmol, Yield=55% over 3 steps). Compound 7-1 was characterized by $^{1}H$ NMR (600 MHz, $CD_3OD$): δ 8.20-8.16 (m, 2H), 7.72-7.67 (m, 1H), 7.59-7.54 (m, 2H), 7.50 (d, J=8.5 Hz, 2H), 7.25 (d, J=8.5 Hz, 2H), 5.05 (d, J=7.4 Hz, 2H); $^{13}C$ NMR (150 MHz, $CD_3OD$): δ 166.6, 155.2, 136.2 (d, J=7.8 Hz), 135.0, 131.04, 131.02, 130.7, 129.9 (d, J=3.1 Hz), 122.9, 68.6 (d, J=5.0 Hz); $^{31}P$ NMR (162 MHz, $CD_3OD$): δ −0.1; HRMS (ESI-TOF) m/z: calculated for $C_{14}H_{12}O_6P$ [M−H]: 307.0371, found: 307.0361; m.p. 140-142° C.

Example 6

Preparation of Compound 22

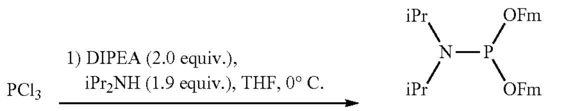

compound 22
Fm = 9-Fluoroenylmethyl $iPr_2NP(OFm)_2$ (compound 22) was prepared according to the reported procedure disclosed by Lambrecht et al., J. Am. Chem. Soc. 2015, 137, 3558-3564. 500 mL flame dried round bottom flask, equipped with a stir bar, was evacuated, backfilled with argon (3 times) and capped with a septum. Subsequently, anhydrous THF (160 mL) was added, followed by $PCl_3$ (4.0 mL, 46 mmol, 1.0 equiv.). The resulting solution was cooled to 0° C. and DIPEA (16.0 mL, 92 mmol, 2.0 equiv.) was added. Anhydrous diisopropylamine (12.0 mL, 87 mmol, 1.9 equiv.) was then added dropwise over 10 min and the resulting suspension was stirred for 1 h at 0° C. After that time, another portion of DIPEA (16.0 mL, 92 mmol, 2.0 equiv.) was added, followed by 9-fluorenylmethanol (17.9 g, 92 mmol, 2.0 equiv.). The reaction mixture allowed to warm to room temperature and stirred overnight under argon atmosphere. The resulting suspension was filtered via a pad of celite and the filtrate was concentrated under reduced pressure. The residue was diluted with DCM, loaded on a pad of silica gel (18×4 cm) and flushed with hexane/EtOAc/$NEt_3$ (100:5:1). Fractions containing pure product (as determined by $^{31}$P NMR), were combined and concentrated under reduced pressure. After being dried under reduced pressure, compound 22 was obtained as a yellow semisolid (12.4 g; Yield=52%), which was used in the next step without any further purification. Compound 22 should be stored under argon atmosphere at −20° C. Compound 22 was characterized by $^{1}$H NMR (600 MHz, $CDCl_3$): δ 7.76-7.73 (m, 4H), 7.67-7.64 (m, 4H), 7.40-7.35 (m, 4H), 7.31-7.26 (m, 4H), 4.18 (t, J=6.9 Hz, 2H), 4.01 (dt, J=9.9, 6.8 Hz, 2H), 3.81 (dt, J=9.9, 7.3 Hz, 2H), 3.66 (hept, J=6.8 Hz, 2H), 1.16 (d, J=6.8 Hz, 12H); $^{13}$C NMR (150 MHz, $CDCl_3$): δ 145.1, 144.8, 141.5, 141.4, 127.54, 127.50, 127.0, 126.9, 125.6, 125.3, 120.0, 119.9, 66.1 (d, J=17.1 Hz), 49.3 (d, J=7.7 Hz), 43.2 (d, J=12.1 Hz), 24.8 (d, J=7.2 Hz); $^{31}$P NMR (162 MHz, $CDCl_3$): δ 146.0.

The NMR data was consistent with previously reported in Lambrecht et al., J. Am. Chem. Soc. 2015, 137, 3558-3564.

Example 7

Preparation of Compound 20-1

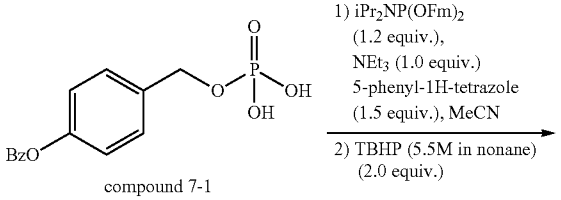

compound 7-1

-continued

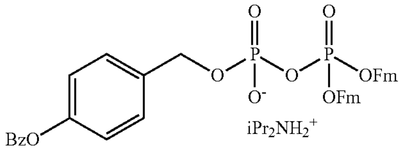

compound 20-1
Fm = 9-Fluorenylmethyl

Flame dried round bottom flask, equipped with a stir bar was charged with fleshly prepared $iPr_2NP(OFm)_2$ (compound 22; 4.0 g, 7.7 mmol, 1.2 equiv.), followed by addition of anhydrous MeCN (20 mL). To the resulting suspension were added consecutively monophosphate compound 7-1 (2.0 g, 6.4 mmol, 1.0 equiv.) and triethylamine (0.89 mL, 6.4 mmol, 1.0 equiv.). After 2 min of stirring 5-phenyl-1H-tetrazole (1.4 g, 9.6 mmol, 1.5 equiv.) and the resulting mixture was stirred under argon atmosphere for 1 h. Subsequently, tert-butyl hydroperoxide (5.5 M in nonane; 2.3 mL, 12.8 mmol, 2.0 equiv.) was added and the reaction was stirred for another 1 h. The suspension was filtered through a pad of celite and washed with EtOAc. The filtrate was loaded directly on the chromatography column packed with silica gel (18×4 cm) and the column was flushed with 400 mL of EtOAc. The eluent was changed to MeOH/DCM (1:15) and the chromatography was continued until all of the product was eluted from the silica (as indicated by TLC: MeOH/DCM, 1:4, $R_f$=0.8). Fractions containing product were combined and concentrated in vacuo (temp.<35° C.). The residue was treated with DCM and the resulting suspension was filtered. The filter cake was washed with DCM, the filtrate was concentrated in vacuo (temp.<35° C.) and the residual MeOH was removed by coevaporation with DCM. After being dried under high vacuum, compound 20-1 was obtained as a white foam (3.5 g, Yield=65%). Pyrophosphate compound 20-1 can be stored for a several months at −20° C., without any appreciable loss of purity.

Compound 20-1 was characterized by $^{1}$H NMR (600 MHz, $CDCl_3$): δ 8.86-8.78 (m, 2H), 8.18-8.16 (m, 2H), 7.68 (ddt, J=8.7, 7.6, 1.0 Hz, 4H), 7.65-7.62 (m, 1H), 7.52-7.49 (m, 6H), 7.37-7.29 (m, 6H), 7.20 (tdd, J=7.4, 4.7, 1.2 Hz, 4H), 7.09-7.06 (m, 2H), 4.97 (d, J=8.0 Hz, 2H), 4.32-4.23 (m, 4H), 4.14 (t, J=7.1 Hz, 2H), 3.12 (hept, J=6.5 Hz, 2H), 1.21 (d, J=6.5 Hz, 12H); $^{13}$C NMR (150 MHz, $CDCl_3$): δ 165.3, 150.6, 143.5, 143.4, 141.5, 135.8 (d, J=7.5 Hz), 133.8, 130.4, 129.7. 129.0, 128.8, 127.96, 127.95, 127.2, 125.51, 125.45, 121.65, 120.08, 120.06, 69.6 (d, J=5.8 Hz), 67.9 (d, J=5.8 Hz), 48.0 (d, J=8.1 Hz), 46.8, 19.1; $^{31}$P NMR (162 MHz, $CD_3OD$): δ −11.6 (d, J=20.0 Hz), −13.4 (d, J=20.0 Hz); HRMS (ESI-TOF) m/z: calculated for $C_{44}H_{33}O_9P_2$ $[M-iPr_2NH_2]^-$: 743.1600, found: 743.1628.

Example 8

Stereocontrolled Synthesis of α-Thiodiphosphates General Procedure A: Stereocontrolled Synthesis of α-Thiodiphosphates

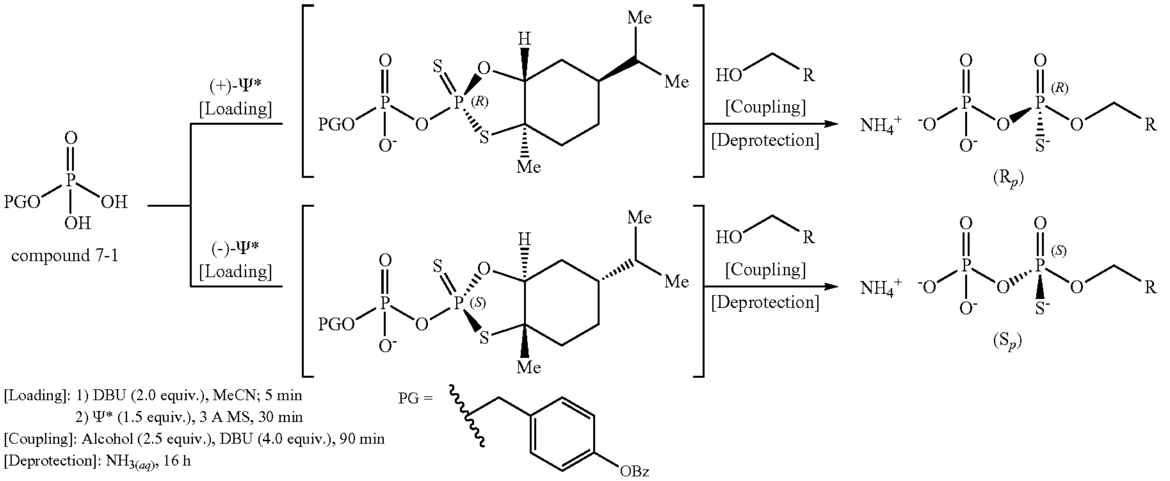

Isomer $R_P$ of α-thiodiphosphate can be obtained from (+)-Ψ* reagent. Isomer $S_P$ of α-thiodiphosphate can be obtained from (−)-Ψ* reagent.

A flame dried 1-dram vial with a stir bar was charged with monophosphate compound 7-1 (61.6 mg, 0.2 mmol, 1.0 equiv.). The vial was closed with a Teflon septum screw cap, evacuated and backfilled with argon. Anhydrous MeCN (2.0 mL) and 1,8-diazabicyclo[5.4.0]undec-7-ene (DBU; 60 μL, 0.4 mmol, 2.0 equiv.) were added and the mixture was stirred until starting material completely dissolved (~5 min). Subsequently, 3 Å molecular sieves (60 mg) and Ψ* reagent (128 mg, 0.3 mmol, 1.5 equiv.) were added and the reaction was stirred at room temperature for 30 min. After that time protected nucleoside (0.5 mmol, 2.5 equiv.) was added, followed by another portion of DBU (120 μL, 0.8 mmol, 4.0 equiv.) and the mixture was stirred for another 90 min. Upon completion of the reaction, resulting mixture was filtered and concentrated in vacuo to ~0.5 mL. Concentrated aq. $NH_3$ solution (5.0 mL) was added to the residue and the resulting mixture was stirred at room temperature (or at 40° C.) for 16 h. Subsequently, the reaction mixture was diluted with water and washed with EtOAc. Aqueous phase was concentrated in vacuo (temp.<40° C.). The remaining oily residue was dissolved in 2 mL of water and added dropwise to a solution of 0.2 M $NaClO_4$ in acetone (40 mL). The resulting suspension was centrifuged at 4000 rpm for 3 min. The supernatant was discarded and the pellet was washed with acetone twice. The crude product was purified by ion exchange chromatography on DEAE Sephadex (gradient 1 M $NH_4HCO_3$/water, from 0:100 to 30:70). Fractions containing product were combined and the solvent was evaporated in vacuo (temp.<40° C.). The solid residue was dissolved in minimal amount of water and lyophilized to provide pure nucleoside α-thiodiphosphate.

Example 9

Stereocontrolled Synthesis of α-Thiotriphosphates General Procedure B: Stereocontrolled Synthesis of α-Thiotriphosphates

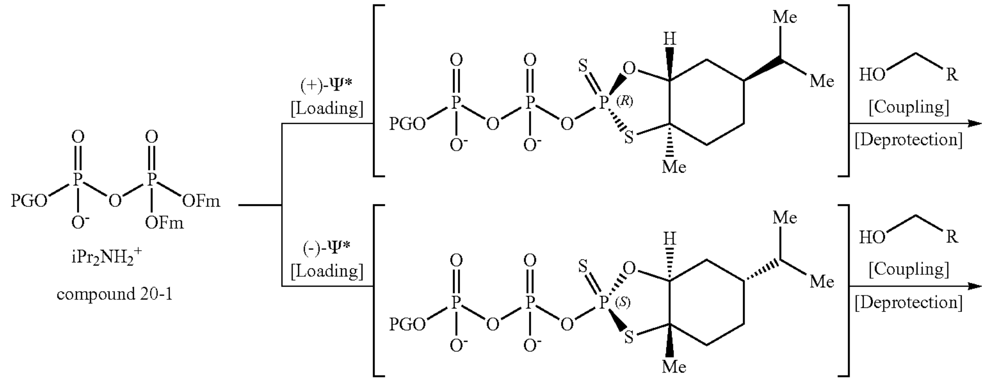

-continued

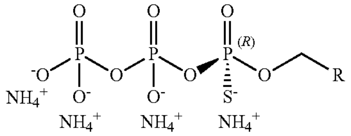

($R_P$)

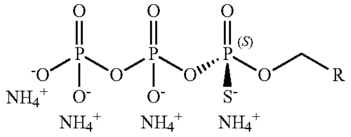

($S_P$)

[Loading]: 1) DBU (4.0 equiv.), MeCN; 10 min
2) Ψ* (1.3 equiv.), 3 A MS, 15 min
[Coupling]: Alcohol (2.0 equiv.), DBU (6.0 equiv.), 3-6 h
[Deprotection]: $NH_{3(aq)}$, 16 h PG = 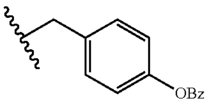

Fm = 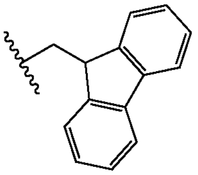

Isomer $R_P$ of α-thiotriphosphate can be obtained from (+)-Ψ* reagent. Isomer $S_P$ of α-thiotriphosphate can be obtained from (−)-Ψ* reagent.

A flame dried 1-dram vial with a stir bar was charged with pyrophosphate compound 20-1 (169 mg, 0.20 mmol, 1.0 equiv.). The vial was closed with a Teflon septum screw cap, evacuated and backfilled with argon. Anhydrous MeCN (2.0 mL) and DBU (120 μL, 0.80 mmol, 4.0 equiv.) were added and the mixture was stirred for 10 min. Subsequently, 3 Å molecular sieves (200 mg) and Ψ* reagent (112 mg, 0.26 mmol, 1.3 equiv.) were added and the reaction was stirred at room temperature for 15 min. After that time protected nucleoside (0.40 mmol, 2.0 equiv.) was added, followed by another portion of DBU (180 μL, 1.2 mmol, 6.0 equiv.) and the mixture was stirred for 3 to 6 h. Upon completion of the reaction, resulting mixture was filtered and concentrated in vacuo to ~0.5 mL. Concentrated aq. $NH_3$ solution (5.0 mL) was added to the residue and the resulting mixture was stirred at room temperature (or at 40° C.) for 16 h. Subsequently, the reaction mixture was diluted with water and washed with EtOAc. Aqueous phase was concentrated in vacuo (temp. 40° C.). The remaining oily residue was dissolved in 2 mL of water and added dropwise to a solution of 0.2 M $NaClO_4$ in acetone (40 mL). The resulting suspension was centrifuged at 4000 rpm for 3 min. The supernatant was discarded and the pellet was washed with acetone twice. The crude product was purified by ion exchange chromatography on DEAE Sephadex (gradient 1 M $NH_4HCO_3$/water, from 0:100 to 50:50). Fractions containing product were combined and the solvent was evaporated in vacuo (temp. 40° C.). The solid residue was dissolved in minimal amount of water and lyophilized to provide pure nucleoside α-thiotriphosphate.

Example 10

Stereocontrolled Synthesis of Dinucleoside Thiodiphosphates

General Procedure C: Stereocontrolled Synthesis of Dinucleoside Thiodiphosphates

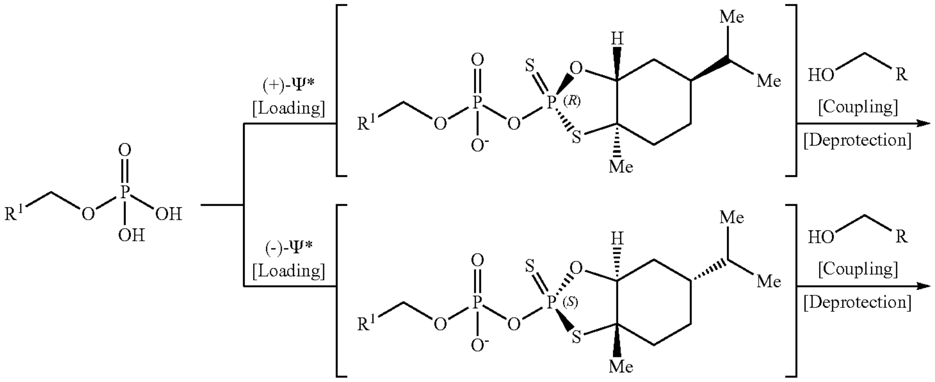

-continued

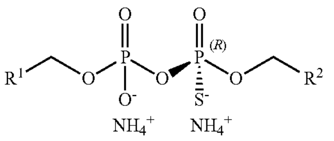

($R_p$)

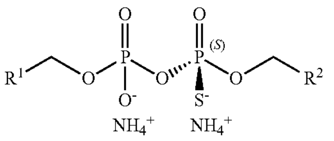

($S_p$)

[Loading]: 1) DBU (2.0 equiv.), MeCN; 5 min
2) Ψ* (1.5 equiv.), 3 A MS, 30 min
[Coupling]: Alcohol (2.5 equiv.), DBU (4.0 equiv.), 90 min
[Deprotection]: $NH_{3(aq)}$, 16 h Isomer $R_P$ of dinucleoside thiodiphosphate can be obtained from (+)-Ψ* reagent. Isomer $S_P$ of dinucleoside thiodiphosphate can be obtained from (−)-Ψ* reagent.

A flame dried 1-dram vial with a stir bar was charged with protected nucleoside monophosphate (0.2 mmol, 1.0 equiv.). The vial was closed with a Teflon septum screw cap, evacuated and backfilled with argon. Anhydrous MeCN (2.0 mL) and DBU (60 μL, 0.4 mmol, 2.0 equiv.) were added and the mixture was stirred until starting material completely dissolved (~5 min). Subsequently, 3 Å molecular sieves (60 mg) and Ψ* reagent (128 mg, 0.3 mmol, 1.5 equiv.) were added and the reaction was stirred at room temperature for 30 min. After that time protected nucleoside (0.5 mmol, 2.5 equiv.) was added, followed by another portion of DBU (120 μL, 0.8 mmol, 4.0 equiv.) and the mixture was stirred for another 2 h. Upon completion of the reaction, resulting mixture was filtered and concentrated in vacuo to ~0.5 mL. Concentrated aq. $NH_3$ solution (5.0 mL) was added to the residue and the resulting mixture was stirred at 40° C. for 16 h. Subsequently, the reaction mixture was diluted with water and washed with EtOAc. Aqueous phase was concentrated in vacuo (temp.<40° C.). The remaining oily residue was dissolved in 2 mL of water and added dropwise to a solution of 0.2 M $NaClO_4$ in acetone (40 mL). The resulting suspension was centrifuged at 4000 rpm for 3 min. The supernatant was discarded and the pellet was washed with acetone twice. The crude product was purified by ion exchange chromatography on DEAE Sephadex (gradient 1 M $NH_4HCO_3$/water, from 0:100 to 30:70). Fractions containing product were combined and the solvent was evaporated in vacuo (temp.<40° C.). The solid residue was dissolved in minimal amount of water and lyophilized to provide pure dinucleoside thiodiphosphate.

Example 11

Preparation of Non-Commercially Available Substrates Compounds 10-1, 11-1, 12-1, 13-1, 14-1, 15-1 and 23 compound 10-1

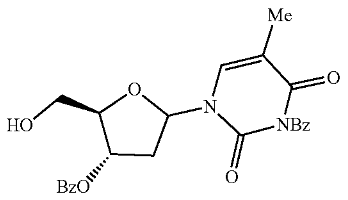

compound 11-1

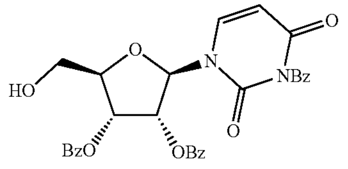

compound 12-1

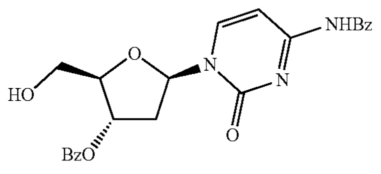

compound 13-1

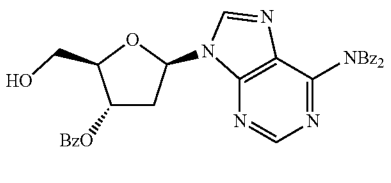

-continued compound 14-1

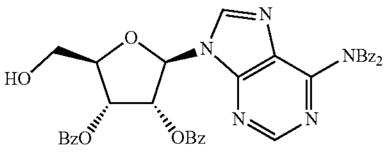

compound 15-1

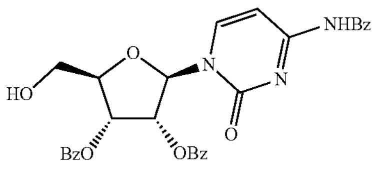

compound 23

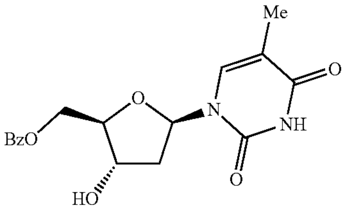

Compound 10-1 was prepared by the following procedures disclosed in Debarge et al., *J. Org. Chem.* 2011, 76, 105-126.

Compound 11-1 was prepared by the following procedures disclosed in Zhu et al., *Synth. Commun.* 2008, 38, 1346-1354.

Compound 12-1 was prepared by the following procedures disclosed in Debarge et al., *J. Org. Chem.* 2011, 76, 105-126.

Compound 13-1 was prepared by the following procedures disclosed in Zhu et al., *Synth. Commun.* 2008, 38, 1346-1354.

Compound 14-1 was prepared by the following procedures disclosed in Zhu et al., *Synth. Commun.* 2008, 38, 1346-1354.

Compound 15-1 was prepared by the following procedures disclosed in Zhu et al., *Synth. Commun.* 2008, 38, 1346-1354.

Compound 23 was prepared by the following procedures disclosed in Saudi et al., *Eur. J. Med. Chem.* 2014, 76, 98-109.

Example 12

Preparation of Non-Commercially Available Substrate Compound 18-1

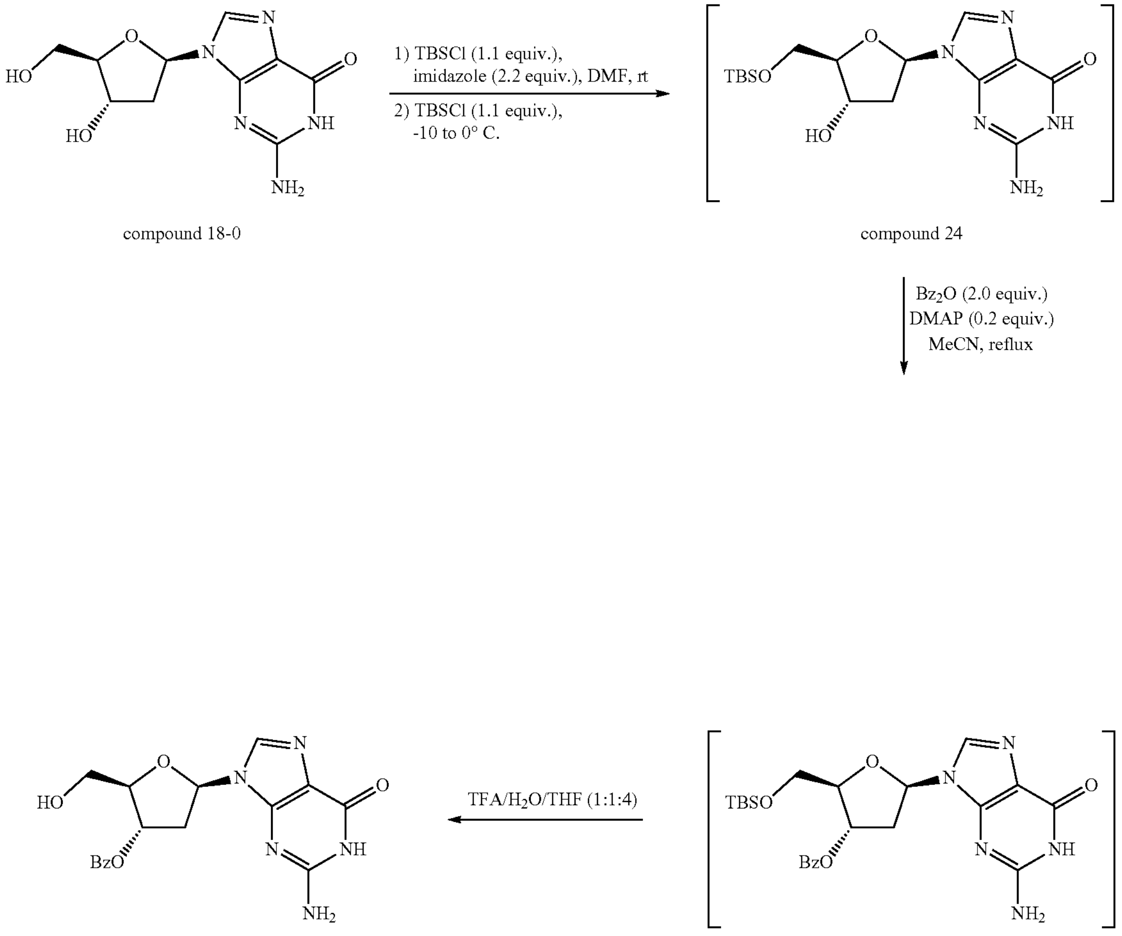

compound 18-0 compound 24 compound 18-1 compound 25

Round-bottom flask equipped with a stir bar was charged with deoxyguanosine (2.50 g, 9.4 mmol, 1.0 equiv.), followed by addition of anhydrous DMF (25 mL). Subsequently, imidazole (1.40 g, 20.6 mmol, 2.2 equiv.) and tert-butyldimethylsilyl chloride (1.55 g, 10.3 mmol, 1.1 equiv.) were added and the resulting suspension was stirred at room temperature for 15 min. After that time, the reaction mixture was cooled to −10° C. Another portion of tert-butyldimethylsilyl chloride (1.55 g, 10.3 mmol, 1.1 equiv.) was added and the reaction mixture was stirred at 0° C. for 3 h. The reaction was quenched by addition of water (400 mL), and the resulting suspension was filtered. The solid residue was washed consecutively with water and $Et_2O$, and dried under reduced pressure to provide 2.48 g of compound 24, which was used directly in the next step.

2H), 6.23 (dd, J=9.1, 5.7 Hz, 1H), 5.57 (d, J=5.7 Hz, 1H), 5.20 (t, J=5.7 Hz, 1H), 4.23-4.19 (m, 1H), 3.70-3.62 (m, 2H), 2.91 (ddd, J=14.6, 9.1, 5.9 Hz, 1H), 2.58 (dd, J=14.6, 5.7 Hz, 1H); $^{13}C$ NMR (150 MHz, DMSO-$d_6$): δ 165.2, 156.8, 153.8, 151.0, 135.3, 133.7, 129.4, 129.3, 128.8, 116.8, 84.9, 82.8, 76.0, 61.6, 36.7; HRMS (ESI-TOF) m/z: calculated for $C_{17}H_{18}N_5O_5$ [M+H]$^+$: 372.1303, found: 372.1285.

Example 13

Preparation of Non-Commercially Available Substrate Compound 17-1

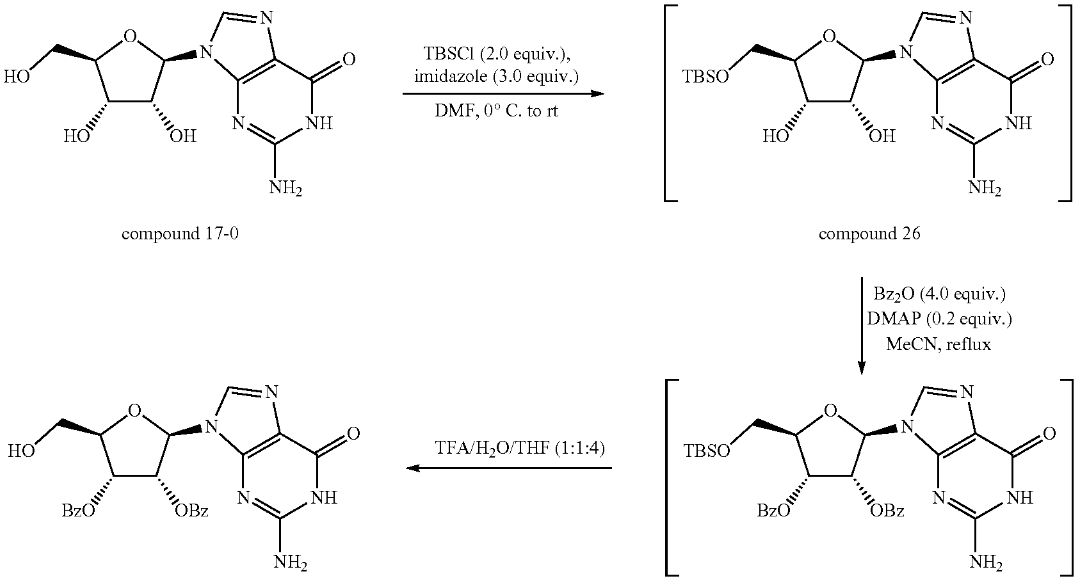

compound 17-0 compound 26 compound 17-1 compound 27

Compound 24 (2.48, 6.5 mmol, 1.0 equiv.) was suspended in anhydrous MeCN (50 mL), followed by addition of benzoyl anhydride (2.95 g, 13.0 mmol, 2.0 equiv.) and DMAP (0.16 g, 0.13 mmol, 0.2 equiv.). The reaction vessel was equipped with an air condenser and the heterogeneous mixture was refluxed for 3 h. Subsequently, the reaction was cooled to room temperature and quenched by addition of saturated aq. $NaHCO_3$. The solid residue was filtered off, washed consecutively with water and MeCN, and dried under reduced pressure to provide 2.80 g of a crude compound 25, which was used directly in the next step.

Crude compound 25 (2.80 g, 5.8 mmol, 1.0 equiv.) was suspended in THF (20 mL), followed by addition of $H_2O$ (5 mL) and TFA (5 mL). The reaction was stirred at room temperature for 90 min. Subsequently, the solution was neutralized by careful addition of saturated aq. $NaHCO_3$. The crude mixture was concentrated under reduced pressure to ~5 mL and filtered off. The solid residue was washed consecutively with water and $Et_2O$, and dried under reduced pressure to provide 1.92 g of pure compound 18-1 (Yield over 3 steps=55%). Physical state: white amorphous solid. Compound 18-1 was characterized by $^1H$ NMR (600 MHz, DMSO-$d_6$): δ 10.68 (br s, 1H), 8.03 (d, J=7.7 Hz, 2H), 8.00 (s, 1H), 7.72-7.68 (m, 1H), 7.60-7.54 (m, 2H), 6.48 (br s, Round-bottom flask equipped with a stir bar was charged with guanosine (14.2 g, 50 mmol, 1.0 equiv.), followed by addition of anhydrous DMF (200 mL). The heterogeneous mixture was cooled to 0° C., followed by addition of imidazole (10.2 g, 150 mmol, 3.0 equiv.) and tert-butyldimethylsilyl chloride (15.1 g, 100 mmol, 2.0 equiv.). The reaction mixture was allowed to warm to room temperature overnight. Subsequently, the reaction was quenched by addition of water (800 mL), and the resulting suspension was filtered. The solid residue was washed consecutively with water and acetone, and dried under reduced pressure to provide 12.1 g of a crude compound 26, which was used directly in the next step.

Crude compound 26 (12.1 g, 30.4 mmol, 1.0 equiv.) was suspended in anhydrous MeCN (150 mL), followed by addition of benzoyl anhydride (27.5 g, 121.6 mmol, 4.0 equiv.) and DMAP (0.74 g, 6.2 mmol, 0.2 equiv.). The reaction vessel was equipped with an air condenser and the heterogeneous mixture was refluxed for 3 h. Subsequently, the reaction was cooled to room temperature and quenched by addition of saturated aq. $NaHCO_3$. The solid residue was filtered off, washed consecutively with water and MeCN, and dried under reduced pressure to provide 14.9 g of a crude compound 27, which was used directly in the next step.

Crude compound 27 (14.9 g, 24.6 mmol, 1.0 equiv.) was suspended in THF (90 mL), followed by addition of $H_2O$ (22.5 mL) and TFA (22.5 mL). The reaction was stirred at room temperature for 90 min. Subsequently, the solution was neutralized by careful addition of saturated aq. $NaHCO_3$. The crude mixture was concentrated under reduced pressure to ~25 mL and filtered off. The solid residue was washed consecutively with water and $Et_2O$, and dried under reduced pressure to provide 11.5 g of pure compound 17-1 (Yield over 3 steps=47%). Physical state: white amorphous solid. Compound 17-1 was characterized by $^1H$ NMR (600 MHz, DMSO-$d_6$): δ 10.77 (br s, 1H), 8.07 (s, 1H), 7.94 (dd, J=8.3, 1.4 Hz, 2H), 7.79 (dd, J=8.4, 1.4 Hz, 1H), 7.68 (tt, J 7.4, 1.4 Hz, 1H), 7.61 (tt, J=7.4, 1.4 Hz, 1H), 7.54-7.50 (m, 2H), 7.43-7.39 (m, 2H), 6.54 (br s, 2H), 6.26 (d, J=6.7 Hz, 1H), 6.12 (dd, J=6.7, 5.5 Hz, 1H), 5.84 (dd, J=5.5, 2.8 Hz, 1H), 5.51 (t, J=5.5 Hz, 1H), 4.49 (q, J=3.4 Hz, 1H), 3.84-3.75 (m, 2H); $^{13}C$ NMR (150 MHz, DMSO-$d_6$): δ 164.9, 164.4, 157.0, 154.2, 151.2, 135.6, 134.0, 133.9, 129.32, 129.30, 128.91, 128.85, 128.81, 128.2, 116.9, 84.6, 83.6, 73.7, 72.4, 61.2; HRMS (ESI-TOF) m/z: calculated for $C_{24}H_{22}N_5O_7$ $[M+H]^+$: 492.1514, found: 492.1493.

Example 14

Preparation of Non-Commercially Available Substrates Compounds 16-1 and 30

2:50:50) to provide 3.21 g of a mixture of compounds 28 and 29 (mixture of N- and S-benzoylated regioisomers), which was used directly in the next step.

Mixture of regioisomeric compounds 28 and 29 (3.21 g, 4.7 mmol, 1.0 equiv.) was dissolved in THF (84 mL). The solution was cooled to 0° C., followed by addition of $H_2O$ (21 mL) and TFA (21 mL). The reaction was allowed to warm to room temperature over 3 h. Subsequently, the solution was neutralized by careful addition of saturated aq. $NaHCO_3$. The crude product was extracted with DCM, and the organic phase was dried over $MgSO_4$, filtered and concentrated under reduced pressure. The crude was purified by silica gel chromatography (EtOAc/Hexanes/DCM; from 10:40:50 to 40:10:50) to provide 1.77 g of a regioisomeric mixture of compounds 30 and 16-1 (ratio 2:1; structures of minor and major regioisomers not assigned) (Yield over 3 steps=43%). Physical state: white amorphous solid.

A regioisomeric mixture of compounds 30 and 16-1 was characterized by $^1H$ NMR (600 MHz, DMSO-$d_6$): δ 8.57 (d, J=8.2 Hz, 1H; major), 8.55 (d, J=8.2 Hz, 1H; minor), 8.00-7.79 (m, 6H; major+minor), 7.75-7.36 (m, 9H; major+minor), 7.21-7.17 (m, 1H; major+minor), 6.52 (d, J=8.2 Hz, 1H; major), 6.46 (d, J=8.2 Hz, 1H; minor), 5.89-5.75 (m, 3H; major+minor), 4.63 (s, 1H; major), 4.62 (s, 1H; minor), 3.94-3.83 (m, 2H; major+minor); $^{13}C$ NMR (150 MHz, DMSO-$d_6$): δ 174.4 (minor), 174.2 (major), 168.1 (minor), 167.9 (major), 164.9 (major), 164.7 (major), 164.6 (minor),

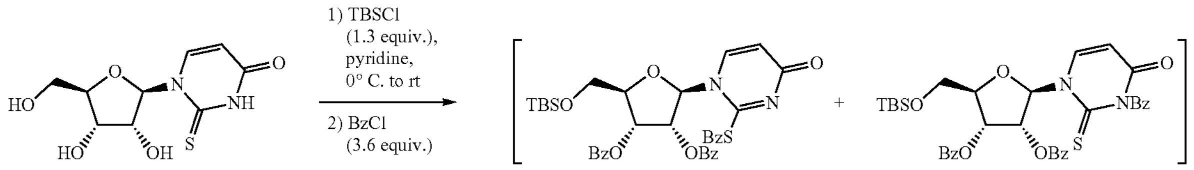

compound 16-0 compound 28 compound 29

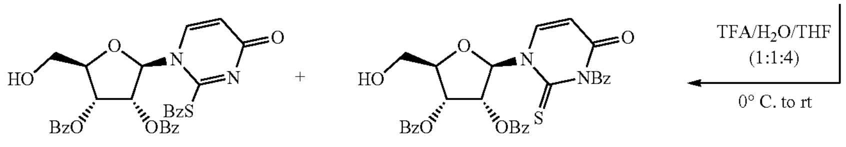

compound 30 compound 16-1

Round bottom flask equipped with a stir bar was charged with 2-thiouridine (1.87 g, 7.2 mmol, 1.0 equiv.), followed by addition of anhydrous pyridine (40 mL). The solution was cooled to 0° C., followed by addition of tert-butyldimethylsilyl chloride (1.42 g, 9.4 mmol, 1.3 equiv.). The reaction mixture was allowed to warm to room temperature overnight. Subsequently, benzoyl chloride (3.0 mL, 25.9 mmol, 3.6 equiv.) was added and the reaction was stirred for another 8 h. After that time, the reaction mixture was diluted with DCM, washed with 1 M HCl and water. The organic phase was dried over $MgSO_4$, filtered and concentrated under reduced pressure. The crude was purified by silica gel chromatography (EtOAc/Hexanes/DCM; from 0.5:50:50 to 164.4 (minor), 159.0 (minor), 158.9 (major), 141.5 (major+minor), 135.0 (major+minor), 133.91 (major), 133.90 (major+minor), 138.85 (minor), 130.8 (minor), 130.6 (major), 130.20 (minor), 130.15 (major), 129.5 (minor), 129.4 (major), 129.34 (major+minor), 129.28 (major), 129.20 (minor), 128.9 (major+minor), 128.82 (minor), 128.79 (major), 128.71 (major+minor), 128.4 (minor), 129.3 (major), 106.9 (major), 106.8 (minor), 89.5 (minor), 89.4 (major), 84.0 (major), 83.9 (minor), 74.9 (major), 74.7 (minor), 71.6 (major), 71.1 (minor), 60.2 (major), 60.1 (minor); HRMS (ESI-TOF) m/z: calculated for $C_{30}H_{24}N_2O_8SNa$ [M+Na]+: 595.1151, found: 595.1138.

Example 15

Preparation of Non-Commercially Available Substrate Compound 31

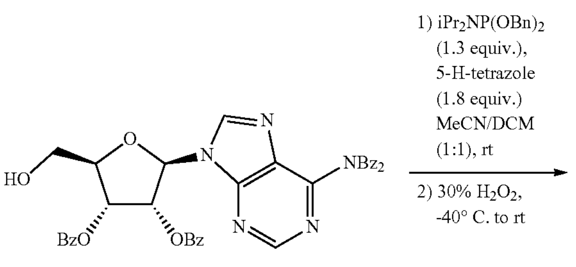

compound 14-1

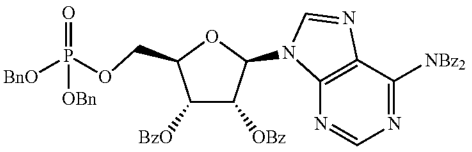

compound 31

Flame-dried round bottom flask was charged with protected adenosine (compound 14-1; 2.05 g, 3.0 mmol, 1.0 equiv.) and 5-H-tetrazole (0.38 g, 5.4 mmol, 1.8 equiv.). Substrates were dissolved in a mixture of anhydrous MeCN (25 mL) and DCM (25 mL). $iPr_2NP(OBn)_2$ (1.25 mL, 3.9 mmol, 1.3 equiv.) was added dropwise to the resulting mixture and the reaction was stirred for 1 h under argon atmosphere. Subsequently, the reaction mixture was cooled down to −40° C., followed by addition of 30% aq. $H_2O_2$ (10 mL) and the reaction was allowed to warm to room temperature over 1 h. The resulting solution was diluted with DCM and the organic phase was sequentially washed with saturated aq. $NaHCO_3$ and brine. The organic layer was dried over $MgSO_4$, filtered and concentrated under reduced pressure. The crude residue was purified by silica gel chromatography (EtOAc/Hexanes/DCM; from 10:40:50 to 20:30:50) to provide 2.17 g of compound 31 (Yield=77%). Physical state: white amorphous solid. Compound 31 was characterized by $^1H$ NMR (600 MHz, $CDCl_3$): δ 8.62 (s, 1H), 8.40 (s, 1H), 7.97 (dd, J=8.4, 1.4 Hz, 2H), 7.90 (dd, J=8.4, 1.4 Hz, 2H), 7.88-7.84 (m, 4H), 7.58 (tt, J=7.4, 1.4 Hz, 1H), 7.55 (tt, J=7.4, 1.4 Hz, 1H), 7.49-7.46 (m, 2H), 7.42-7.39 (m, 2H), 7.38-7.32 (m, 10H), 7.31-7.24 (m, 6H), 6.50 (d, J=5.7 Hz, 1H), 6.09 (t, J=5.7 Hz, 1H), 5.98 (dd, J=5.7, 4.0 Hz, 2H), 5.11-5.02 (m, 4H), 4.62-4.59 (m, 1H), 4.37 (dd, J=6.2, 3.6 Hz, 2H); $^{13}C$ NMR (150 MHz, $CDCl_3$): δ 172.4, 165.4, 165.0, 153.1, 152.6, 152.3, 143.4, 135.60 (d, J=6.5 Hz), 135.58 (d, J=6.5 Hz), 134.2, 133.95, 133.93, 133.2, 130.01, 129.96, 129.6, 128.9, 128.81, 128.79, 128.73, 128.66, 128.5, 128.28, 128.27, 127.9, 86.6, 81.9 (d, J=8.0 Hz), 74.3, 71.6, 69.96 (d, J=5.5 Hz), 69.94 (d, J=5.5 Hz), 66.5 (d, J=5.2 Hz); $^{31}P$ NMR (162 MHz, $CDCl_3$): δ −1.0; HRMS (ESI-TOF) m/z: calculated for $C_{52}H_{43}N_5O_{11}P$ $[M+H]^+$: 944.2697, found: 944.2669.

Example 16

Preparation of Non-Commercially Available Substrate Compound 32

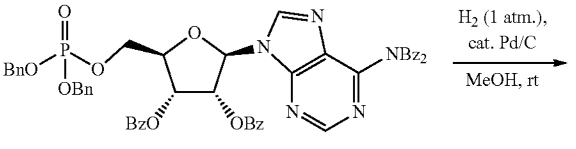

compound 31

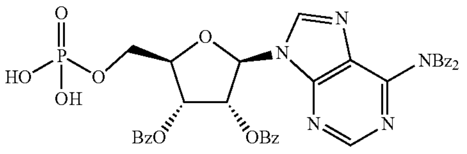

compound 32

Round bottom flask equipped with a stir bar was charged with protected adenosine phosphate (compound 31; 2.17 g, 2.3 mmol, 1.0 equiv.), and the atmosphere was exchanged to argon. MeOH (140 mL) was added, followed by Pd/C (10% wt.; 325 mg). The atmosphere in the flask was exchanged for $H_2$ and the reaction vessel was equipped with a $H_2$ balloon. The reaction mixture was stirred at room temperature for 1 h, after which TLC indicated full conversion of the starting material. The crude reaction mixture was filtered through a pad of celite, followed by few volumes of MeOH/DCM (1:1). The volatiles were removed under reduced pressure, and the residue was coevaporated two times with DCM to remove residual MeOH. After being dried under reduced pressure compound 32 was obtained as a white amorphous solid (1.55 g; Yield=88%). Physical state: white amorphous solid. Compound 32 was characterized by $^1H$ NMR (600 MHz, $CD_3OD$): δ 8.81 (s, 1H), 8.58 (s, 1H), 8.00 (d, J=6.8 Hz, 2H), 7.81 (d, J=7.0 Hz, 4H), 7.76 (d, J=7.4 Hz, 2H), 7.58 (t, J=7.4 Hz, 1H), 7.51-7.45 (m, 3H), 7.41 (t, J=7.8 Hz, 2H), 7.34 (t, J=7.7 Hz, 4H), 7.27 (t, J=7.8 Hz, 2H), 6.67 (d, J=5.8 Hz, 1H), 6.21 (t, J=5.8 Hz, 1H), 6.08 (dd, J=5.8, 3.6 Hz, 1H), 4.77-4.74 (m, 1H), 4.47-4.38 (m, 2H); $^{13}C$ NMR (150 MHz, $CD_3OD$): δ 173.7, 166.7, 166.2, 154.4, 153.39, 153.37, 152.9, 146.0, 145.9, 135.3, 134.9, 134.8, 134.3, 130.8, 130.7, 130.5, 130.2, 129.8, 129.71, 129.69, 129.6, 128.9, 87.9, 83.5 (d, J=8.0 Hz), 75.8, 73.2, 66.67 (d, J=3.8 Hz); $^{31}P$ NMR (162 MHz, $CD_3OD$): δ 0.4; HRMS (ESI-TOF) m/z: calculated for $C_{38}H_{29}N_5O_{11}P$ $[M-H]^-$: 762.1601, found: 762.1625.

Example 17

Preparation of Non-Commercially Available Substrate Compound 33

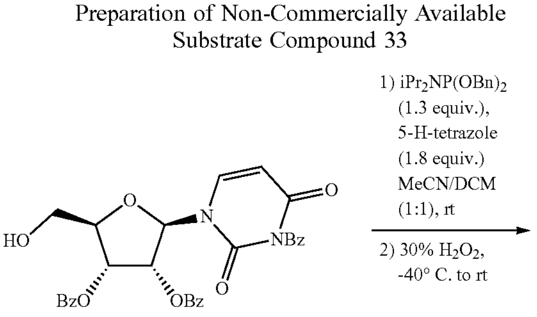

compound 11-1

-continued

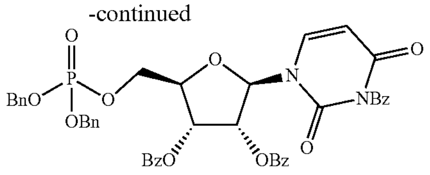

compound 33

Flame-dried round bottom flask was charged with protected uridine (compound 11-1; 3.10 g, 5.6 mmol, 1.0 equiv.) and 5-H-tetrazole (0.71 g, 10.1 mmol, 1.8 equiv.). Substrates were dissolved in a mixture of anhydrous MeCN (45 mL) and DCM (45 mL). $iPr_2NP(OBn)_2$ (2.30 mL, 7.3 mmol, 1.3 equiv.) was added dropwise to the resulting mixture and the reaction was stirred for 1 h under argon atmosphere. Subsequently, the reaction mixture was cooled down to −40° C., followed by addition of 30% aq. $H_2O_2$ (18 mL) and the reaction was allowed to warm to room temperature over 1 h. The resulting solution was diluted with DCM and the organic phase was sequentially washed with saturated aq. $NaHCO_3$ and brine. The organic layer was dried over $MgSO_4$, filtered and concentrated under reduced pressure. The crude residue was purified by silica gel chromatography (EtOAc/Hexanes/DCM; from 10:40:50 to 30:20:50) to provide 3.88 g of compound 33 (Yield=86%). Physical state: white amorphous solid. Compound 33 was characterized by $^1H$ NMR (600 MHz, $CDCl_3$): δ 7.98 (d, J=7.2 Hz, 2H), 7.91 (dd, J=8.4, 1.2 Hz, 2H), 7.87 (d, J=7.3 Hz, 2H), 7.68 (d, J=8.3 Hz, 1H), 7.61-7.56 (m, 2H), 7.52 (tt, J=7.3, 1.2 Hz, 2H), 7.43-7.30 (m, 16H), 6.41 (d, J=7.0 Hz, 1H), 5.67-5.64 (m, 2H), 5.46 (t, J=6.5 Hz, 1H), 5.19-5.08 (m, 4H), 4.47-4.44 (m, 1H), 4.37-4.30 (m, 2H); $^{13}C$ NMR (150 MHz, $CDCl_3$): δ 168.4, 165.42, 165.40, 161.7, 149.7, 139.2, 130.49 (d, J=5.7 Hz), 135.46 (d, J=6.2 Hz), 135.1, 134.0, 133.9, 131.5, 130.6, 130.0, 129.9, 129.2, 129.14, 129.09, 129.0, 128.9, 128.76, 128.75, 128.7, 128.39, 128.36, 103.7, 86.5, 81.7 (d, J=8.1 Hz), 73.7, 71.6, 70.17 (d, J=5.4 Hz), 70.15 (d, J=5.4 Hz), 66.6 (d, J=5.2 Hz); $^{31}P$ NMR (162 MHz, $CDCl_3$): δ −0.6; HRMS (ESI-TOF) m/z: calculated for $C_{44}H_{38}N_2O_{12}P$ $[M+H]^+$: 817.2157, found: 817.2153.

Example 18

Preparation of Non-Commercially Available Substrate Compound 34

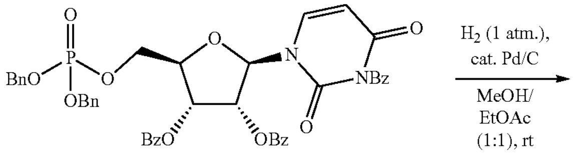

compound 33

-continued

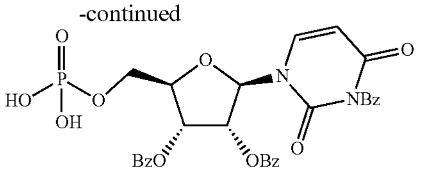

compound 34

Round bottom flask equipped with a stir bar was charged with protected uridine phosphate (compound 33; 3.85 g, 4.8 mmol, 1.0 equiv.), and the atmosphere was exchanged to argon. MeOH (100 mL) and EtOAc (100 mL) were added, followed by Pd/C (10% wt.; 675 mg). The atmosphere in the flask was exchanged for $H_2$ and the reaction vessel was equipped with a $H_2$ balloon. The reaction mixture was stirred at room temperature for 1.5 h, after which TLC indicated full conversion of the starting material. The crude reaction mixture was filtered through a pad of celite, followed by few volumes of MeOH/DCM (1:1). The volatiles were removed under reduced pressure, and the residue was coevaporated two times with DCM to remove residual MeOH. After being dried under educed pressure compound 34 was obtained as a white amorphous solid (2.82 g; Yield=93%). Physical state: white amorphous solid. Compound 34 was characterized by $^1H$ NMR (600 MHz, $(CD_3)_2CO$): δ 9.38 (br s, 2H), 8.18 (d, J=7.5 Hz, 1H), 8.03-7.98 (m, 4H), 7.86 (d, J=7.5 Hz, 2H), 7.66 (t, J=7.4 Hz, 1H), 7.61 (t, J=7.4 Hz, 1H), 7.54 (t, J=7.4 Hz, 1H), 7.49 (t, J=7.7 Hz, 2H), 7.43 (t, J=7.7 Hz, 2H), 7.32 (t, J=7.7 Hz, 2H), 6.48 (d, J=6.6 Hz, 1H), 6.08 (d, J=6.9 Hz, 1H), 5.98-5.94 (m, 1H), 5.84-5.79 (m, 1H), 4.82 (br s, 1H), 4.64-4.55 (m, 2H); $^{13}C$ NMR (150 MHz, $(CD_3)_2CO$): δ 169.8, 165.94, 165.88, 162.6, 150.5, 141.2, 135.8, 134.50, 134.49, 132.6, 131.2, 130.49, 130.48, 130.1, 130.0, 129.6, 129.49, 129.46, 129.3, 103.7, 87.6, 82.2 (d, J=7.4 Hz), 75.0, 72.7, 66.9; $^{31}P$ NMR (162 MHz, $(CD_3)_2CO$): δ 0.3; HRMS (ESI-TOF) m/z: calculated for $C_{30}H_{24}N_2O_{12}P$ [M−H]: 635.1072, found: 635.1071.

Example 19

Preparation of Non-Commercially Available Substrate Compound 36

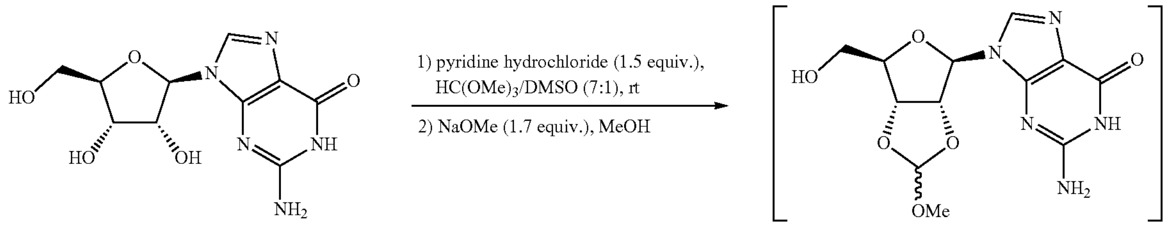

compound 17-0 compound 35

-continued

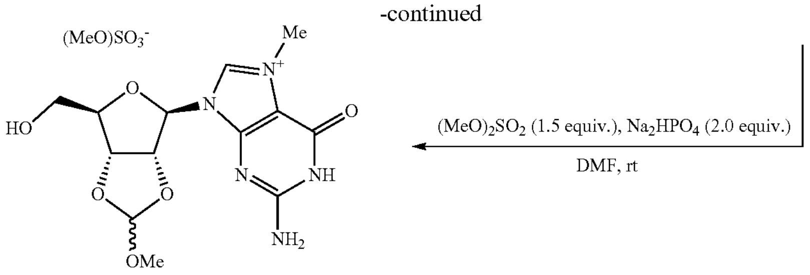

compound 36

According to the procedure disclosed in Jo Davisson et al., J. Org. Chem. 1987, 52, 1794-1801, guanosine (2.83 g, 10 mmol, 1.0 equiv.) was suspended in anhydrous trimethyl orthoformate (25 mL), followed by addition of pyridine hydrochloride (1.75 g, 15 mmol, 1.5 equiv.). The stirred suspension was treated with DMSO (3.5 mL) and the mixture was stirred at room temperature for 48 h. To a resultant cloudy suspension were added sequentially MeOH (25 mL) and solid NaOMe (0.90 g, 16.5 mmol, 1.7 equiv.) and the reaction was stirred for another 3 h. Subsequently, the mixture was concentrated under reduced pressure and the resulting thick suspension was treated with MeOH/$Et_2O$ (1:1). Obtained pale yellow solid was filtered off and dried under reduced pressure. Crude compound 35 was used directly in the next step.

Crude compound 35 was redissolved in anhydrous DMF (12 mL), followed by addition of $Na_2HPO_4$ (2.84 g, 20 mmol, 2.0 equiv.). Dimethyl sulfate (1.40 mL, 15 mmol, 1.5 equiv.) was added dropwise and the reaction was stirred at room temperature for 1 h. The heterogeneous mixture was filtered through a pad of celite, and the solid residue was washed with MeOH. The filtrate was concentrated under reduced pressure to ~10 mL and loaded directly on the silica gel. The crude was purified by silica gel chromatography (DCM/MeOH; from 100:0 to 80:20) to provide 2.20 g of compound 36 (2:1 mixture of diastereoisomers). (Yield over 2 steps=49%). Physical state: white amorphous solid. Compound 36 was characterized by $^{1}H$ NMR (600 MHz, $D_2O$): δ 6.31 (d, J=2.3 Hz, 1H; major), 6.23 (s, 1H; minor), 6.21 (d, J=2.4 Hz, 1H; minor), 6.13 (s, 1H; major), 5.50 (dd, J=6.2, 2.4 Hz, 1H; minor), 4.48 (dd, J=6.8, 2.3 Hz, 1H; major), 5.15 (dd, J=6.1, 2.4 Hz, 1H; minor), 5.09 (dd, J=6.8, 2.6 Hz, 1H; major), 4.72-4.69 (m, 1H; major), 4.64-4.61 (m, 1H; minor), 4.11 (s, 3H; major+minor), 3.90-3.86 (m, 1H; major+minor), 3.86-3.81 (m, 1H; major+minor), 3.75 (s, 3H; major+minor), 3.49 (s, 3H; major), 3.40 (s, 3H; minor); $^{13}C$ NMR (150 MHz, $D_2O$): δ 150.5 (minor), 157.42 (minor), 157.37 (major), 157.29 (major), 149.4 (major+minor), 136.1 (t, 1:1:1, $J^{1}_{C-D}$=35.1 Hz; major+minor), 118.4 (major), 117.3 (minor), 108.7 (major+minor), 92.6 (major), 91.9 (minor), 89.0 (major), 87.6 (minor), 84.3 (major), 83.6 (minor), 81.5 (major), 80.7 (minor), 61.4 (major), 61.2 (minor), 55.4 (major+minor), 52.6 (major), 51.6 (minor), 35.71 (minor), 35.70 (major); HRMS (ESI-TOF) m/z: calculated for $C_{13}H_{18}N_5O_6$ [M]+: 340.1252, found: 340.1264.

Example 20

Preparation of Non-Commercially Available Substrate Compound 39

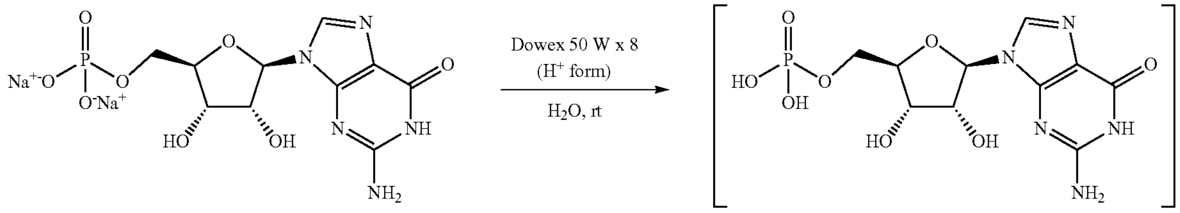

compound 37 compound 38

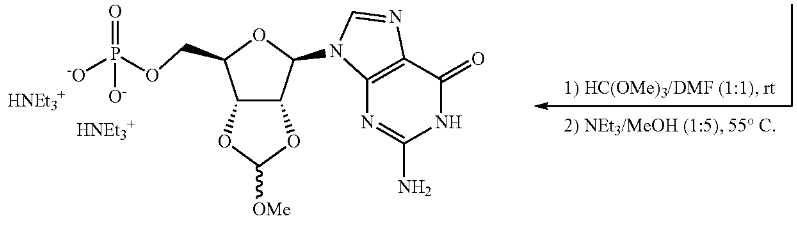

compound 39

Disodium guanosine monophosphate (compound 37; 10 g, 25 mmol, 1.0 equiv.) was converted into dihydrogen guanosine monophosphate (compound 38) according to the procedure disclosed in Lu et al., Org. Lett. 2016, 18, 1724-1727. Compound 38 was used in the next step without any further purification.

Dihydrogen guanosine monophosphate (compound 38), obtained as described above, suspended in a mixture of anhydrous trimethyl orthoformate (50 mL) and anhydrous DMF (50 mL). The resulting mixture was stirred overnight at room temperature. Subsequently, the reaction mixture was concentrated under reduced pressure, followed by addition of $Et_2O$. The resulting suspension was filtered to provide off-white solid, which was mixed with MeOH (100 mL) and triethylamine (20 mL). The solution was stirred overnight at 55° C. The reaction was concentrated under reduced pressure and the crude residue was purified by reverse phase C18-silica gel chromatography (1 M aq. TEAA/MeCN; from 100:0 to 70:30) and lyophilized provide 7.13 g of compound 39 (9:1 mixture of diastereoisomers). (Yield over 3 steps=47%). Physical state: white amorphous solid. Compound 39 was characterized by $^1$H NMR (600 MHz, $D_2O$): δ 7.97 (s, 1H; minor), 7.95 (s, 1H; major), 6.18 (s, 1H; minor), 6.14 (d, J=2.7 Hz, 1H; major), 6.07 (s, 1H; major), 6.02 (d, J=2.9 Hz, 1H; minor), 5.40 (dd, J=6.2, 2.9 Hz, 1H; minor), 5.35 (dd, J=7.0, 2.7 Hz, 1H; major), 5.21 (dd, J=6.2, 2.8 Hz, 1H; minor), 5.15 (dd, J=7.0, 3.1 Hz, major), 4.60 (q, J=4.3 Hz, 1H; major), 4.51 (q, J=4.1 Hz, 1H; minor), 4.10-4.05 (m, 1H; major+minor), 4.05-3.99 (m, 1H; major+minor), 3.45 (s, 3H; major), 3.35 (s, 3H; minor), 3.16 (q, J=7.3 Hz, 12H; $Et_3NH^+$), 1.24 (t, J=7.3 Hz, 18H; $Et_3NH^+$); $^{13}$C NMR (150 MHz, $D_2O$): δ 158.6 (major+minor), 153.72 (minor), 153.66 (major), 151.1 (minor), 151.0 (major), 137.8 (major), 137.7 (minor), 118.6 (major), 117.3 (minor), 116.1 (major+minor), 90.1 (major), 89.1 (minor), 86.0 (d, J=8.7 Hz; major), 84.5 (d, J=8.8 Hz; minor), 84.1 (major), 83.2 (minor), 81.4 (major), 80.7 (minor), 64.7 (d, J=4.8 Hz; major), 64.5 (d, J=4.6 Hz; minor), 52.5 (major), 51.4 (minor), 46.6 ($Et_3NH^+$), 8.2 ($Et_3NH^+$); $^{31}$P NMR (162 MHz, $D_2O$): δ 0.6; HRMS (ESI-TOF) m/z: calculated for $C_{12}H_{15}N_5O_9P$ $[M-H]^-$: 404.0613, found: 404.0626.

Example 21

Preparation of Non-Commercially Available Substrate Compound 40

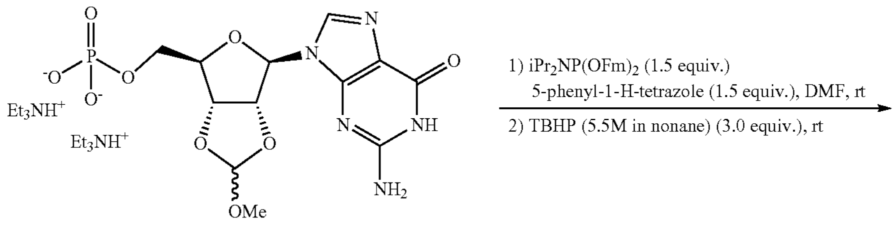

compound 39

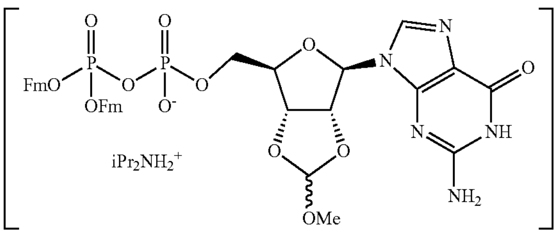

compound 40

Compound 39 (2.61 g; 4.3 mmol; 1.0 equiv.) was dried by co-evaporation with anhydrous DMF and dissolved in anhydrous DMF (12 mL). $iPr_2NP(OFm)_2$ (3.35 g, 6.5 mmol, 1.5 equiv.) was added to the resulting solution, followed by 5-phenyl-1-H-tetrazole (0.94 g, 6.5 mmol, 1.5 equiv.) and the reaction was stirred for 1 h at room temperature. Subsequently, tert-butyl hydroperoxide (5.5 M in nonane; 2.3 mL, 12.9 mmol, 3.0 equiv.) was added and the mixture was stirred for another 1 h. The reaction was quenched by the addition of $Et_2O$ (100 mL). Solvent was decanted and the remaining oily residue was washed twice with $Et_2O$. The residue was redissolved in DCM (10 mL) followed by addition of $Et_2O$ (100 mL). The resulting haze mixture was sonicated for 10 min to initiate precipitation. The precipitate was filtered off to provide 4.05 g of crude compound 40 (75% wt. purity determined by quantitative $^{31}P$ NMR) (9:1 mixture of diastereoisomers) (NMR yield=75%). Compound 40 can be used in subsequent steps without any further purification. Physical state: white amorphous solid. Compound 40 was characterized by $^1H$ NMR (600 MHz, DMSO-$d_6$): δ 10.7 (br s, 1H; major+minor), 8.40 (br s, 2H; major+minor), 7.94 (s, 1H; major), 7.92 (s, 1H; minor), 7.86-7.81 (m, 4H; major+minor), 7.56-7.48 (m, 4H; major+minor), 7.39-7.32 (m, 4H; major+minor), 7.26-7.18 (m, 4H; major+minor), 6.81 (br s, 2H; $iPr_2NH_2$+), 6.12 (d, J=1.9 Hz, 1H; major), 6.10 (s, 1H; minor), 6.02 (d, J=2.4 Hz, 1H; minor), 6.01 (s, 1H; major), 5.33 (dd, J=7.2, 3.5 Hz, 1H; minor), 5.26-5.19 (m; 2H major+1H minor), 4.40-4.31 (m, 2H; major+minor), 4.28-4.14 (m, 6H; major+minor), 3.97-3.94 (m, 1H; minor), 3.83-3.75 (m, 1H; major), 3.30 (s, 3H; major), 3.27 (hept, J=6.5 Hz, 1H; $iPr_2NH_2$+), 3.17 (s, 3H; minor), 1.17 (d, J=6.5 Hz, 12H; $iPr_2NH_2$); $^{13}C$ NMR (150 MHz, DMSO-$d_6$): δ 157.5 (minor), 156.8 (major), 153.9 (major+minor), 150.5 (minor), 150.4 (major), 143.4 (major+minor), 143.2 (major+minor), 140.79 (major+minor), 140.77 (major+minor), 140.76 (major+minor), 136.3 (minor), 136.2 (major), 129.4 (major+minor), 129.0 (major+minor), 127.6 (major+minor), 127.0 (major+minor), 126.8 (minor), 126.5 (major), 125.14 (major), 125.10 (minor), 120.0 (major+minor), 118.2 (major+minor), 116.91 (major), 116.85 (minor), 89.6 (major), 88.6 (minor), 85.9 (d, J=7.5 Hz; major), 84.7 (d, J=8.1 Hz; minor), 84.2 (major), 83.0 (minor), 81.4 (major), 81.2 (minor), 68.3 (major+minor), 64.9 (major+minor), 54.9 (major+minor), 51.9 (major), 50.4 (minor), 47.3 (d, J=7.1 Hz; major+minor), 46.1 ($iPr_2NH_2$+), 18.7 ($iPr_2NH_2$); $^{31}P$ NMR (162 MHz, DMSO-$d_6$): δ −12.1 (d, J=19.8 Hz), −12.7 (d, J=19.8 Hz); HRMS (ESI-TOF) m/z: calculated for $C_{40}H_{36}N_5O_{12}P_2[M-H]^-$: 840.1841, found: 840.1861.

For the following Examples 22-79, diastereomeric purities of the products were determined by NMR and LC-MS.

LC traces of pure diastereoisomers were recorded from samples obtained after purification and lyophilization using one of methods 1, 2 or 3, described below.

LC traces for mixtures of diastereoisomers were obtained from solutions prepared by mixing previously obtained $R_P$ and $S_P$ isomers. In several cases samples of compounds used to prepare such mixtures were partially hydrolysed due to prolonged storage, therefore chromatograms for mixture of isomers does not reflect purity of the obtained compounds.

HPLC analyses were conducted on a Waters Autopurification LC with a Waters XBridge C18 column (4.6×150 mm, 3.5 μm). Solvent A: 0.1 M triethylammonium acetate (TEAA) in $H_2O$; solvent B: MeCN; flow rate: 1.5 mL/min; and temperature: 25° C. Table 1 lists HPLC gradient for method 1. Table 2 lists HPLC gradient for method 2. Table 3 lists HPLC gradient for method 3.

TABLE 1

| time (min) | Solvent A (%) | Solvent B (%) |
|---|---|---|
| 0 | 98 | 2 |
| 15 | 92 | 8 |
| 17 | 5 | 90 |

TABLE 2

| time (min) | Solvent A (%) | Solvent B (%) |
|---|---|---|
| 0 | 99 | 1 |
| 4 | 99 | 1 |
| 15 | 95 | 5 |
| 17 | 5 | 90 |

TABLE 3

| time (min) | Solvent A (%) | Solvent B (%) |
|---|---|---|
| 0 | 99 | 1 |
| 4 | 99 | 1 |
| 15 | 92 | 5 |
| 17 | 5 | 90 |

Example 22

Preparation of 5'-O-azidothymidine triammonium (R)-diphosphoro-α-thioate (Compound ($R_P$)-41)

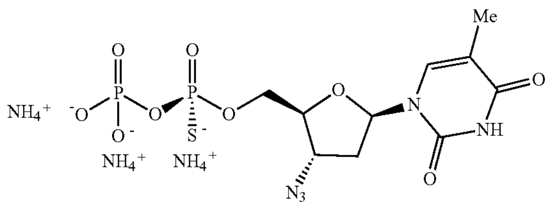

Following the General Procedure A, compound ($R_P$)-41 was obtained from monophosphate precursor compound 7-1 (62 mg, 0.2 mmol), (+)-Ψ* reagent (128 mg, 0.3 mmol) and azidothymidine (133 mg, 0.5 mmol). Deprotection was performed at room temperature. The crude product was purified by ion-exchange chromatography on DEAE Sephadex (1 M $NH_4HCO_3$/water, from 0:100 to 20:80) to afford 52 mg of compound ($R_P$)-41 after lyophilization (Yield=53%, d.r.>20:1). Physical state: white amorphous solid. Compound ($R_P$)-41 was characterized by $^1H$ NMR (600 MHz, $D_2O$): δ 7.79 (s, 1H), 6.28 (t, J=6.9 Hz, 1H), 4.60 (dt, J=6.7, 3.5 Hz, 1H), 4.29-4.20 (m, 3H), 2.54-2.45 (m, 2H), 1.95 (s, 3H); $^{13}C$ NMR (150 MHz, $D_2O$): δ 166.5, 151.7, 137.3, 111.8, 84.9, 83.0 (d, J=9.8 Hz), 65.7 (d, J=5.8 Hz), 61.0, 36.2, 11.7; $^{31}P$ NMR (162 MHz, $D_2O$): 641.1 (d, J=29.9 Hz), −6.7 (d, J=29.9 Hz); HRMS (ESI-TOF) m/z: calculated for $C_{10}H_{14}N_5O_9P_2S$ $[M-H]^-$: 441.9987, found: 441.9979; Retention time: 11.57 min (Method 1).

Example 23

Preparation of 5'-O-azidothymidine triammonium (S)-diphosphoro-α-thioate (Compound (S$_P$)-41)

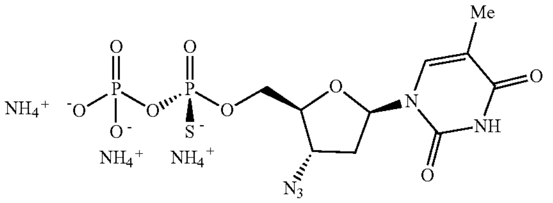

Following the General Procedure A, compound (S$_P$)-41 was obtained from monophosphate precursor compound 7-1 (62 mg, 0.2 mmol), (−)-$\Psi$* reagent (128 mg, 0.3 mmol) and azidothymidine (133 mg, 0.5 mmol). Deprotection was performed at room temperature. The crude product was purified by ion-exchange chromatography on DEAE Sephadex (1 M $NH_4HCO_3$/water, from 0:100 to 20:80) to afford 49 mg of compound (S$_P$)-41 after lyophilization (Yield=50%, d.r.>20:1). Physical state: white amorphous solid. Compound (S$_P$)-41 was characterized by $^1$H NMR (600 MHz, $D_2O$): δ 7.78 (s, 1H), 6.28 (t, J=6.8 Hz, 1H), 4.60 (dt, J=6.9, 3.7 Hz, 1H), 4.28-4.21 (m, 3H), 2.56-2.47 (m, 2H), 1.96 (s, 3H); $^{13}$C NMR (150 MHz, $D_2O$): δ 166.5, 151.7, 137.3, 111.8, 84.9, 82.9 (d, J=9.7 Hz), 65.4 (d, J=6.1 Hz), 60.7, 36.1, 11.7; $^{31}$P NMR (162 MHz, $D_2O$): δ 42.1 (d, J=28.3 Hz), −9.4 (d, J=28.4 Hz); HRMS (ESI-TOF) m/z: calculated for $C_{10}H_{14}N_5O_9P_2S$ $[M-H]^-$: 441.9987, found: 441.9979; Retention time: 10.59 min (Method 1).

Example 24

Preparation of 5'-O-thymidine triammonium (R)-diphosphoro-α-thioate (Compound (R$_P$)-42)

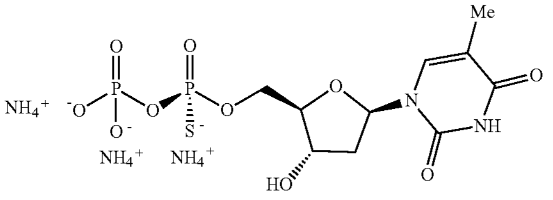

Following the General Procedure A, compound (R$_P$)-42 was obtained from monophosphate precursor compound 7-1 (62 mg, 0.2 mmol), (+)-$\Psi$* reagent (128 mg, 0.3 mmol) and protected thymidine compound 10-1 (225 mg, 0.5 mmol). Deprotection was performed at room temperature. The crude product was purified by ion-exchange chromatography on DEAE Sephadex (1 M $NH_4HCO_3$/water, from 0:100 to 20:80) to afford 44 mg of compound (R$_P$)-42 after lyophilization (Yield=47%, d.r.>20:1). Physical state: white amorphous solid. Compound (R$_P$)-42 was characterized by $^1$H NMR (600 MHz, $D_2O$): δ 7.79 (s, 1H), 6.35 (t, J 6.9 Hz, 1H), 4.67 (dt, J=6.5, 3.7 Hz, 1H), 4.25-4.18 (m, 3H), 2.41 (dt, J=13.8, 6.9 Hz, 1H), 2.35 (ddd, J=13.8, 6.9, 3.0 Hz, 1H), 1.96 (s, 3H); $^{13}$C NMR (150 MHz, $D_2O$): δ 166.6, 151.8, 137.4, 111.8, 85.3 (d, J=9.6 Hz), 84.9, 70.9, 65.4 (d, J=5.9 Hz), 38.5, 11.7; $^{31}$P NMR (162 MHz, $D_2O$): δ 41.3 (d, J=27.3 Hz), −7.1 (d, J=27.3 Hz); HRMS (ESI-TOF) m/z: calculated for $C_{10}H_{15}N_2O_{10}P_2S$ [M−H]: 416.9923, found: 416.9934; Retention time: 4.99 min (Method 1).

Example 25

Preparation of 5'-O-thymidine triammonium (S)-diphosphoro-α-thioate (Compound (S$_P$)-42)

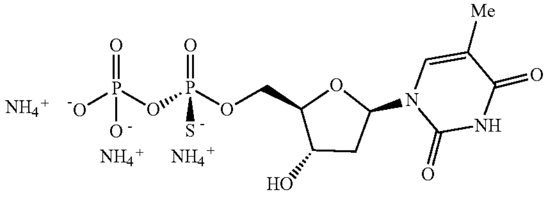

Following the General Procedure A, compound (S$_P$)-42 was obtained from monophosphate precursor compound 7-1 (62 mg, 0.2 mmol), (−)-$\Psi$* reagent (128 mg, 0.3 mmol) and protected thymidine compound 10-1 (225 mg, 0.5 mmol). Deprotection was performed at room temperature. The crude product was purified by ion-exchange chromatography on DEAE Sephadex (1 M $NH_4HCO_3$/water, from 0:100 to 20:80) to afford 49 mg of compound (S$_P$)-42 after lyophilization (Yield=52%, d.r.>20:1). Physical state: white amorphous solid. Compound (S$_P$)-42 was characterized by $^1$H NMR (600 MHz, $D_2O$) δ 7.77 (s, 1H), 6.35 (t, J 6.9 Hz, 1H), 4.66 (dt, J=6.2, 3.2 Hz, 1H), 4.26-4.17 (m, 3H), 2.41 (dt, J=13.8, 6.9 Hz, 1H), 2.36 (ddd, J=13.8, 6.9, 3.6 Hz, 1H), 1.96 (s, 3H); $^{13}$C NMR (150 MHz, $D_2O$): δ 166.6, 151.8, 137.4, 111.8, 85.2 (d, J=9.5 Hz), 84.9, 70.9, 65.2 (d, J=6.2 Hz), 38.3, 11.7; $^{31}$P NMR (162 MHz, $D_2O$): δ 42.1 (d, J=29.4 Hz), −9.3 (d, J=29.4 Hz); HRMS (ESI-TOF) m/z: calculated for $C_{10}H_{15}N_2O_{10}P_2S$ $[M-H]^-$: 416.9923, found: 416.9934; Retention time: 4.21 min (Method 1).

Example 26

Preparation of 5'-O-uridine triammonium (R)-diphosphoro-α-thioate (Compound (R$_P$)-43)

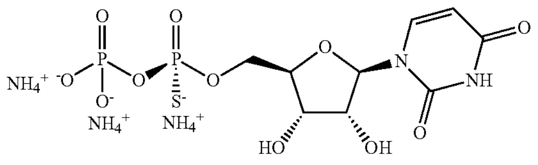

Following the General Procedure A, compound (R$_P$)-43 was obtained from monophosphate precursor compound 7-1 (62 mg, 0.2 mmol), (+)-$\Psi$* reagent (128 mg, 0.3 mmol) and protected uridine compound 11-1 (278 mg, 0.5 mmol). Deprotection was performed at room temperature. The crude product was purified by ion-exchange chromatography on DEAE Sephadex (1 M $NH_4HCO_3$/water, from 0:100 to 20:80) to afford 58 mg of compound (R$_P$)-43 after lyophilization (Yield=62%, d.r.>20:1). Physical state: white amorphous solid. Compound (R$_P$)-43 was characterized by $^1$H NMR (600 MHz, $D_2O$): δ 8.05 (d, J=8.1 Hz, 1H), 5.96-5.94 (m, 2H), 4.42 (t, J=5.0 Hz, 1H), 4.39 (t, J=5.0 Hz, 1H), 4.29-4.24 (m, 3H); $^{13}$C NMR (150 MHz, $D_2O$) δ 166.3, 151.8, 141.9, 102.6, 88.4, 83.2 (d, J=9.7 Hz), 73.8, 69.6, 64.8 (d, J=5.6 Hz); $^{31}$P NMR (162 MHz, $D_2O$): δ 41.1 (d, J=30.9 Hz), −6.8 (d, J=30.9 Hz); HRMS (ESI-TOF) m/z: calculated for $C_9H_{13}N_2O_{11}P_2S$ $[M-H]^-$: 418.9715, found: 418.9705; Retention time: 2.87 min (Method 1).

Example 27

Preparation of 5'-O-uridine triammonium (S)-diphosphoro-α-thioate (Compound ($S_P$)-43)

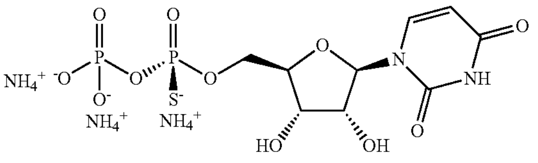

Following the General Procedure A, compound ($S_P$)-43 was obtained from monophosphate precursor compound 7-1 (62 mg, 0.2 mmol), (−)-Ψ* reagent (128 mg, 0.3 mmol) and protected uridine compound 11-1 (278 mg, 0.5 mmol). Deprotection was performed at room temperature. The crude product was purified by ion-exchange chromatography on DEAE Sephadex (1 M $NH_4HCO_3$/water, from 0:100 to 20:80) to afford 60 mg of compound ($S_P$)-43 after lyophilization (Yield=64%, d.r.>20:1). Physical state: white amorphous solid. Compound ($S_P$)-43 was characterized by $^1$H NMR (600 MHz, $D_2O$): δ 8.09 (d, J=8.1 Hz, 1H), 5.99-5.97 (m, 2H), 4.42 (t, J=4.8 Hz, 1H), 4.40 (t, J=4.8 Hz, 1H), 4.31-4.29 (m, 1H), 4.29-4.25 (m, 2H); $^{13}$C NMR (150 MHz, $D_2O$): δ 166.3, 151.8, 142.0, 102.6, 88.5, 83.1 (d, J=9.5 Hz), 73.8, 69.6, 64.5 (d, J=6.5 Hz); $^{31}$P NMR (162 MHz, $D_2O$) δ 41.7 (d, J=28.5 Hz), −9.7 (d, J=28.5 Hz); HRMS (ESI-TOF) m/z: calculated for $C_9H_{13}N_2O_{11}P_2S$ $[M-H]^-$: 418.9715, found: 418.9705; Retention time: 2.30 min (Method 1).

Example 28

Preparation of 5'-O-deoxyadenosine triammonium (R)-diphosphoro-α-thioate (Compound ($R_P$)-44)

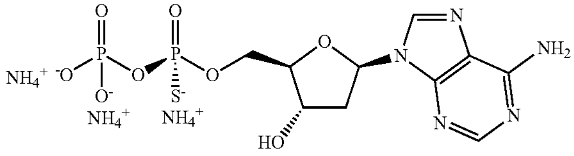

Following the General Procedure A, compound ($R_P$)-44 was obtained from monophosphate precursor compound 7-1 (62 mg, 0.2 mmol), (+)-Ψ* reagent (128 mg, 0.3 mmol) and protected deoxyadenosine compound 13-1 (281 mg, 0.5 mmol). Deprotection was performed at 40° C. The crude product was purified by ion-exchange chromatography on DEAE Sephadex (1 M $NH_4HCO_3$/water, from 0:100 to 30:70) to afford 60 mg of compound ($R_P$)-44 after lyophilization (Yield=63%, d.r.>20:1). Physical state: white amorphous solid. Compound ($R_P$)-44 was characterized by $^1$H NMR (600 MHz, $D_2O$): δ 8.47 (s, 1H), 8.11 (s, 1H), 6.41 (t, J=6.7 Hz, 1H), 4.30-4.28 (m, 1H), 4.22 (ddd, J=11.2, 7.4, 3.7 Hz, 1H), 4.16 (ddd, J=11.2, 6.6, 3.8 Hz, 1H), 2.79 (dt, J=13.6, 6.7 Hz, 1H), 2.59 (ddd, J=13.6, 6.7, 4.0 Hz, 1H); $^{13}$C NMR (150 MHz, $D_2O$): δ 155.2, 152.4, 148.3, 139.9, 118.3, 85.6 (d, J=9.5 Hz), 83.5, 71.0, 65.1 (d, J=6.0 Hz), 39.0; $^{31}$P NMR (162 MHz, $D_2O$) δ 41.1 (d, J=29.4 Hz), −8.9 (d, J=29.4 Hz); HRMS (ESI-TOF) m/z: calculated for $C_{10}H_{14}N_5O_8P_2S$ $[M-H]^-$: 426.0038, found: 426.0033; Retention time: 6.17 min (Method 1).

Example 29

Preparation of 5'-O-deoxyadenosine triammonium (S)-diphosphoro-α-thioate (Compound ($S_P$)-44)

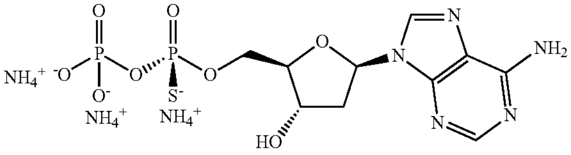

Following the General Procedure A, compound ($S_P$)-44 was obtained from monophosphate precursor compound 7-1 (62 mg, 0.2 mmol), (−)-Ψ* reagent (128 mg, 0.3 mmol) and protected deoxyadenosine compound 13-1 (281 mg, 0.5 mmol). Deprotection was performed at 40° C. The crude product was purified by ion-exchange chromatography on DEAE Sephadex (1 M $NH_4HCO_3$/water, from 0:100 to 30:70) to afford 55 mg of compound ($S_P$)-44 after lyophilization (Yield=57%, d.r.>20:1). Physical state: white amorphous solid. Compound ($S_P$)-44 was characterized by $^1$H NMR (600 MHz, $D_2O$): δ 8.47 (s, 1H), 8.08 (s, 1H), 6.39 (t, J=6.7 Hz, 1H), 4.79-4.75 (m, 1H), 4.31-4.29 (m, 1H), 4.22 (ddd, J=11.5, 7.7, 3.9 Hz, 1H), 4.16 (ddd, J=11.5, 6.6, 3.7 Hz, 1H), 2.77 (dt, J=13.6, 6.7 Hz, 1H), 2.59 (ddd, J=13.6, 6.7, 3.6 Hz, 1H); $^{13}$C NMR (150 MHz, $D_2O$): δ 154.9, 152.0, 148.2, 140.0, 118.2, 85.6 (d, J=9.4 Hz), 83.7, 71.2, 65.4 (d, J=6.3 Hz), 39.2; $^{31}$P NMR (162 MHz, $D_2O$): δ 42.0 (d, J=28.0 Hz), −10.8 (d, J=28.0 Hz); HRMS (ESI-TOF) m/z: calculated for $C_{10}H_{14}N_5O_8P_2S$ $[M-H]^-$: 426.0038, found: 426.0033; Retention time: 5.49 min (Method 1).

Example 30

Preparation of 5'-O-adenosine triammonium (R)-diphosphoro-α-thioate (Compound ($R_P$)-45)

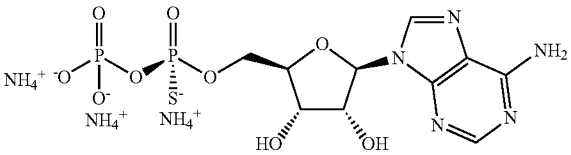

Following the General Procedure A, compound ($R_P$)-45 was obtained from monophosphate precursor compound 7-1 (62 mg, 0.2 mmol), (+)-Ψ* reagent (128 mg, 0.3 mmol) and protected adenosine compound 14-1 (341 mg, 0.5 mmol). Deprotection was performed at 40° C. The crude product was purified by ion-exchange chromatography on DEAE Sephadex (1 M $NH_4HCO_3$/water, from 0:100 to 30:70) to afford 55 mg of compound ($R_P$)-45 after lyophilization (Yield=56%, d.r.>20:1). Physical state: white amorphous solid. Compound ($R_P$)-45 was characterized by $^1H$ NMR (600 MHz, $D_2O$): δ 8.54 (s, 1H), 8.13 (s, 1H), 6.08 (d, J=5.4 Hz, 1H), 4.79-4.74 (m, 1H), 4.59 (t, J=4.6 Hz, 1H), 4.41-4.39 (m, 1H), 4.31-4.25 (m, 2H); $^{13}C$ NMR (150 MHz, $D_2O$): δ 155.4, 152.6, 148.9, 140.0, 118.4, 87.0, 83.8 (d, J=9.6 Hz), 74.4, 70.4, 65.1 (d, J=5.6 Hz); $^{31}P$ NMR (162 MHz, $D_2O$): δ 42.0 (d, J=29.2 Hz), −8.3 (d, J=29.2 Hz); HRMS (ESI-TOF) m/z: calculated for $C_{10}H_{14}N_5O_9P_2S$ $[M-H]^-$: 441.9987, found: 441.9988; Retention time: 5.06 min (Method 1).

Example 31

Preparation of 5'-O-adenosine triammonium (S)-diphosphoro-α-thioate (Compound ($S_P$)-45)

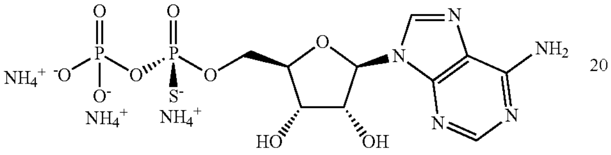

Following the General Procedure A, compound ($S_P$)-45 was obtained from monophosphate precursor compound 7-1 (62 mg, 0.2 mmol), (−)-Ψ* reagent (128 mg, 0.3 mmol) and protected adenosine compound 14-1 (342 mg, 0.5 mmol). Deprotection was performed at 40° C. The crude product was purified by ion-exchange chromatography on DEAE Sephadex (1 M $NH_4HCO_3$/water, from 0:100 to 30:70) to afford 52 mg of compound ($S_P$)-45 after lyophilization (Yield=53%, d.r.>20:1).

Preparative scale: Following the General Procedure A, compound ($S_P$)-45 was obtained from monophosphate precursor compound 7-1 (0.62 g, 2.0 mmol), (−)-Ψ* reagent (1.28 g, 3.0 mmol) and protected adenosine compound 14-1 (3.42 g, 5.0 mmol). The crude product was purified by ion-exchange chromatography on DEAE Sephadex (1 M $NH_4HCO_3$/water, from 0:100 to 30:70) to afford 620 mg of compound ($S_P$)-45 after lyophilization (Yield=63%, d.r.>20:1). Physical state: white amorphous solid. Compound ($S_P$)-45 was characterized by $^1H$ NMR (600 MHz, $D_2O$) δ 8.55 (s, 1H), 8.09 (s, 1H), 6.06 (d, J=5.3 Hz, 1H), 4.74-4.72 (m, 1H), 4.57 (t, J=4.6 Hz, 1H), 4.40-4.37 (m, 1H), 4.29 (ddd, J=10.7, 7.5, 3.0 Hz, 1H), 4.26-4.23 (m, 1H); $^{13}C$ NMR (150 MHz, $D_2O$): δ 155.1, 152.4, 148.6, 140.0, 118.2, 87.0, 83.6 (d, J=9.4 Hz), 74.4, 70.2, 64.7 (d, J=6.1 Hz); $^{31}P$ NMR (162 MHz, $D_2O$): δ 42.0 (d, J=29.1 Hz), −8.1 (d, J=29.1 Hz); HRMS (ESI-TOF) m/z: calculated for $C_{10}H_{14}N_5O_9P_2S$ $[M-H]^-$: 441.9987, found: 441.9988; Retention time: 3.64 min (Method 1).

Example 32

Preparation of 5'-O-deoxycytidine triammonium (R)-diphosphoro-α-thioate (Compound ($R_P$)-46)

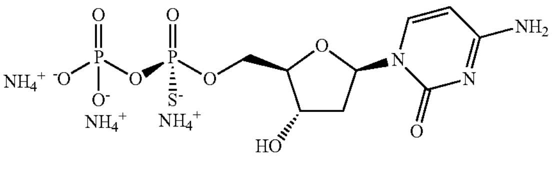

Following the General Procedure A with slight modifications, compound ($R_P$)-46 was obtained from monophosphate precursor compound 7-1 (62 mg, 0.2 mmol), (+)-Ψ* reagent (128 mg, 0.3 mmol) and protected deoxycytidine compound 12-1 (217 mg, 0.5 mmol). Coupling step was performed using 5.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 30:70) to afford 38 mg of compound ($R_P$)-46 after lyophilization (Yield=42%, d.r.>20:1). Physical state: white amorphous solid. Compound ($R_P$)-46 was characterized by $^1H$ NMR (600 MHz, $D_2O$): δ 8.04 (d, J=7.6 Hz, 1H), 6.33 (t, J=6.6 Hz, 1H), 6.13 (d, J=7.6 Hz, 1H), 4.63 (dt, J=6.6, 3.5 Hz, 1H), 4.25-4.20 (m, 3H), 2.42 (ddd, J=13.9, 6.6, 4.1 Hz, 1H), 2.33 (dt, J=13.9, 6.6 Hz, 1H); $^{13}C$ NMR (150 MHz, $D_2O$): δ 165.8, 157.2, 142.0, 96.5, 85.9, 85.3 (d, J=9.6 Hz), 70.6, 65.1 (d, J=5.8 Hz), 39.3; $^{31}P$ NMR (162 MHz, $D_2O$): δ 42.2 (d, J=28.5 Hz), −10.0 (d, J=28.5 Hz); HRMS (ESI-TOF) m/z: calculated for $C_9H_{14}N_3O_9P_2S$ $[M-H]^-$: 401.9926, found: 401.9918; Retention time: 2.83 min (Method 1).

Example 33

Preparation of 5'-O-deoxycytidine triammonium (S)-diphosphoro-α-thioate (Compound ($S_P$)-46)

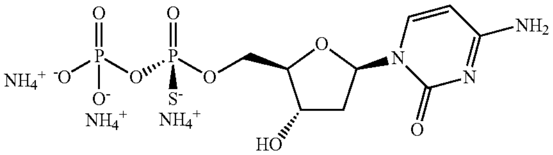

Following the General Procedure A with slight modifications, compound ($S_P$)-46 was obtained from monophosphate precursor compound 7-1 (62 mg, 0.2 mmol), (−)-Ψ* reagent (128 mg, 0.3 mmol) and protected deoxycytidine compound 12-1 (217 mg, 0.5 mmol). Coupling step was performed using 5.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 30:70) to afford 41 mg of compound ($S_P$)-46 after lyophilization (Yield=45%, d.r.>20:1). Physical state: white amorphous solid. Compound ($S_P$)-46 was characterized by $^1H$ NMR (600 MHz, $D_2O$): δ 8.04 (d, J=7.6 Hz, 1H), 6.32 (t, J=6.6 Hz, 1H), 6.13 (d, J=7.6 Hz, 1H), 4.62 (dt, J=6.7, 3.5 Hz, 1H), 4.24-4.18 (m, 3H), 2.42 (ddd, J=13.9, 6.6, 4.1 Hz, 1H), 2.32 (dt, J=13.9, 6.6 Hz, 1H); $^{13}C$ NMR (150 MHz, $D_2O$): δ 165.8, 157.1, 142.0, 96.5, 85.9, 85.3 (d, J=9.7 Hz), 70.7, 65.1 (d, J=6.2 Hz), 39.3; $^{31}P$ NMR (162 MHz, $D_2O$): δ 42.2 (d, J=29.1 Hz), −9.7 (d, J=29.1 Hz); HRMS (ESI-TOF) m/z: calculated for $C_9H_{14}N_3O_9P_2S$ $[M-H]^-$: 401.9926, found: 401.9918; Retention time: 2.29 min (Method 1).

Example 34

Preparation of 5'-O-cytidine triammonium (R)-diphosphoro-α-thioate (Compound ($R_P$)-47)

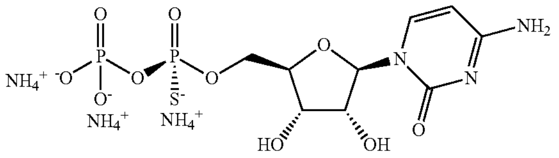

Following the General Procedure A with slight modifications, compound ($R_P$)-47 was obtained from monophosphate precursor compound 7-1 (62 mg, 0.2 mmol), (+)-Ψ* reagent (128 mg, 0.3 mmol) and protected cytidine compound 15-1 (277 mg, 0.5 mmol). Coupling step was performed using 5.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 30:70) to afford 35 mg of compound ($R_P$)-47 after lyophilization (Yield=37%, d.r.>20:1). Physical state: white amorphous solid. Compound ($R_P$)-47 was characterized by $^{1}H$ NMR (600 MHz, $D_2O$) δ 8.06 (d, J=7.6 Hz, 1H), 6.15 (d, J=7.6 Hz, 1H), 6.00 (d, J=3.8 Hz, 1H), 4.40 (t, J=5.1 Hz, 1H), 4.35-4.25 (m, 4H); $^{13}C$ NMR (150 MHz, $D_2O$): δ 165.9, 157.4, 141.8, 96.5, 89.3, 82.6 (d, J=9.9 Hz), 74.2, 69.2, 64.6 (d, J=5.9 Hz); $^{31}P$ NMR (162 MHz, $D_2O$): δ 41.3 (d, J=29.1 Hz), −6.8 (d, J=29.1 Hz); HRMS (ESI-TOF) m/z: calculated for $C_9H_{14}N_3O_{10}P_2S$ $[M-H]^-$: 417.9875, found: 417.9983; Retention time: 5.75 min (Method 2).

Example 35

Preparation of 5'-O-cytidine triammonium (S)-diphosphoro-α-thioate (Compound ($S_P$)-47)

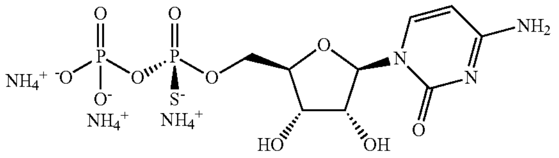

Following the General Procedure A with slight modifications, compound ($S_P$)-47 was obtained from monophosphate precursor compound 7-1 (62 mg, 0.2 mmol), (−)-Ψ* reagent (128 mg, 0.3 mmol) and protected cytidine compound 15-1 (277 mg, 0.5 mmol). Coupling step was performed using 5.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 30:70) to afford 32 mg of compound ($S_P$)-47 after lyophilization (Yield=34%, d.r.>20:1). Physical state: white amorphous solid. Compound ($S_P$)-47 was characterized by $^{1}H$ NMR (600 MHz, $D_2O$): δ 8.10 (d, J=7.6 Hz, 1H), 6.14 (d, J=7.6 Hz, 1H), 6.00 (d, J=4.1 Hz, 1H), 4.41 (t, J=5.0 Hz, 1H), 4.33 (t, J=4.6 Hz, 1H), 4.31-4.27 (m, 3H); $^{13}C$ NMR (150 MHz, $D_2O$): δ 166.1, 157.6, 141.9, 96.6, 89.3, 82.6 (d, J=9.7 Hz), 74.3, 69.2, 64.2 (d, J=6.6 Hz); $^{31}P$ NMR (162 MHz, $D_2O$): δ 41.2 (d, J=29.3 Hz), −6.7 (d, J=29.3 Hz); HRMS (ESI-TOF) m/z: calculated for $C_9H_{14}N_3O_{10}P_2S$ $[M-H]^-$: 417.9875, found: 417.9983; Retention time: 4.97 min (Method 2).

Example 36

Preparation of 5'-O-deoxyguanosine triammonium (R)-diphosphoro-α-thioate (Compound ($R_P$)-48)

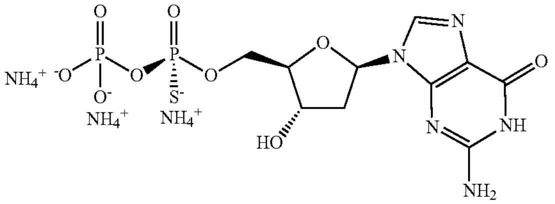

Following the General Procedure A with slight modifications, compound ($R_P$)-48 was obtained from monophosphate precursor compound 7-1 (92 mg, 0.3 mmol), (+)-Ψ* reagent (85 mg, 0.2 mmol) and protected deoxyguanosine compound 18-1 (185 mg, 0.5 mmol). Coupling step was performed using 5.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 30:70) to afford 32 mg of compound ($R_P$)-48 after lyophilization (Yield=33%, d.r.>20:1). Physical state: white amorphous solid. Compound ($R_P$)-48 was characterized by $^{1}H$ NMR (600 MHz, $D_2O$): δ 8.14 (s, 1H), 6.29 (t, J=6.9 Hz, 1H), 4.29-4.26 (m, 1H), 4.21-4.18 (m, 2H), 2.80 (dt, J=13.8, 6.9 Hz, 1H), 2.51 (ddd, J=13.8, 6.9, 3.5 Hz, 1H); $^{13}C$ NMR (150 MHz, $D_2O$): δ 158.8, 153.8, 151.3, 137.7, 116.1, 85.5 (d, J=9.5 Hz), 83.5, 71.3, 65.4 (d, J=6.0 Hz), 38.6; $^{31}P$ NMR (162 MHz, $D_2O$): δ 42.3 (d, J=28.5 Hz), −10.2 (d, J=28.5 Hz); HRMS (ESI-TOF) m/z: calculated for $C_{10}H_{14}N_5O_9P_2S$ $[M-H]^-$: 441.9993, found: 441.9999; Retention time: 9.03 min (Method 2).

Example 37

Preparation of 5'-O-deoxyguanosine triammonium (S)-diphosphoro-α-thioate (Compound ($S_P$)-48)

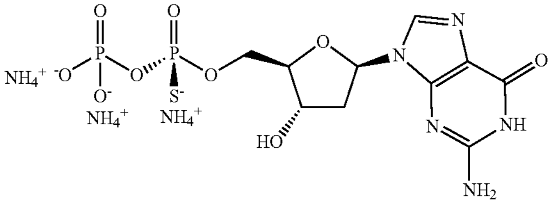

Following the General Procedure A with slight modifications, compound ($S_P$)-48 was obtained from monophosphate precursor compound 7-1 (92 mg, 0.3 mmol), (−)-Ψ* reagent (85 mg, 0.2 mmol) and protected deoxyguanosine compound 18-1 (185 mg, 0.5 mmol). Coupling step was performed using 5.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 30:70) to afford 31 mg of compound ($S_P$)-48 after lyophilization (Yield=31%, d.r.>20:1). Physical state: white amorphous solid. Compound ($S_P$)-48 was characterized by $^1$H NMR (600 MHz, $D_2O$): δ 8.16 (s, 1H), 6.29 (t, J=6.9 Hz, 1H), 4.29-4.26 (m, 1H), 4.23-4.16 (m, 2H), 2.79 (dt, J=13.7, 6.9 Hz, 1H), 2.52 (ddd, J=13.7, 6.9, 3.5 Hz, 1H); $^{13}$C NMR (150 MHz, $D_2O$): δ 158.8, 153.7, 151.2, 137.7, 116.1, 85.5 (d, J=9.4 Hz), 83.6, 71.4, 65.4 (d, J=6.2 Hz), 38.6; $^{31}$P NMR (162 MHz, $D_2O$): δ 42.6 (d, J=29.4 Hz), −10.1 (d, J=29.4 Hz); HRMS (ESI-TOF) m/z: calculated for $C_{10}H_{14}N_5O_9P_2S$ $[M-H]^-$: 441.9993, found: 441.9999; Retention time: 8.52 min (Method 2).

Example 38

Preparation of 5'-O-guanosine triammonium (R)-diphosphoro-α-thioate (Compound ($R_P$)-49)

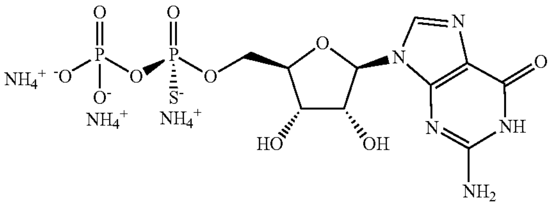

Following the General Procedure A with slight modifications, compound ($R_P$)-49 was obtained from monophosphate precursor compound 7-1 (92 mg, 0.3 mmol), (+)-Ψ* reagent (85 mg, 0.2 mmol) and protected guanosine compound 17-1 (245 mg, 0.5 mmol). Coupling step was performed using 5.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 30:70) to afford 34 mg of compound ($R_P$)-49 after lyophilization (Yield=33%, d.r.>20:1). Physical state: white amorphous solid. Compound ($R_P$)-49 was characterized by $^1$H NMR (600 MHz, $D_2O$): δ 8.18 (s, 1H), 5.92 (d, J=5.6 Hz, 1H), 4.58-4.54 (m, 1H), 4.40-4.34 (m, 1H), 4.29-4.24 (m, 2H); $^{13}$C NMR (150 MHz, $D_2O$): δ 158.9, 153.9, 151.7, 137.7, 116.1, 86.9, 83.7 (d, J=9.7 Hz), 73.9, 70.4, 65.2 (d, J=5.8 Hz); $^{31}$P NMR (162 MHz, $D_2O$): δ 42.3 (d, J=28.2 Hz), −10.2 (d, J=28.2 Hz); HRMS (ESI-TOF) m/z: calculated for $C_{10}H_{14}N_5O_{10}P_2S$ $[M-H]^-$: 457.9942, found: 457.9951; Retention time: 7.60 min (Method 2).

Example 39

Preparation of 5'-O-guanosine triammonium (S)-diphosphoro-α-thioate (Compound ($S_P$)-49)

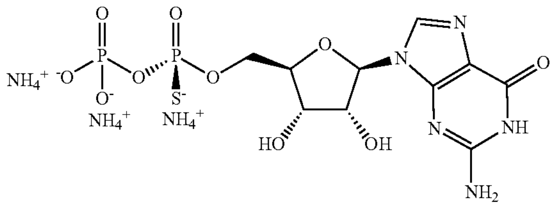

Following the General Procedure A with slight modifications, compound ($S_P$)-49 was obtained from monophosphate precursor compound 7-1 (92 mg, 0.3 mmol), (−)-Ψ* reagent (85 mg, 0.2 mmol) and protected guanosine compound 17-1 (245 mg, 0.5 mmol). Coupling step was performed using 5.0 equiv. of DBU. Deprotection was performed at 40° C. After extraction, the aqueous phase was concentrated to −3 mL, neutralized using 10% aq. AcOH and directly purified by ion-exchange chromatography on DEAE Sephadex (1 M $NH_4HCO_3$/water, from 0:100 to 30:70) to afford 38 mg of the title compound after lyophilization (Yield=37%, d.r.>20:1). Physical state: white amorphous solid. Compound ($S_P$)-49 was characterized by $^1$H NMR (600 MHz, $D_2O$): δ 8.21 (s, 1H), 5.92 (d, J=5.8 Hz, 1H), 4.78-4.75 (m, 1H), 4.57-4.55 (m, 1H), 4.39-4.36 (m, 1H), 4.30-4.23 (m, 2H); $^{13}$C NMR (150 MHz, $D_2O$): δ 158.8, 153.8, 151.6, 137.7, 116.1, 86.9, 83.6 (d, J=9.7 Hz), 73.9, 70.4, 65.1 (d, J=6.1 Hz); $^{31}$P NMR (162 MHz, $D_2O$): δ 42.6 (d, J=27.0 Hz), −10.2 (d, J=27.0 Hz); HRMS (ESI-TOF) m/z: calculated for $C_{10}H_{14}N_5O_{10}P_2S$ $[M-H]^-$: 457.9942, found: 457.9951; Retention time: 6.79 min (Method 2).

Example 40

Preparation of 5'-O-2-thiouridine triammonium (R)-diphosphoro-α-thioate (Compound ($R_P$)-50)

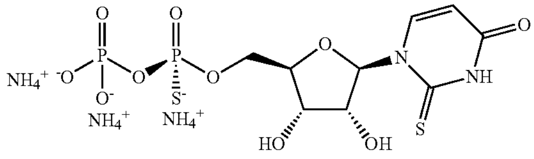

Following the General Procedure A, compound ($R_P$)-50 was obtained from monophosphate precursor compound 7-1 (62 mg, 0.2 mmol), (+)-Ψ* reagent (128 mg, 0.3 mmol) and regioisomeric mixture of protected 2-thiouridine derivatives compounds 16-1 and 30 (286 mg, 0.5 mmol). Deprotection was performed at room temperature. The crude product was purified by ion-exchange chromatography on DEAE Sephadex (1 M $NH_4HCO_3$/water, from 0:100 to 35:65) to afford 32 mg of the title compound after lyophilization (Yield=33%, d.r.>20:1). Physical state: white amorphous solid. Compound ($R_P$)-50 was characterized by $^1$H NMR (600 MHz, $D_2O$): δ 8.26 (d, J=8.2 Hz, 1H), 6.63 (d, J=2.8 Hz, 1H), 6.27 (d, J=8.2 Hz, 1H), 4.46 (dd, J=4.8, 2.8 Hz, 1H), 4.42-4.37 (m, 2H), 4.35-4.28 (m, 2H); $^{13}$C NMR (150

MHz, $D_2O$): δ 175.9, 162.8, 142.3, 106.9, 93.1, 82.7 (d, J=9.7 Hz), 74.6, 68.3, 63.9 (d, J=5.7 Hz); $^{31}P$ NMR (162 MHz, $D_2O$): δ 41.9 (d, J=29.0 Hz), −9.6 (d, J=29.0 Hz); HRMS (ESI-TOF) m/z: calculated for $C_9H_{13}N_2O_{10}P_2S_2$ $[M-H]^-$: 434.9487, found: 434.9483; Retention time: 4.85 min (Method 1).

Example 41

Preparation of 5'-O-2-thiouridine triammonium (S)-diphosphoro-α-thioate (Compound $(S_P)$-50)

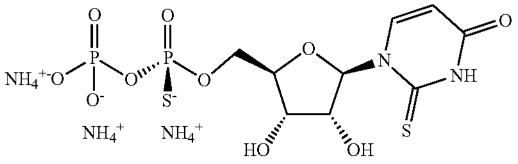

Following the General Procedure A, compound $(S_P)$-50 was obtained from monophosphate precursor compound 7-1 (62 mg, 0.2 mmol), (−)-Ψ* reagent (128 mg, 0.3 mmol) and regioisomeric mixture of protected 2-thiouridine derivatives compounds 16-1 and 30 (286 mg, 0.5 mmol). Deprotection was performed at room temperature. The crude product was purified by ion-exchange chromatography on DEAE Sephadex (1 M $NH_4HCO_3$/water, from 0:100 to 35:65) to afford 33 mg of compound $(S_P)$-50 after lyophilization (Yield=34%, d.r.>20:1). Physical state: white amorphous solid. Compound $(S_P)$-50 was characterized by $^1H$ NMR (600 MHz, $D_2O$): δ 8.30 (d, J=8.1 Hz, 1H), 6.64 (d, J=2.3 Hz, 1H), 6.28 (d, J=8.1 Hz, 1H), 4.46-4.43 (m, 1H), 4.40-4.36 (m, 2H), 4.35-4.28 (m, 2H); $^{13}C$ NMR (150 MHz, $D_2O$): δ 175.9, 162.8, 142.4, 107.0, 93.1, 82.7 (d, J=9.4 Hz), 74.6, 68.4, 63.7 (d, J=6.1 Hz); $^{31}P$ NMR (162 MHz, $D_2O$): δ 42.5 (d, J=28.9 Hz), −10.3 (d, J=28.9 Hz); HRMS (ESI-TOF) m/z: calculated for $C_9H_{13}N_2O_{10}P_2S_2$ $[M-H]^-$: 434.9487, found: 434.9483; Retention time: 3.60 min (Method 1).

FIG. 1 describes LC trace for compound 50.

Example 42

Preparation of 3'-O-thymidine triammonium (R)-diphosphoro-α-thioate (Compound $(R_P)$-51)

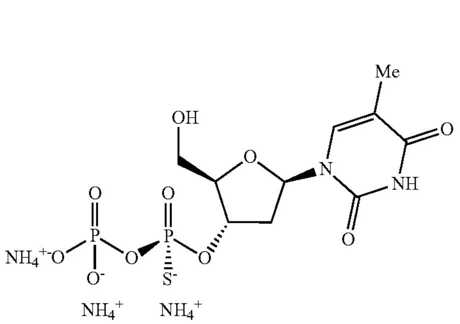

Following the General Procedure A, compound $(R_P)$-51 was obtained from monophosphate precursor compound 7-1 (62 mg, 0.2 mmol), (+)-Ψ* reagent (128 mg, 0.3 mmol) and protected thymidine compound 23 (173 mg, 0.5 mmol). Deprotection was performed at 40° C. The crude product was purified by ion-exchange chromatography on DEAE Sephadex (1 M $NH_4HCO_3$/water, from 0:100 to 20:80) to afford 47 mg of compound $(R_P)$-51 after lyophilization (Yield=50%, d.r.>20:1). Physical state: white amorphous solid. Compound $(R_P)$-51 was characterized by $^1H$ NMR (600 MHz, $D_2O$): δ 7.70 (s, 1H), 6.34 (t, J 6.8 Hz, 1H), 5.05 (ddt, J=10.7, 7.0, 3.8 Hz, 1H), 4.27 (q, J=3.8 Hz, 1H), 3.88 (d, J=3.8 Hz, 2H), 2.63 (ddd, J=14.3, 6.8, 3.8 Hz, 1H), 2.49 (ddd, J=14.3, 7.0, 6.8 Hz, 1H), 1.90 (s, 3H); $^{13}C$ NMR (150 MHz, $D_2O$): δ 166.5, 151.7, 137.6, 111.5, 85.4 (d, J=6.2 Hz), 84.8, 74.6 (d, J=5.7 Hz), 60.7, 37.5 (d, J=3.7 Hz), 11.5; $^{31}P$ NMR (162 MHz, $D_2O$): δ 41.0 (d, J=28.5 Hz), −8.3 (d, J=28.5 Hz); HRMS (ESI-TOF) m/z: calculated for $C_{10}H_{15}N_2O_{10}P_2S$ $[M-H]^-$: 416.9928, found: 416.9926; Retention time: 7.96 min (Method 3).

Example 43

Preparation of 3'-O-thymidine triammonium (S)-diphosphoro-α-thioate (Compound $(S_P)$-51)

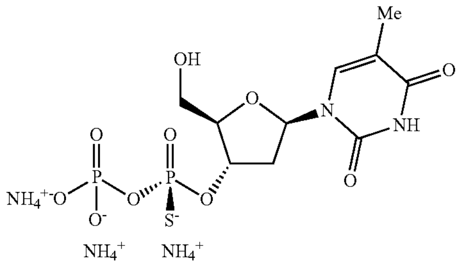

Following the General Procedure A, compound $(S_P)$-51 was obtained from monophosphate precursor compound 7-1 (62 mg, 0.2 mmol), (+)-Ψ* reagent (128 mg, 0.3 mmol) and protected thymidine compound 23 (173 mg, 0.5 mmol). Deprotection was performed at 40° C. The crude product was purified by ion-exchange chromatography on DEAE Sephadex (1 M $NH_4HCO_3$/water, from 0:100 to 20:80) to afford 50 mg of the title compound after lyophilization (Yield=53%, d.r.>20:1). Physical state: white amorphous solid. Compound $(S_P)$-51 was characterized by $^1H$ NMR (600 MHz, $D_2O$): δ 7.69 (d, J=1.2 Hz, 1H), 6.35 (t, J 7.0 Hz, 1H), 5.05 (ddt, J=10.4, 7.0, 3.6 Hz, 1H), 4.26 (dt, J=4.6, 3.6 Hz, 1H), 3.90 (dd, J=12.7, 3.6 Hz, 1H), 3.87 (dd, J=12.7, 4.6 Hz, 1H), 2.65 (ddd, J=14.3, 7.0, 3.6 Hz, 1H), 2.46 (dt, J=14.3, 7.0 Hz, 1H), 1.90 (d, J=1.2 Hz, 3H); $^{13}C$ NMR (150 MHz, $D_2O$): δ 166.5, 151.7, 137.6, 111.5, 85.6 (d, J=6.5 Hz), 85.0, 75.1 (d, J=6.1 Hz), 60.9, 37.4 (d, J=3.5 Hz), 11.5; $^{31}P$ NMR (162 MHz, $D_2O$): δ 41.7 (d, J=27.8 Hz), −10.2 (d, J=27.8 Hz); HRMS (ESI-TOF) m/z: calculated for $C_{10}H_{15}N_2O_{10}P_2S$ $[M-H]^-$: 416.9928, found: 416.9926; Retention time: 8.22 min (Method 3).

Example 44

Preparation of 5'-O-adenosine triammonium diphosphoro-β-thioate (Compound 52)

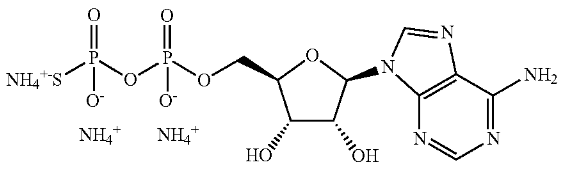

Following the General Procedure A with slight modifications, compound 52 was obtained from protected adenosine monophosphate compound 32 (152 mg, 0.2 mmol), (+)-Ψ* reagent (128 mg, 0.3 mmol) and 4-(hydroxymethyl)phenyl benzoate (114 mg, 0.5 mmol). The synthesis of 4-(hydroxymethyl)phenyl benzoate is disclosed in Yang et al., Angew. Chem. Int. Ed. 2016, 55, 9080-9083. Deprotection was performed at 40° C. The crude product was purified by ion-exchange chromatography on DEAE Sephadex (1 M $NH_4HCO_3$/water, from 0:100 to 40:60) to afford 42 mg of the title compound after lyophilization (Yield=43%). Physical state: white amorphous solid. Compound 52 was characterized by $^1$H NMR (600 MHz, $D_2O$): δ 8.55 (s, 1H), 8.19 (s, 1H), 6.11 (d, J=5.5 Hz, 1H), 4.68-4.66 (m, 1H), 4.40-4.38 (m, 1H), 4.30 (ddd, J=11.5, 6.0, 2.9 Hz, 1H), 4.23 (dt, J=11.5, 3.4 Hz, 1H); $^{13}$C NMR (150 MHz, $D_2O$): δ 155.3, 152.5, 148.9, 140.0, 118.4, 86.9, 83.9 (d, J=8.8 Hz), 74.4, 70.2, 64.7 (d, J=4.6 Hz); $^{31}$P NMR (162 MHz, $D_2O$): δ 33.5 (d, J=30.6 Hz), −11.5 (d, J=30.6 Hz); HRMS (ESI-TOF) m/z: calculated for $C_{10}H_{14}N_5O_9P_2S$ $[M-H]^-$: 441.9987, found: 441.9981; Retention time: 3.34 min (Method 1).

Example 45

Preparation of 5'-O-azidothymidine triammonium (R)-triphosphoro-α-thioate (Compound ($R_P$)-53)

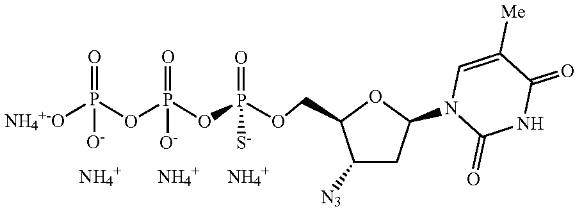

Following the General Procedure B, compound ($R_P$)-53 was obtained from diphosphate precursor compound 20-1 (169 mg, 0.2 mmol), (+)-Ψ* reagent (112 mg, 0.26 mmol) and azidothymidine (107 mg, 0.4 mmol). Deprotection was performed at room temperature. The crude product was purified by ion-exchange chromatography on DEAE Sephadex (1 M $NH_4HCO_3$/water, from 0:100 to 30:70) to afford 67 mg of compound ($R_P$)-53 after lyophilization (Yield=57%, d.r.>20:1). Physical state: white amorphous solid. Compound ($R_P$)-53 was characterized by $^1$H NMR (600 MHz, $D_2O$): δ 7.80 (s, 1H), 6.29 (t, J=6.9 Hz, 1H), 4.64 (dt, J=6.7, 3.4 Hz, 1H), 4.34-4.25 (m, 3H), 2.54-2.45 (m, 2H), 1.96 (s, 3H); $^{13}$C NMR (150 MHz, $D_2O$): δ 166.6, 151.7, 137.3, 111.9, 84.8, 82.9 (d, J=9.8 Hz), 66.1 (d, J=6.1 Hz), 61.1, 36.3, 11.7; $^{31}$P NMR (162 MHz, $D_2O$): δ 42.3 (d, J=27.7 Hz), −9.1 (d, J=19.7 Hz), −24.2 (dd, J=27.7, 19.7 Hz); HRMS (ESI-TOF) m/z: calculated for $C_{10}H_{15}N_5O_{12}P_3S$ $[M-H]^-$: 521.9651, found: 521.9650; Retention time: 11.27 min (Method 1).

Example 46

Preparation of 5'-O-azidothymidine triammonium (S)-triphosphoro-α-thioate (Compound ($S_P$)-53)

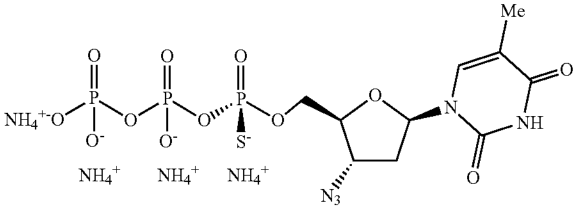

Following the General Procedure B, compound ($S_P$)-53 was obtained from diphosphate precursor compound 20-1 (169 mg, 0.2 mmol), (−)-Ψ* reagent (112 mg, 0.26 mmol) and azidothymidine (107 mg, 0.4 mmol). Deprotection was performed at room temperature. The crude product was purified by ion-exchange chromatography on DEAE Sephadex (1 M $NH_4HCO_3$/water, from 0:100 to 30:70) to afford 70 mg of compound ($S_P$)-53 after lyophilization (Yield=59%, d.r.>20:1). Physical state: white amorphous solid. Compound ($S_P$)-53 was characterized by $^1$H NMR (600 MHz, $D_2O$): δ 7.78 (s, 1H), 6.28 (t, J=6.9 Hz, 1H), 4.61 (dt, J=7.1, 3.7 Hz, 1H), 4.34-4.23 (m, 3H), 2.55-2.45 (m, 2H), 1.96 (s, 3H); $^{13}$C NMR (150 MHz, $D_2O$): δ 166.6, 151.7, 137.3, 111.8, 84.9, 82.8 (d, J=9.8 Hz), 65.7 (d, J=6.4 Hz), 60.8, 36.2, 11.7; $^{31}$P NMR (162 MHz, $D_2O$): δ 43.3 (d, J=26.8 Hz), −9.1 (d, J=20.0 Hz), −23.6 (dd, J=26.8, 20.0 Hz); HRMS (ESI-TOF) m/z: calculated for $C_{10}H_{15}N_5O_{12}P_3S$ $[M-H]^-$: 521.9651, found: 521.9650; Retention time: 10.43 min (program: Method 1).

Example 47

Preparation of 5'-O-thymidine triammonium (R)-triphosphoro-α-thioate (Compound ($R_P$)-54)

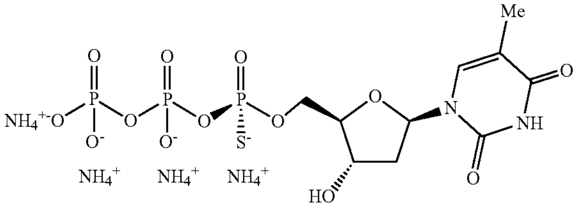

Following the General Procedure B, compound ($R_P$)-54 was obtained from diphosphate precursor compound 20-1 (169 mg, 0.2 mmol), (+)-Ψ* reagent (112 mg, 0.26 mmol) and protected thymidine compound 10-1 (180 mg, 0.4 mmol). Deprotection was performed at room temperature. The crude product was purified by ion-exchange chromatography on DEAE Sephadex (1 M $NH_4HCO_3$/water, from 0:100 to 30:70) to afford 54 mg of compound ($R_P$)-54 after lyophilization (Yield=48%, d.r.>20:1). Physical state: white amorphous solid. Compound ($R_P$)-54 was characterized by $^1H$ NMR (600 MHz, $D_2O$): δ 7.80 (s, 1H), 6.35 (t, J=6.9 Hz, 1H), 4.70 (dt, J=6.5, 3.4 Hz, 1H), 4.30-4.26 (m, 2H), 4.23-4.20 (m, 1H), 2.41 (ddd, J 13.9, 7.5, 6.9 Hz, 1H), 2.35 (ddd, J=13.9, 6.9, 3.6 Hz, 1H), 1.96 (s, 3H); $^{13}C$ NMR (150 MHz, $D_2O$): δ 166.6, 151.8, 137.4, 111.8, 85.3 (d, J=9.6 Hz), 84.9, 70.8, 65.7 (d, J=6.2 Hz), 38.5, 11.7; $^{31}P$ NMR (162 MHz, $D_2O$): δ 42.9 (d, J=28.2 Hz), −8.2 (d, J=20.7 Hz), −23.5 (dd, J=28.2, 20.7 Hz); HRMS (ESI-TOF) m/z: calculated for $C_{10}H_{16}N_2O_{13}P_3S$ $[M-H]^-$: 496.9586, found: 496.9590; Retention time: 5.87 min (Method 1).

Example 48

Preparation of 5'-O-thymidine triammonium (S)-triphosphoro-α-thioate (Compound ($S_P$)-54)

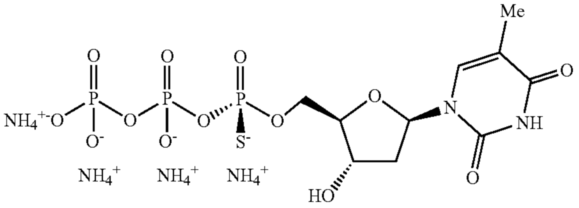

Following the General Procedure B, compound ($S_P$)-54 was obtained from diphosphate precursor compound 20-1 (169 mg, 0.2 mmol), (−)-Ψ* reagent (112 mg, 0.26 mmol) and protected thymidine compound 10-1 (180 mg, 0.4 mmol). Deprotection was performed at room temperature. The crude product was purified by ion-exchange chromatography on DEAE Sephadex (1 M $NH_4HCO_3$/water, from 0:100 to 30:70) to afford 52 mg of compound ($S_P$)-54 after lyophilization (Yield=46%, d.r.>20:1). Physical state: white amorphous solid. Compound ($S_P$)-54 was characterized by $^1H$ NMR (600 MHz, $D_2O$): δ 7.77 (s, 1H), 6.36 (t, J=6.9 Hz, 1H), 4.67 (dt, J=6.2, 3.2 Hz, 1H), 4.29 (ddd, J=11.9, 7.6, 4.0 Hz, 2H), 4.25-4.19 (m, 2H), 2.41 (dt, J 13.9, 6.9 Hz, 1H), 2.35 (ddd, J=13.9, 6.9, 3.2 Hz, 1H), 1.96 (s, 3H); $^{13}C$ NMR (150 MHz, $D_2O$): δ 166.6, 151.8, 137.4, 111.8, 85.3 (d, J=9.6 Hz), 85.0, 70.9, 65.6 (d, J=6.7 Hz), 38.4, 11.7; $^{31}P$ NMR (162 MHz, $D_2O$): δ 42.6 (d, J=26.7 Hz), −7.1 (d, J=20.0 Hz), −23.3 (dd, J=26.7, 20.0 Hz); HRMS (ESI-TOF) m/z: calculated for $C_{10}H_{16}N_2O_{13}P_3S$ $[M-H]^-$: 496.9586, found: 496.9590; Retention time: 4.83 min (Method 1).

Example 49

Preparation of 5'-O-uridine triammonium (R)-triphosphoro-α-thioate (Compound ($R_P$)-55)

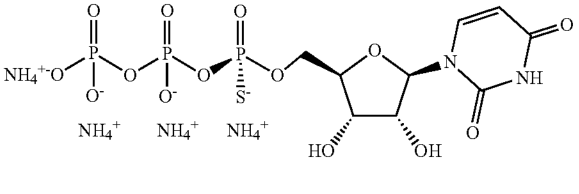

Following the General Procedure B, compound ($R_P$)-55 was obtained from diphosphate precursor compound 20-1 (169 mg, 0.2 mmol), (+)-Ψ* reagent (112 mg, 0.26 mmol) and protected uridine compound 11-1 (222 mg, 0.4 mmol). Deprotection was performed at room temperature. The crude product was purified by ion-exchange chromatography on DEAE Sephadex (1 M $NH_4HCO_3$/water, from 0:100 to 30:70) to afford 53 mg of the title compound after lyophilization (Yield=47%, d.r.>20:1). Physical state: white amorphous solid. Compound ($R_P$)-55 was characterized by $^1H$ NMR (600 MHz, $D_2O$): δ 8.04 (d, J=8.1 Hz, 1H), 5.99 (d, J=5.1 Hz, 1H), 5.97 (d, J=8.1 Hz, 1H), 4.46-4.43 (m, 1H), 4.41 (t, J=5.1 Hz, 1H), 4.34-4.27 (m, 3H); $^{13}C$ NMR (150 MHz, $D_2O$): δ 166.2, 151.8, 141.9, 102.6, 88.2, 83.2 (d, J=9.7 Hz), 73.8, 69.6, 65.3 (d, J=5.9 Hz); $^{31}P$ NMR (162 MHz, $D_2O$): δ 43.1 (d, J=27.7 Hz), −8.9 (d, J=20.0 Hz), −23.6 (dd, J=27.7, 20.0 Hz); HRMS (ESI-TOF) m/z: calculated for $C_9H_{14}N_2O_{14}P_3S$ $[M-H]^-$: 498.9379, found: 498.9383; Retention time: 3.67 min (Method 1).

Example 50

Preparation of 5'-O-uridine triammonium (S)-triphosphoro-α-thioate (Compound ($S_P$)-55)

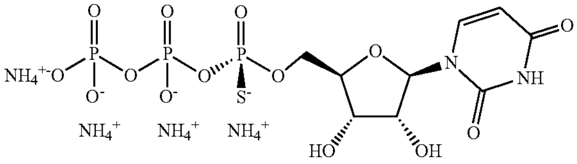

Following the General Procedure B, compound ($S_P$)-55 was obtained from diphosphate precursor compound 20-1 (169 mg, 0.2 mmol), (+)-Ψ* reagent (112 mg, 0.26 mmol) and protected uridine compound 11-1 (222 mg, 0.4 mmol). Deprotection was performed at room temperature. The crude product was purified by ion-exchange chromatography on DEAE Sephadex (1 M $NH_4HCO_3$/water, from 0:100 to 30:70) to afford 52 mg of compound ($S_P$)-55 after lyophilization (Yield=46%, d.r.>20:1). Physical state: white amorphous solid. Compound ($S_P$)-55 was characterized by $^1H$ NMR (600 MHz, $D_2O$): δ 8.10 (d, J=8.1 Hz, 1H), 6.00 (d, J=5.1 Hz, 1H), 5.98 (d, J=8.1 Hz, 1H), 4.45-4.43 (m, 1H), 4.44 (t, J=5.1 Hz, 1H), 4.33-4.27 (m, 3H); $^{13}C$ NMR (150 MHz, $D_2O$): δ 166.3, 151.8, 142.1, 102.6, 88.3, 83.2 (d, J=9.5 Hz), 73.8, 69.6, 64.8 (d, J=6.6 Hz); $^{31}P$ NMR (162 MHz, $D_2O$): δ 43.4 (d, J=27.1 Hz), −8.7 (d, J=19.9 Hz), −23.5 (dd, J=27.1, 19.9 Hz); HRMS (ESI-TOF) m/z: calculated for $C_9H_{14}N_2O_{14}P_3S$ $[M-H]^-$: 498.9379, found: 498.9383; Retention time: 2.91 min (Method 1).

Figure 2:
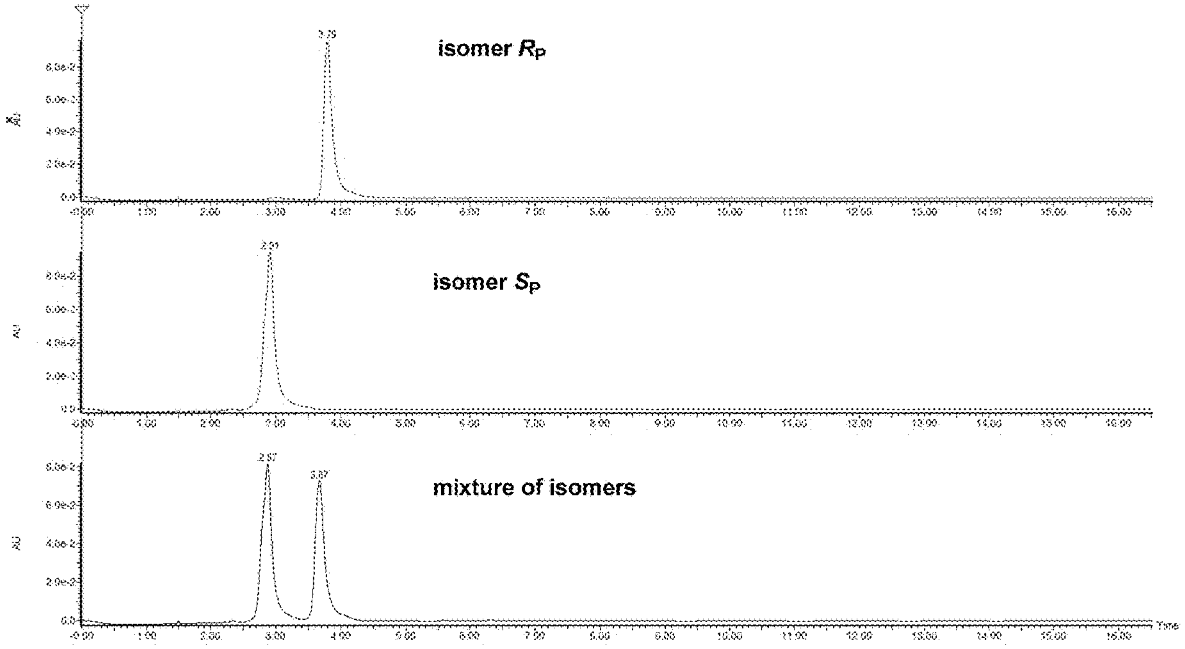
FIG. 2 depicts a representative LC trace for compound 55 as an illustration of an LC trace demonstrating diastereoisomeric purity for a triphosphorothioate of the disclosure.

FIG. 2 describes LC trace for compound 55.

Example 51

Preparation of 5'-O-deoxyadenosine triammonium (R)-triphosphoro-α-thioate (Compound ($R_P$)-56)

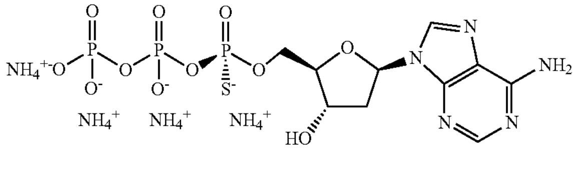

Following the General Procedure B, compound ($R_P$)-56 was obtained from diphosphate precursor compound 20-1 (169 mg, 0.2 mmol), (+)-Ψ* reagent (112 mg, 0.26 mmol) and protected deoxyadenosine compound 13-1 (225 mg, 0.4 mmol). Deprotection was performed at 40° C. The crude product was purified by ion-exchange chromatography on DEAE Sephadex (1 M $NH_4HCO_3$/water, from 0:100 to 40:60) to afford 54 mg of compound ($R_P$)-56 after lyophilization (Yield=47%, d.r.>20:1). Physical state: white amorphous solid. Compound ($R_P$)-56 was characterized by $^1$H NMR (600 MHz, $D_2O$): δ 8.51 (s, 1H), 8.17 (s, 1H), 6.46 (t, J=6.7 Hz, 1H), 4.34-4.30 (m, 1H), 4.27 (ddd, J=10.9, 7.2, 3.5 Hz, 1H), 4.22 (ddd, J=10.9, 6.5, 3.6 Hz, 1H), 2.82 (dt, J=13.6, 6.7 Hz, 1H), 2.60 (ddd, J=13.6, 6.7, 3.8 Hz, 1H); $^{13}$C NMR (150 MHz, $D_2O$): δ 155.3, 152.5, 148.5, 140.0, 118.4, 85.6 (d, J=9.5 Hz), 83.6, 71.0, 65.6 (d, J=6.2 Hz), 39.1; $^{31}$P NMR (162 MHz, $D_2O$): δ 43.2 (d, J=27.8 Hz), −8.5 (d, J=20.2 Hz), −23.5 (dd, J=27.8, 20.2 Hz); HRMS (ESI-TOF) m/z: calculated for $C_{10}H_{15}N_5O_{11}P_3S$ $[M-H]^-$: 505.9702, found: 505.9688; Retention time: 6.63 min (Method 1).

Example 52

Preparation of 5'-O-deoxyadenosine triammonium (S)-triphosphoro-α-thioate (Compound ($S_P$)-56)

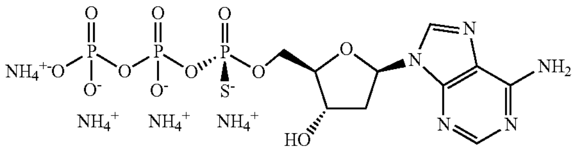

Following the General Procedure B, compound ($S_P$)-56 was obtained from diphosphate precursor compound 20-1 (169 mg, 0.2 mmol), (−)-Ψ* reagent (112 mg, 0.26 mmol) and protected deoxyadenosine compound 13-1 (225 mg, 0.4 mmol). Deprotection was performed at 40° C. The crude product was purified by ion-exchange chromatography on DEAE Sephadex (1 M $NH_4HCO_3$/water, from 0:100 to 40:60) to afford 59 mg of the title compound after lyophilization (Yield=51%, d.r.>20:1). Physical state: white amorphous solid. Compound ($S_P$)-56 was characterized by $^1$H NMR (600 MHz, $D_2O$): δ 8.50 (s, 1H), 8.11 (s, 1H), 6.42 (t, J=6.7 Hz, 1H), 4.32-4.24 (m, 2H), 4.21-4.17 (m, 1H), 2.80 (dt, J=13.6, 6.7 Hz, 1H), 2.59 (ddd, J=13.6, 6.7, 3.8 Hz, 1H); $^{13}$C NMR (150 MHz, $D_2O$): δ 155.2, 152.3, 148.4, 140.0, 118.3, 85.6 (d, J=9.6 Hz), 83.6, 71.0, 65.5 (d, J=6.4 Hz), 39.0; $^{31}$P NMR (162 MHz, $D_2O$): δ 43.4 (d, J=27.4 Hz), −7.4 (d, J=20.7 Hz), −23.2 (dd, J=27.4, 20.7 Hz); HRMS (ESI-TOF) m/z: calculated for $C_{10}H_{15}N_5O_{11}P_3S$ $[M-H]^-$: 505.9702, found: 505.9688; Retention time: 6.05 min (Method 1).

Example 53

Preparation of 5'-O-adenosine triammonium (R)-triphosphoro-α-thioate (Compound ($R_P$)-57)

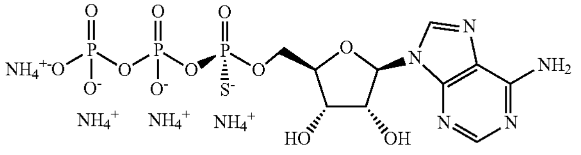

Following the General Procedure B, compound ($R_P$)-57 was obtained from diphosphate precursor compound 20-1 (169 mg, 0.2 mmol), (+)-Ψ* reagent (112 mg, 0.26 mmol) and protected adenosine compound 14-1 (273 mg, 0.4 mmol). Deprotection was performed at 40° C. The crude product was purified by ion-exchange chromatography on DEAE Sephadex (1 M $NH_4HCO_3$/water, from 0:100 to 40:60) to afford 59 mg of compound ($R_P$)-57 after lyophilization (Yield=50%, d.r.>20:1). Physical state: white amorphous solid. Compound ($R_P$)-57 was characterized by $^1$H NMR (600 MHz, $D_2O$): δ 8.58 (s, 1H), 8.21 (s, 1H), 6.12 (d, J=5.9 Hz, 1H), 4.62 (dd, J=5.1, 3.6 Hz, 1H), 4.43-4.41 (m, 1H), 4.34 (ddd, J=10.4, 7.5, 2.7 Hz, 1H), 4.28 (ddd, J=11.9, 6.1, 2.7 Hz, 1H); $^{13}$C NMR (150 MHz, $D_2O$): δ 155.5, 152.7, 149.0, 140.0, 118.5, 86.7, 83.9 (d, J=9.7 Hz), 74.3, 70.4, 65.5 (d, J=5.8 Hz); $^{31}$P NMR (162 MHz, $D_2O$): δ 43.4 (d, J=27.6 Hz), −10.9 (d, J=19.6 Hz), −24.1 (dd, J=27.6, 19.6 Hz); HRMS (ESI-TOF) m/z: calculated for $C_{10}H_{15}N_5O_{12}P_3S$ $[M-H]^-$: 521.9651, found: 521.9662; Retention time: 5.85 min (Method 1).

Example 54

Preparation of 5'-O-adenosine triammonium (S)-triphosphoro-α-thioate (Compound ($S_P$)-57)

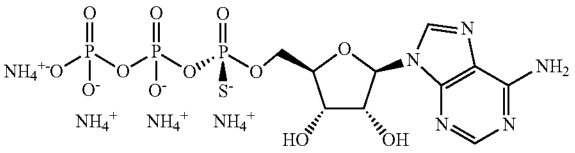

Following the General Procedure B, compound ($S_P$)-57 was obtained from diphosphate precursor compound 20-1 (169 mg, 0.2 mmol), (−)-Ψ* reagent (112 mg, 0.26 mmol) and protected adenosine compound 14-1 (273 mg, 0.4 mmol). Deprotection was performed at 40° C. The crude product was purified by ion-exchange chromatography on DEAE Sephadex (1 M $NH_4HCO_3$/water, from 0:100 to 40:60) to afford 61 mg of compound ($S_P$)-57 after lyophilization (Yield=52%, d.r.>20:1). Physical state: white amorphous solid. Compound ($S_P$)-57 was characterized by $^1$H NMR (600 MHz, $D_2O$): δ 8.63 (s, 1H), 8.18 (s, 1H), 6.12 (d, J=5.7 Hz, 1H), 4.62-4.59 (m, 1H), 4.43-4.40 (m, 1H), 4.35 (ddd, J=11.0, 7.7, 3.0 Hz, 1H), 4.28 (ddd, J=11.7, 5.5, 3.0 Hz, 1H); $^{13}$C NMR (150 MHz, $D_2O$): δ 155.4, 152.6, 148.9, 140.1, 118.4, 86.8, 83.8 (d, J=9.5 Hz), 74.3, 70.4, 65.1 (d, J=6.5 Hz); $^{31}$P NMR (162 MHz, $D_2O$): δ 43.4 (d, J=26.9 Hz), −8.5 (d, J=20.1 Hz), −23.5 (dd, J=26.9, 20.1 Hz); HRMS (ESI-TOF) m/z: calculated for $C_{10}H_{15}N_5O_{12}P_3S$ $[M-H]^-$: 521.9651, found: 521.9662; Retention time: 4.52 min (Method 1).

Example 55

Preparation of 5'-O-deoxycytidine triammonium (R)-triphosphoro-α-thioate (Compound ($R_P$)-58)

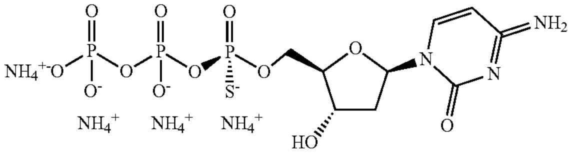

Following the General Procedure B with slight modifications, compound ($R_P$)-58 was obtained from diphosphate precursor compound 20-1 (169 mg, 0.2 mmol), (+)-Ψ* reagent (112 mg, 0.26 mmol) and protected deoxycytidine compound 12-1 (174 mg, 0.4 mmol). Coupling step was performed using 8.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 40:60) to afford 40 mg of compound ($R_P$)-58 after lyophilization (Yield=36%, d.r.>20:1). Physical state: white amorphous solid. Compound ($R_P$)-58 was characterized by $^1H$ NMR (600 MHz, $D_2O$) δ 8.02 (d, J=7.6 Hz, 1H), 6.33 (t, J=6.7 Hz, 1H), 6.14 (d, J=7.6 Hz, 1H), 4.66-4.62 (m, 1H), 4.30-4.24 (m, 2H), 4.24-4.19 (m, 1H), 2.44-2.38 (m, 1H), 2.33 (dt, J=13.9, 6.7, 1H); $^{13}C$ NMR (150 MHz, $D_2O$): δ 166.0, 157.4, 141.8, 96.5, 85.8, 85.3 (d, J=9.6 Hz), 70.4, 65.4 (d, J=6.0 Hz), 39.3; $^{31}P$ NMR (162 MHz, $D_2O$) δ 43.1 (d, J=27.4 Hz), −8.1 (d, J=20.4 Hz), −23.4 (dd, J=27.4, 20.4 Hz); HRMS (ESI-TOF) m/z: calculated for $C_9H_{15}N_3O_{12}P_3S$ $[M-H]^-$: 481.9589, found: 481.9575; Retention time: 7.58 min (Method 2).

Example 56

Preparation of 5'-O-deoxycytidine triammonium (S)-triphosphoro-α-thioate (Compound ($S_P$)-58)

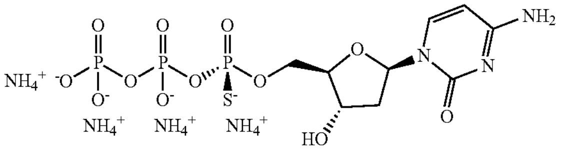

Following the General Procedure B with slight modifications, compound ($S_P$)-58 was obtained from diphosphate precursor compound 20-1 (169 mg, 0.2 mmol), (−)-Ψ* reagent (112 mg, 0.26 mmol) and protected deoxycytidine compound 12-1 (174 mg, 0.4 mmol). Coupling step was performed using 8.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 40:60) to afford 41 mg of compound ($S_P$)-58 after lyophilization (Yield=37%, d.r.>20:1). Physical state: white amorphous solid. Compound ($S_P$)-58 was characterized by $^1H$ NMR (600 MHz, $D_2O$) δ 8.07 (d, J=7.6 Hz, 1H), 6.34 (t, J=6.6 Hz, 1H), 6.16 (d, J=7.6 Hz, 1H), 4.64 (dt, J=6.8, 3.6 Hz, 1H), 4.31-4.21 (m, 3H), 2.42 (ddd, J=14.1, 6.6, 4.0 Hz, 1H), 2.33 (dt, J=14.1, 6.6, 1H); $^{13}C$ NMR (150 MHz, $D_2O$): δ 165.7, 156.9, 142.1, 96.5, 86.0, 85.4 (d, J=9.7 Hz), 70.7, 65.4 (d, J=6.3 Hz), 39.4; $^{31}P$ NMR (162 MHz, $D_2O$): δ 43.4 (d, J=27.1 Hz), −9.9 (d, J=19.9 Hz), −23.9 (dd, J=27.1, 19.9 Hz); HRMS (ESI-TOF) m/z: calculated for $C_9H_{15}N_3O_{12}P_3S$ $[M-H]^-$: 481.9589, found: 481.9575; Retention time: 6.66 min (Method 2).

Example 57

Preparation of 5'-O-cytidine trisodium (R)-triphosphoro-α-thioate (Compound ($R_P$)-59)

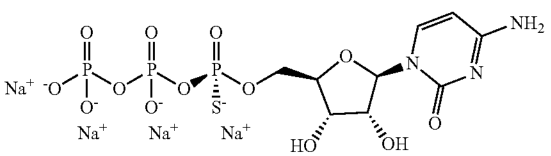

Following the General Procedure B with slight modifications, compound ($R_P$)-59 was obtained from diphosphate precursor compound 20-1 (169 mg, 0.2 mmol), (+)-Ψ* reagent (112 mg, 0.26 mmol) and protected cytidine compound 15-1 (222 mg, 0.4 mmol). Coupling step was performed using 8.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 45 mg of compound ($R_P$)-59, after drying under high vacuum. (Yield=38%, d.r.>20:1). Physical state: white amorphous solid. Compound ($R_P$)-59 was characterized by $^1H$ NMR (600 MHz, $D_2O$): δ 8.06 (d, J=7.6 Hz, 1H), 6.15 (d, J=7.6 Hz, 1H), 6.01 (d, J=4.3 Hz, 1H), 4.47 (t, J=5.2 Hz, 1H), 4.36 (t, J=4.7 Hz, 1H), 4.36-4.32 (m, 2H), 4.31-4.28 (m, 1H); $^{13}C$ NMR (150 MHz, $D_2O$): δ 166.2, 157.8, 141.7, 96.6, 89.0, 82.6 (d, J=9.7 Hz), 74.2, 69.1, 64.9 (d, J=5.6 Hz); $^{31}P$ NMR (162 MHz, $D_2O$): δ 42.8 (d, J=27.9 Hz), −5.8 (d, J=20.2 Hz), −22.5 (dd, J=27.9, 20.2 Hz); HRMS (ESI-TOF) m/z: calculated for $C_9H_{15}N_3O_{13}P_3S$ $[M-H]^-$: 497.9538, found: 497.9533; Retention time: 6.81 min (Method 2).

Example 58

Preparation of 5'-O-cytidine trisodium (S)-triphosphoro-α-thioate (Compound ($S_P$)-59)

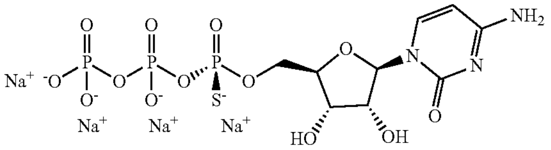

Following the General Procedure B with slight modifications compound ($S_P$)-59 was obtained from diphosphate precursor compound 20-1 (169 mg, 0.2 mmol), (−)-Ψ* reagent (112 mg, 0.26 mmol) and protected cytidine compound 15-1 (222 mg, 0.4 mmol). Coupling step was performed using 8.0 equiv. of DBU. Deprotection was performed at 40° C. The crude product after work-up was neutralized using 10% aq. AcOH and purified by ion-exchange chromatography on DEAE Sephadex (1 M $NH_4HCO_3$/water, from 0:100 to 40:60) followed by reverse-phase chromatography on C18-silica gel (1 M aq. TEAA/

MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 47 mg of compound ($S_P$)-59 after drying under high vacuum (Yield=40%, d.r.>20:1). Physical state: white amorphous solid. Compound ($S_P$)-59 was characterized by $^1H$ NMR (600 MHz, $D_2O$): δ 8.13 (d, J=7.6 Hz, 1H), 6.17 (d, J=7.6 Hz, 1H), 6.02 (d, J=4.3 Hz, 1H), 4.45 (t, J=5.2 Hz, 1H), 4.37-4.32 (m, 3H), 4.30 (dt, J=5.2, 2.5 Hz, 1H); $^{13}C$ NMR (150 MHz, $D_2O$): δ 166.2, 157.8, 141.9, 96.7, 89.1, 82.7 (d, J=9.7 Hz), 74.3, 69.2, 64.4 (d, J=5.9 Hz); $^{31}P$ NMR (162 MHz, $D_2O$): δ 43.2 (d, J=27.1 Hz), −8.7 (d, J=19.3 Hz), −23.5 (dd, J=27.1, 19.3 Hz); HRMS (ESI-TOF) m/z: calculated for $C_9H_{15}N_3O_{13}P_3S$ $[M-H]^-$: 497.9538, found: 497.9533; Retention time: 5.79 min (Method 2).

Example 59

Preparation of 5'-O-deoxyguanosine trisodium (R)-triphosphoro-α-thioate (Compound ($R_P$)-60)

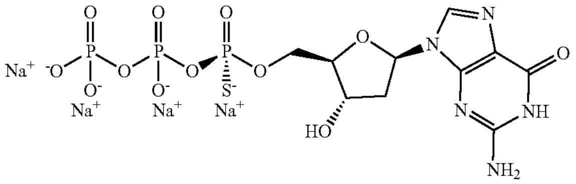

Following the General Procedure B with slight modifications, compound ($R_P$)-60 was obtained from diphosphate precursor compound 20-1 (169 mg, 0.2 mmol), (+)-Ψ* reagent (112 mg, 0.26 mmol) and protected deoxyguanosine compound 18-1 (148 mg, 0.4 mmol). Coupling step was performed using 8.0 equiv. of DBU. Deprotection was performed at 40° C. After extraction, the aqueous phase was concentrated to −3 mL, neutralized using 10% aq. AcOH and directly purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 35 mg of compound ($R_P$)-60 after drying under high vacuum (Yield=29%, d.r.>20:1). Physical state: white amorphous solid. Compound ($R_P$)-60 was characterized by $^1H$ NMR (600 MHz, $D_2O$) δ 8.16 (s, 1H), 6.32 (t, J=6.8 Hz, 1H), 4.31-4.28 (m, 1H), 4.27-4.23 (m, 2H), 2.83 (dt, J=13.7, 6.8 Hz, 1H), 2.51 (ddd, J=13.7, 6.8, 3.4 Hz, 1H); $^{13}C$ NMR (150 MHz, $D_2O$) δ 159.0, 153.8, 151.4, 137.8, 116.1, 85.6 (d, J=9.6 Hz), 83.6, 71.2, 65.7 (d, J=6.1 Hz), 38.6; $^{31}P$ NMR (162 MHz, $D_2O$) δ 43.3 (d, J=27.3 Hz), −5.2 (d, J=19.2 Hz), −21.7 (dd, J=27.3, 19.2 Hz); HRMS (ESI-TOF) m/z: calculated for $C_{10}H_{15}N_5O_{11}P_3S$ $[M-H]^-$: 505.9702, found: 505.9688; Retention time: 9.78 min (Method 2).

Example 60

Preparation of 5'-O-deoxyguanosine trisodium (S)-triphosphoro-α-thioate (Compound ($S_P$)-60)

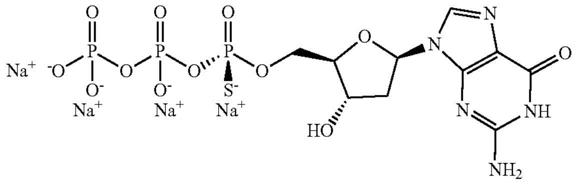

Following the General Procedure B with slight modifications, compound ($S_P$)-60 was obtained from diphosphate precursor compound 20-1 (169 mg, 0.2 mmol), (−)-Ψ* reagent (112 mg, 0.26 mmol) and protected deoxyguanosine compound 18-1 (148 mg, 0.4 mmol). Coupling step was performed using 8.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 39 mg of compound ($S_P$)-60 after drying under high vacuum (Yield=32%, d.r.>20:1). Physical state: white amorphous solid. Compound ($S_P$)-60 was characterized by $^1H$ NMR (600 MHz, $D_2O$) δ 8.18 (s, 1H), 6.30 (t, J=6.8 Hz, 1H), 4.83-4.79 (m, 1H), 4.31-4.21 (m, 3H), 2.81 (dt, J=13.7, 6.8 Hz, 1H), 2.52 (ddd, J=13.7, 6.8, 3.7 Hz, 1H); $^{13}C$ NMR (150 MHz, $D_2O$) δ 159.1, 153.9, 151.3, 137.9, 116.2, 85.6 (d, J=9.4 Hz), 83.6, 71.1, 65.6 (d, J=6.3 Hz), 38.6; $^{31}P$ NMR (162 MHz, $D_2O$) δ 43.4 (d, J=27.5 Hz), −5.8 (d, J=20.1 Hz), −22.4 (dd, J=27.5, 20.1 Hz); HRMS (ESI-TOF) m/z: calculated for $C_{10}H_{15}N_5O_{11}P_3S$ $[M-H]^-$: 505.9702, found: 505.9688; Retention time: 9.17 min (Method 2).

Example 61

Preparation of 5'-O-guanosine trisodium (R)-triphosphoro-α-thioate (Compound ($R_P$)-61)

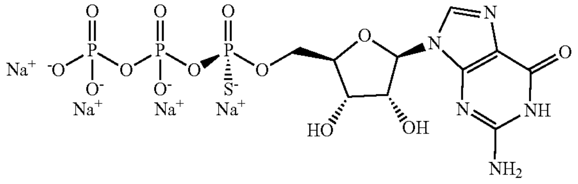

Following the General Procedure B with slight modifications, compound ($R_P$)-61 was obtained from diphosphate precursor compound 20-1 (169 mg, 0.2 mmol), (+)-Ψ* reagent (112 mg, 0.26 mmol) and protected guanosine compound 17-1 (196 mg, 0.4 mmol). Coupling step was performed using 8.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 39 mg of compound ($R_P$)-61 after drying under high vacuum (Yield=31%, d.r.>20:1). Physical state: white amorphous solid. Compound ($R_P$)-61 was characterized by $^1$H NMR (600 MHz, $D_2O$): δ 8.20 (s, 1H), 5.93 (d, J=5.9 Hz, 1H), 4.64-4.62 (m, 1H), 4.41-4.37 (m, 1H), 4.33 (ddd, J=10.8, 7.9, 2.7 Hz, 1H), 4.27 (ddd, J=10.8, 5.9, 3.0 Hz, 1H); $^{13}$C NMR (150 MHz, $D_2O$) δ 159.1, 154.0, 151.7, 137.7, 116.1, 86.6, 83.7 (d, J=9.3 Hz), 73.8, 70.3, 65.5 (d, J=5.4 Hz); $^{31}$P NMR (162 MHz, $D_2O$) δ 43.0 (d, J=28.6 Hz), −5.8 (d, J=19.9 Hz), −22.4 (dd, J=28.6, 19.9 Hz); HRMS (ESI-TOF) m/z: calculated for $C_{10}H_{15}N_5O_{13}P_3S$ $[M-H]^-$: 537.9600, found: 537.9592; Retention time: 8.92 min (Method 2).

Example 62

Preparation of 5'-O-guanosine trisodium (S)-triphosphoro-α-thioate (Compound ($S_P$)-61)

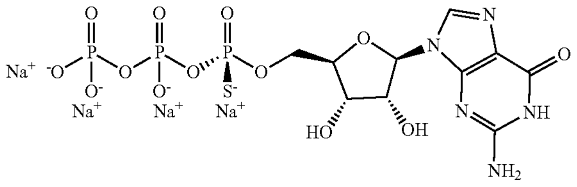

Following the General Procedure B with slight modifications, compound ($S_P$)-61 was obtained from diphosphate precursor compound 20-1 (169 mg, 0.2 mmol), (−)-Ψ* reagent (112 mg, 0.26 mmol) and protected guanosine compound 17-1 (196 mg, 0.4 mmol). Coupling step was performed using 8.0 equiv. of DBU. Deprotection was performed at 40° C. After extraction, the aqueous phase was concentrated to ~3 mL, neutralized using 10% aq. AcOH and directly purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 41 mg of compound ($S_P$)-61 after drying under high vacuum (Yield=33%, d.r.>20:1). Physical state: white amorphous solid. Compound ($S_P$)-61 was characterized by $^1$H NMR (600 MHz, $D_2O$): δ 8.26 (s, 1H), 5.93 (d, J=6.0 Hz, 1H), 4.82-4.79 (m, 1H), 4.64-4.61 (m, 1H), 4.41-4.37 (m, 1H), 4.34 (ddd, J=10.8, 7.6, 3.0 Hz, 1H), 4.27 (dt, J=10.8, 4.7 Hz, 1H); $^{13}$C NMR (150 MHz, $D_2O$): δ 159.1, 154.0, 151.7, 137.9, 116.2, 86.7, 83.8 (d, J=9.3 Hz), 73.7, 70.4, 65.1 (d, J=6.7 Hz); $^{31}$P NMR (162 MHz, $D_2O$): δ 43.2 (d, J=27.1 Hz), −5.8 (d, J=20.0 Hz), −22.4 (dd, J=27.1, 20.0 Hz); HRMS (ESI-TOF) m/z: calculated for $C_{10}H_{15}N_5O_{13}P_3S$ $[M-H]^-$: 537.9600, found: 537.9592; Retention time: 7.61 min (Method 2).

Example 63

Preparation of 5'-O-2-thiouridine trisodium (R)-triphosphoro-α-thioate (Compound ($R_P$)-62)

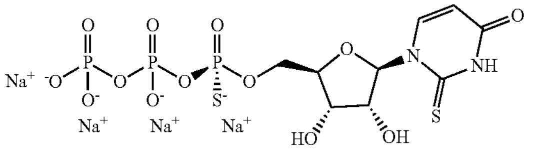

Following the General Procedure B, compound ($R_P$)-62 was obtained from diphosphate precursor compound 20-1 (169 mg, 0.2 mmol), (+)-Ψ* reagent (112 mg, 0.26 mmol) and regioisomeric mixture of protected 2-thiouridine derivatives compounds 16-1 and 30 (229 mg, 0.4 mmol). Deprotection was performed at room temperature. The crude product was purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 35 mg of compound ($R_P$)-62 after drying under high vacuum (Yield=29%, d.r.>20:1). Physical state: white amorphous solid. Compound ($R_P$)-62 was characterized by $^1$H NMR (600 MHz, $D_2O$): δ 8.23 (d, J=8.0 Hz, 1H), 6.69 (s, 1H), 6.25 (d, J=8.0 Hz, 1H), 4.48-4.40 (m, 3H), 4.39-4.31 (m, 2H); $^{13}$C NMR (150 MHz, $D_2O$): δ 176.5, 164.5, 142.2, 106.8, 93.1, 82.7 (d, J=9.7 Hz), 74.7, 68.3, 64.4 (d, J=5.7 Hz); $^{31}$P NMR (162 MHz, $D_2O$): δ 42.6 (d, J=28.3 Hz), −6.0 (d, J=20.3 Hz), −22.7 (dd, J=28.3, 20.3 Hz); HRMS (ESI-TOF) m/z: calculated for $C_9H_{14}N_2O_{13}P_3S_2$ $[M-H]^-$: 514.9150, found: 514.9168; Retention time: 5.44 min (Method 1).

Example 64

Preparation of 5'-O-2-thiouridine trisodium (S)-triphosphoro-α-thioate (Compound ($S_P$)-62)

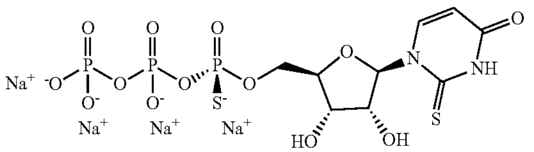

Following the General Procedure B, compound ($S_P$)-62 was obtained from diphosphate precursor compound 20-1 (169 mg, 0.2 mmol), (−)-Ψ* reagent (112 mg, 0.26 mmol) and regioisomeric mixture of protected 2-thiouridine derivatives compounds 16-1 and 30 (229 mg, 0.4 mmol). Deprotection was performed at room temperature. The crude product was purified by ion-exchange chromatography on DEAE Sephadex (1 M $NH_4HCO_3$/water, from 0:100 to 40:60), followed by reverse-phase chromatography on C18-silica gel (1 M aq. TEAA/MeCN, from 100:0 to 95:5). Fractions containing product were pooled and lyophilized. Obtained solid was redissolved in minimal amount of water and the product was precipitated as sodium salt from 0.2 M $NaClO_4$ in acetone to afford 33 mg of compound ($S_P$)-62 after drying under high vacuum (Yield=27%, d.r.>20:1). Physical state: white amorphous solid. Compound ($S_P$)-62 was characterized by $^1$H NMR (600 MHz, $D_2O$): δ 8.34 (d, J=8.1 Hz, 1H), 6.67 (s, 1H), 6.28 (d, J=8.1 Hz, 1H), 4.48-4.43 (m, 2H), 4.42-4.38 (m, 2H), 4.35-4.31 (m, 1H); $^{13}$C NMR (150 MHz, $D_2O$): δ 176.2, 163.6, 142.5, 107.0, 93.2, 82.8 (d, J=9.4 Hz), 74.7, 68.2, 63.7 (d, J=6.8 Hz); $^{31}$P NMR (162 MHz, $D_2O$): δ 42.9 (d, J=27.1 Hz), −6.2 (d, J=20.0 Hz), −22.6 (dd, J=27.1, 20.0 Hz); HRMS (ESI-TOF) m/z: calculated for $C_9H_{14}N_2O_{13}P_3S_2$ $[M-H]^-$: 514.9150, found: 514.9168; Retention time: 4.20 min (Method 1).

Example 65

Preparation of 3'-O-thymidine triammonium (R)-triphosphoro-α-thioate (Compound ($R_P$)-63)

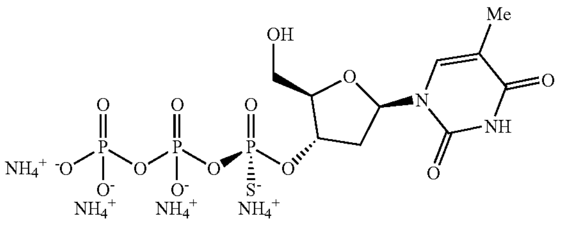

Following the General Procedure B, compound ($R_P$)-63 was obtained from diphosphate precursor compound 20-1 (169 mg, 0.2 mmol), (+)-Ψ* reagent (112 mg, 0.26 mmol) and protected thymidine compound 23 (138 mg, 0.4 mmol). Deprotection was performed at 40° C. The crude product was purified by ion-exchange chromatography on DEAE Sephadex (1 M $NH_4HCO_3$/water, from 0:100 to 20:80) to afford 57 mg of compound ($R_P$)-63 after lyophilization (Yield=51%, d.r.>20:1). Physical state: white amorphous solid. Compound ($R_P$)-63 was characterized by $^1$H NMR (600 MHz, $D_2O$) δ 7.69 (s, 1H), 6.34 (t, J=6.9 Hz, 1H), 5.09 (td, J=6.9, 3.3 Hz, 1H), 4.31 (q, J=3.7 Hz, 1H), 3.90-3.84 (m, 2H), 2.63 (ddd, J=14.3, 6.9, 3.3 Hz, 1H), 2.48 (dt, J=14.3, 6.9 Hz, 1H), 1.90 (s, 3H); $^{13}$C NMR (150 MHz, $D_2O$) δ 166.5, 151.7, 137.6, 111.5, 85.5 (d, J=5.8 Hz), 85.0, 75.6 (d, J=6.0 Hz), 61.0, 37.5 (d, J=3.9 Hz), 11.5; $^{31}$P NMR (162 MHz, $D_2O$) δ 42.8 (d, J=26.2 Hz), −10.0 (d, J=19.3 Hz), −23.8 (dd, J=26.2, 19.3 Hz); HRMS (ESI-TOF) m/z: calculated for $C_{10}H_{16}N_2O_{13}P_3S$ $[M-H]^-$: 496.9551, found: 496.9603; Retention time: 8.45 min (Method 3).

Example 66

Preparation of 3'-O-thymidine triammonium (S)-triphosphoro-α-thioate (Compound ($S_P$)-63)

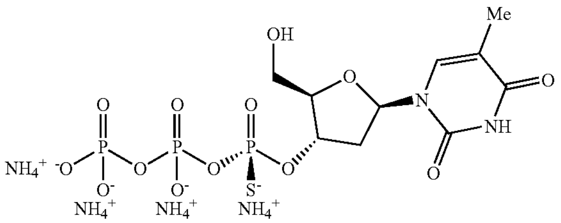

Following the General Procedure B, compound ($S_P$)-63 was obtained from diphosphate precursor compound 20-1 (169 mg, 0.2 mmol), (−)-Ψ* reagent (112 mg, 0.26 mmol) and protected thymidine compound 23 (138 mg, 0.4 mmol). Deprotection was performed at 40° C. The crude product was purified by ion-exchange chromatography on DEAE Sephadex (1 M $NH_4HCO_3$/water, from 0:100 to 20:80) to afford 60 mg of compound ($S_P$)-63 after lyophilization (Yield=53%, d.r.>20:1). Physical state: white amorphous solid. Compound ($S_P$)-63 was characterized by $^1$H NMR (600 MHz, $D_2O$): δ 7.69 (d, J=1.1 Hz, 1H), 6.36 (dd, J=7.1, 6.4 Hz, 1H), 5.10 (ddt, J=10.0, 6.4, 3.1 Hz, 1H), 4.29 (q, J=3.6 Hz, 1H), 3.91-3.85 (m, 2H), 2.66 (ddd, J=14.4, 6.4, 3.1 Hz, 1H), 2.47 (dt, J=14.4, 7.1 Hz, 1H), 1.90 (d, J=1.1 Hz, 3H); $^{13}$C NMR (150 MHz, $D_2O$) δ 166.5, 151.7, 137.7, 111.5, 85.7 (d, J=6.3 Hz), 85.0, 75.7 (d, J=6.0 Hz), 61.0, 37.4 (d, J=3.7 Hz), 11.5; $^{31}$P NMR (162 MHz, $D_2O$) δ 42.7 (d, J=26.2 Hz), −7.8 (d, J=20.1 Hz), −23.3 (dd, J=26.2, 20.1 Hz); HRMS (ESI-TOF) m/z: calculated for $C_{10}H_{16}N_2O_{13}P_3S$ $[M-H]^-$: 496.9551, found: 496.9603; Retention time: 8.81 min (Method 3).

Example 67

Preparation of $P^1$,$P^2$-di-(5'-O-uridine) diammonium (R)-diphosphoro-1-thioate (Compound ($R_P$)-64)

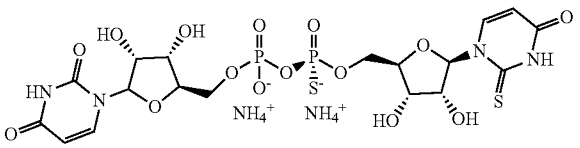 [SMILES: O=c1ccn(C2O[C@H](COP(=O)([O-])O[P@](=O)([S-])OC[C@H]3O[C@@H](n4ccc(=O)[nH]c4=S)[C@H](O)[C@@H]3O)[C@@H](O)[C@H]2O)c(=O)[nH]1 ; [NH4+] ; [NH4+]]

Following the General Procedure C, compound ($R_P$)-64 was obtained from protected uridine monophosphate compound 34 (127 mg, 0.2 mmol), (+)-Ψ* reagent (128 mg, 0.3 mmol) and protected uridine compound 11-1 (278 mg, 0.5 mmol). Deprotection was performed at 40° C. The crude product was purified by ion-exchange chromatography on DEAE Sephadex (1 M $NH_4HCO_3$/water, from 0:100 to 20:80) to afford 57 mg of compound ($R_P$)-64 after lyophilization (Yield=42%, d.r.>20:1). Physical state: white amorphous solid. Compound ($R_P$)-64 was characterized by $^1$H NMR (600 MHz, $D_2O$) δ 8.03 (d, J=8.0 Hz, 1H), 7.96 (d, J=8.2 Hz, 1H), 6.00-5.94 (m, 4H), 4.41-4.36 (m, 4H), 4.36-4.27 (m, 4H), 4.27-4.19 (m, 2H); $^{13}$C NMR (150 MHz, $D_2O$) δ 165.65, 165.64, 151.27, 151.26, 141.4, 141.3, 102.24, 102.16, 88.0, 87.9, 82.8 (d, J=9.4 Hz), 82.6 (d, J=9.7 Hz), 73.38, 73.35, 69.31, 69.29, 64.54 (d, J=5.9 Hz), 64.53 (d, J=6.5 Hz); $^{31}$P NMR (162 MHz, $D_2O$) δ 43.3 (d, J=27.7 Hz), −12.1 (d, J=27.7 Hz); HRMS (ESI-TOF) m/z: calculated for $C_{18}H_{23}N_4O_{16}P_2S$ $[M-H]^-$: 645.0310, found: 645.0323; Retention time: 4.85 min (Method 1).

Example 68

Preparation of $P^1$,$P^2$-di-(5'-O-uridine) diammonium (S)-diphosphoro-1-thioate (Compound ($S_P$)-64)

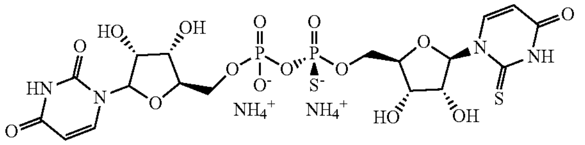 [SMILES: O=c1ccn(C2O[C@H](COP(=O)([O-])O[P@@](=O)([S-])OC[C@H]3O[C@@H](n4ccc(=O)[nH]c4=S)[C@H](O)[C@@H]3O)[C@@H](O)[C@H]2O)c(=O)[nH]1 ; [NH4+] ; [NH4+]]

Following the General Procedure C, compound ($S_P$)-64 was obtained from protected uridine monophosphate compound 34 (127 mg, 0.2 mmol), (−)-Ψ* reagent (128 mg, 0.3 mmol) and protected uridine compound 11-1 (278 mg, 0.5 mmol). Deprotection was performed at 40° C. The crude product was purified by ion-exchange chromatography on DEAE Sephadex (1 M $NH_4HCO_3$/water, from 0:100 to 20:80) to afford 54 mg of compound ($S_P$)-64 after lyophilization (Yield=40%, d.r.>20:1). Physical state: white amorphous solid. Compound ($S_P$)-64 was characterized by $^1$H NMR (600 MHz, $D_2O$): δ 8.01 (dd, J=8.1, 1.4 Hz, 1H), 7.94 (dd, J=8.1, 1.4 Hz, 1H), 5.98-5.94 (m, 4H), 4.42-4.39 (m, 1H), 4.39-4.35 (m, 3H), 4.32-4.24 (m, 6H), 4.23-4.18 (m, 1H); $^{13}$C NMR (150 MHz, $D_2O$): δ 165.63, 165.62, 151.2, 141.4, 141.3, 102.3, 102.2, 87.83, 87.77, 82.7 (d, J=9.5 Hz), 82.6 (d, J=10.0 Hz), 73.4, 73.3, 69.29, 69.28, 64.7 (d, J=6.0 Hz), 64.5 (d, J=5.6 Hz). $^{31}$P NMR (162 MHz, $D_2O$) δ 43.1 (d, J=26.3 Hz), −12.1 (d, J=26.3 Hz); HRMS (ESI-TOF) m/z: calculated for $C_{18}H_{23}N_4O_{16}P_2S$ $[M-H]^-$: 645.0310, found: 645.0323; Retention time: 3.53 min (Method 1).

Example 69

Preparation of $P^1$-(5'-O-adenosine)-$P^2$-(5'-O-uridine) diammonium (R)-diphosphoro-2-thioate (Compound ($R_P$)-65)

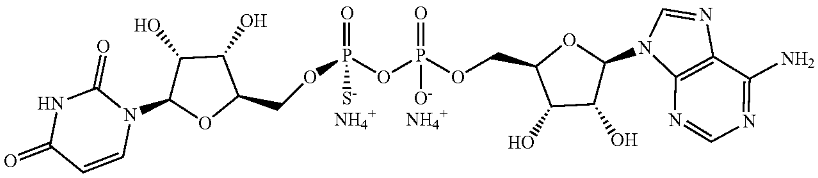 [SMILES: Nc1ncnc2c1ncn2[C@@H]1O[C@H](COP(=O)([O-])O[P@@](=O)([S-])OC[C@H]2O[C@@H](n3ccc(=O)[nH]c3=O)[C@H](O)[C@@H]2O)[C@@H](O)[C@H]1O ; [NH4+] ; [NH4+]]

Following the General Procedure C, compound ($R_P$)-65 was obtained from protected adenosine monophosphate compound 32 (152 mg, 0.2 mmol), (+)-Ψ* reagent (128 mg, 0.3 mmol) and protected uridine compound 11-1 (278 mg, 0.5 mmol). Deprotection was performed at 40° C. The crude product was purified by ion-exchange chromatography on DEAE Sephadex (1 M $NH_4HCO_3$/water, from 0:100 to 20:80) to afford 77 mg of compound ($R_P$)-65 after lyophilization (Yield=55%, d.r.>20:1). Physical state: white amorphous solid. Compound ($R_P$)-65 was characterized by $^1$H NMR (600 MHz, $D_2O$): δ 8.45 (s, 1H), 8.19 (s, 1H), 7.79 (d, J=8.1 Hz, 1H), 6.08 (d, J=5.8 Hz, 1H), 5.84 (d, J=4.8 Hz, 1H), 5.71 (d, J=8.1 Hz, 1H), 4.79-4.76 (m, 1H), 4.54 (dd, J=5.0, 3.7 Hz, 1H), 4.40-4.37 (m, 1H), 4.35 (ddd, J=11.4, 4.6, 2.8 Hz, 1H), 4.31-4.18 (m, 6H); $^{13}$C NMR (150 MHz, $D_2O$): δ 165.7, 155.1, 152.4, 151.4, 148.9, 141.3, 139.9, 118.4, 102.2, 88.3, 86.9, 83.8 (d, J=9.4 Hz), 83.0 (d, J=9.7 Hz), 74.2, 73.9, 70.4, 69.7, 65.3 (d, J=5.5 Hz), 64.8 (d, J=6.5 Hz); $^{31}$P NMR (162 MHz, $D_2O$): δ 43.5 (d, J=27.7 Hz), −12.0 (d, J=27.7 Hz); HRMS (ESI-TOF) m/z: calculated for $C_{19}H_{24}N_7O_{14}P_2S$ $[M-H]^-$: 668.0582, found: 668.0587; Retention time: 7.82 min (Method 1).

Example 70

Preparation of $P^1$-(5'-O-adenosine)-$P^2$-(5'-O-uridine) diammonium (S)-diphosphoro-2-thioate (Compound ($S_P$)-65)

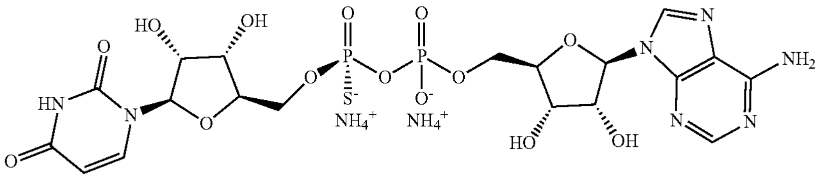 [SMILES: Nc1ncnc2c1ncn2[C@@H]1O[C@H](COP(=O)([O-])O[P@@](=O)([S-])OC[C@H]2O[C@@H](n3ccc(=O)[nH]c3=O)[C@H](O)[C@@H]2O)[C@@H](O)[C@H]1O ; [NH4+] ; [NH4+]]

Following the General Procedure C, compound ($S_P$)-65 was obtained from protected adenosine monophosphate compound 32 (152 mg, 0.2 mmol), (−)-Ψ* reagent (128 mg, 0.3 mmol) and protected uridine compound 11-1 (278 mg, 0.5 mmol). Deprotection was performed at 40° C. The crude product was purified by ion-exchange chromatography on DEAE Sephadex (1 M $NH_4HCO_3$/water, from 0:100 to 20:80) to afford 90 mg of compound ($S_P$)-65 after lyophilization (Yield=64%, d.r.>20:1).

Preparative scale: Following the General Procedure C, compound ($S_P$)-65 was obtained from protected adenosine monophosphate compound 32 (1.52 g, 2.0 mmol), (−)-Ψ* reagent (1.28 g, 3.0 mmol) and protected uridine compound 11-1 (2.78 g, 5.0 mmol). Deprotection was performed at 40° C. The crude product was purified by ion-exchange chromatography on DEAE Sephadex (1 M $NH_4HCO_3$/water, from 0:100 to 20:80) to afford 1.01 g of compound ($S_P$)-65 after lyophilization (Yield=72%, d.r.>20:1). Physical state: white amorphous solid. Compound ($S_P$)-65 was characterized by $^1$H NMR (600 MHz, $D_2O$): δ 8.43 (s, 1H), 8.14 (s, 1H), 7.71 (d, J=8.1 Hz, 1H), 6.06 (d, J=5.9 Hz, 1H), 5.82 (d, J=5.1 Hz, 1H), 5.67 (d, J=8.1 Hz, 1H), 4.56 (dd, J=5.0, 3.6 Hz, 1H), 4.39-4.37 (m, 1H), 4.31-4.28 (m, 1H), 4.28-4.20 (m, 6H); $^{13}C$ NMR (150 MHz, $D_2O$): δ 165.6, 155.0, 152.3, 151.4, 148.9, 141.1, 139.8, 118.3, 102.2, 88.1, 86.7, 83.8 (d, J=9.6 Hz), 83.0 (d, J=10.1 Hz), 74.2, 74.0, 70.5, 69.7, 65.30 (d, J=5.1 Hz), 64.26 (d, J=5.4 Hz); $^{31}P$ NMR (162 MHz, $D_2O$): δ 43.2 (d, J=25.8 Hz), −12.0 (d, J=25.8 Hz); HRMS (ESI-TOF) m/z: calculated for $C_{19}H_{24}N_7O_{14}P_2S$ $[M-H]^-$: 668.0582, found: 668.0587; Retention time: 5.20 min (Method 1).

Example 71

Preparation of $P^1$-(5'-O-adenosine)-$P^2$-(5'-O-uridine) diammonium (R)-diphosphoro-1-thioate (Compound ($R_P$)-66)

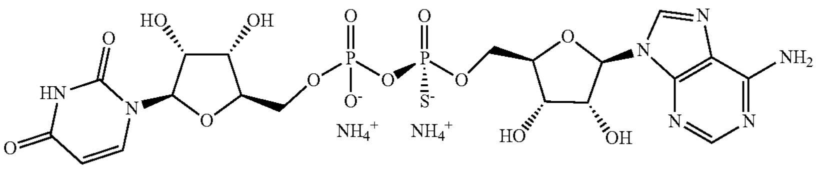 [SMILES: Nc1ncnc2c1ncn2[C@@H]1O[C@H](CO[P@@](=O)([S-])OP(=O)([O-])OC[C@H]2O[C@@H](n3ccc(=O)[nH]c3=O)[C@H](O)[C@@H]2O)[C@@H](O)[C@H]1O ; [NH4+] ; [NH4+]]

Following the General Procedure C, compound ($R_P$)-66 was obtained from protected uridine monophosphate compound 34 (127 mg, 0.2 mmol), (+)-Ψ* reagent (128 mg, 0.3 mmol) and protected adenosine compound 14-1 (342 mg, 0.5 mmol). Deprotection was performed at 40° C. The crude product was purified by ion-exchange chromatography on DEAE Sephadex (1 M $NH_4HCO_3$/water, from 0:100 to 20:80) to afford 72 mg of compound ($R_P$)-66 after lyophilization (Yield=51%, d.r.>20:1). Physical state: white amorphous solid. Compound ($R_P$)-66 was characterized by $^{1}H$ NMR (600 MHz, $D_2O$): δ 8.56 (s, 1H), 8.16 (s, 1H), 7.69 (d, J=8.1 Hz, 1H), 6.08 (d, J=5.8 Hz, 1H), 5.83 (d, J=5.0 Hz, 1H), 5.70 (d, J=8.1 Hz, 1H), 4.53 (dd, J=5.0, 3.6 Hz, 1H), 4.42-4.39 (m, 1H), 4.33 (ddd, J=11.6, 4.1, 2.4 Hz, 1H), 4.31-4.22 (m, 5H), 4.17 (ddd, J=11.6, 5.3, 2.6 Hz, 1H); $^{13}C$ NMR (150 MHz, $D_2O$) δ 165.6, 155.1, 152.4, 151.4, 148.9, 141.0, 140.0, 118.3, 102.3, 88.2, 87.0, 83.8 (d, J=9.6 Hz), 83.1 (d, J=9.4 Hz), 74.4, 74.0, 70.6, 69.6, 65.4 (d, J=6.4 Hz), 65.0 (d, J=5.2 Hz); $^{31}P$ NMR (162 MHz, $D_2O$) δ 43.5 (d, J=27.3 Hz), −12.0 (d, J=27.3 Hz); HRMS (ESI-TOF) m/z: calculated for $C_{19}H_{24}N_7O_{14}P_2S$ $[M-H]^-$: 668.0582, found: 668.0557; Retention time: 7.11 min (Method 1).

Example 72

Preparation of $P^1$-(5'-O-adenosine)-$P^2$-(5'-O-uridine) diammonium (S)-diphosphoro-1-thioate (Compound ($S_P$)-66)

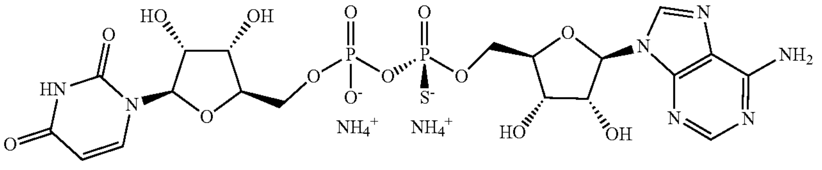 [SMILES: Nc1ncnc2c1ncn2[C@@H]1O[C@H](CO[P@](=O)([S-])OP(=O)([O-])OC[C@H]2O[C@@H](n3ccc(=O)[nH]c3=O)[C@H](O)[C@@H]2O)[C@@H](O)[C@H]1O ; [NH4+] ; [NH4+]]

Following the General Procedure C, compound ($S_P$)-66 was obtained from protected uridine monophosphate compound 34 (127 mg, 0.2 mmol), (−)-Ψ* reagent (128 mg, 0.3 mmol) and protected adenosine compound 14-1 (342 mg, 0.5 mmol). Deprotection was performed at 40° C. The crude product was purified by ion-exchange chromatography on DEAE Sephadex (1 M $NH_4HCO_3$/water, from 0:100 to 20:80) to afford 79 mg of compound ($S_P$)-66 after lyophilization (Yield=56%, d.r.>20:1). Physical state: white amorphous solid. Compound ($S_P$)-66 was characterized by $^{1}H$ NMR (600 MHz, $D_2O$) δ 8.51 (s, 1H), 8.16 (s, 1H), 7.66 (d, J=8.1 Hz, 1H), 6.07 (d, J=5.9 Hz, 1H), 5.82 (d, J=5.1 Hz, 1H), 5.69 (d, J=8.1 Hz, 1H), 4.79-4.76 (m, 1H), 4.54 (dd, J=4.9, 3.3 Hz, 1H), 4.42-4.39 (m, 1H), 4.33-4.27 (m, 3H), 4.26-4.20 (m, 3H), 4.18-4.14 (m, 1H); $^{13}C$ NMR (150 MHz, $D_2O$) δ 165.6, 155.1, 152.4, 151.4, 149.0, 141.0, 139.9, 118.3, 102.3, 88.1, 86.7, 83.8 (d, J=10.0 Hz), 83.1 (d, J=9.6 Hz), 74.3, 73.9, 70.6, 69.6, 65.7 (d, J=5.9 Hz), 64.9 (d, J=5.2

Hz); $^{31}P$ NMR (162 MHz, $D_2O$) δ 43.1 (d, J=26.1 Hz), −12.1 (d, J=26.1 Hz); HRMS (ESI-TOF) m/z: calculated for $C_{19}H_{24}N_7O_{14}P_2S$ $[M-H]^-$: 668.0582, found: 668.0557; Retention time: 5.45 min (Method 1).

Example 73

Preparation of $P^1$-(5'-O-7-methylguanosine)-$P^2$-(5'-O-guanosine) disodium (R)-triphosphoro-1-thioate (Compound ($R_P$)-67)

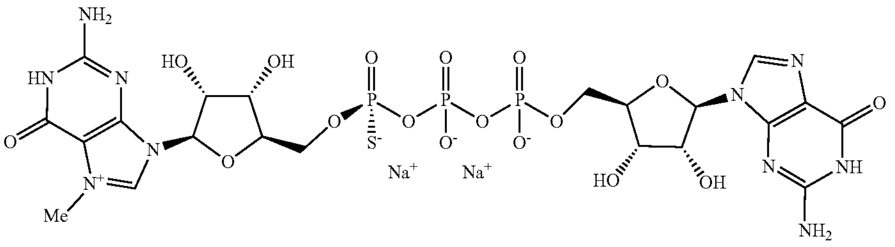 [SMILES: C[n+]1cn([C@@H]2O[C@H](CO[P@](=O)([S-])OP(=O)([O-])OP(=O)([O-])OC[C@H]3O[C@@H](n4cnc5c(=O)[nH]c(N)nc54)[C@H](O)[C@@H]3O)[C@@H](O)[C@H]2O)c2nc(N)[nH]c(=O)c21 ; [Na+] ; [Na+]]

A flame dried round bottom as with a stir bar was charged with protected guanosine diphosphate compound 40 (1.26 g, 1.0 mmol, 1.0 equiv.; 75% wt. purity) and the flask was capped with a septum. Anhydrous DMSO (10 mL) and DBU (0.90 mL, 6.0 mmol, 6.0 equiv.) were added and the mixture was stirred for 10 min. Subsequently, 3 Å molecular sieves (1.0 g) and (+)-Ψ* reagent (1.08 g, 2.5 mmol, 2.5 equiv.) were added and the reaction was stirred at room temperature for 1 h. After that time protected 7-methylguanosine compound 36 (0.90 g, 2.0 mmol, 2.0 equiv.) was added, followed by another portion of DBU (1.05 mL, 7.0 mmol, 7.0 equiv.) and the mixture was stirred for another 5 h. Upon completion of the reaction, resulting mixture was filtered and the solid residue was washed with ~2 mL of DMSO. Filtrate was partitioned between six 50 mL centrifuge tubes containing a solution of 0.2 M $NaClO_4$ in acetone (40 mL) each. The resulting suspension was centrifuged at 4000 rpm for 3 min. The supernatant was discarded and the pellet was washed with acetone twice. The solid residues from each of the centrifuge tubes were redissolved in minimal amount of water, combined and purified by ion exchange chromatography on DEAE Sephadex (gradient 1 M $NH_4HCO_3$/water, from 0:100 to 40:60). Fractions containing product were combined and the solvent was evaporated in vacuo (temp.<40° C.). The remaining solid was co-evaporated with water 3 times to remove residual buffer. The residue was redissolved in 40 mL 80% aq. AcOH and the resulting solution was stirred at 35° C. for 16 h. Subsequently, the volatiles were removed under reduced pressure and the crude was redissolved in a mixture of $MeOH/H_2O/Et_3N$ (20:5:1) (100 mL) and the solution was stirred at 30° C. for 16 h. The reaction mixture was concentrated under reduced pressure (temp.≤40° C.) ant the crude was purified by reverse-phase column chromatography on C-18 silica gel (gradient 1 M aq. TEAA/MeCN, from 100:0 to 95:5). Fractions containing product were combined and lyophilized 3 times to remove remaining buffer. Obtained solid was redissolved in minimal amount of water and the product was precipitated as sodium salt from 0.2 M $NaClO_4$ in acetone to afford 370 mg of compound ($R_P$)-67 after drying under high vacuum (Yield=43%, d.r.>20:1). Physical state: white amorphous solid. Compound (R)-67 was characterized by $^1H$ NMR (600 MHz, $D_2O$): δ 8.00 (s, 1H), 5.86 (d, J=2.2 Hz, 1H), 5.78 (d, J=6.1 Hz, 1H), 4.60 (t, J=5.6 Hz, 1H), 4.49-4.46 (m, 1H), 4.46-4.42 (m, 2H), 4.40-4.37 (m, 1H), 4.36-4.29 (m, 4H), 4.29-4.24 (m, 1H), 4.05 (s, 3H); $^{13}C$ NMR (150 MHz, $D_2O$): δ 162.8, 161.7, 158.8, 154.0, 151.3, 148.9. 136.9, 133.6 (br), 115.7, 108.8, 89.3, 86.4, 83.6 (d, J 8.9 Hz), 82.9 (d, J=9.7 Hz), 74.7, 74.1, 70.4, 68.5, 65.4 (d, J 5.4 Hz), 63.9 (d, J 6.5 Hz), 36.0; $^{31}P$ NMR (162 MHz, $D_2O$): δ 42.8 (d, J=26.0 Hz), −11.6 (d, J=20.1 Hz), −24.0 (dd, J=26.0, 20.1 Hz); HRMS (ESI-TOF) m/z: calculated for $C_{21}H_{28}N_{10}O_{17}P_3S$ $[M-2H]^-$: 817.0573, found: 817.0567; Retention time: 9.63 min (Method 2).

Example 74

Preparation of $P^1$-(5'-O-7-methylguanosine)-$P^2$-(5'-O-guanosine) disodium (S)-triphosphoro-1-thioate (Compound ($S_P$)-67)

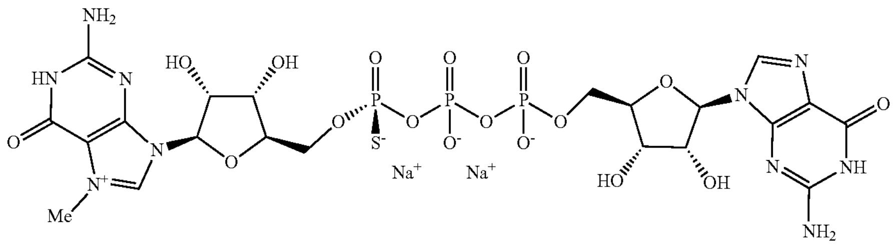 [SMILES: C[n+]1cn([C@@H]2O[C@H](CO[P@@](=O)([S-])OP(=O)([O-])OP(=O)([O-])OC[C@H]3O[C@@H](n4cnc5c(=O)[nH]c(N)nc54)[C@H](O)[C@@H]3O)[C@@H](O)[C@H]2O)c2nc(N)[nH]c(=O)c21 ; [Na+] ; [Na+]]

Compound ($S_P$)-67 was obtained following analogous procedure as ($R_P$)-67 using (−)-Ψ* reagent. Purification by reverse-phase column chromatography on C-18 silica gel (gradient 1 M aq. TEAA/MeCN, from 100:0 to 95:5), followed by precipitation as a sodium salt afforded 353 mg of compound ($S_P$)-67, after drying under high vacuum (Yield=41%, d.r.>20:1). Physical state: white amorphous solid. Compound ($S_P$)-67 was characterized by $^1H$ NMR (600 MHz, $D_2O$): δ 8.01 (s, 1H), 5.88 (d, J=3.0 Hz, 1H), 5.79 (d, J=5.9 Hz, 1H), 4.66 (t, J=5.5 Hz, 1H), 4.52-4.48 (m, 2H), 4.48-4.45 (m, 1H), 4.41-4.32 (m, 4H), 4.30-4.25 (m, 2H), 4.06 (s, 3H); $^{13}C$ NMR (150 MHz, $D_2O$): δ 162.8, 161.7, 158.8, 154.0, 151.3, 149.1. 137.2, 133.9 (br), 115.9, 108.9, 89.0, 86.6, 83.6 (d, J=8.6 Hz), 83.3 (d, J=9.7 Hz), 74.9, 73.8, 70.3, 68.9, 65.4 (d, J 5.0 Hz), 64.4 (d, J 5.7 Hz), 35.9; $^{31}P$ NMR (162 MHz, $D_2O$): δ 43.3 (d, J=25.5 Hz), −11.5 (d, J=17.2 Hz), −24.1 (dd, J=25.5, 27.2 Hz); HRMS (ESI-TOF) m/z: calculated for $C_{21}H_{28}N_{10}O_{17}P_3S$ $[M-2H]^-$: 817.0573, found: 817.0567; Retention time: 8.58 min (Method 2).

Example 75

Preparation of acycloguanosine triammonium (R)-diphosphoro-α-thioate (Compound ($R_P$)-68)

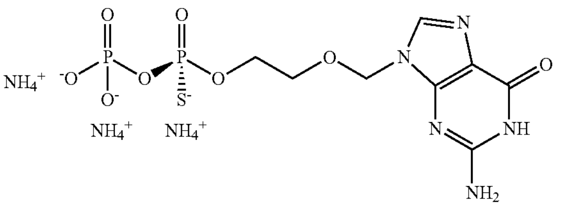

Following the General Procedure A with slight modifications, compound ($R_P$)-68 was obtained from monophosphate precursor compound 7-1 (92 mg, 0.3 mmol), (+)-Ψ* reagent (85 mg, 0.2 mmol) and acyclovir (112 mg, 0.5 mmol), and using anhydrous DMF (2.0 mL) as a solvent. Coupling step was performed using 5.0 equiv. of DBU. The crude product was purified by ion-exchange chromatography on DEAE Sephadex (1 M $NH_4HCO_3$/water, from 0:100 to 25:75) to afford 42 mg of compound ($R_P$)-68 after lyophilization (Yield=47%, e.e.>20:1). Physical state: white amorphous solid. Compound ($R_P$)-68 was characterized by $^1H$ NMR (600 MHz, $D_2O$): δ 7.91 (s, 1H), 5.50 (s, 2H), 4.11-4.04 (m, 2H), 3.77 (t, J=4.5 Hz, 2H); $^{13}C$ NMR (150 MHz, $D_2O$): δ 158.4, 153.5, 151.1, 139.5, 115.5, 72.2, 67.7 (d, J=8.8 Hz), 64.4 (d, J=5.9 Hz); $^{31}P$ NMR (162 MHz, $D_2O$): δ 41.4 (d, J=29.3 Hz), −6.8 (d, J=29.3 Hz); HRMS (ESI-TOF) m/z: calculated for $C_8H_{12}N_5O_8P_2S$ $[M-H]^-$: 399.9887, found: 399.9879; $[\alpha]D_{25}$=+10.6 (c 1.01, DMSO) (measured as triethylammonium salt); Retention time: 7.75 min (Method 2).

Example 76

Preparation of acycloguanosine triammonium (S)-diphosphoro-α-thioate (Compound ($S_P$)-68)

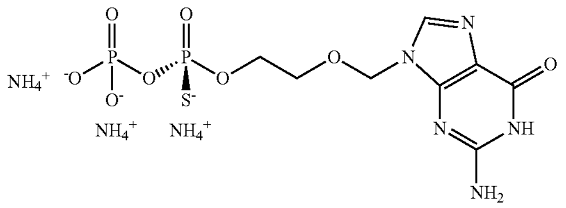

Following the General Procedure A with slight modifications, compound ($S_P$)-68 was obtained from monophosphate precursor compound 7-1 (92 mg, 0.3 mmol), (−)-Ψ* reagent (85 mg, 0.2 mmol) and acyclovir (112 mg, 0.5 mmol), and using anhydrous DMF (2.0 mL) as a solvent. Coupling step was performed using 5.0 equiv. of DBU. The crude product was purified by ion-exchange chromatography on DEAE Sephadex (1 M $NH_4HCO_3$/water, from 0:100 to 25:75) to afford 46 mg of compound ($S_P$)-68 after lyophilization (Yield=51%, e.e.>20:1). All characterization data were identical with compound ($R_P$)-68, except of the optical rotation. $[\alpha]D_{25}$=−11.0 (c 0.98, DMSO) (measured as triethylammonium salt); Retention time: 7.76 min (Method 2).

Example 77

Preparation of Compound 72

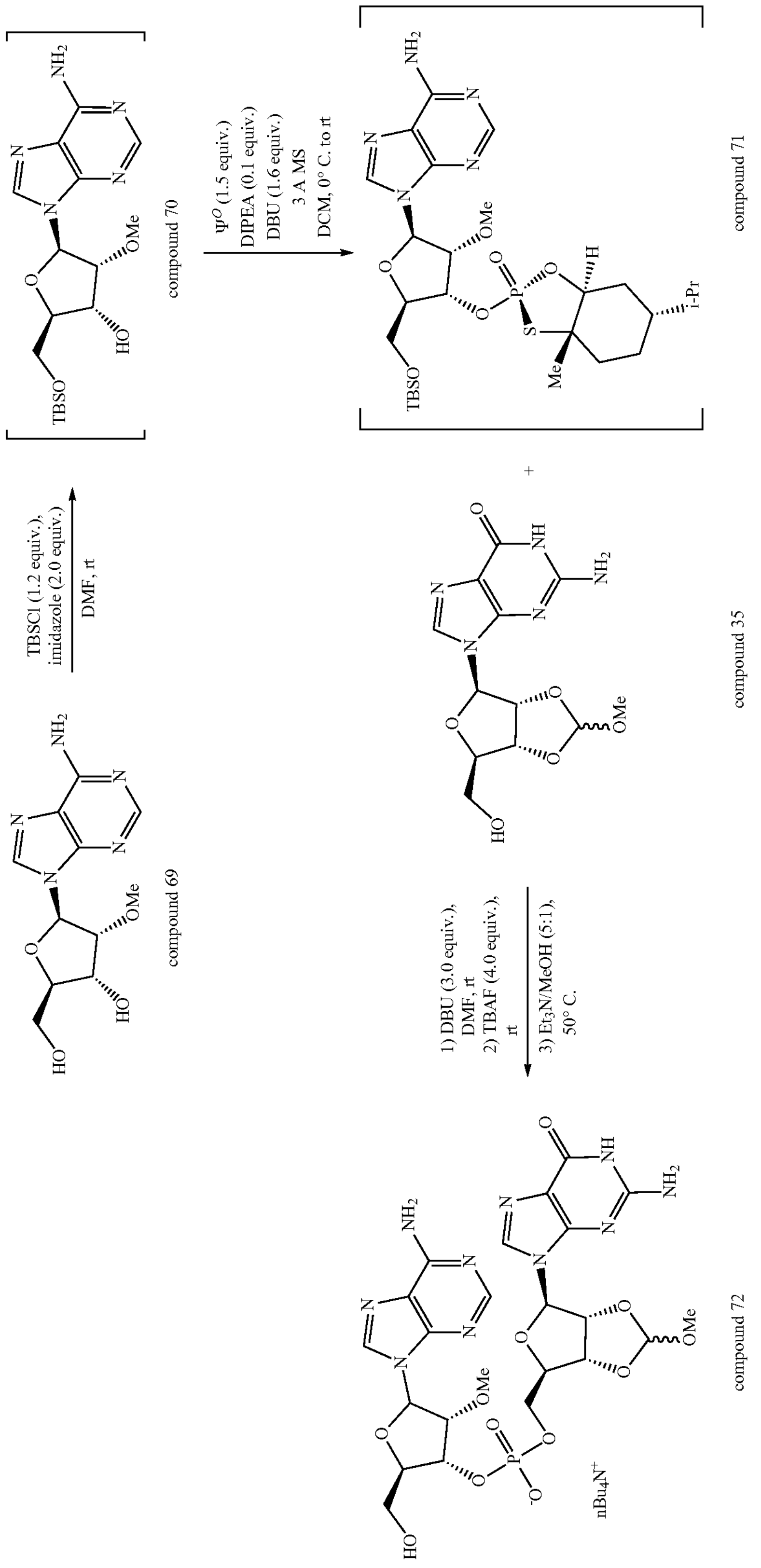
compound 69
compound 70
compound 71
compound 35
compound 72

Round-bottom flask equipped with a stir bar was charged with 2'-O-methyladenosine (compound 69) (1.55 g, 5.5 mmol, 1.0 equiv.), followed by addition of anhydrous DMF (55 mL). Imidazole (0.75 g, 11.0 mmol, 2.0 equiv.) and tert-butyldimethylsilyl chloride (1.0 g, 6.6 mmol, 1.2 equiv.) were added consecutively and the reaction mixture was stirred at room temperature overnight. Subsequently, the reaction was quenched by addition of concentrated aq. $NaHCO_3$ and extracted with EtOAc. Organic phase was washed with water, brine, dried over $Na_2SO_4$, filtered and concentrated under reduced pressure to provide crude compound 70, which was used in the next step without any further purification.

The crude compound 70 was redissolved in anhydrous DCM (30 mL), followed by the addition of $\Psi^O$ reagent (3.47 g, 8.3 mmol, 1.5 equiv.). The synthesis of $\Psi^O$ reagent is disclosed in Huang, et al., Science, 2021, 373, 1265-1270. Freshly dried 3 Å molecular sieves (3.0 g) were added and the mixture was stirred for 5 min. Subsequently, the reaction mixture was cooled to 0° C., followed by consecutive addition of DIPEA (0.10 mL, 0.6 mmol, 0.1 equiv.) and DBU (1.30 mL, 8.8 mmol, 1.6 equiv.) and the reaction was stirred under argon atmosphere for 30 min. After that time, the mixture was diluted with EtOAc and filtered. The filtrate was washed consecutively with 10% aq. $KH_2PO_4$ and brine, dried over $Na_2SO_4$, filtered and concentrated under reduced pressure to provide crude compound 71, which was used in the next step without any further purification.

The crude compound 71 was redissolved in anhydrous DMF (25 mL), followed by addition of protected guanosine compound 35 (3.58 g, 11.0 mmol, 2.0 equiv.). The synthesis of protected guanosine compound 35 is disclosed in Jo Davisson, et al., J. Org. Chem. 1987, 52, 1794-1801. DBU (2.46 mL, 16.5 mmol, 3.0 equiv.) was added and the reaction mixture was stirred under argon atmosphere for 30 min. Subsequently, 1.0 M solution of TBAF in THF (22.0 mL, 22.0 mmol, 4.0 equiv.) was added and the reaction was stirred at room temperature for another 4 h. After that time, MeOH (25 mL) and $Et_3N$ (5.0 mL) were added consecutively and the reaction mixture as stirred at 50° C. overnight. The resulting mixture was concentrated under reduced pressure and the residue was suspended in water (50 mL). The resulting suspension was filtered through a pad of Celite and the filtrate was concentrated under reduced pressure. The residue was suspended in water and the filtration step was repeated once again. The filtrate was concentrated under reduced pressure and the crude product was purified by reverse phase C18-silica gel chromatography (1 M aq. TEAA/MeCN; from 100:0 to 80:20) and lyophilized provide 2.40 g of compound 72 (2:1 mixture of diastereoisomers). (Yield over 5 steps=48%). Physical state: white amorphous solid.

Compound 72 was characterized by $^1H$ NMR (600 MHz, $D_2O$): δ 8.21 (s, 1H; major+minor), 8.05 (s, 1H; minor), 8.04 (s, 1H; major), 7.87 (s, 1H; minor); 7.85 (s, 1H; major), 6.20 (s, 1H; minor), 6.16 (s, 1H; major), 6.09 (s, 1H; major), 6.06 (s, 1H; minor), 5.89 (d, J=6.6 Hz, 1H; minor), 5.86 (d, J=6.3 Hz, 1H; major), 5.50 (d, J=6.3 Hz, 1H; minor), 5.46 (d, J=6.9 Hz, 1H; major), 5.29 (dd, J=6.1, 3.1 Hz, 1H; minor), 5.19 (dd, J=6.9, 3.1 Hz, 1H; major), 4.66-4.62 (m, 1H; major), 4.54-4.50 (m, 1H; minor), 4.36-4.30 (m, 1H; major+minor), 4.20-4.11 (m, 2H; major+minor), 4.06-4.03 (m, 1H; minor), 4.00-3.96 (m, 1H; major), 3.66-3.59 (m, 1H; major+minor), 3.57-3.48 (m, 1H; major+minor), 3.46 (s, 3H; major), 3.38 (s, 3H; minor), 3.29 (s, 3H; major+minor), 3.16-3.10 (m, 8H; $nBu_4N^+$), 1.63-1.54 (m, 8H; $nBu_4N^+$), 1.36-1.27 (m, 8H; $nBu_4N^+$), 0.91 (t, J=7.3 Hz, 12H; $nBu_4N^+$); $^{13}C$ NMR (150 MHz, $D_2O$) δ 159.2 (minor), 159.1 (major), 154.9 (major+minor), 154.1 (minor), 154.0 (major), 151.81 (minor), 151.79 (major), 150.4 (minor), 150.3 (major), 147.6 (major+minor), 140.0 (major+minor), 137.1 (major), 137.0 (minor), 118.5 (major+minor), 118.1 (major), 117.0 (minor), 116.0 (major), 115.9 (minor), 89.8 (major), 88.5 (minor), 86.19 (major), 86.15 (minor), 85.9 (d, J=9.5 Hz; major), 84.7 (major+minor), 84.4 (d, J=9.4 Hz; minor), 83.5 (major), 82.4 (minor), 81.24 (d, J=5.5 Hz; major), 81.21 (d, J=4.7 Hz; minor), 80.6 (major), 80.1 (minor), 72.7 (d, J=5.5 Hz; major+minor), 65.4 (d, J=5.1 Hz; major), 65.1 (d, J=4.9 Hz; minor), 60.6 (major+minor), 57.6 (br; $nBu_4N^+$), 57.3 (major+minor), 52.0 (major), 51.0 (minor), 22.6 ($nBu_4N^+$), 18.6 ($nBu_4N^+$), 12.3 ($nBu_4N^+$); $^{31}P$ NMR (162 MHz, $D_2O$) δ −1.1; HRMS (ESI-TOF) m/z: calculated for $C_{23}H_{28}N_{10}O_{12}P$ $[M-H]^-$: 667.1631, found: 667.1621.

Example 78

Preparation of Compound 73

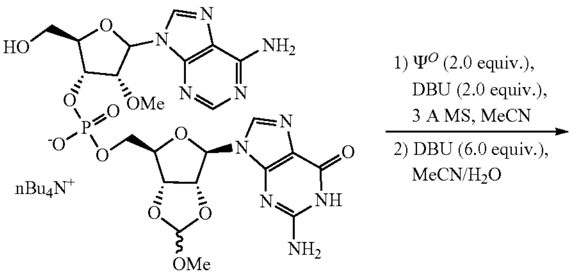

compound 72

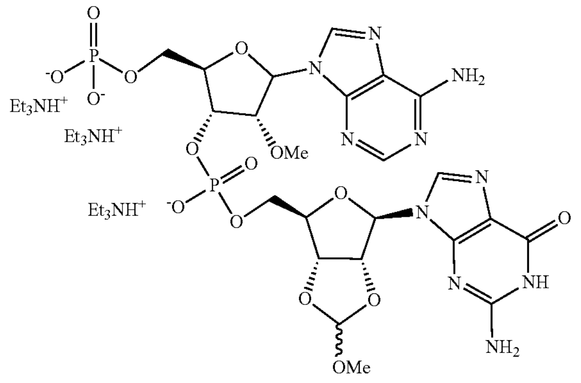

compound 73

Dinucleoside 72 (2.40 g, 2.6 mmol, 1.0 equiv.) was dried by co-evaporation with anhydrous MeCN, and the substrate was dissolved in anhydrous MeCN (30 mL). Subsequently $\Psi^O$ reagent (2.22 g, 5.2 mmol, 2.0 equiv.) and 3 Å molecular sieves (3.0 g) were added and the resulting suspension was stirred for 5 min. The synthesis of $\Psi^O$ reagent is disclosed in Huang, et al., Science, 2021, 373, 1265-1270. DBU (0.77 mL, 5.2 mmol, 2.0 equiv.) was added dropwise and the reaction was stirred at room temperature and under argon atmosphere for 45 min. After that time, deionized water (3.0 mL) and DBU (2.32 mL, 15.6 mmol, 6.0 equiv.) were added consecutively and the reaction was stirred for another 15 min. The mixture was diluted with waster, filtered through a pad of Celite and the filtrate was concentrated under reduced pressure. The residue was resuspended in water and the filtration step was repeated once again. The filtrate was concentrated under reduced pressure and the crude product was purified by reverse phase C18-silica gel chromatography (1 M aq. TEAA/MeCN; from 100:0 to 85:15) and lyophilized provide 1.56 g of compound 73 (2:1 mixture of diastereoisomers). (Yield=63%). Physical state: white amorphous solid.

Compound 73 was characterized by $^{1}$H NMR (600 MHz, $D_2O$): δ 8.39 (s, 1H; minor), 8.38 (s, 1H; major), 8.15 (s, 1H; major+minor), 7.90 (s, 1H; major+minor), 6.21 (s, 1H; minor), 6.18 (d, J=2.3 Hz, 1H; major), 6.10 (s, 1H; major), 6.08 (d, J=2.3 Hz, 1H; minor), 5.98 (d, J=7.1 Hz, minor), 5.97 (d, J=6.8 Hz; major), 5.47 (dd, J=6.2, 2.3 Hz, 1H; minor), 5.43 (dd, J=7.0, 2.3 Hz, 1H; major), 5.31 (dd, J=6.2, 3.6 Hz, 1H; minor), 5.21 (dd, J=7.0, 3.5 Hz, 1H; major), 4.91-4.86 (m, 1H; major+minor), 4.66 (q, J=4.4 Hz, 1H; major), 4.54 (q, J=4.2 Hz, 1H; minor), 4.37-4.31 (m, 1H; major+minor), 4.25-4.15 (m, 3H; major+minor), 4.00-3.92 (m, 1H; major+minor), 3.86-3.81 (m, 1H; minor), 3.80-3.75 (m, 1H; major), 3.47 (s, 3H; major), 3.37 (s, 3H; minor), 3.35 (s, 3H; minor), 3.34 (s, 3H; major), 3.18 (q, J=7.3 Hz, 12H; $Et_3NH^+$), 1.26 (t, J=7.3 Hz, 18H; $Et_3NH^+$); $^{13}$C NMR (150 MHz, $D_2O$): δ 158.1 (major), 158.0 (minor), 154.5 (major+minor), 153.1 (minor), 153.0 (major), 151.8 (major+minor), 150.5 (minor), 150.3 (major), 148.3 (major+minor), 139.2 (major+minor), 137.6 (major), 137.5 (minor), 118.1 (major), 117.9 (major+minor), 116.9 (minor), 115.9 (major), 115.8 (minor), 89.9 (major), 88.6 (minor), 85.8 (d, J=9.5 Hz; major), 84.6 (major+minor), 84.3 (d, J=9.4 Hz; minor), 83.6 (major), 82.8 (d, J=9.1 Hz; major+minor), 82.4 (minor), 82.1 (d, J=5.5 Hz; major), 82.0 (d, J=5.5 Hz; minor), 80.5 (major), 80.0 (minor), 72.71 (d, J=5.7 Hz; major), 72.66 (d, J=5.8 Hz; minor), 65.4 (d, J=5.1 Hz; major), 65.1 (d, J=5.2 Hz; minor), 63.7 (d, J=4.7 Hz; major+minor), 57.2 (major+minor), 52.0 (major), 50.9 (minor), 46.2 ($Et_3NH^+$), 7.7 ($Et_3NH^+$); $^{31}$P NMR (162 MHz, $D_2O$) δ 0.1, −1.2; HRMS (ESI-TOF) m/z: calculated for $C_{23}H_{29}N_{10}O_{15}P_2$[M−H]: 747.1294, found: 747.1287.

Example 79

Preparation of Compound 75

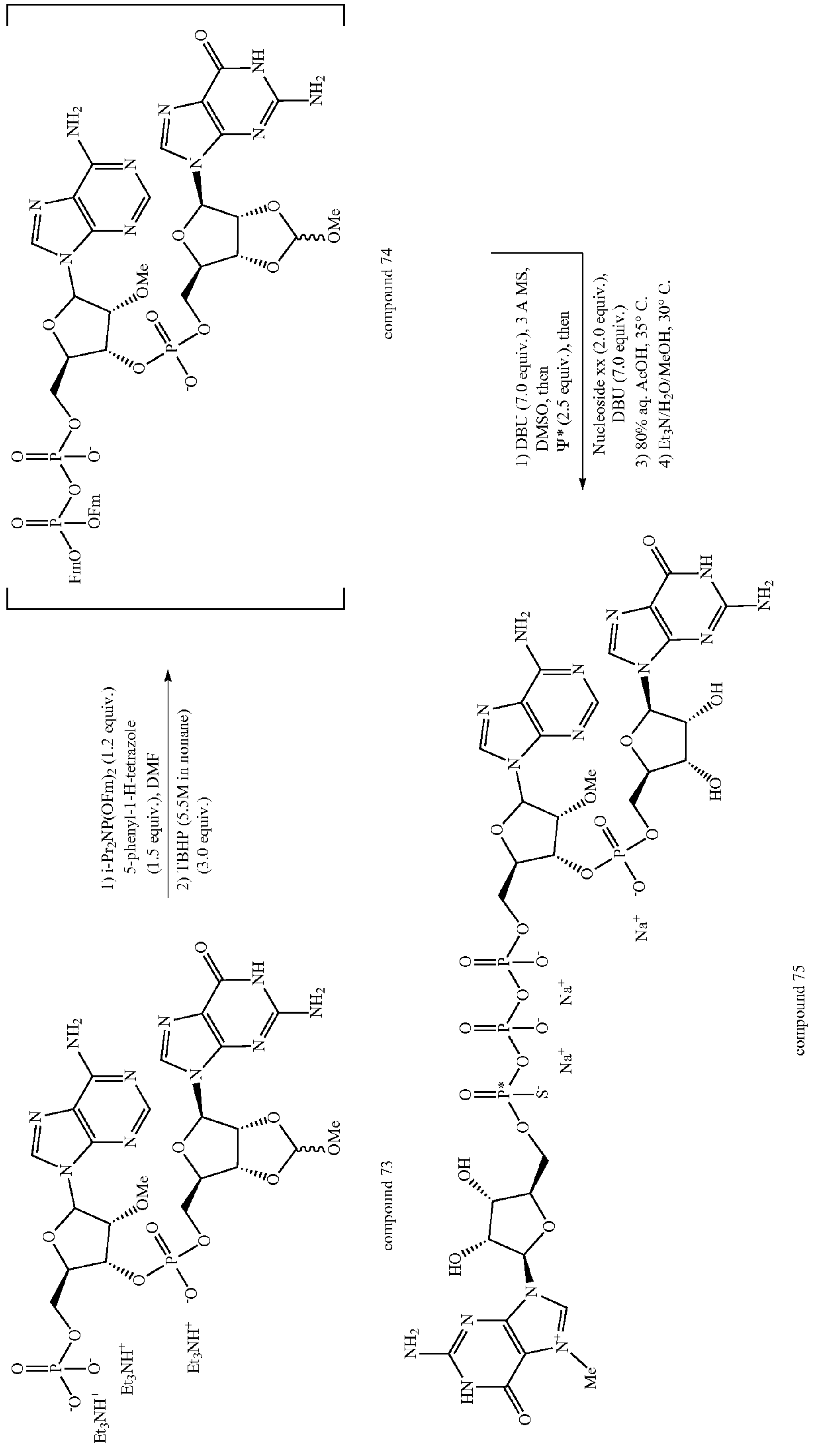
compound 73
compound 74
compound 75

Compound 73 (1.56 g, 1.6 mmol, 1.0 equiv.) was dried by co-evaporation with anhydrous DMF and dissolved in anhydrous DMF (20 mL). i-$Pr_2NP(OFm)_2$ (1.27 g, 2.4 mmol, 1.5 equiv.) was added to the resulting solution, followed by 5-phenyl-1-H-tetrazole (0.36 g, 2.4 mmol, 1.5 equiv.) and the reaction was stirred for 1 h at room temperature. Subsequently, tert-butyl hydroperoxide (5.5 M in nonane; 0.86 mL, 4.8 mmol, 3.0 equiv.) was added and the mixture was stirred for another 1 h. The reaction was quenched by the addition of $Et_2O$ (250 mL) and the resulting suspension was sonicated for 10 min. Solvent was decanted and the remaining oily residue was redissolved in DCM (10 mL). The volatile components were evaporated under reduced pressure, and the residue was co-evaporated consecutively with MeCN and DCM to provide 2.72 g of crude compound 74 (65% wt. purity as determined by quantitative $^{31}P$ NMR) (NMR yield=91%).

Compound 74 was used in subsequent steps without any further purification.

Compound 74 was characterized by $^{31}P$ NMR (162 MHz, DMSO-$d_6$): δ −1.9, −12.2 (d, J=20.9 Hz), −12.6 (d, J=20.9 Hz); HRMS (ESI-TOF) m/z: calculated for $C_{51}H_{50}N_{10}O_{18}P_3[M-H]^-$: 1183.2523, found: 1183.2497.

$P^1$-{5'-O-[2'-O-methyladenylyl-(3',5')-guanosine]}-$P^2$-(5'-O-7-methylguanosine) trisodium (R)-triphosphoro-3-thioate (Compound (R)-75)

solution of 0.2 M $NaClO_4$ in acetone (40 mL) each. The resulting suspension was centrifuged at 4000 rpm for 3 min. The supernatant was discarded and the pellet was washed with acetone twice. The solid residues from each of the centrifuge tubes were redissolved in minimal amount of water, combined and purified by ion exchange chromatography on DEAE Sephadex (gradient 1 M $NH_4HCO_3$/water, from 0:100 to 40:60). Fractions containing product were combined and the solvent was evaporated in vacuo (temp.<40° C.). The remaining solid was co-evaporated with water 3 times to remove residual buffer. The residue was redissolved in 40 mL 80% aq. AcOH and the resulting solution was stirred at 35° C. for 16 h. Subsequently, the volatiles were removed under reduced pressure and the crude was redissolved in a mixture of $MeOH/H_2O/Et_3N$ (20:5:1) (100 mL) and the solution was stirred at 30° C. for 16 h. The reaction mixture was concentrated under reduced pressure (temp.<40° C.) ant the crude was purified by reverse-phase column chromatography on C-18 silica gel (gradient 1 M aq. TEAA/MeCN, from 100:0 to 95:5). Fractions containing product were combined and lyophilized 3 times to remove remaining buffer. Obtained solid was redissolved in minimal amount of water and the product was precipitated as sodium salt from 0.2 M $NaClO_4$ in acetone to afford 522 mg of the title compound after drying under high vacuum (Yield=38% from 72, d.r.>20:1). Physical state: white solid.

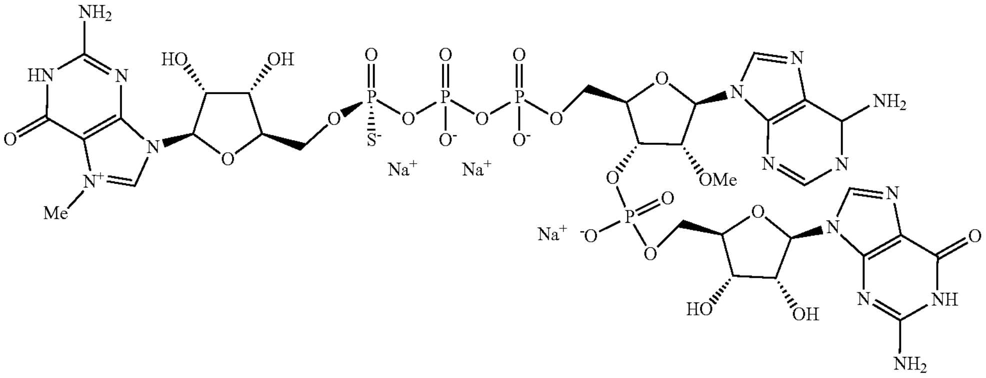

A flame dried round bottom flask with a stir bar was charged with crude protected guanosine diphosphate compound 74 (1.82 g, 1.0 mmol, 1.0 equiv.; 65% wt. purity) (obtained as described above) and the flask was capped with a septum. Anhydrous DMSO (10 mL) and DBU (1.05 mL, 7.0 mmol, 7.0 equiv.) were added and the mixture was stirred for 10 min. Subsequently, 3 Å molecular sieves (1.0 g) and (+)-Ψ* reagent (1.08 g, 2.5 mmol, 2.5 equiv.) were added and the reaction was stirred at room temperature for 1 h. After that time protected 7-methylguanosine compound 36 (0.90 g, 2.0 mmol, 2.0 equiv.) was added, followed by another portion of DBU (1.05 mL, 7.0 mmol, 7.0 equiv.) and the mixture was stirred for another 5 h. Upon completion of the reaction, resulting mixture was filtered and the solid residue was washed with −2 mL of DMSO. Filtrate was partitioned between six 50 mL centrifuge tubes containing a Compound (R)-75 was characterized by $^1H$ NMR (600 MHz, $D_2O$) δ 9.04 (s, 1H), 8.36 (s, 1H), 8.06 (s, 1H), 7.95 (s, 1H), 6.00 (d, J=5.5 Hz, 1H), 5.85-5.80 (m, 2H), 4.97-4.92 (m, 1H), 4.78-4.72 (m, 1H), 4.54-4.48 (m, 3H), 4.46-4.40 (m, 3H), 4.37-4.31 (m, 3H), 4.31-4.17 (m, 4H), 4.02 (s, 3H), 3.44 (s, 3H); $^{13}C$ NMR (150 MHz, $D_2O$) δ 158.0, 156.3, 155.9, 154.7, 153.1, 152.3, 150.9, 148.4, 148.0, 138.9, 137.0, 135.0 (br), 117.7, 115.6, 107.4, 89.1, 86.9, 84.4, 83.0 (d, J=9.1 Hz), 82.42 (d, J=9.5 Hz), 82.40 (d, J=9.6 Hz), 81.2 (d, J=4.2 Hz), 74.3, 72.9, 72.1 (d, J=4.9 Hz), 69.8, 68.5, 64.60 (d, J=4.6 Hz), 63.5 (d, J=6.2 Hz), 57.5, 35.6; $^{31}P$ NMR (162 MHz, $D_2O$) δ 42.9 (d, J=27.4 Hz), −1.0, −11.9 (d, J=18.7 Hz), −24.2 (dd, J=27.4, 18.7 Hz); HRMS (ESI-TOF) m/z: calculated for $C_{32}H_{42}N_{15}O_{23}P_4S$ $[M-2H]^-$: 1160.1254, found: 1160.1228; Retention time: 8.43 min (Method 1).

$P^1$-{5'-O-[2'-O-methyladenylyl-(3',5')-guanosine]}-$P^2$-(5'-O-7-methylguanosine) trisodium (S)-triphosphoro-3-thioate (Compound ($S_P$)-75)

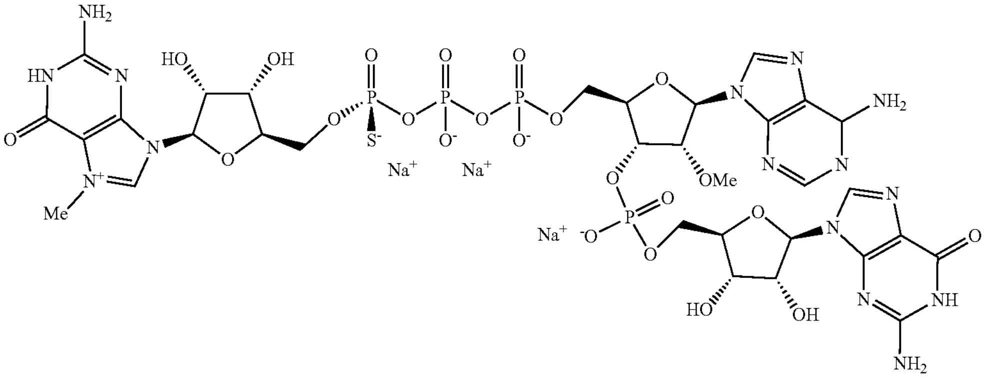

Compound ($S_P$)-75 was obtained following analogous procedure as compound ($R_P$)-75 on 0.1 mmol scale and using (−)-Ψ* reagent. Purification by reverse-phase column chromatography on C-18 silica gel (gradient 1 M aq. TEAA/MeCN, from 100:0 to 95:5), followed by precipitation as a sodium salt afforded 43 mg of compound ($S_P$)-75, after drying under high vacuum (Yield=35% from 72, d.r.>20:1). Physical state: white solid.

Compound ($S_P$)-75 was characterized by $^1$H NMR (600 MHz, $D_2O$): δ 9.16 (s, 1H), 8.46 (s, 1H), 8.18 (s, 1H), 7.97 (s, 1H), 6.04 (d, J=4.5 Hz, 1H), 5.88 (s, 1H), 5.81 (d, J=4.5 Hz, 1H), 4.98-4.91 (m, 1H), 4.78-4.72 (m, 1H), 4.61-4.56 (m, 1H), 4.54-4.48 (m, 3H), 4.45-4.17 (m, I0H), 4.03 (s, 3H), 3.47 (s, 3H); $^{13}$C NMR (150 MHz, $D_2O$): δ 157.7, 154.8, 153.8, 153.1, 152.3, 150.8, 149.0, 148.6, 147.6, 140.0, 137.0, 136.1, 117.7, 115.3, 107.2, 89.1, 87.0, 85.0, 83.4 (d, J=9.3 Hz), 83.0 (d, J=8.8 Hz), 82.3 (br), 81.6 (d, J=3.5 Hz), 74.4, 73.0, 71.9 (d, J=4.8 Hz), 69.7, 68.7, 64.6 (d, J=4.9 Hz), 64.4, 63.8, 57.5, 35.6; $^{31}$P NMR (162 MHz, $D_2O$): δ 43.2 (d, J=26.6 Hz), −1.0, −11.8 (d, J=18.8 Hz), −24.3 (dd, J=26.6, 18.8 Hz); HRMS (ESI-TOF) m/z: calculated for $C_{32}H_{42}N_{15}O_{23}P_4S$ $[M-2H]^-$: 1160.1254, found: 1160.1228; Retention time: 7.62 min (Method 1).

What is claimed is:

1. A compound having the structure:

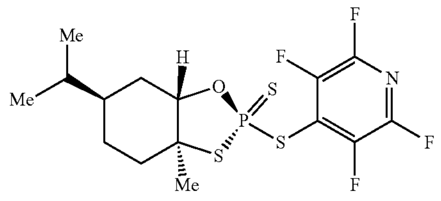

Enantiomer (-)

or

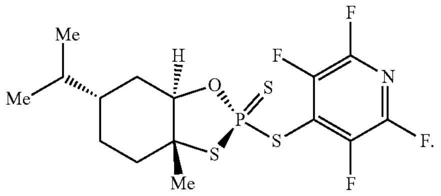

Enantiomer (+)

2. A method of making the compound of claim 1, comprising reacting compound 1:

(compound 1)

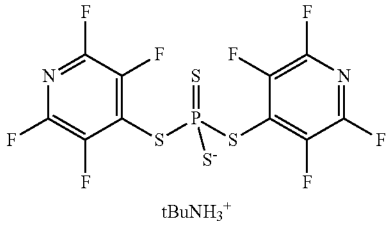

with compound 2 or compound 3:

(compound 2)

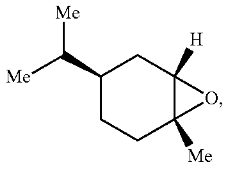

(compound 3)

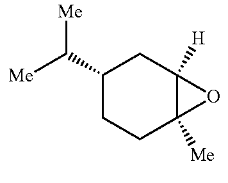

in the presence of an acid.

3. The method of claim 2, wherein the acid is selected from the group consisting of trifluoroacetic acid, dichloroacetic acid, acetic acid, and formic acid.

4. The method of claim 2, wherein compound 1 is formed by reacting compound 4:

(compound 4)

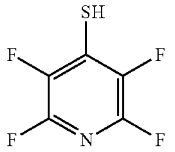

with $P_2S_5$ in the presence of a base.

5. The method of claim 4, wherein the base is selected from the group consisting of tert-butylamine, triethylamine, pyridine, tri-n-propylamine, trimethylamine, 1,2-bicyclo [2.2.2]octane, and 1,8-diazabicyclo[5.4.0]undec-7-ene.

6. The method of claim 2, wherein compound 2 or compound 3 is formed by reacting compound 5 or compound 6:

(compound 5)

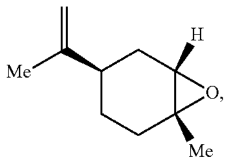

(compound 6)

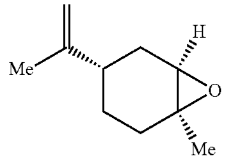

with hydrogen in the presence of a catalyst respectively.

7. The method of claim 6, wherein the catalyst is selected from the group consisting of platinum dioxide, palladium on carbon, platinum on carbon, Lindlar's catalyst, sponge nickel, nickel, rhodium on aluminum oxide, palladium, and platinum.

8. A method of making a nucleoside diphosphorothioate or a salt thereof, comprising:

(a) reacting one of compounds 7, 8, or 9:

(compound 7)

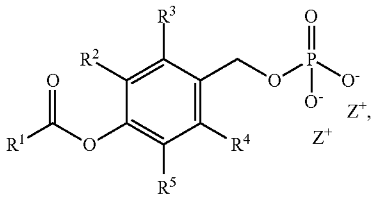

(compound 8)

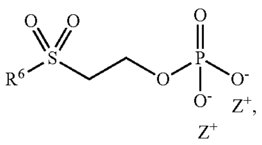

(compound 9)

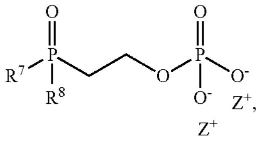

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl;

each of $R^6$, $R^7$, and $R^8$ is independently $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with the compound of claim 1 in the presence of a first base to form a chiral thiodiphosphate transfer reagent;

(b) reacting the chiral thiodiphosphate transfer reagent with a protected nucleoside or an unprotected nucleoside in the presence of a second base to form a protected nucleoside diphosphorothioate; and (c) deprotecting the protected nucleoside diphosphorothioate to form a nucleoside diphosphorothioate.

9. The method of claim 8, wherein the first base is selected from the group consisting of 1,8-diazabicyclo[5.4.0]undec-7-ene, 2-tert-butyl-1,1,3,3-tetramethylguanidine, 1, 1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, triethylamine, pyridine, 2,6-lutidine, and imidazole.

10. The method of claim 8, wherein the second base is selected from the group consisting of 1,8-diazabicyclo [5.4.0]undec-7-ene, 1,5-diazabicyclo[4.3.0]non-5-ene, 2-tert-butyl-1,1,3,3-tetramethylguanidine, and 1,1,3,3-tetramethylguanidine.

11. The method of claim 10, wherein the second base is 1,8-diazabicyclo(5.4.0)undec-7-ene.

12. The method of claim 8, wherein the nucleoside is selected from the group consisting of compound 10, compound 11, compound 12, compound 13, compound 14, compound 15, compound 16, compound 17, compound 18, and compound 19:

(compound 10)

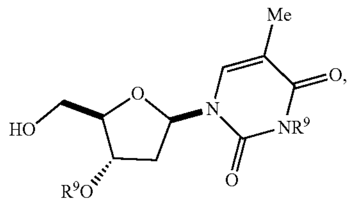

(compound 11)

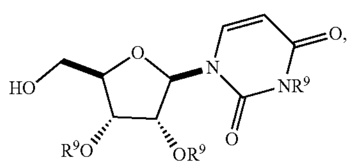

(compound 12)

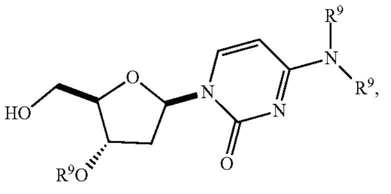

-continued
(compound 13)
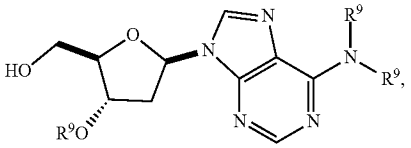
(compound 14)
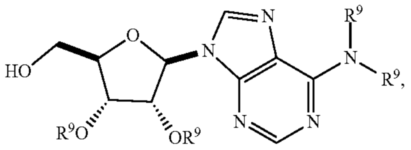
(compound 15)
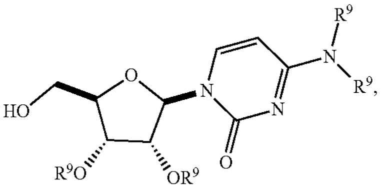
(compound 16)
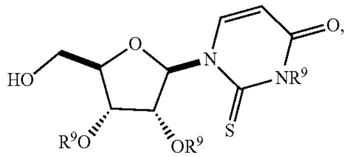
(compound 17)
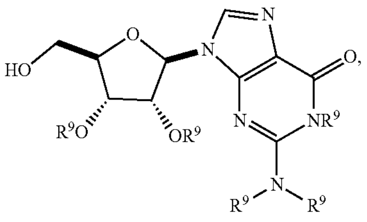
(compound 18)
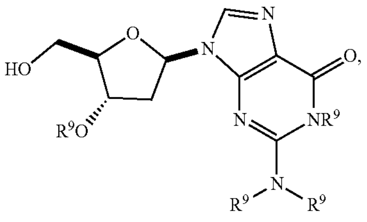
(compound 19)
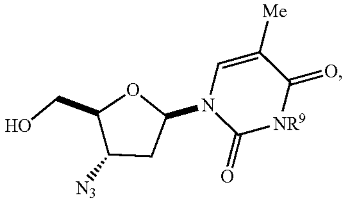
wherein each of RY is independently hydrogen, acetyl, branched or linear $C_2$-$C_{20}$ alkanoyl, benzoyl, aryloyl, acryloyl, or heteroaryloyl.
13. The method of claim 8, wherein the nucleoside diphosphorothioate is selected from the group consisting of:
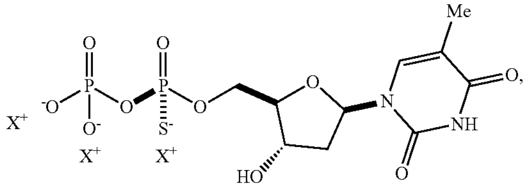
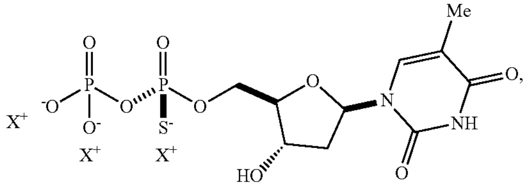
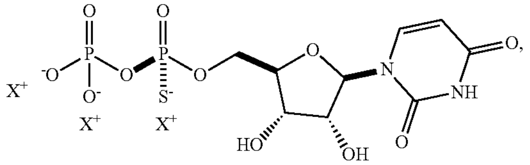
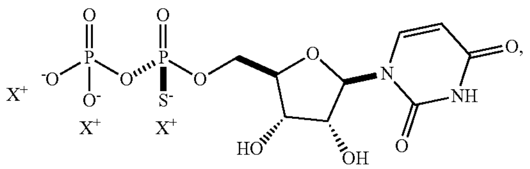
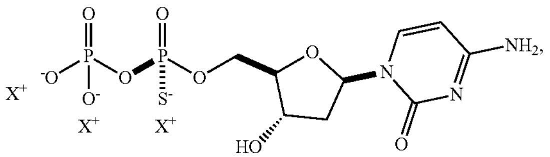
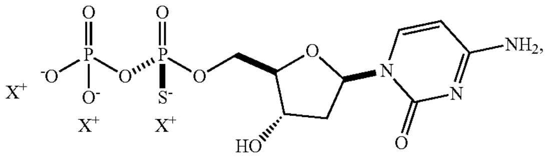
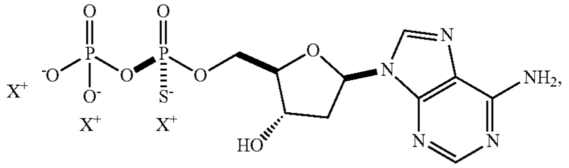
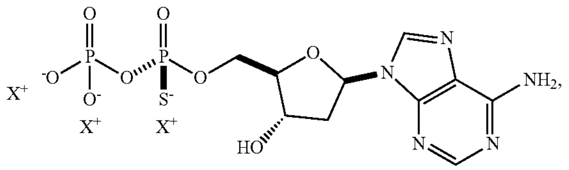
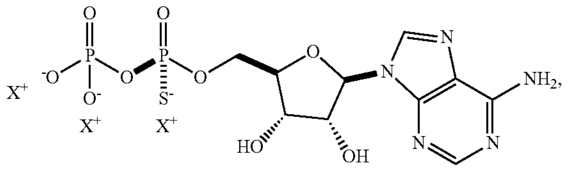
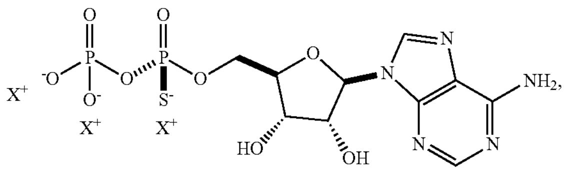

-continued
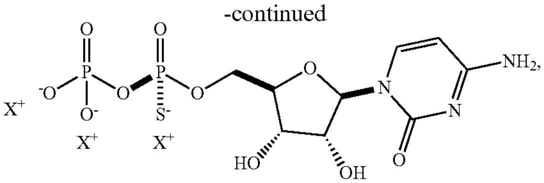,
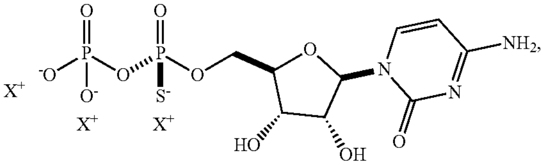,
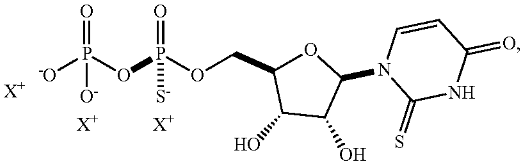,
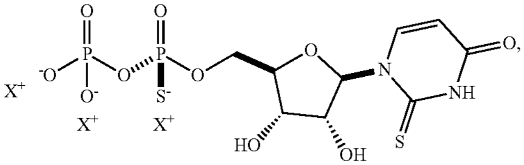,
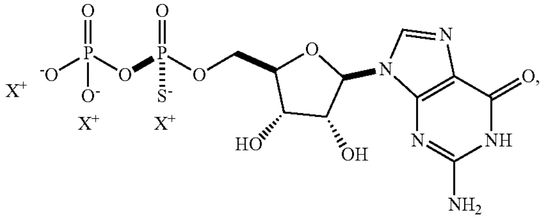,
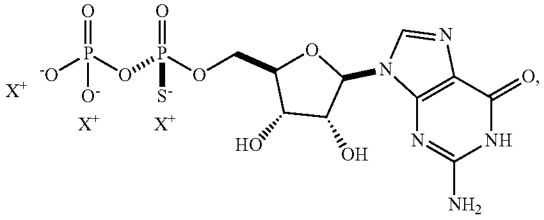,
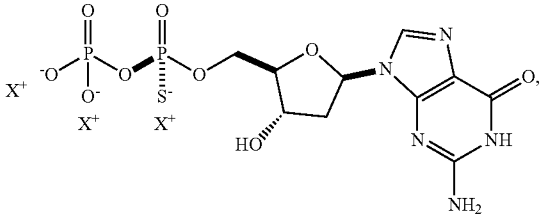,
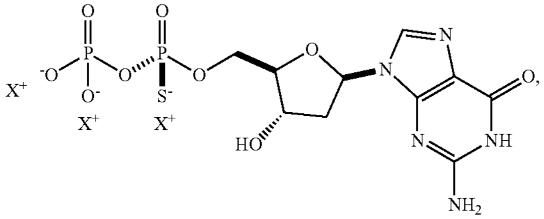,
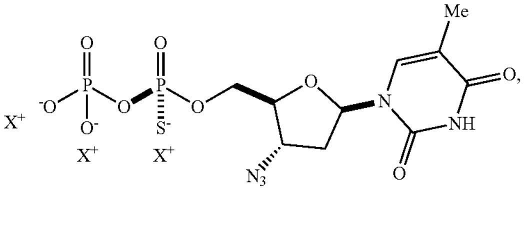,
-continued
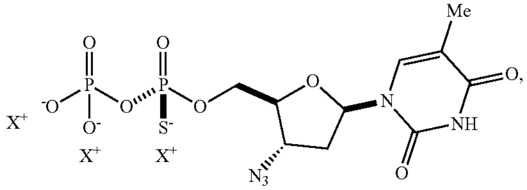,
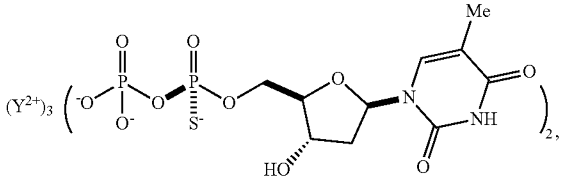,
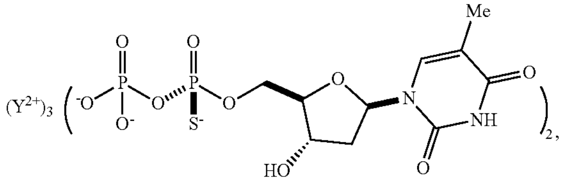,
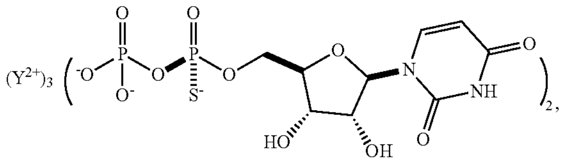,
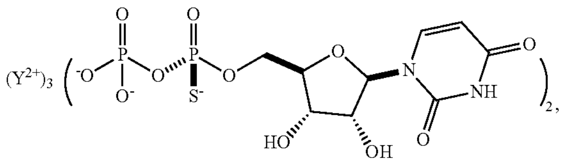,
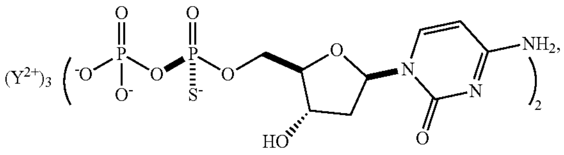
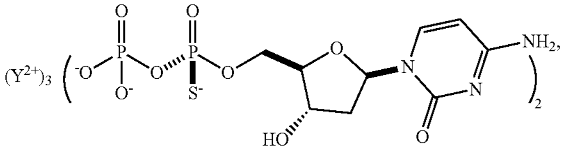
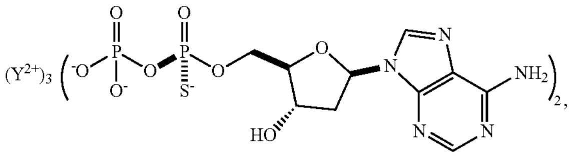,
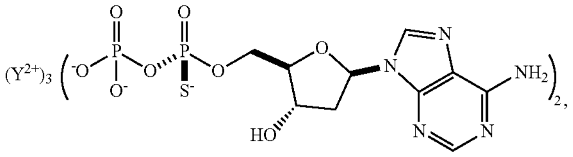,
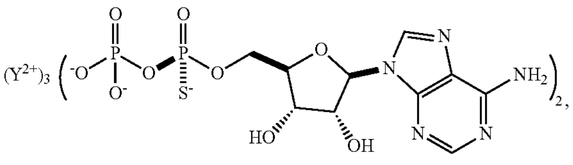, -continued
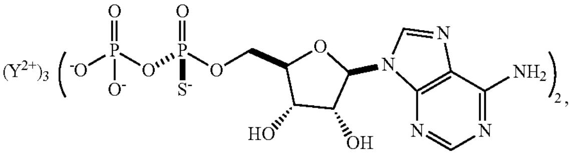
,
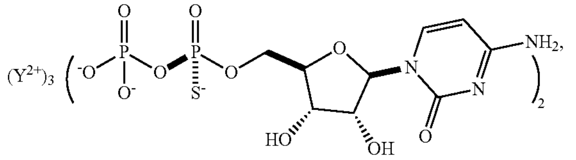
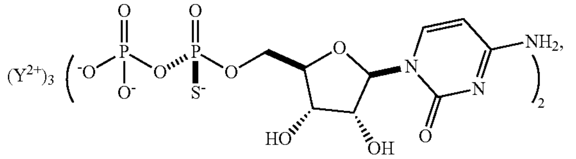
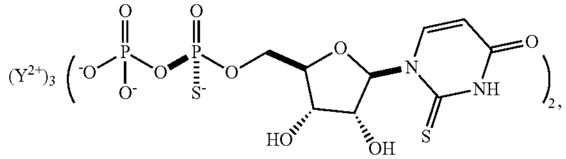
,
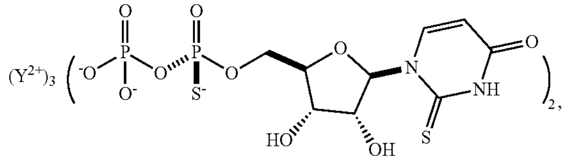
,
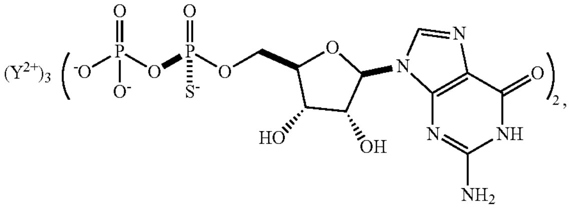
,
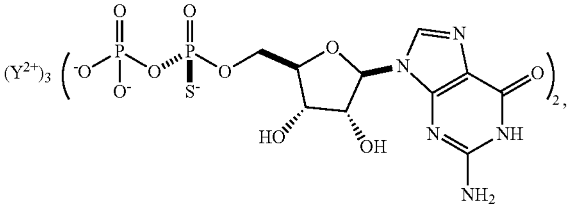
,
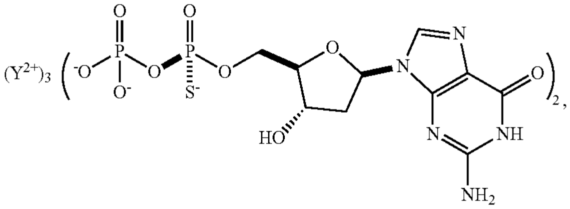
,
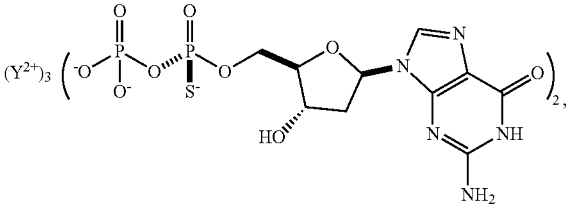
,
-continued
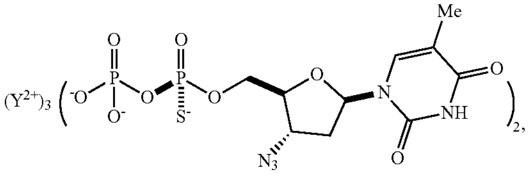
, and
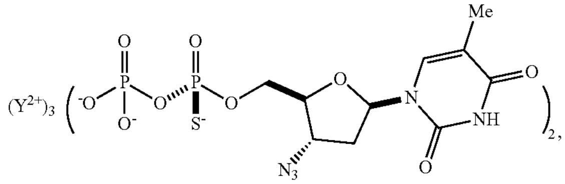
,
wherein X is ammonium, trialkylammonium, lithium, sodium, or potassium;
and Y is calcium or magnesium.
14. The method of claim 13, wherein the nucleoside diphosphorothioate is selected from the group consisting of:
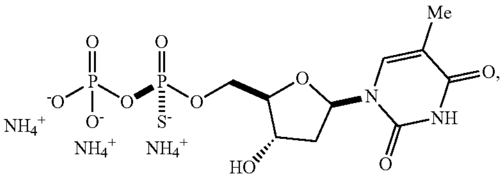
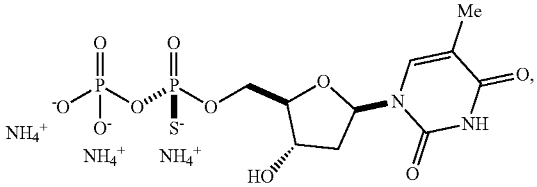
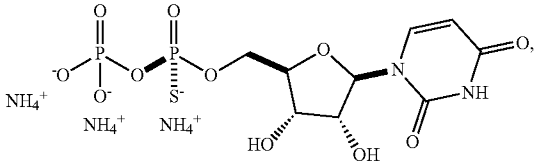
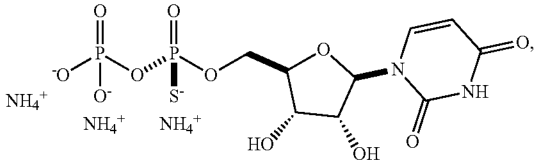
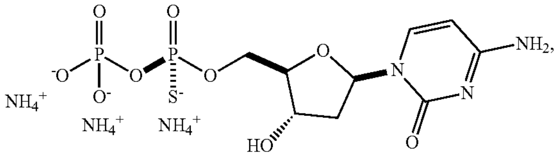
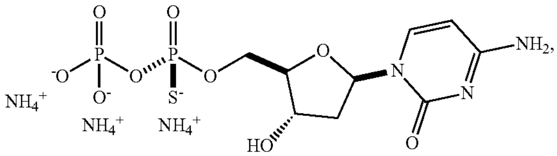

-continued
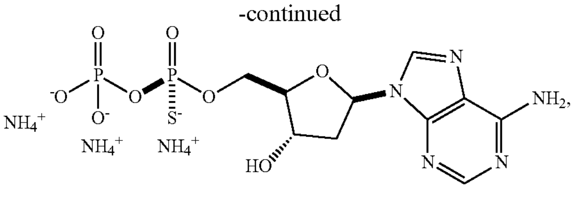
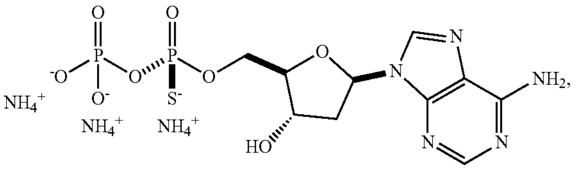
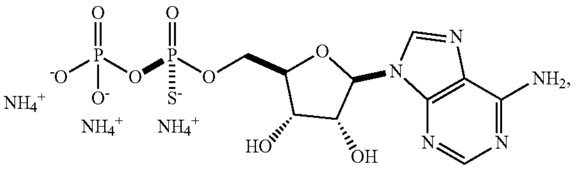
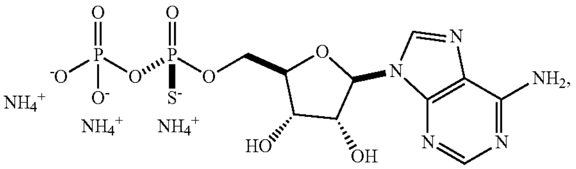
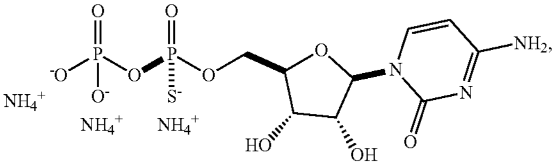
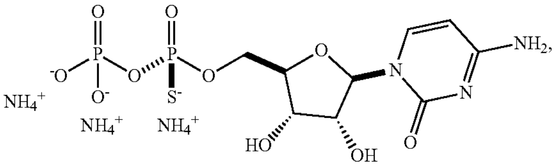
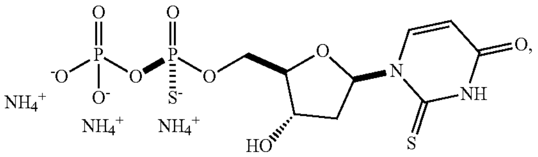
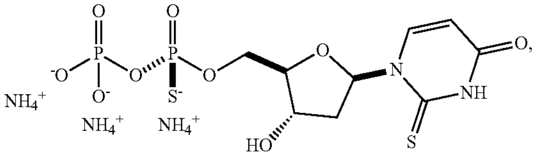
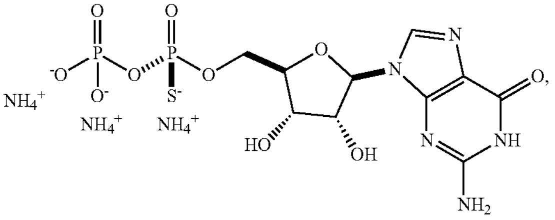
-continued
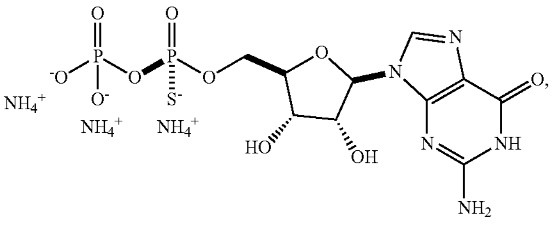
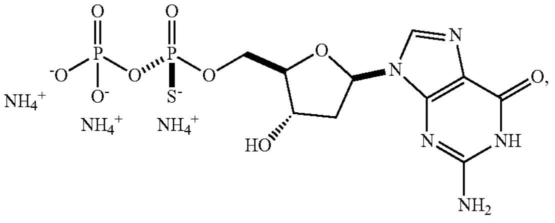
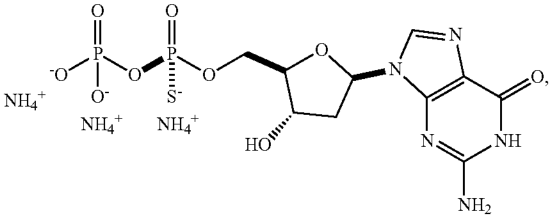
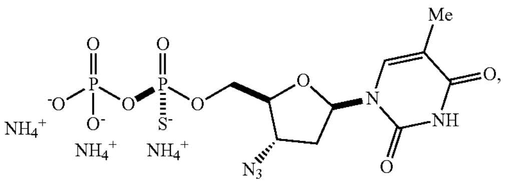
and
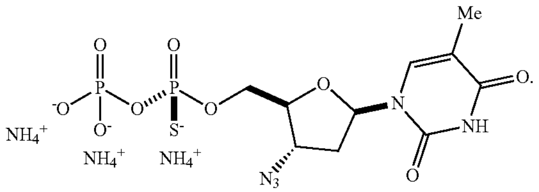
15. A method of making a nucleoside triphosphorothioate or a salt thereof, comprising:
(a) reacting compound 20 or compound 21:
(compound 20)
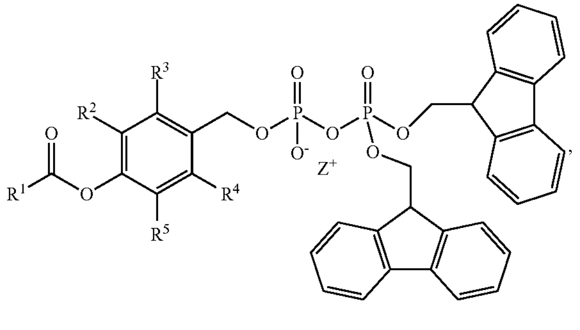

-continued (compound 21)

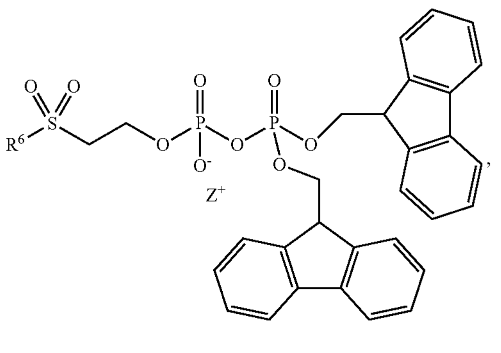

wherein each of $R^1$, $R^2$, $R^3$, $R^4$, and $R^5$ is independently hydrogen, $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl;

$R^6$ is $CD_3$, $CF_3$, linear or branched $C_1$-$C_{20}$ alkyl, linear or branched $C_2$-$C_{12}$ alkenyl, linear or branched $C_2$-$C_{12}$ alkynyl, aryl, heteroaryl, heterocycle, or $C_3$-$C_8$ cycloalkyl; and Z is hydrogen, alkylammonium, dialkylammonium, trialkylammonium, or tetralkylammonium;

with the compound of claim 1 in the presence of a first base to form a chiral thiotriphosphate transfer reagent;

(b) reacting the chiral thiotriphosphate transfer reagent with a protected nucleoside or an unprotected nucleoside in the presence of a second base to form a protected nucleoside triphosphorothioate; and (c) deprotecting the protected nucleoside triphosphorothioate to form a nucleoside triphosphorothioate.

16. The method of claim 15, wherein the first base is selected from the group consisting of 1,8-diazabicyclo[5.4.0]undec-7-ene, 2-tert-butyl-1,1,3,3-tetramethylguanidine, 1,1,3,3-tetramethylguanidine, lithium bis(trimethylsilyl)amide, lithium tert-butoxide, potassium bis(trimethylsilyl)amide, potassium tert-butoxide, sodium bis(trimethylsilyl)amide, sodium tert-butoxide, 1,4-diazabicyclo[2.2.2]octane, N-methylimidazole, N,N-diisopropylethylamine, and triethylamine.

17. The method of claim 15, wherein the second base is selected from the group consisting of 1,8-diazabicyclo[5.4.0]undec-7-ene, 1,5-diazabicyclo[4.3.0]non-5-ene, 2-tert-butyl-1,1,3,3-tetramethylguanidine, and 1,1,3,3-tetramethylguanidine.

18. The method of claim 17, wherein the second base is 1,8-diazabicyclo(5.4.0)undec-7-ene.

19. The method of claim 15, wherein the nucleoside is selected from the group consisting of compound 10, compound 11, compound 12, compound 13, compound 14, compound 15, compound 16, compound 17, compound 18, and compound 19:

(compound 10)

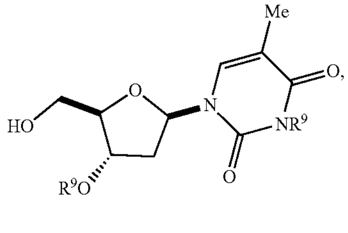

-continued (compound 11)

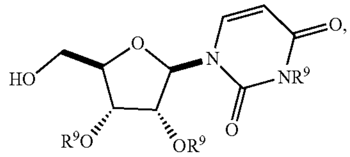

(compound 12)

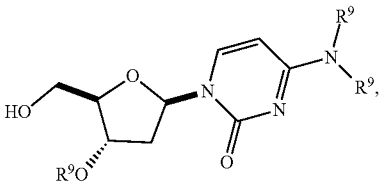

(compound 13)

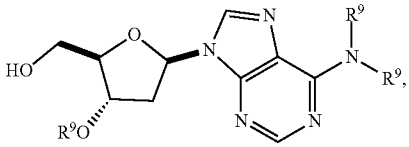

(compound 14)

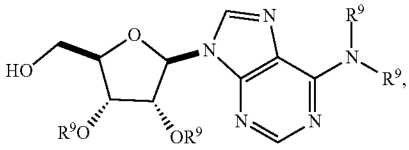

(compound 15)

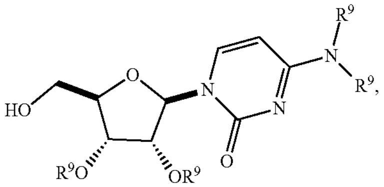

(compound 16)

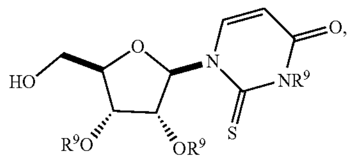

(compound 17)

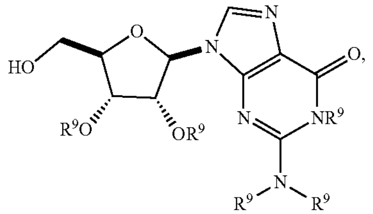

(compound 18)

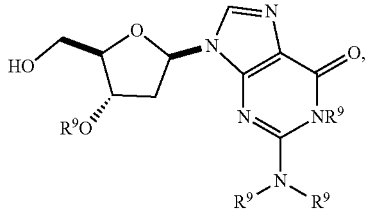

-continued
(compound 19)
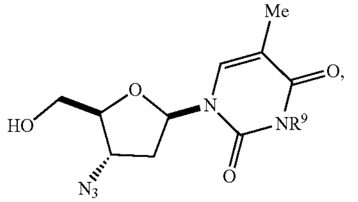
wherein each of $R^9$ is independently hydrogen, acetyl, branched or linear $C_2$-$C_{20}$ alkanoyl, benzoyl, aryloyl, acryloyl, or heteroaryloyl.
20. The method of claim 15, wherein the nucleoside triphosphorothioate is selected from the group consisting of:
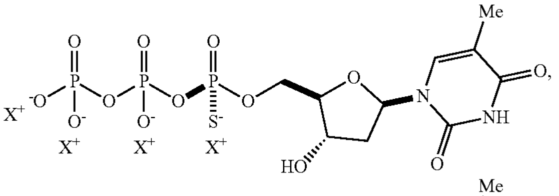
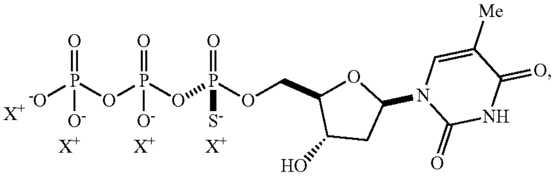
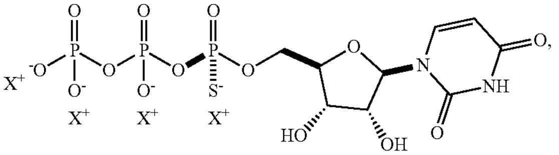
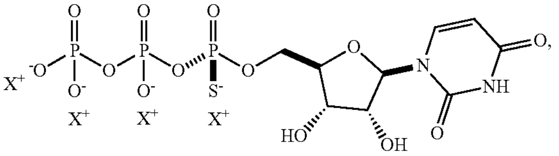
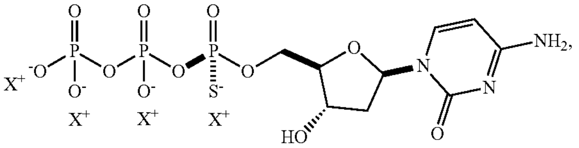
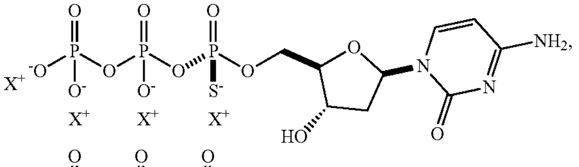
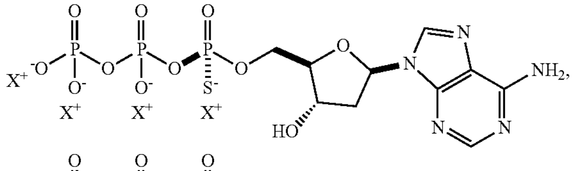
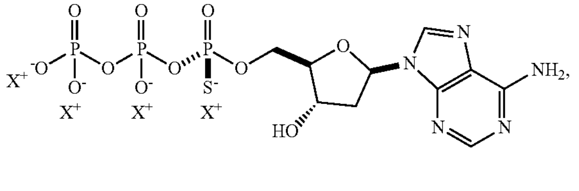
-continued
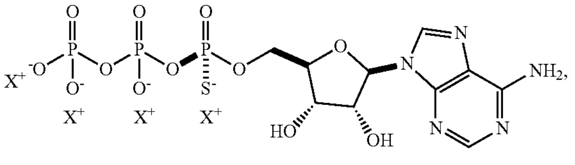
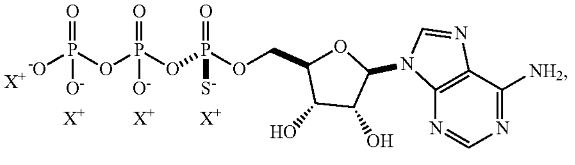
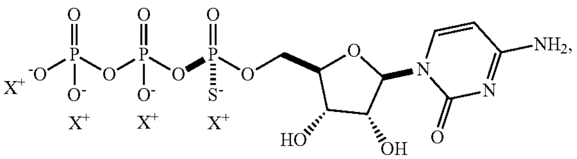
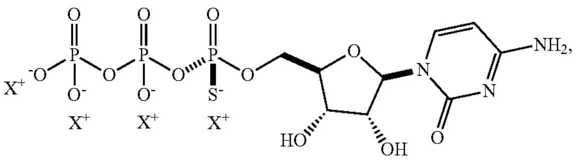
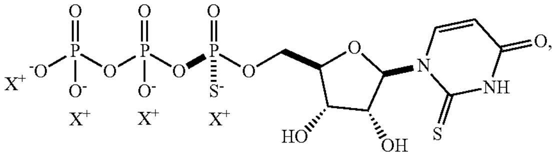
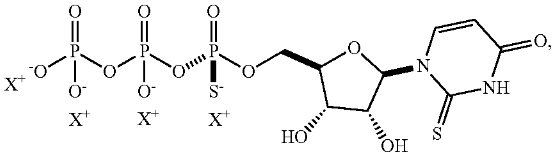
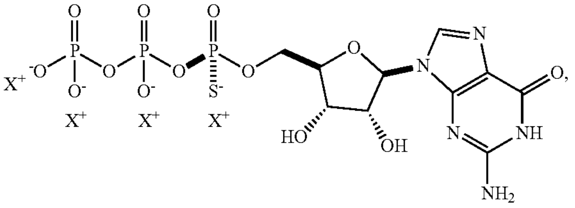
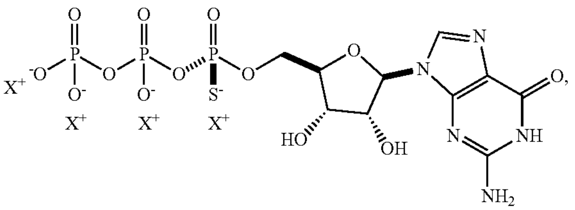
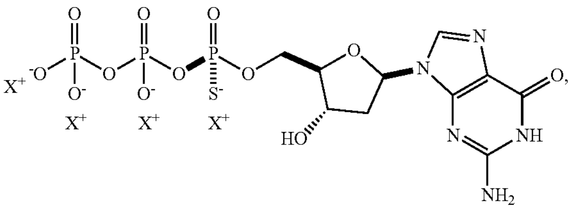

-continued
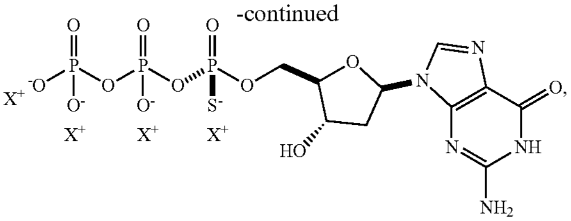
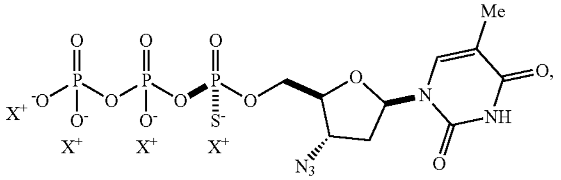
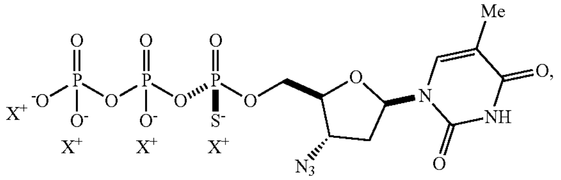
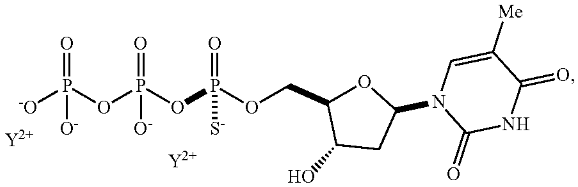
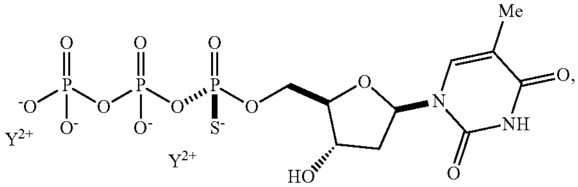
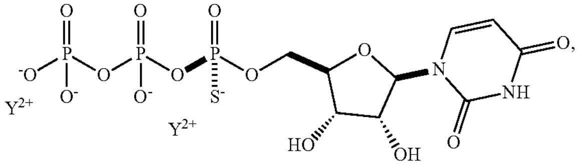
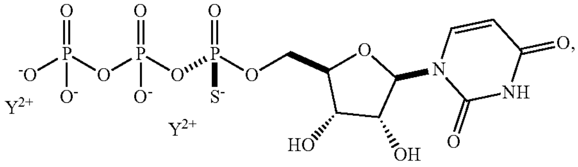
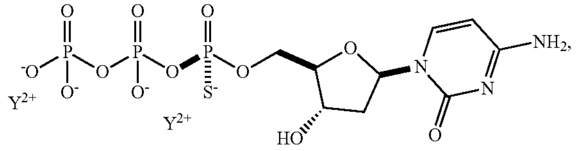
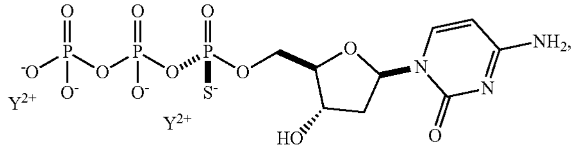
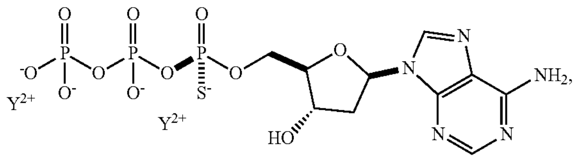
-continued
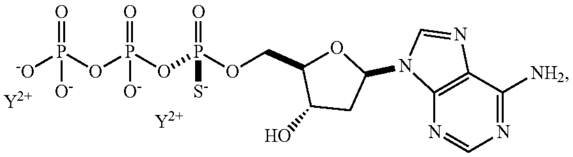
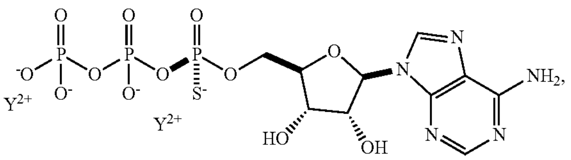
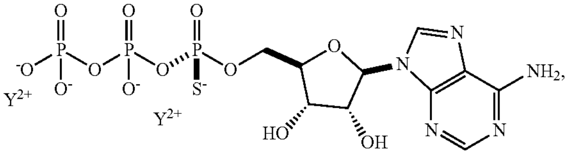
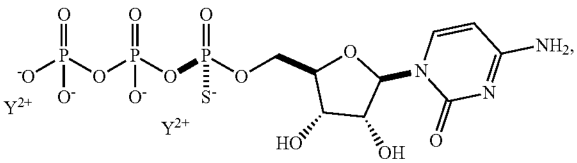
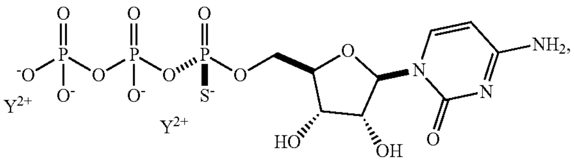
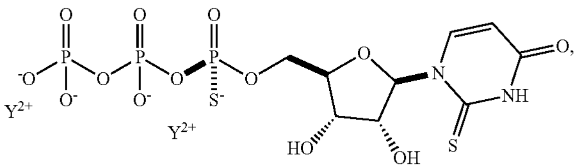
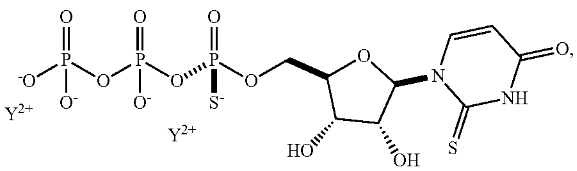
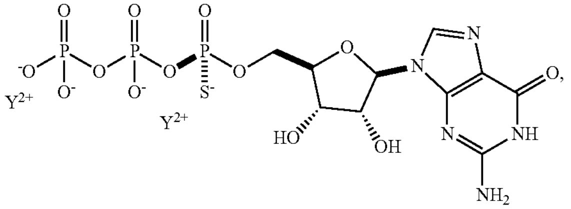
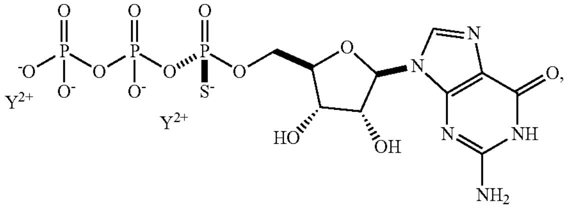

-continued
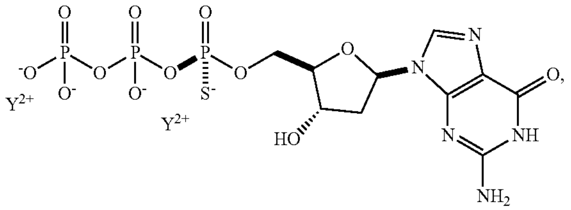
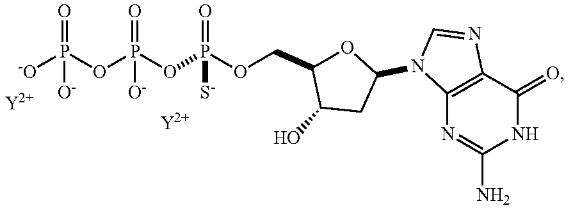
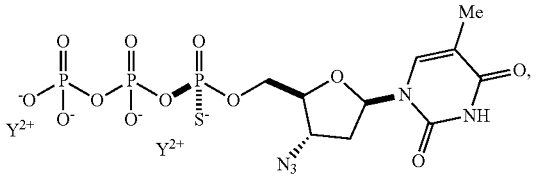
and
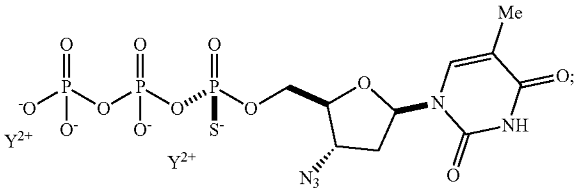
wherein X is ammonium, trialkylammonium, lithium, sodium, or potassium;
and Y is calcium or magnesium.
21. The method of claim 20, wherein the nucleoside triphosphorothioate is selected from the group consisting of:
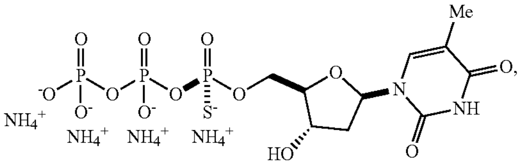
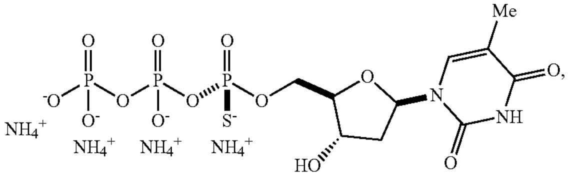
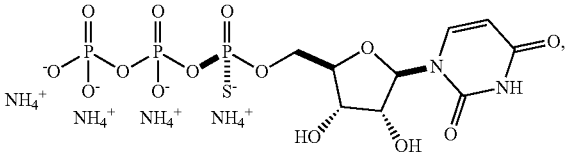
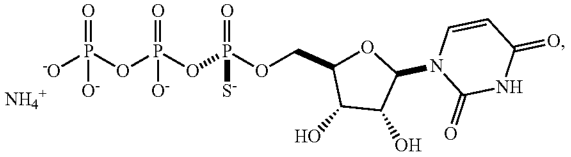
-continued
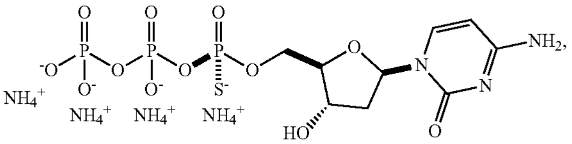
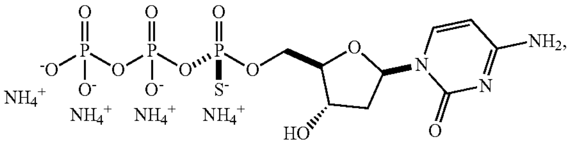
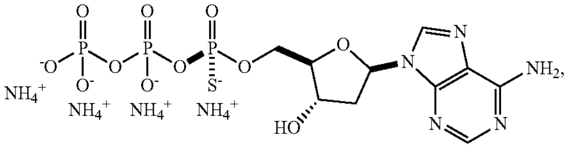
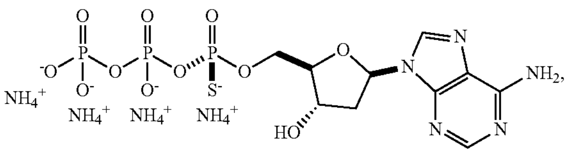
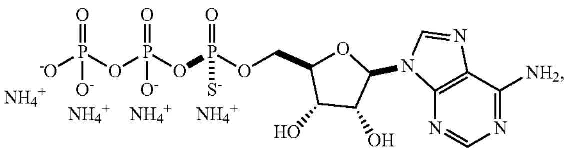
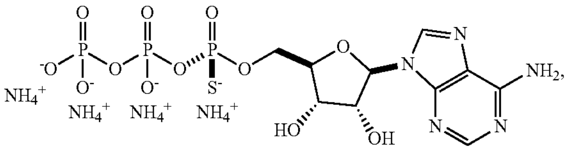
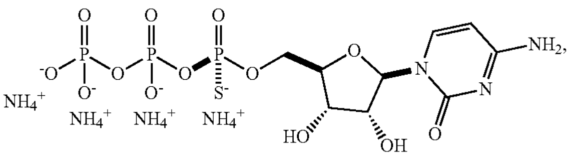
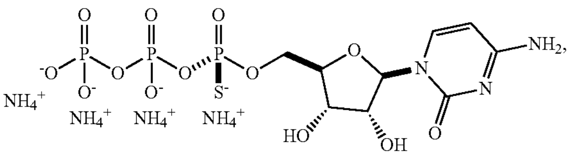
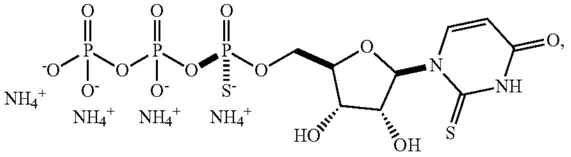
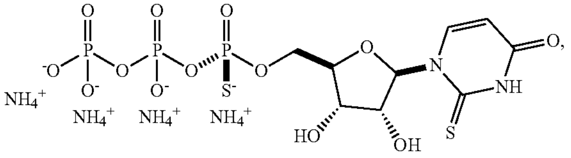
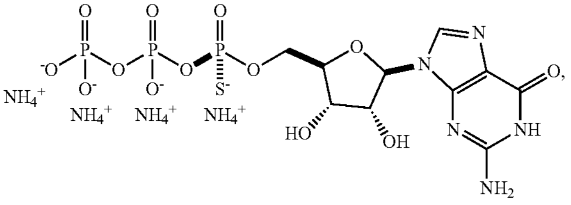

-continued
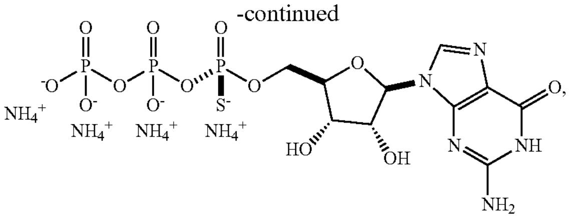
,
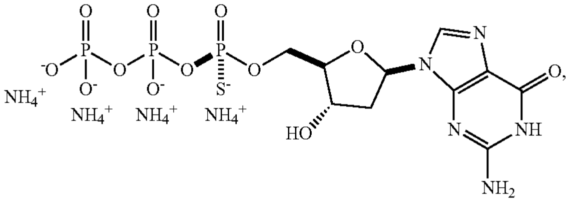
,
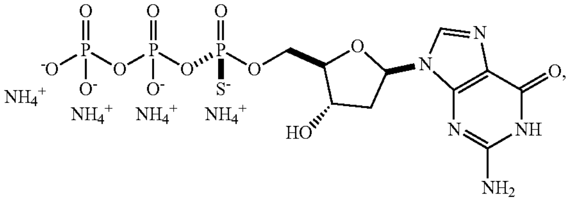
,
-continued
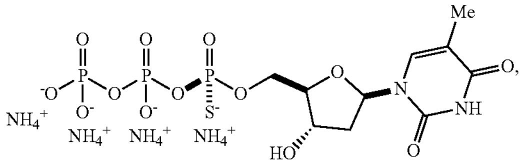
, and
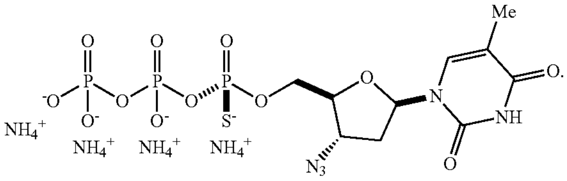
.
* * * * *